(12) United States Patent
Palangie et al.

(10) Patent No.: US 11,557,102 B2
(45) Date of Patent: Jan. 17, 2023

(54) METHODS FOR MANIPULATING OBJECTS IN AN ENVIRONMENT

(71) Applicant: Apple Inc., Cupertino, CA (US)

(72) Inventors: Alexis Henri Palangie, Palo Alto, CA (US); Peter D. Anton, San Francisco, CA (US); Stephen O. Lemay, Palo Alto, CA (US); Christopher D. Mckenzie, San Mateo, CA (US); Israel Pastrana Vicente, San Jose, CA (US); Dorian D. Dargan, San Francisco, CA (US); Shih-Sang Chiu, Menlo Park, CA (US); Jonathan Perron, Felton, CA (US); Tong Chen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/478,593

(22) Filed: Sep. 17, 2021

(65) Prior Publication Data
US 2022/0101612 A1    Mar. 31, 2022

Related U.S. Application Data

(60) Provisional application No. 63/083,720, filed on Sep. 25, 2020.

(51) Int. Cl.
*G06T 19/00* (2011.01)
*G06V 20/20* (2022.01)
*G06F 3/01* (2006.01)

(52) U.S. Cl.
CPC ............ *G06T 19/006* (2013.01); *G06F 3/013* (2013.01); *G06F 3/017* (2013.01); *G06T 19/003* (2013.01); *G06V 20/20* (2022.01)

(58) Field of Classification Search
CPC ..... G06T 19/006; G06T 19/003; G06F 3/013; G06F 3/017; G06F 3/011; G06V 20/20
See application file for complete search history.

(56) References Cited

U.S. PATENT DOCUMENTS

| 6,323,846 B1 | 11/2001 | Westerman et al. |
|---|---|---|
| 6,570,557 B1 | 5/2003 | Westerman et al. |

(Continued)

FOREIGN PATENT DOCUMENTS

| WO | 2013/169849 A2 | 11/2013 |
|---|---|---|
| WO | 2014/105276 A1 | 7/2014 |

OTHER PUBLICATIONS

International Search Report received for PCT Patent Application No. PCT/US2021/050948, dated Mar. 4, 2022, 6 pages.

*Primary Examiner* — Jeffery A Brier
(74) *Attorney, Agent, or Firm* — Kubota & Basol LLP

(57) ABSTRACT

In some embodiments, an electronic device automatically updates the orientation of a virtual object in a three-dimensional environment based on a viewpoint of a user in the three-dimensional environment. In some embodiments, an electronic device automatically updates the orientation of a virtual object in a three-dimensional environment based on viewpoints of a plurality of users in the three-dimensional environment. In some embodiments, the electronic device modifies an appearance of a real object that is between a virtual object and the viewpoint of a user in a three-dimensional environment. In some embodiments, the electronic device automatically selects a location for a user in a three-dimensional environment that includes one or more virtual objects and/or other users.

45 Claims, 75 Drawing Sheets

(56) References Cited

U.S. PATENT DOCUMENTS

| | | | |
|---|---|---|---|
| 6,677,932 B1 | 1/2004 | Westerman | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 9,348,458 B2 | 5/2016 | Hotelling et al. | |
| 9,933,937 B2 | 4/2018 | Lemay et al. | |
| 2002/0015024 A1 | 2/2002 | Westerman et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2014/0347391 A1 | 11/2014 | Keane et al. | |
| 2018/0101223 A1* | 4/2018 | Ishihara | G06F 3/147 |
| 2018/0158222 A1* | 6/2018 | Hayashi | G06T 11/60 |

* cited by examiner

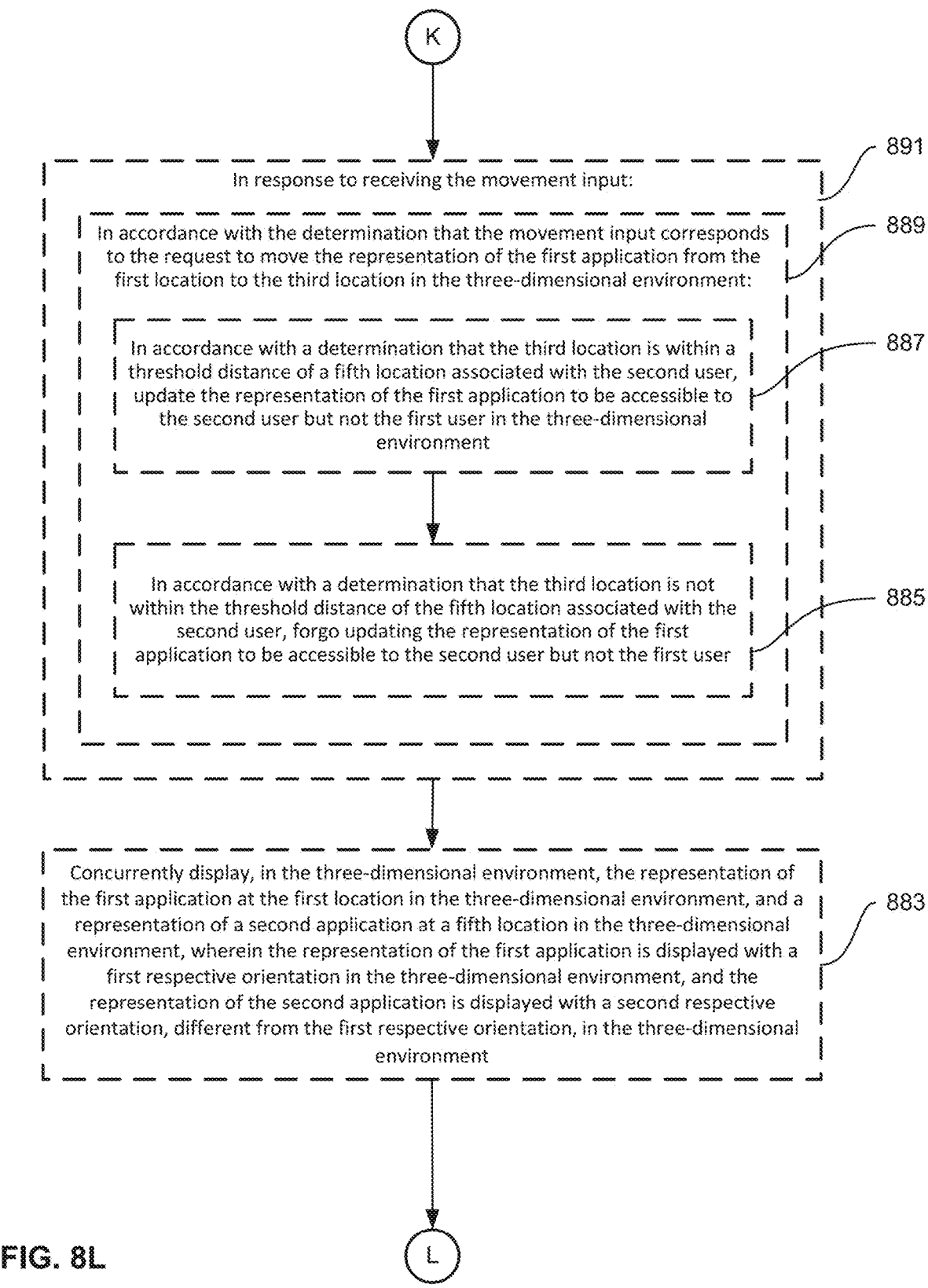

METHODS FOR MANIPULATING OBJECTS IN AN ENVIRONMENT

CROSS-REFERENCE TO RELATED APPLICATIONS

This application claims the benefit of U.S. Provisional Application No. 63/083,720, filed Sep. 25, 2020, the content of which is incorporated herein by reference in its entirety for all purposes.

TECHNICAL FIELD

This relates generally to computer systems with a display generation component and one or more input devices that present graphical user interfaces, including but not limited to electronic devices that present three-dimensional environments, via the display generation component, that include virtual objects.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects include digital images, video, text, icons, and control elements such as buttons and other graphics.

But methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious and error-prone, create a significant cognitive burden on a user, and detract from the experience with the virtual/augmented reality environment. In addition, these methods take longer than necessary, thereby wasting energy. This latter consideration is particularly important in battery-operated devices.

SUMMARY

Accordingly, there is a need for computer systems with improved methods and interfaces for providing computer generated experiences to users that make interaction with the computer systems more efficient and intuitive for a user. Such methods and interfaces optionally complement or replace conventional methods for providing computer generated reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems with a display generation component and one or more input devices are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through stylus and/or finger contacts and gestures on the touch-sensitive surface, movement of the user's eyes and hand in space relative to the GUI or the user's body as captured by cameras and other movement sensors, and voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

There is a need for electronic devices with improved methods and interfaces for interacting with objects in a three-dimensional environment. Such methods and interfaces may complement or replace conventional methods for interacting with objects in a three-dimensional environment. Such methods and interfaces reduce the number, extent, and/or the nature of the inputs from a user and produce a more efficient human-machine interface.

In some embodiments, an electronic device automatically updates the orientation of a virtual object in a three-dimensional environment based on a viewpoint of a user in the three-dimensional environment. In some embodiments, an electronic device automatically updates the orientation of a virtual object in a three-dimensional environment based on viewpoints of a plurality of users in the three-dimensional environment. In some embodiments, the electronic device modifies an appearance of a real object that is between a virtual object and the viewpoint of a user in a three-dimensional environment. In some embodiments, the electronic device automatically selects a location for a user in a three-dimensional environment that includes one or more virtual objects and/or other users.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
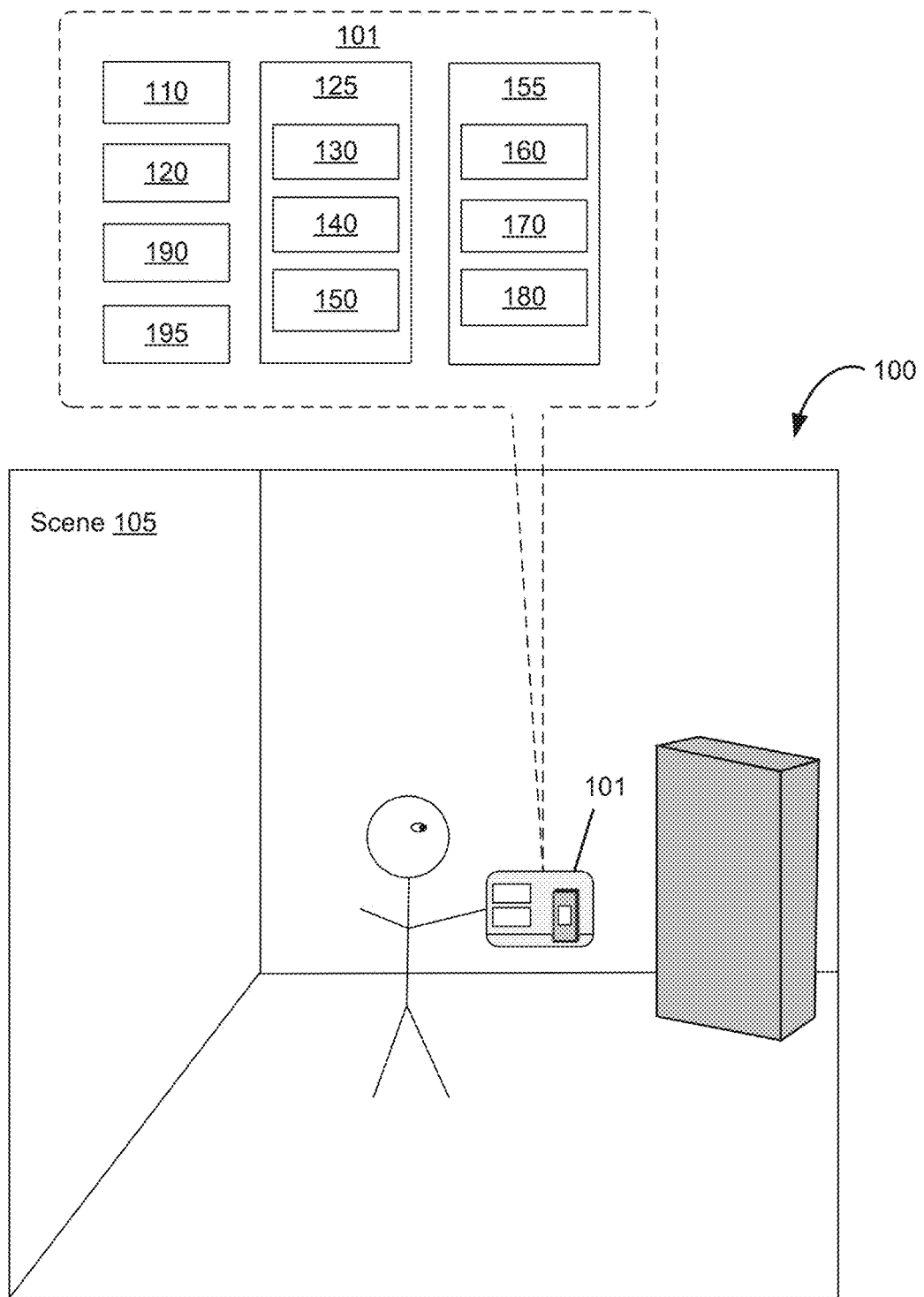
FIG. 1 is a block diagram illustrating an operating environment of a computer system for providing CGR experiences in accordance with some embodiments.

The present disclosure relates to user interfaces for providing a computer generated reality (CGR) experience to a user, in accordance with some embodiments.

The systems, methods, and GUIs described herein provide improved ways for an electronic device to interact with and manipulate objects in a three-dimensional environment. The three-dimensional environment optionally includes one or more virtual objects, one or more representations of real objects (e.g., displayed as photorealistic (e.g., "pass-through") representations of the real objects or visible to the user through a transparent portion of the display generation component) that are in the physical environment of the electronic device, and/or representations of users in the three-dimensional environment.

In some embodiments, an electronic device automatically updates the orientation of a virtual object in a three-dimensional environment based on a viewpoint of a user in the three-dimensional environment. In some embodiments, the electronic device moves the virtual object in accordance with a user input and, in response to termination of the user input, displays the object at an updated location. In some embodiments, the electronic device automatically updates the orientation of the virtual object at the updated location (e.g., and/or as the virtual object moves to the updated location) so that the virtual object is oriented towards a viewpoint of the user in the three-dimensional environment (e.g., throughout and/or at the end of its movement). Automatically updating the orientation of the virtual object in the three-dimensional environment enables the user to view and interact with the virtual object more naturally and efficiently, without requiring the user to adjust the orientation of the object manually.

In some embodiments, an electronic device automatically updates the orientation of a virtual object in a three-dimensional environment based on viewpoints of a plurality of users in the three-dimensional environment. In some embodiments, the electronic device moves the virtual object in accordance with a user input and, in response to termination of the user input, displays the object at an updated location. In some embodiments, the electronic device automatically updates the orientation of the virtual object at the updated location (e.g., and/or as the virtual object moves to the updated location) so that the virtual object is oriented towards viewpoints of a plurality of users in the three-dimensional environment (e.g., throughout and/or at the end of its movement). Automatically updating the orientation of the virtual object in the three-dimensional environment enables the users to view and interact with the virtual object more naturally and efficiently, without requiring the users to adjust the orientation of the object manually.

In some embodiments, the electronic device modifies an appearance of a real object that is between a virtual object and the viewpoint of a user in a three-dimensional environment. The electronic device optionally blurs, darkens, or otherwise modifies a portion of a real object (e.g., displayed as a photorealistic (e.g., "pass-through") representation of the real object or visible to the user through a transparent portion of the display generation component) that is in between a viewpoint of a user and a virtual object in the three-dimensional environment. In some embodiments, the electronic device modifies a portion of the real object that is within a threshold distance (e.g., 5, 10, 30, 50, 100, etc. centimeters) of a boundary of the virtual object without modifying a portion of the real object that is more than the threshold distance from the boundary of the virtual object. Modifying the appearance of the real object allows the user to more naturally and efficiently view and interact with the virtual object. Moreover, modifying the appearance of the real object reduces cognitive burden on the user.

In some embodiments, the electronic device automatically selects a location for a user in a three-dimensional environment that includes one or more virtual objects and/or other users. In some embodiments, a user gains access to a three-dimensional environment that already includes one or more other users and one or more virtual objects. In some embodiments, the electronic device automatically selects a location with which to associate the user (e.g., a location at which to place the viewpoint of the user) based on the locations and orientations of the virtual objects and other users in the three-dimensional environment. In some embodiments, the electronic device selects a location for the user to enable the user to view the other users and the virtual objects in the three-dimensional environment without blocking other users' views of the users and the virtual objects. Automatically placing the user in the three-dimensional environment based on the locations and orientations of the virtual objects and other users in the three-dimensional environment enables the user to efficiently view and interact with the virtual objects and other users in the three-dimensional environment, without requiring the user manually select a location in the three-dimensional environment with which to be associated.

FIGS. 1-6 provide a description of example computer systems for providing CGR experiences to users (such as described below with respect to methods 800, 1000, 1200, and 1400). In some embodiments, as shown in FIG. 1, the CGR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a CGR experience, various terms are used to differentially refer to several related but distinct environments that the user may sense and/or with which a user may interact (e.g., with inputs detected by a computer system 101 generating the CGR experience that cause the computer system generating the CGR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a CGR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the CGR experience (e.g., at least a visual component of the CGR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a CGR experience to the user while the user is virtually and/or physically present within the scene 105.

In some embodiments, the display generation component is worn on a part of the user's body (e.g., on his/her head, on his/her hand, etc.). As such, the display generation component 120 includes one or more CGR displays provided to display the CGR content. For example, in various embodiments, the display generation component 120 encloses the field-of-view of the user. In some embodiments, the display generation component 120 is a handheld device (such as a smartphone or tablet) configured to present CGR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a CGR chamber, enclosure, or room configured to present CGR content in which the user does not wear or hold the display generation component 120. Many user interfaces described with reference to one type of hardware for displaying CGR content (e.g., a handheld device or a device on a tripod) could be implemented on another type of hardware for displaying CGR content (e.g., an HMD or other wearable computing device). For example, a user interface showing interactions with CGR content triggered based on interactions that happen in a space in front of a handheld or tripod mounted device could similarly be implemented with an HMD where the interactions happen in a space in front of the HMD and the responses of the CGR content are displayed via the HMD. Similarly, a user interface showing interactions with CRG content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operation environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
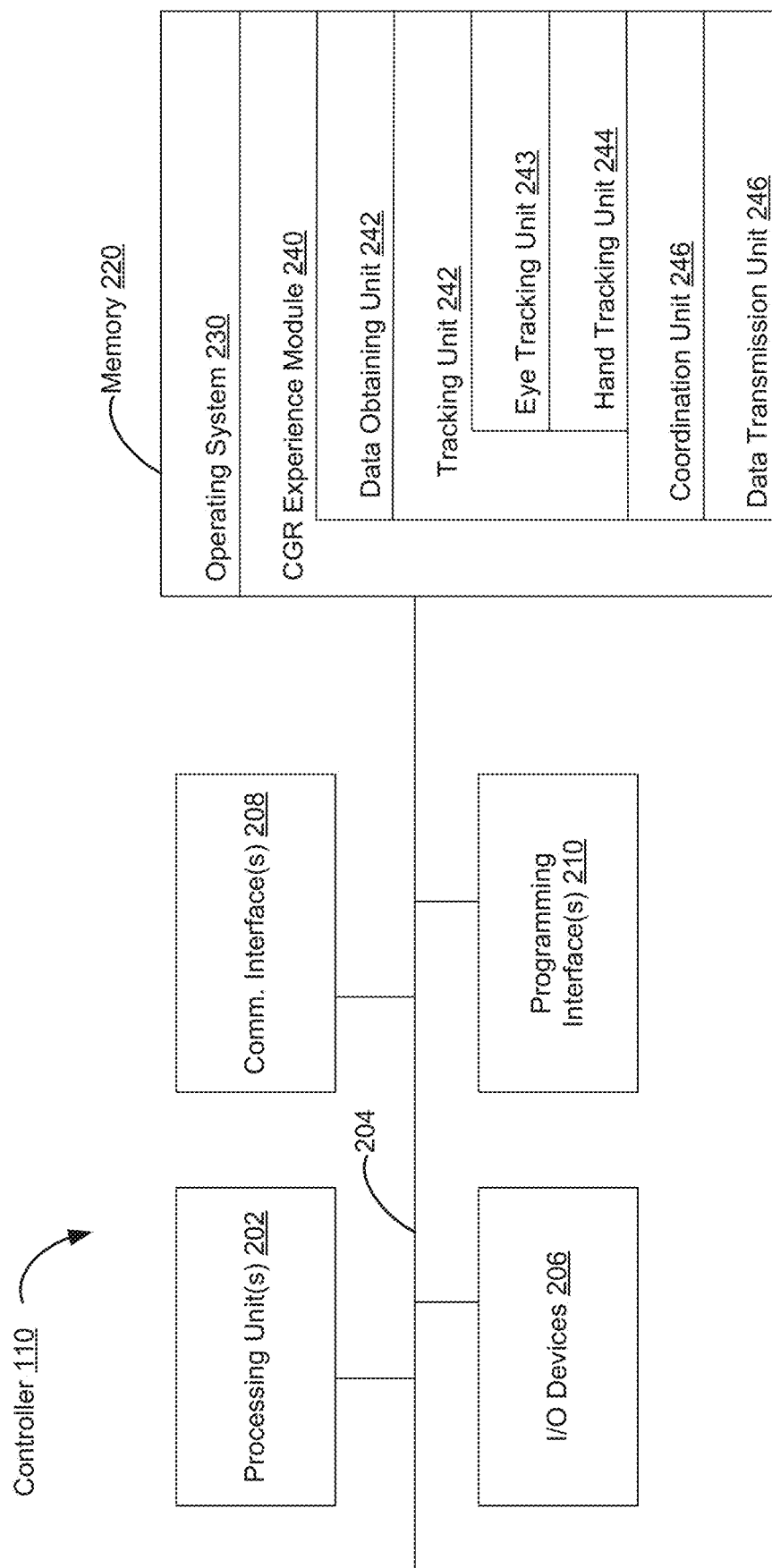
FIG. 2 is a block diagram illustrating a controller of a computer system that is configured to manage and coordinate a CGR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a CGR experience module 240.

The operating system 230 includes instructions for handling various basic system services and for performing hardware dependent tasks. In some embodiments, the CGR experience module 240 is configured to manage and coordinate one or more CGR experiences for one or more users (e.g., a single CGR experience for one or more users, or multiple CGR experiences for respective groups of one or more users). To that end, in various embodiments, the CGR experience module 240 includes a data obtaining unit 242, a tracking unit 244, a coordination unit 246, and a data transmitting unit 248.

In some embodiments, the data obtaining unit 242 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 242 includes instructions and/or logic therefor, and heuristics and metadata therefor.

In some embodiments, the tracking unit 244 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 244 includes instructions and/or logic therefor, and heuristics and metadata therefor. In some embodiments, the tracking unit 244 includes hand tracking unit 243 and/or eye tracking unit 245. In some embodiments, the hand tracking unit 243 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 243 is described in greater detail below with respect to FIG. 4. In some embodiments, the eye tracking unit 245 is configured to track the position and movement of the user's gaze (or more broadly, the user's eyes, face, or head) with respect to the scene 105 (e.g., with respect to the physical environment and/or to the user (e.g., the user's hand)) or with respect to the CGR content displayed via the display generation component 120. The eye tracking unit 245 is described in greater detail below with respect to FIG. 5.

In some embodiments, the coordination unit 246 is configured to manage and coordinate the CGR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 242, the tracking unit 244 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 242, the tracking unit 244 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
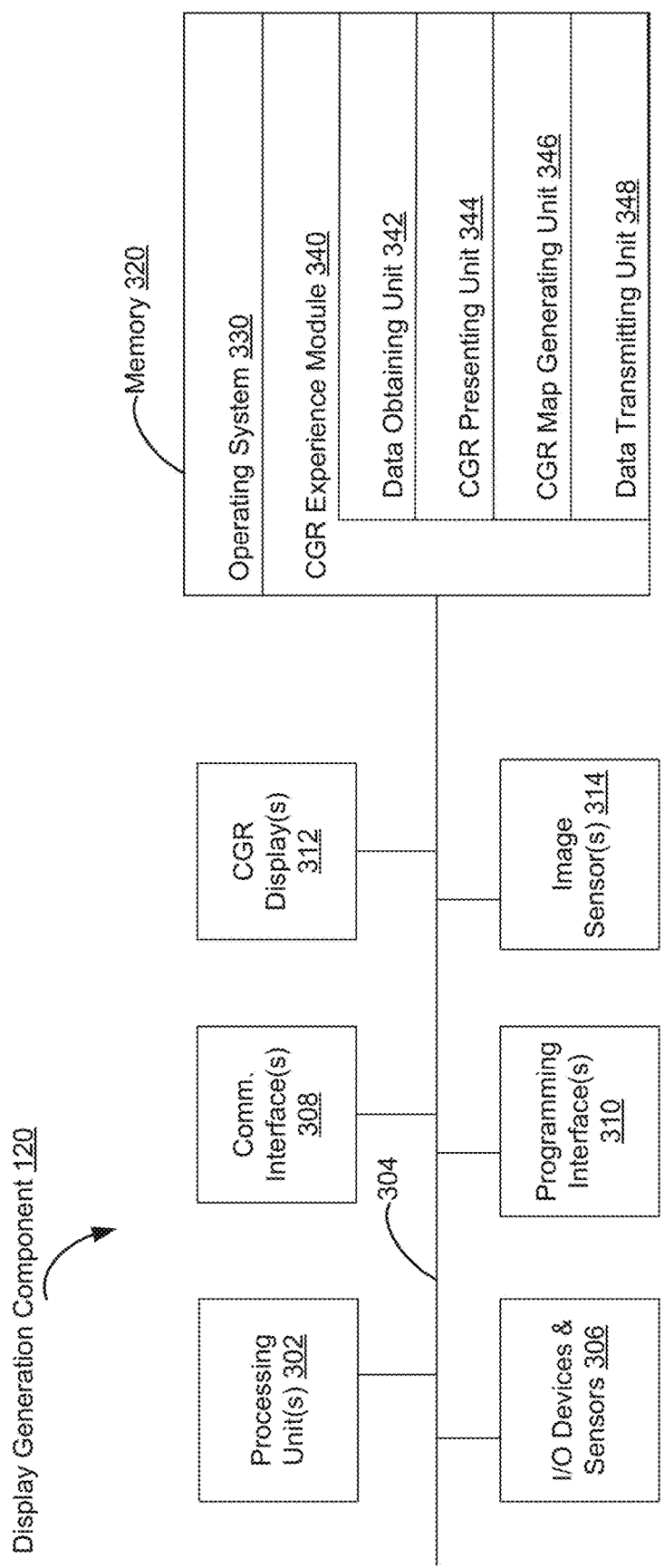
FIG. 3 is a block diagram illustrating a display generation component of a computer system that is configured to provide a visual component of the CGR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more CGR displays 312 are configured to provide the CGR experience to the user. In some embodiments, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more CGR displays 312 correspond to diffractive, reflective, polarized, holographic, etc. waveguide displays. For example, the HMD 120 includes a single CGR display. In another example, the HMD 120 includes a CGR display for each eye of the user. In some embodiments, the one or more CGR displays 312 are capable of presenting MR and VR content. In some embodiments, the one or more CGR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a CGR presentation module 340.

The operating system 330 includes instructions for handling various basic system services and for performing hardware dependent tasks. In some embodiments, the CGR presentation module 340 is configured to present CGR content to the user via the one or more CGR displays 312. To that end, in various embodiments, the CGR presentation module 340 includes a data obtaining unit 342, a CGR presenting unit 344, a CGR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the CGR presenting unit 344 is configured to present CGR content via the one or more CGR displays 312. To that end, in various embodiments, the CGR presenting unit 344 includes instructions and/or logic therefor, and heuristics and metadata therefor.

In some embodiments, the CGR map generating unit 346 is configured to generate a CGR map (e.g., a 3D map of the mixed reality scene or a map of the physical environment into which computer generated objects can be placed to generate the computer generated reality) based on media content data. To that end, in various embodiments, the CGR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the CGR presenting unit 344, the CGR map generating unit 346, and the data transmitting unit 348 are shown as residing on a single device (e.g., the display generation component 120 of FIG. 1), it should be understood that in other embodiments, any combination of the data obtaining unit 342, the CGR presenting unit 344, the CGR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
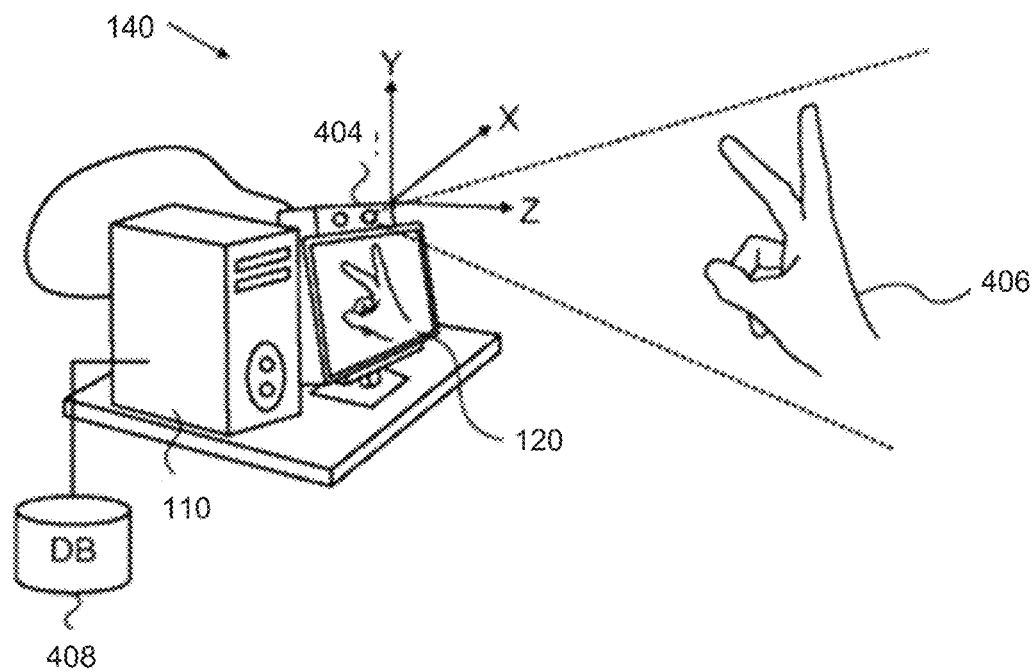
FIG. 4 is a block diagram illustrating a hand tracking unit of a computer system that is configured to capture gesture inputs of the user in accordance with some embodiments.
Figure 4:
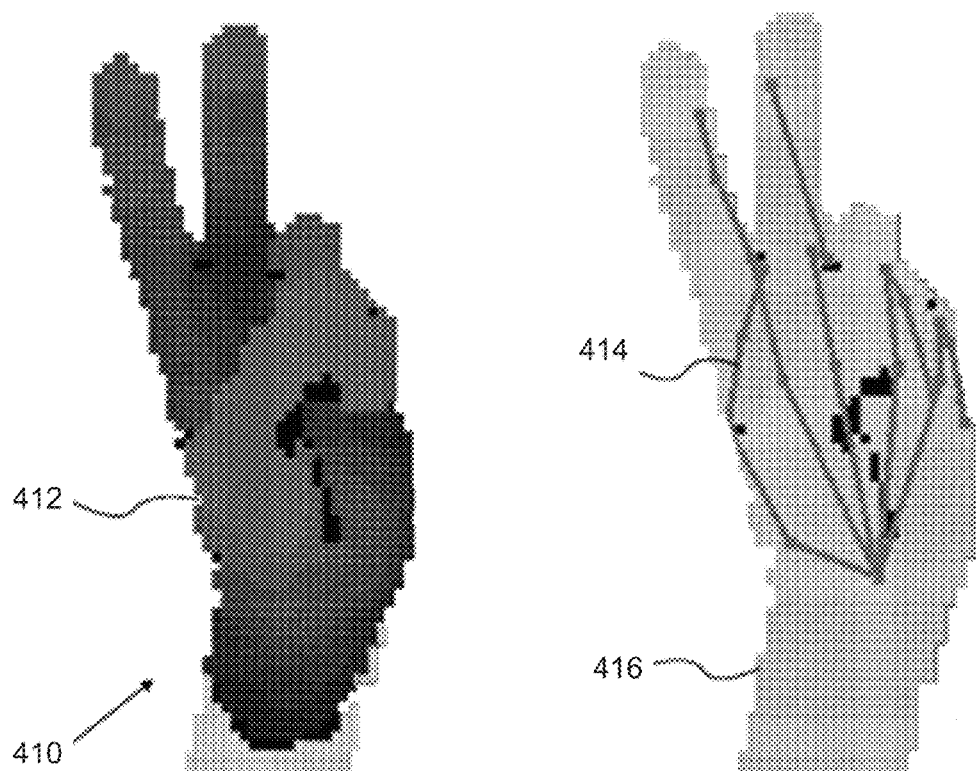

FIG. 4 is a schematic, pictorial illustration of an example embodiment of the hand tracking device 140. In some embodiments, hand tracking device 140 (FIG. 1) is controlled by hand tracking unit 243 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 outputs a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 408 and changing his hand posture.

In some embodiments, the image sensors 404 project a pattern of spots onto a scene containing the hand 406 and captures an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the hand tracking device 440 may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on the controller 110. This program may, for example, move and modify images presented on the display generation component 120, or perform other functions, in response to the pose and/or gesture information.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 440, some or all of the processing functions of the controller may be performed by a suitable microprocessor and software or by dedicated circuitry within the housing of the hand tracking device 402 or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
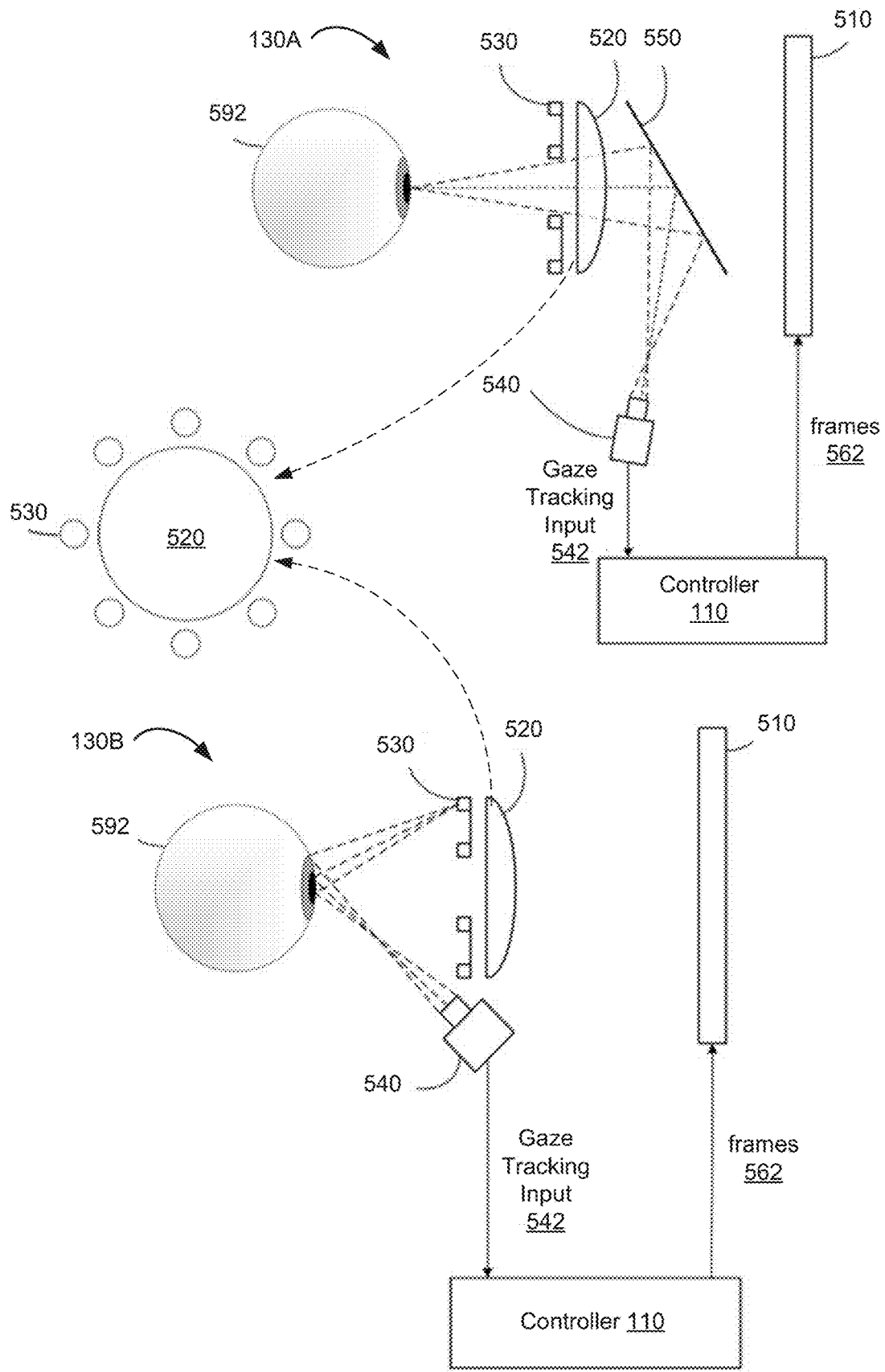
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 245 (FIG. 2) to track the position and movement of the user's gaze with respect to the scene 105 or with respect to the CGR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the CGR content for viewing by the user and a component for tracking the gaze of the user relative to the CGR content. In some embodiments, the eye tracking device 130 is separate from the display generation component 120. For example, when display generation component is a handheld device or a CGR chamber, the eye tracking device 130 is optionally a separate device from the handheld device or CGR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, a gaze tracking device 130 includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The gaze tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provide the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the CGR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs), mounted in a wearable housing. The Light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g. 850 nm) and a camera 540 that operates at a different wavelength (e.g. 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
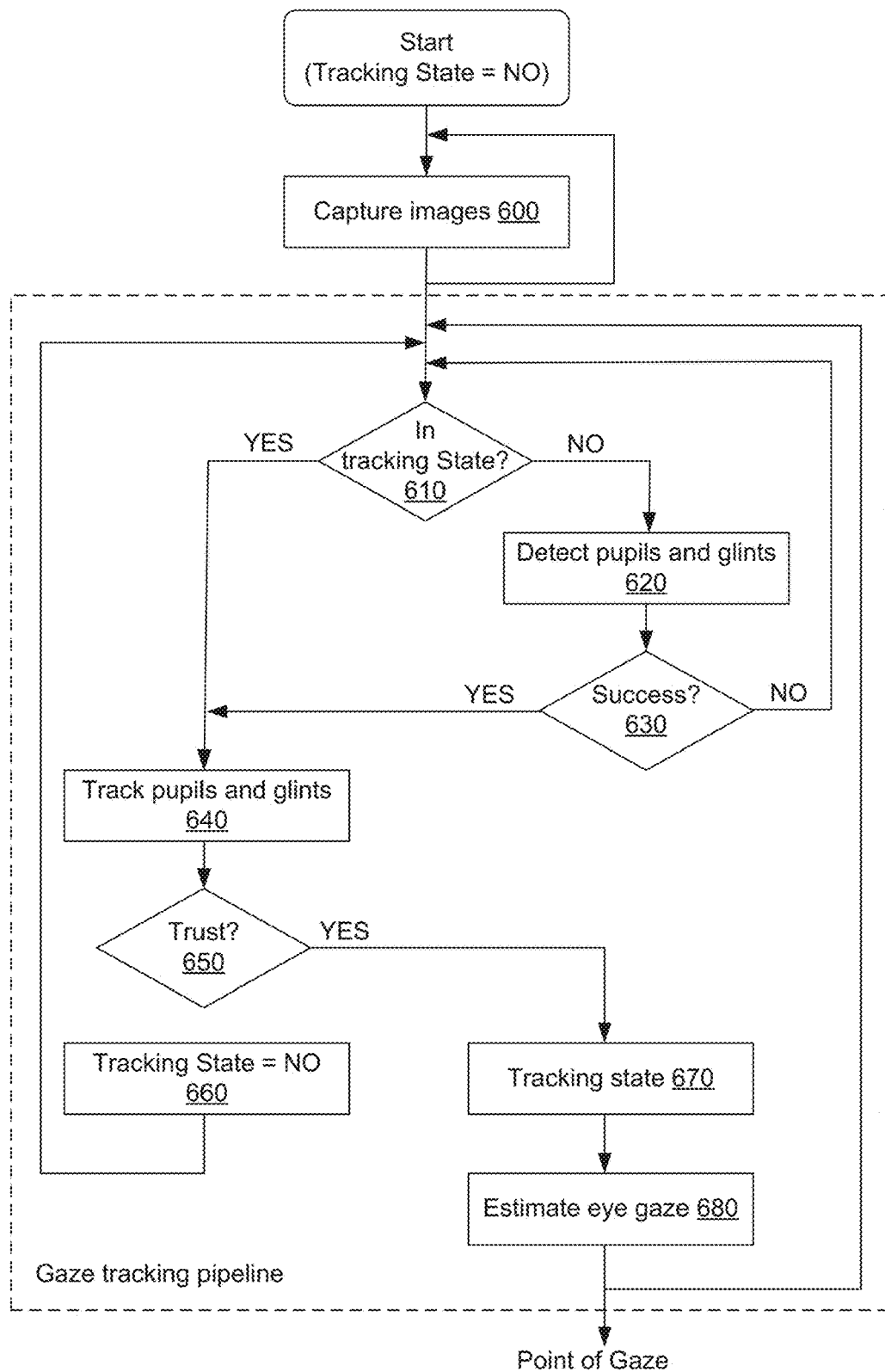
FIG. 6 is a flowchart illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracing system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 410, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing CGR experiences to users, in accordance with various embodiments.

Thus, the description herein describes some embodiments of three-dimensional environments (e.g., CGR environments) that include representations of real world objects and representations of virtual objects. For example, a three-dimensional environment optionally includes a representation of a table that exists in the physical environment, which is captured and displayed in the three-dimensional environment (e.g., actively via cameras and displays of an electronic device, or passively via a transparent or translucent display of the electronic device). As described previously, the three-dimensional environment is optionally a mixed reality system in which the three-dimensional environment is based on the physical environment that is captured by one or more sensors of the device and displayed via a display generation component. As a mixed reality system, the device is optionally able to selectively display portions and/or objects of the physical environment such that the respective portions and/or objects of the physical environment appear as if they exist in the three-dimensional environment displayed by the electronic device. Similarly, the device is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the device optionally displays a vase such that it appears as if a real vase is placed on top of a table in the physical environment. In some embodiments, each location in the three-dimensional environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a vase placed on top of the table, with the table being a view of (or a representation of) a physical table in the physical environment, and the vase being a virtual object.

Similarly, a user is optionally able to interact with virtual objects in the three-dimensional environment using one or more hands as though the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as though they were objects in the three-dimensional environment that are able to interact with the virtual objects in the three-dimensional environment as though they were real physical objects in the physical environment. In some embodiments, a user is able to move his or her hands to cause the representations of the hands in the three-dimensional environment to move in conjunction with the movement of the user's hand.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to and/or where and at what a physical stylus held by a user is pointed. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object. Similarly, the device is optionally able to determine, based on the orientation of a physical stylus, to where in the physical world the stylus is pointing. In some embodiments, based on this determination, the device determines the corresponding virtual position in the three-dimensional environment that corresponds to the location in the physical world to which the stylus is pointing, and optionally determines that the stylus is pointing at the corresponding virtual position in the three-dimensional environment.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

Figure 7A:
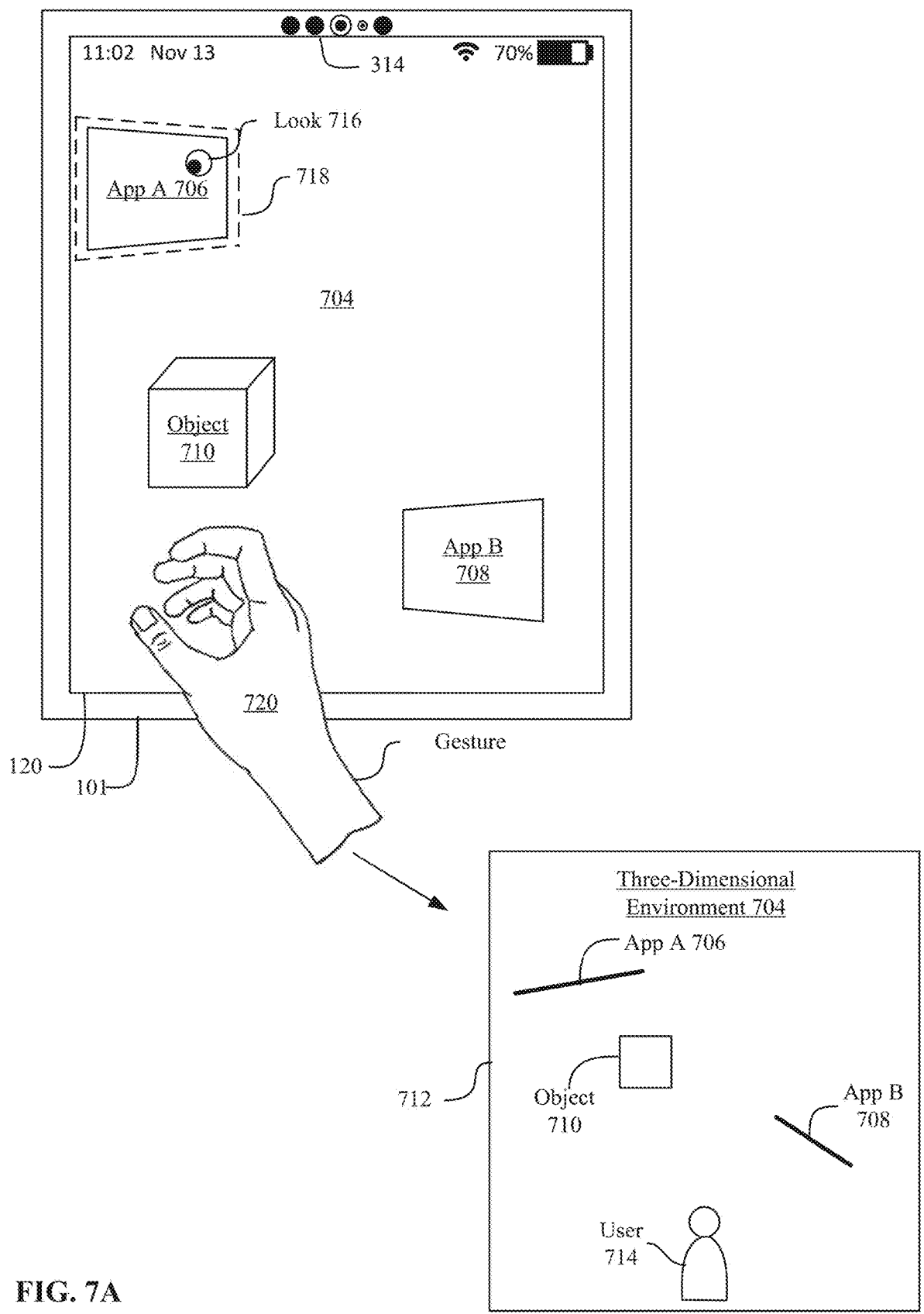
FIGS. 7A-7C illustrate examples of how an electronic device automatically updates the orientation of a virtual object in a three-dimensional environment based on a viewpoint of a user in the three-dimensional environment in accordance with some embodiments.
Figure 7B:
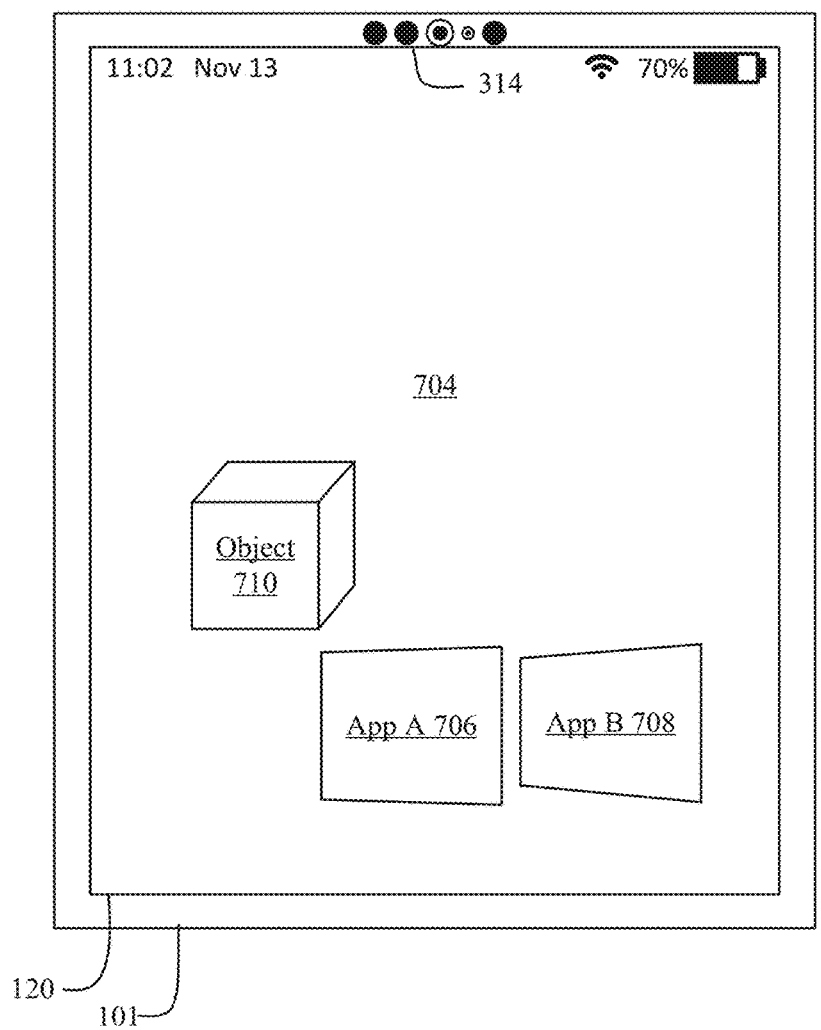
Figure 7B:
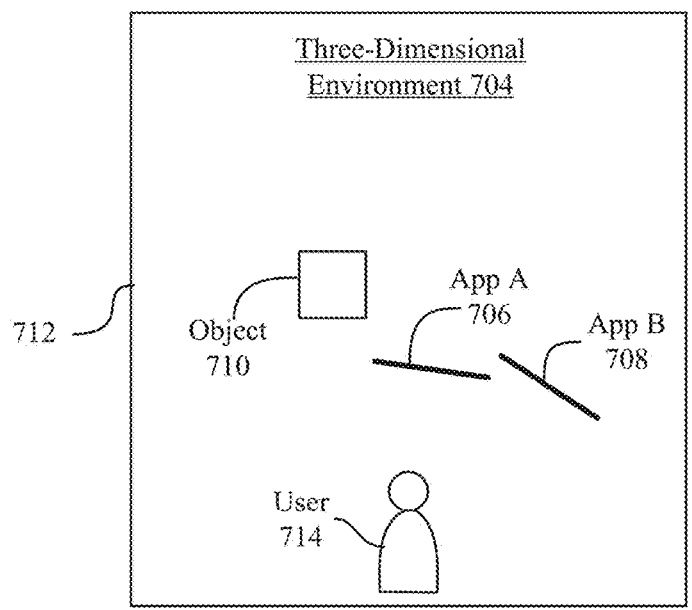
Figure 7C:
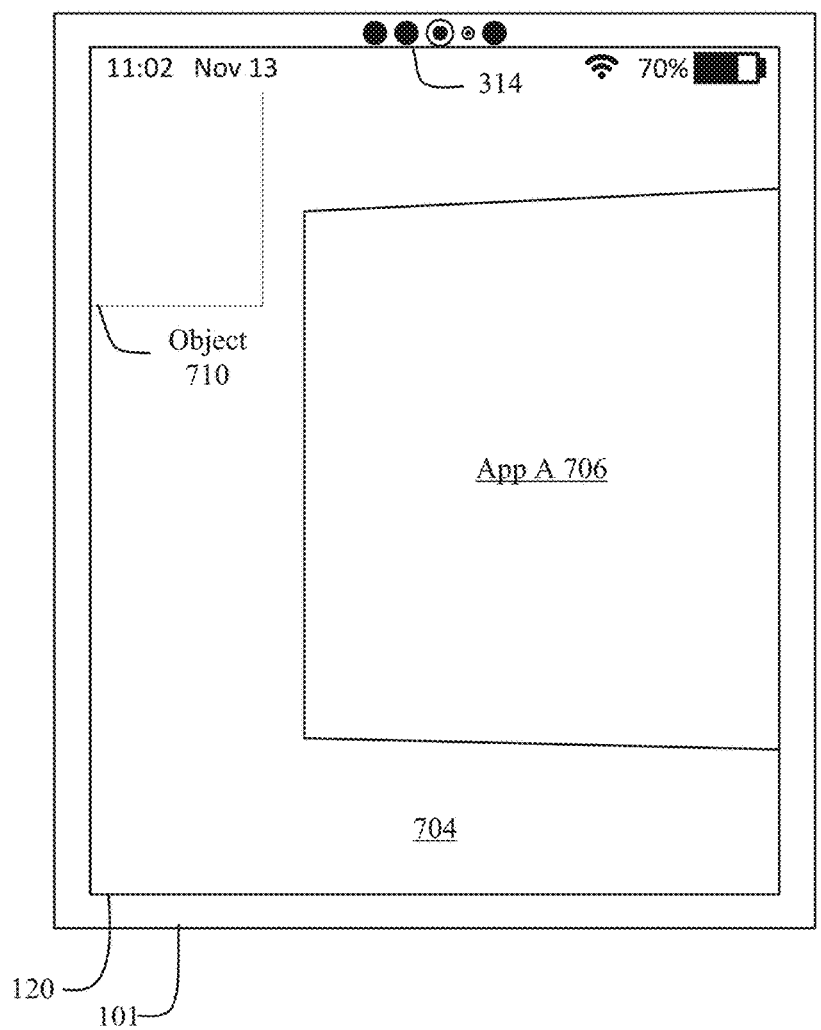
Figure 7C:
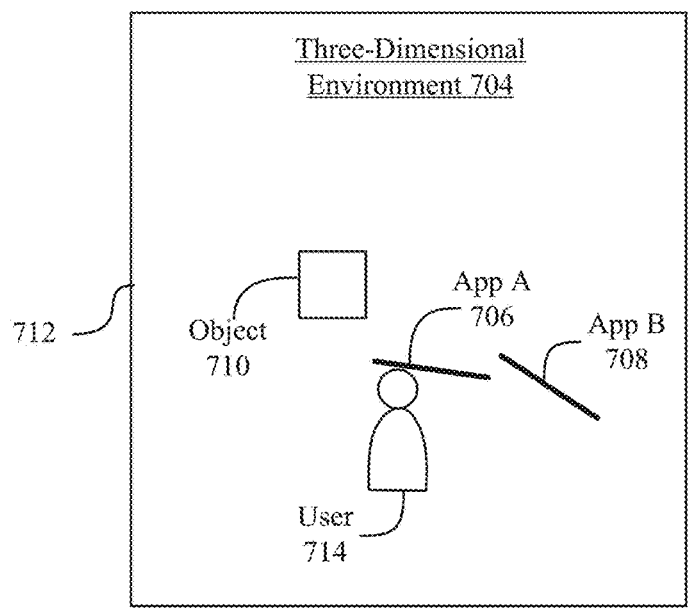

FIGS. 7A-7C illustrate examples of how an electronic device automatically updates the orientation of a virtual object in a three-dimensional environment based on a viewpoint of a user in the three-dimensional environment in accordance with some embodiments.

FIG. 7A illustrates an electronic device 101 displaying, via a display generation component 120, a three-dimensional environment 704 on a user interface. As described above with reference to FIGS. 1-6, the electronic device 101 optionally includes a display generation component 120 (e.g., a touch screen) and a plurality of image sensors 314. The image sensors optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user, and sensors to detect the physical environment and/or movements of the user's hands (e.g., external sensors facing outwards from the user), and/or gaze of the user (e.g., internal sensors facing inwards towards the face of the user).

As shown in FIG. 7A, the three-dimensional environment 704 includes a plurality of virtual objects, including a representation 706 of App A, a representation 708 of App B, and a virtual object 710. In some embodiments, the three-dimensional environment 704 is presented relative to a fixed frame of reference (e.g., gravity, one or more objects in the physical environment of the electronic device 101). In some embodiments, the three-dimensional environment 704 is a three-dimensional environment based on and/or including representations of objects in the physical environment of the electronic device and the frame of reference with which the three-dimensional environment 704 is presented is the physical environment or one or more objects in the physical environment of the electronic device 101. FIG. 7A includes a legend 712 depicting a bird's eye view of the three-dimensional environment 704. Legend 712 illustrates the positions and orientations of the representation 706 of App A, the representation 708 of App B, virtual object 710, and the user 714 in the three-dimensional environment. FIG. 7A also illustrates the electronic device 101 displaying the three-dimensional environment 704 from a viewpoint of the user in the three-dimensional environment.

As illustrated by legend 712, the representation 706 of App A and the representation 708 of App B have an orientation in the three-dimensional environment 704 that is tilted facing towards the user 714. For example, the representation 706 of App A is to the left of the user 714, so the orientation of the representation 706 of App A is tilted to the right to be tilted towards the user 714. As another example, the representation 708 of App B is to the right of the user 714, so the orientation of the representation 708 of App B is tilted towards the left to be tilted towards the user 714. Thus, the orientations of the representation 706 of App A and the representation 708 of App B are different from each other. In some embodiments, representations of applications include content of the application on one side of the representation. For example, the side of representation 706 of App A that faces the user 714 in the three-dimensional environment 704 includes the content of the user interface of App A. Likewise, for example, the side of representation 708 of App B that faces the user 714 in the three-dimensional environment 704 includes the content of the user interface of App B.

In some embodiments, the electronic device 101 automatically orients representations of applications towards the user 714 in the three-dimensional environment 712 (e.g., in response to an input to display the representations of the applications, after moving a representation of an application in response to a user input, etc.). In some embodiments, automatically orienting the representations of applications towards the user includes tilting the representations towards the user and positioning the side of the representation that includes the content of the representation towards the user. In some embodiments, the electronic device 101 constructs and/or has access to a vector field superimposed on the three-dimensional environment 704, where the vectors point towards the location of the user 714 in the three-dimensional environment 704, and orients virtual objects (e.g., representations of applications, etc.) according to the vector field. The results of such setting of orientation are described below.

For example, in FIG. 7A, the electronic device 101 detects (e.g., via an eye tracking device 314) the gaze 716 of the user on the representation 706 of App A. In response to detecting the user's gaze on the representation 706 of App A, the electronic device 101 displays a user interface element 718 that indicates that the user's gaze is detected on the representation 706 of App A. Although FIG. 7A illustrates user interface element 718 as an outline around the representation 706 of App A, it should be understood that, in some embodiments, user interface element 718 has a different shape/appearance/location. For example, the electronic device 101 optionally displays a user interface element such as a bar or line along one edge of the representation 706 of App A in response to detecting the user's gaze on the representation 706 of App A.

While detecting the gaze 716 of the user on the representation 706 of App A, the electronic device 101 detects (e.g., via a hand tracking device (e.g., one or more cameras, depth sensors, proximity sensors, touch sensors (e.g., a trackpad or touch screen))) the user performing a gesture with their hand 720. For example, the gesture is the user touching their thumb to another finger (e.g., index, middle, ring, little finger) on the hand of the thumb. In response to concurrently detecting the gaze 716 of the user on the representation 706 of App A while detecting the gesture being performed with the user's hand 720, the electronic device 101 initiates a process to move the representation 706 in the three-dimensional environment in accordance with movement of the user's hand 720 while the gesture is maintained. As shown in FIG. 7A, the user moves their hand 720 towards the user's body and to the right, while maintaining their other finger touching their thumb.

In response to the movement of the hand 720 illustrated in FIG. 7A, the electronic device moves the representation 706 of App A in the three-dimensional environment 704 in accordance with the movement (e.g., towards the user 714 and to the right), as shown in FIG. 7B.

FIG. 7B illustrates the three-dimensional environment 704 including the representation 706 of App A at the updated position in accordance with the user input illustrated in FIG. 7A (e.g., closer to user 704, and now positioned between object 710 and representation 708 of App B, slightly to the right of user 714). In addition to updating the position of the representation 706 of App A in accordance with the movement of the user's hand 720 in FIG. 7A, the electronic device 101 also updates the orientation of the representation 706 of App A. As described above and as shown in FIG. 7A, the electronic device 101 detects the user input while the representation 706 of App A is tilted towards the right in order to be oriented towards the user. As shown in FIG. 7B, in response to moving the representation 706 of App A to a position that is slightly to the right of the user 714 in the three-dimensional environment 704, the electronic device 101 updates the orientation of the representation 706 of App A to be tilted slightly to the left in order to continue to be oriented towards the user 714 in the three-dimensional environment. The representation 706 of App A continues to be oriented such that the side of the representation 706 facing the user 714 in the three-dimensional environment 704 is the side of the representation 706 that includes the content of the user interface of App A. In some embodiments, the orientation of representation 706 of App A is defined by the vector field pointing to the user 714 in the three-dimensional environment 704. For example, the orientation of the representation 706 of App A in the three-dimensional environment 704 in FIG. 7B is in the direction of the vector field at the location of the representation 706 of App A in the three-dimensional environment 704 in FIG. 7B. In some embodiments, the orientation of the representation 706 of App A continuously updates according to the vector field while the representation 706 of App A is being moved in the three-dimensional environment 704.

In addition to changing the orientation and position of the representation 706 of App A, the electronic device 101 optionally also updates the size of the representation 706 of App A in response to the user input moving the representation 706 of App A in the three-dimensional environment. As shown in FIG. 7A, while the electronic device 101 detects the input to move the representation 706 of App A, the representation 706 of App A is a respective distance from the user 714 in the three-dimensional environment 704, as shown in legend 712. As shown in the legend 712 of FIG. 7B, the updated location of the representation 706 of App A is closer to the user 714 in the three-dimensional environment 704 than the location of the representation 706 of App A before the electronic device 101 moved the representation 706 of App A. Although the representation 706 of App A appears to be displayed at the same or similar size by electronic device 101 (e.g., via display generation component 120) before and after the input to move the representation 706 of App A was detected, as shown in legend 712, the size of the representation 706 optionally decreases in response to moving the representation 706 closer to the user. Likewise, in some embodiments, if the user 714 were to move the representation 706 of App A further away from the user 714 in the three-dimensional environment 704, the electronic device 101 would optionally increase the size of the representation 706. In this way, the electronic device 101 is able to maintain the amount of display area of the display generation component 120 used to display the representation 706 even if the distance of the representation 706 to the user 714 in the three-dimensional environment 704 changes.

In some embodiments, as will be described in more detail below with reference to FIGS. 8A-13C, the three-dimensional environment 704 includes multiple users. For example, the three-dimensional environment 704 includes a user in addition to user 714. In some embodiments, one or more objects (e.g., object 710, representation 706, representation 708) are accessible to only one of the users (e.g., user 714 or one of the other users) in the three-dimensional environment 704. In some embodiments, an object that is only accessible to one user is only displayed by that user's electronic device 101, and only that user is able to provide user inputs directed to the object. For example, an object that is only accessible to user 714 is displayed by electronic device 101 illustrated in FIGS. 7A-7B but is not displayed by the electronic device(s) of the other user(s). As another example, an object that is only accessible to the other user(s) is not displayed by electronic device 101 illustrated in FIGS. 7A-7B.

In some embodiments, the orientation of the virtual object is updated based on the position of the user with access to the object without being based on the positions of the other users (e.g., when initially displayed in the three-dimensional environment 704, in response to a request to move the object, etc.). For example, if the three-dimensional environment 704 included an additional user that did not have access to representation 706 of App A, the electronic device 101 would update the orientation of the representation 706 of App A in the same manner described above with reference to FIGS. 7A-7B. As another example, if the three-dimensional environment 704 includes another user that has access to the representation 706 of App A and user 714 does not have access to the representation 706 of App A, the orientation of the representation 706 of App A would be updated based on the location of the other user, instead of the location of user 714, when the position of the representation 706 of App A is updated.

As will be described in more detail below with reference to FIGS. 8A-9D, if an object is accessible to a plurality (e.g., all) of the users in the three-dimensional environment 704, the electronic device 101 optionally updates the orientation of the object based on the positions of the plurality (e.g., all) of the users with access to the object (e.g., when initially displayed in the three-dimensional environment 704, in response to a request to move the object, etc.). For example, if three-dimensional environment 704 includes an additional user, in response to the input to move the representation 706 of App A, the electronic device 101 would update the orientation of the representation 706 of App A in accordance with both the position of user A 714 and the position of the other user. Thus, in this example, the orientation of the representation 706 of App A may be different from the orientation illustrated in FIG. 7B even if the representation 706 of App A is moved to the location illustrated in FIG. 7B. In some embodiments, an object including content on only one side of the object (e.g., a virtual television, a user interface of an application, etc., representations 706, 708, and 724 in FIGS. 9A-9D) is oriented such that the side with the content is facing the plurality (e.g., all) of the users in the three-dimensional environment 704. As another example, an object including content on multiple sides (e.g., a virtual object, a virtual board game, such as representation 922 in FIGS. 9A-9D) is oriented between users, as will be described in more detail with reference to FIGS. 9A-10T.

In some embodiments, in response to an input to increase the number of users that have access to a virtual object (e.g., updating a virtual object from only being accessible to one user to being accessible to multiple or all of the users in the three-dimensional environment), the electronic device makes the object assessable to the increased number of users and updates one or more of the orientation, size, and position of the object in accordance with the positions of the users that have access to the object. For example, if the three-dimensional environment 704 included a plurality of users with access to representation 706, the orientation and size of representation 706 would be updated based on the position of the plurality of users in FIG. 7B instead of being based on the location of user 714 only. In some embodiments, the orientation of the object is updated to be oriented towards the plurality of users with access to the object (e.g., according to a vector field based on the positions of all of the users with access to the object). In some embodiments, the size of the object is updated based on the distances between the object and the users with access to the object to ensure that the object is legible to all of the users with access to the object (e.g., the size is at least a minimum size based on the distance from the user that is furthest from the object). In some embodiments, the position (e.g., the initial position in response to a request to initiate display of an object that is accessible to a plurality of users) is selected based on the locations of the plurality of users with access to the object so all of the users are able to view the object.

In some embodiments, the electronic device 101 only updates the orientation, size, and/or position of the object if the object was shared with the other users after being prompted by the electronic device 101 to do so (e.g., in response to a request to move the object, such as the request to move representation 706 illustrated in FIG. 7A). In some embodiments, the electronic device 101 does not update the position, size, or orientation of the object in response to increasing the number of users with access to the object. For example, if, while electronic device 101 displays the three-dimensional environment 704 illustrated in FIG. 7A, the electronic device 101 receives an indication of an additional user joining the three-dimensional environment 704, the electronic device 101 continues displaying the representation 706 of App A at the size, location, and orientation illustrated in FIG. 7A even if the additional user has access to the representation 706 of App A until a request to move representation 706 is received, such as the input illustrated in FIG. 7A. In some embodiments, once an object is accessible to a plurality of users, in response to an input to move the object, such as the request to move representation 706 in FIG. 7A, the electronic device 101 moves the object in accordance with the input and updates the size and/or orientation of the object in accordance with the positions of all of the users with access to the object to maintain legibility of the object for the users with access to the object.

Thus, as shown in FIGS. 7A-7B, in some embodiments, the electronic device 101 automatically updates the orientation and/or size of a representation 706 of an application in response to a user input to update the position of the representation 706 of the application in the three-dimensional environment 704. In some embodiments, the electronic device 101 would similarly update the orientation and/or size of representation 708 and object 710 in response to a request to move either of these virtual objects. In some embodiments, as will be described in further detail below with reference to FIG. 7C, the electronic device 101 forgoes updating the orientation and/or size of the representations of applications (e.g., and/or other virtual objects in the three-dimensional environment 704) in response to the user 714 updating the position of the user 714 in the three-dimensional environment 704.

FIG. 7C illustrates the three-dimensional environment 704 after the user 714 has updated the user's position in the three-dimensional environment 704 from the position of the user 714 in FIG. 7B. In some embodiments, the electronic device updates the position of the user 714 in response to detecting (e.g., via one or more gyroscopes, accelerometers, cameras, depth sensors, etc.) movement of the electronic device 101 in the physical environment of the electronic device 101. For example, the electronic device 101 updates the position of the user 714 in the three-dimensional environment 704 by moving the user 714 in the direction in which the movement of the electronic device 101 is detected. In some embodiments, the electronic device 101 updates the position of the user 714 in response to a user input requesting movement of the position of the user 714 in the three-dimensional environment 704.

The position of the user 714 in the three-dimensional environment 704 in FIG. 7C is closer to the representation 706 of App A and object 710, as indicated by legend 712, than it was in the three-dimensional environment 704 in FIG. 7B. In response to detecting the change in the position of the user 714, the electronic device 101 updates display of the three-dimensional environment 704. As shown in FIG. 7C, the representation 706 of App A and object 710 displayed by display 120 at larger sizes in FIG. 7C than they were in FIG. 7B and, due to the user's proximity to the representation 706 of App A and object 710, portions of each of object 710 and the representation 706 of App A are outside of the field of view of the electronic device 101. As shown in legend 712 of FIGS. 7B and 7C, the sizes of representation 706 and 708 and object 710 in the three-dimensional environment 704 are unchanged in response to updating the position of the user 714 in the three-dimensional environment 704 (and, in some embodiments, the sizes of the objects remain the same in the three-dimensional environment 704 while movement of the user 714 is being detected). Moreover, as shown in FIG. 7C, the representation 708 of App B is no longer visible to the user 714 at the position illustrated in FIG. 7C.

Thus, FIGS. 7A-7C illustrate the electronic device 101 updating the position, size, and/or orientation of the representation 706 of App A in response to the user input to move the representation 706 of App A, and forgoing updating the position, size, and/or orientation of the representation 706 of App A, the representation 708 of App B, and the virtual object 710 in response to detecting a change in the position of the user 714 in the three-dimensional environment 704. In some embodiments, the electronic device 101 would also update the position, size, and/or orientation of representation 708 or object 710 in response to a user input to move one of these objects.

In some embodiments, the electronic device 101 initiates display of the representation 706 of App A, the representation 708 of App B, and/or the object 710 in response to a user input. The electronic device optionally initially displays virtual objects at a distance that is legible and convenient to the user 714 (e.g., close enough for the user to view the object and interact with it, far enough away to view other objects in the three-dimensional environment 704). In some embodiments, if there was an additional user in three-dimensional environment 704 other than user 714, the electronic device 101 would initially display a virtual object that both users have access to at a position that is legible for both users. If only user 714 has access to an object, however, in some embodiments, the electronic device 101 selects the initial position for the object based on the position of user 714 without being based on the position of the other user. In some embodiments, when initially displaying virtual objects in the three-dimensional environment 704 (e.g., in response to the user input), the electronic device 101 selects the position of the object to be a distance from the user 714 that is between a first threshold (e.g., 30, 40, 50, 100, etc. centimeters) and a second threshold (e.g., 200, 300, 400, 500, etc. centimeters) if the user 714 is the only user in the three-dimensional environment 704, or if the user 714 is the only user in the three-dimensional environment 704 with access to the object. For example, if there was an additional user in the three-dimensional environment 704 illustrated in FIG. 7A and the representation 706 of App A was accessible to user 714 without being accessible to the other user, the electronic device 101 would initially display the representation 706 of App A at a position, size, and orientation based on the position of the user 714 in the three-dimensional environment 704 (e.g., to make the representation 706 legible to the user 714) without being based on the position of the other user (because the other user is not able to see or interact with representation 706). In some embodiments, if there are multiple users with access to an object in the three-dimensional environment 704, the electronic device 101 initially displays the object at a position that is at least a third threshold distance (e.g., 30, 40, 50, 100, etc. centimeters) from all of the users and less than a fourth threshold distance (e.g., 200, 300, 400, 500, etc. centimeters) from all of the users. For example, if there was an additional user in the three-dimensional environment 704 illustrated in FIG. 7A and the representation 706 of App A was accessible to user 714 and the other user, the electronic device 101 would initially display the representation 706 of App A at a position, size, and orientation based on the position of the user 714 and the additional user in the three-dimensional environment 704 (e.g., to make the representation 706 legible to the user 714 and the other user).

As will be described in more detail below with reference to FIGS. 13A-14L, in some embodiments, while a three-dimensional environment 704 includes at least one user and at least one virtual object, the electronic device 101 detects another user being added to the three-dimensional environment 704. In some embodiments, in response to the new user being added to the three-dimensional environment 704, the electronic device 101 updates the orientations of the virtual objects in the three-dimensional environment 704 to be oriented based on the positions of all of the users in the three-dimensional environment 704, including the user that just joined the three-dimensional environment 704 to ensure the virtual objects are legible to all of the users with access to the virtual objects. In some embodiments, the orientations of the objects in the three-dimensional environment are updated in response to a user joining the three-dimensional environment 704 without detecting an input to move the virtual objects. In some embodiments, the orientations of the objects in the three-dimensional environment 704 are not updated until an input to move the object is detected. In some embodiments, one or more virtual objects that are accessible only to a subset of users (e.g., one user) in the three-dimensional environment 704 and not accessible to the user that was just added to the three-dimensional environment 704 do not change orientations in response to the new user being added to the three-dimensional environment 704. In some embodiments, when a virtual object is not accessible to a user, the user is able to see an indication of the position of the virtual object in the three-dimensional environment 704, but is not able to see the content of the object, as described below with reference to FIG. 9A. In some embodiments, the electronic device 101 does not display an indication of a virtual object that is not accessible to the user of the electronic device.

In some embodiments, the electronic device 101 updates a virtual object from being accessible to a plurality (or all) of the users in the three-dimensional environment 704 to being accessible to fewer than the plurality (or all) of the users in the three-dimensional environment 704 (e.g., being accessible to one user in the three-dimensional environment 704). For example, if three-dimensional environment 704 illustrated in FIG. 7A included an additional user and representation 706 of App A was accessible to the additional user and user 714, it would be possible for the representation 706 of App A to update to be accessible to user 714 without being accessible to the additional user. In some embodiments, the electronic device 101 reduces the number of users that have access to an object in response to an input moving the object to a location between users in the three-dimensional environment 704. For example, if the three-dimensional environment 704 illustrated in FIG. 7A included an additional user and representation 706 of App A was accessible to the additional user and user 714, in response to detecting an input to move the representation 706 of App A to a location between the location of user 714 and the location of the other user in the three-dimensional environment 704, the electronic device 101 would update the representation 706 of App A to be accessible to user 714 without being accessible to the other user. As another example, the electronic device 101 reduces the number of users that have access to an object in response to an input moving the object within a threshold distance (e.g., 0.5, 1, 2, etc. meters) of the user 714 in the three-dimensional environment 704. For example, if the three-dimensional environment 704 illustrated in FIG. 7A included an additional user and representation 706 of App A was accessible to the additional user and user 714, in response to detecting an input to move the representation 706 of App A to a location within the threshold distance of user 714 in the three-dimensional environment 704, the electronic device 101 would update the representation 706 of App A to be accessible to user 714 without being accessible to the other user. In some embodiments, while a virtual object is accessible to a first user in the three-dimensional environment 704, the electronic device 101 detects an input (e.g., from the first user) to move the virtual object to a location within a threshold distance (e.g., 0.5, 1, 2, etc. meters) of a second user. In some embodiments, in response to the input, the electronic device 101 updates the virtual object from being accessible to the first user to being accessible to the second user. For example, if the three-dimensional environment 704 illustrated in FIG. 7A included an additional user and representation 706 of App A was accessible to user 714 without being accessible to the other user, in response to detecting an input to move the representation 706 of App A within the threshold of the location of the other user in the three-dimensional environment 704, the electronic device

101 would update the representation 706 of App A to be accessible to the other user without being accessible to user 714.

In some embodiments, as will be described in more detail below with reference to FIGS. 9A-10T, the electronic device 101 updates a virtual object from being accessible to only one user to being accessible to multiple users in response to a user input (e.g., a user input to share the virtual object).

Figure 8A:
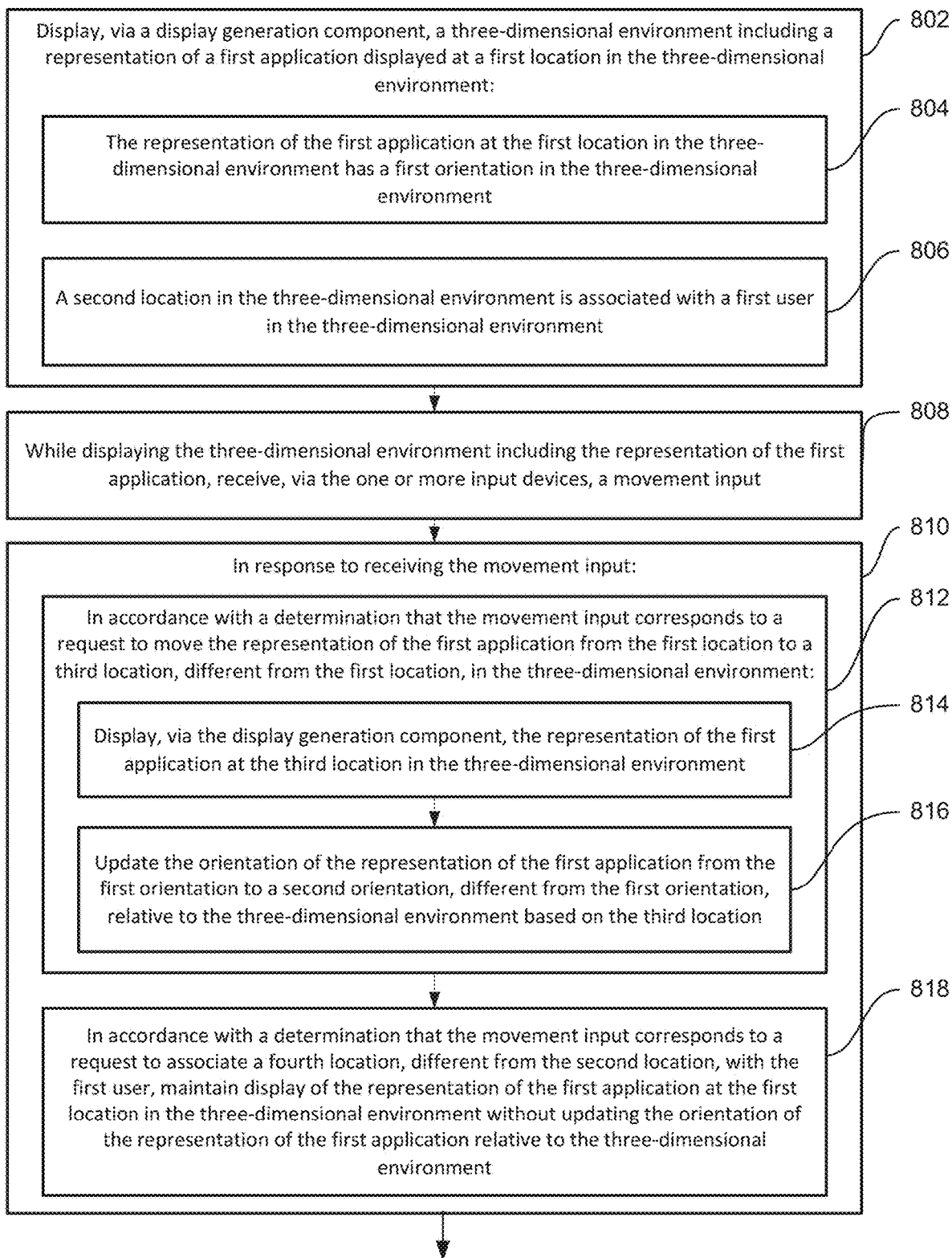
FIGS. 8A-8P is a flowchart illustrating a method of automatically updating the orientation of a virtual object in a three-dimensional environment based on a viewpoint of a user in accordance with some embodiments.
Figure 8B:
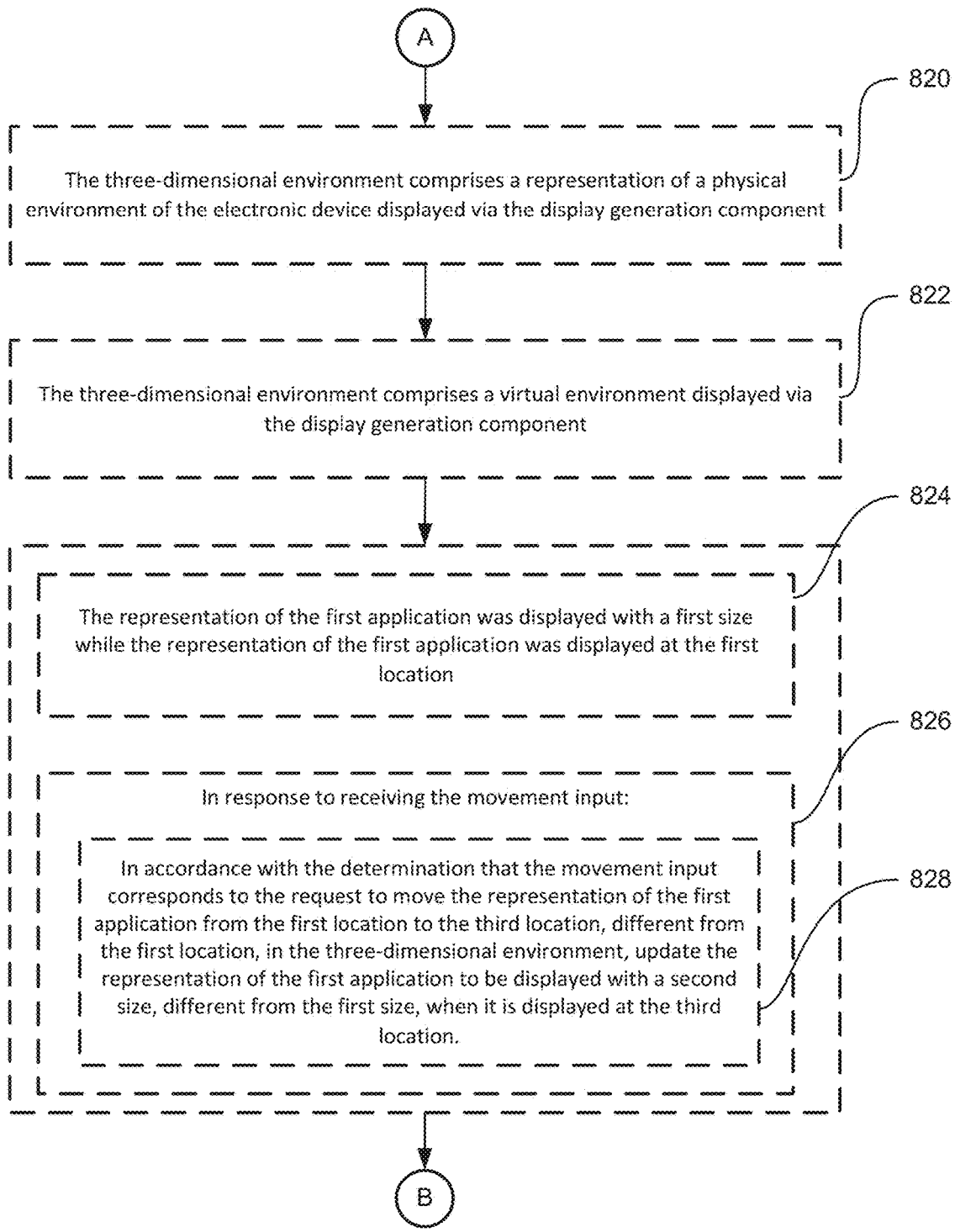
Figure 8C:
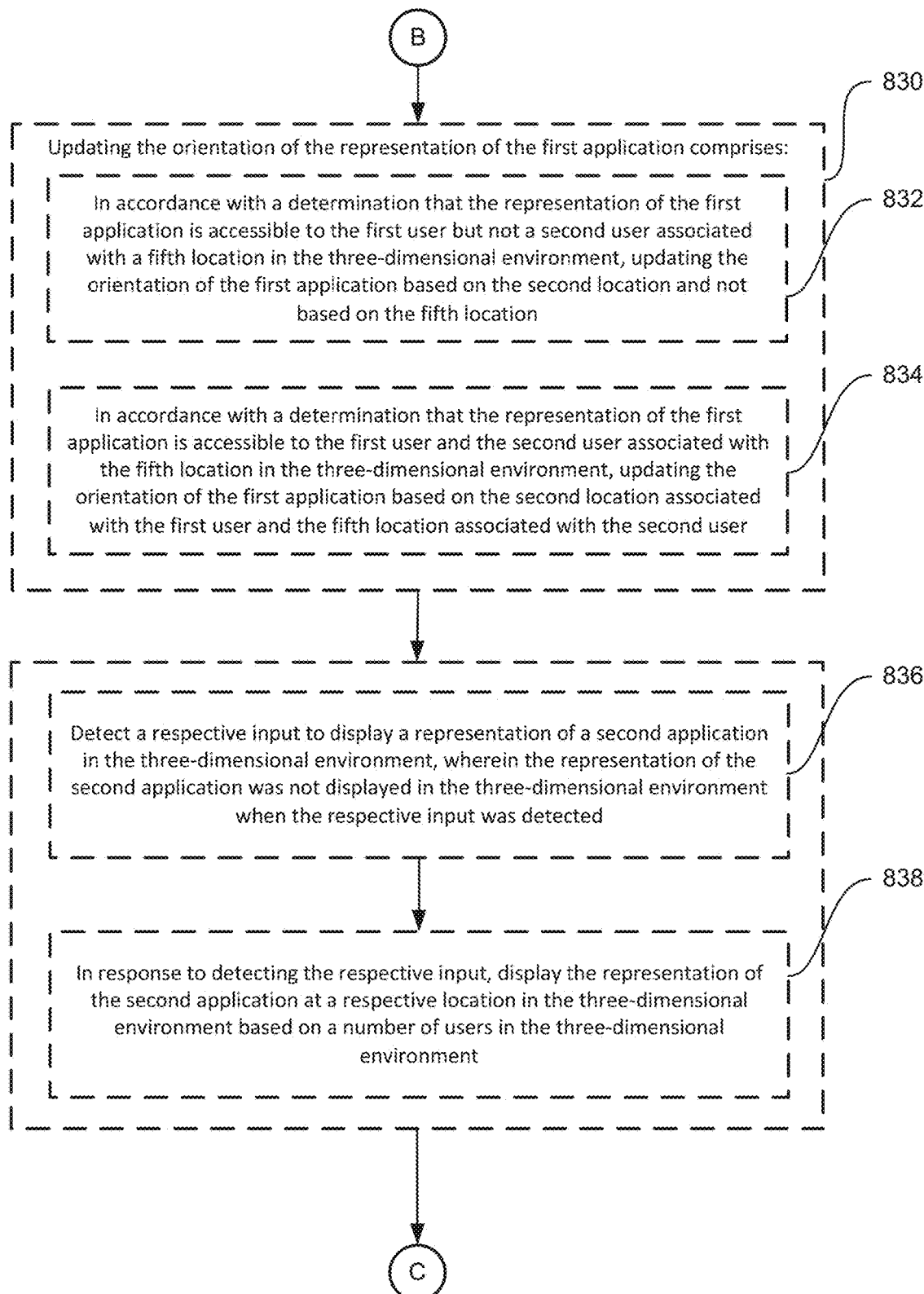
Figure 8D:
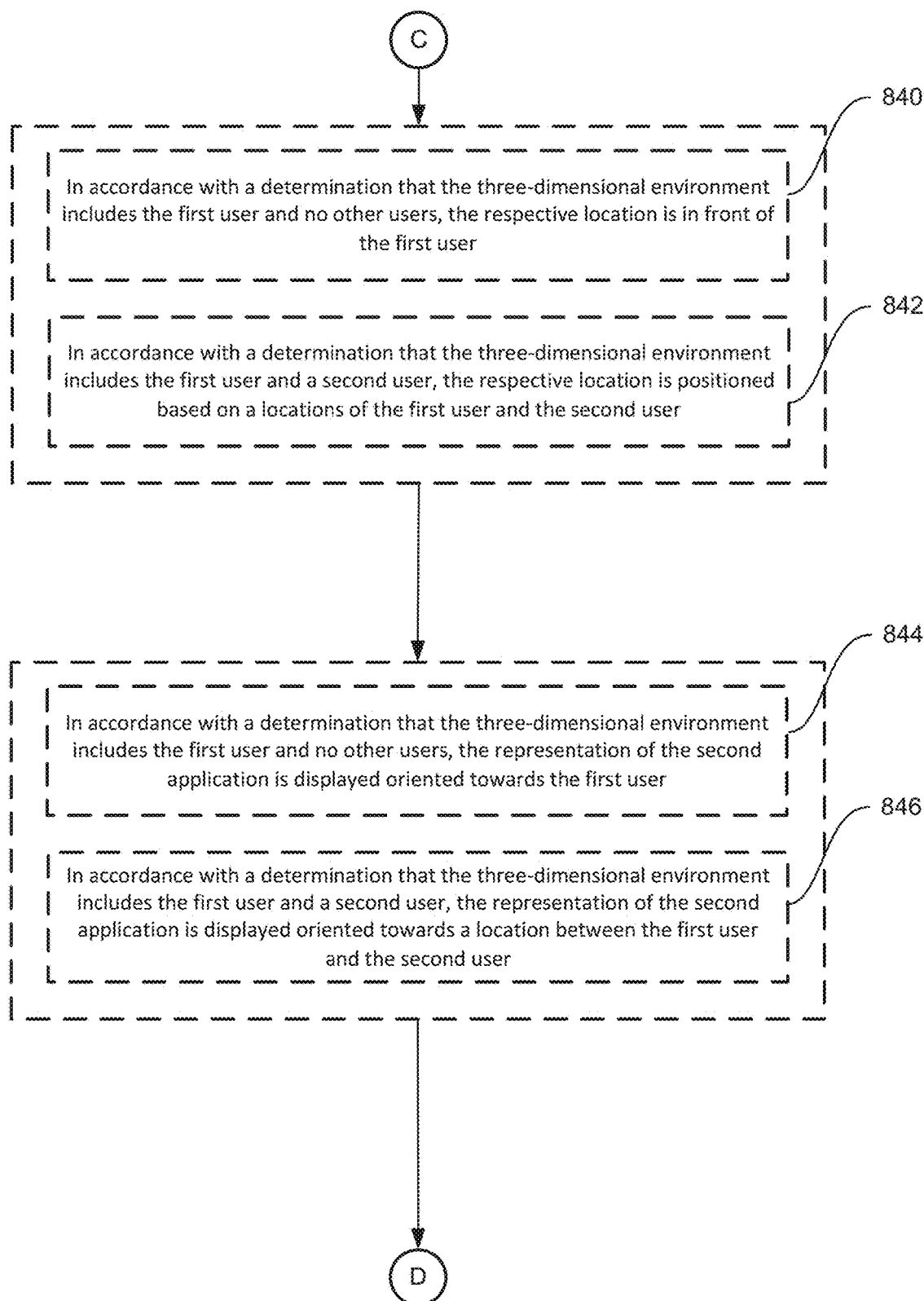
Figure 8E:
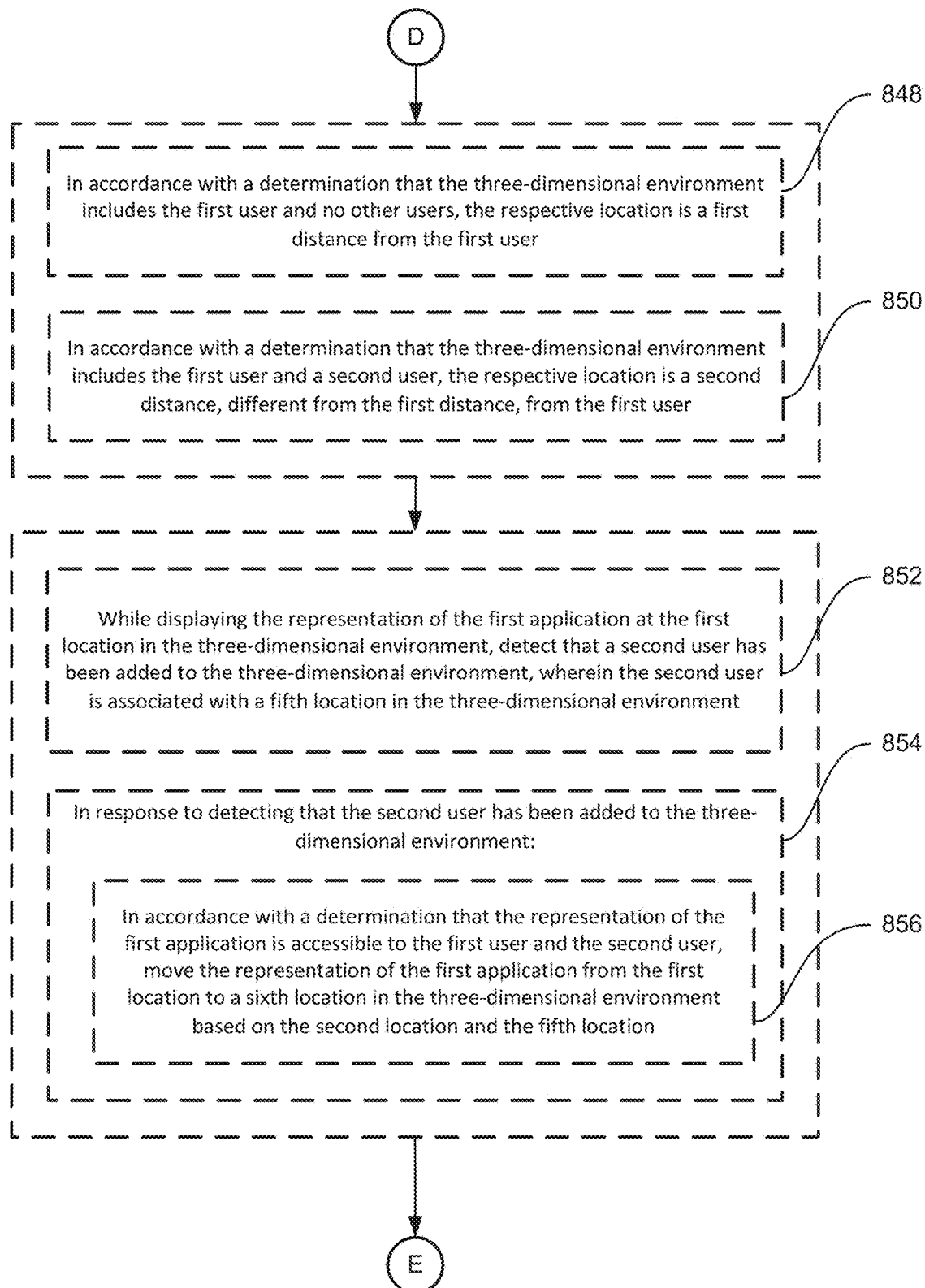
Figure 8F:
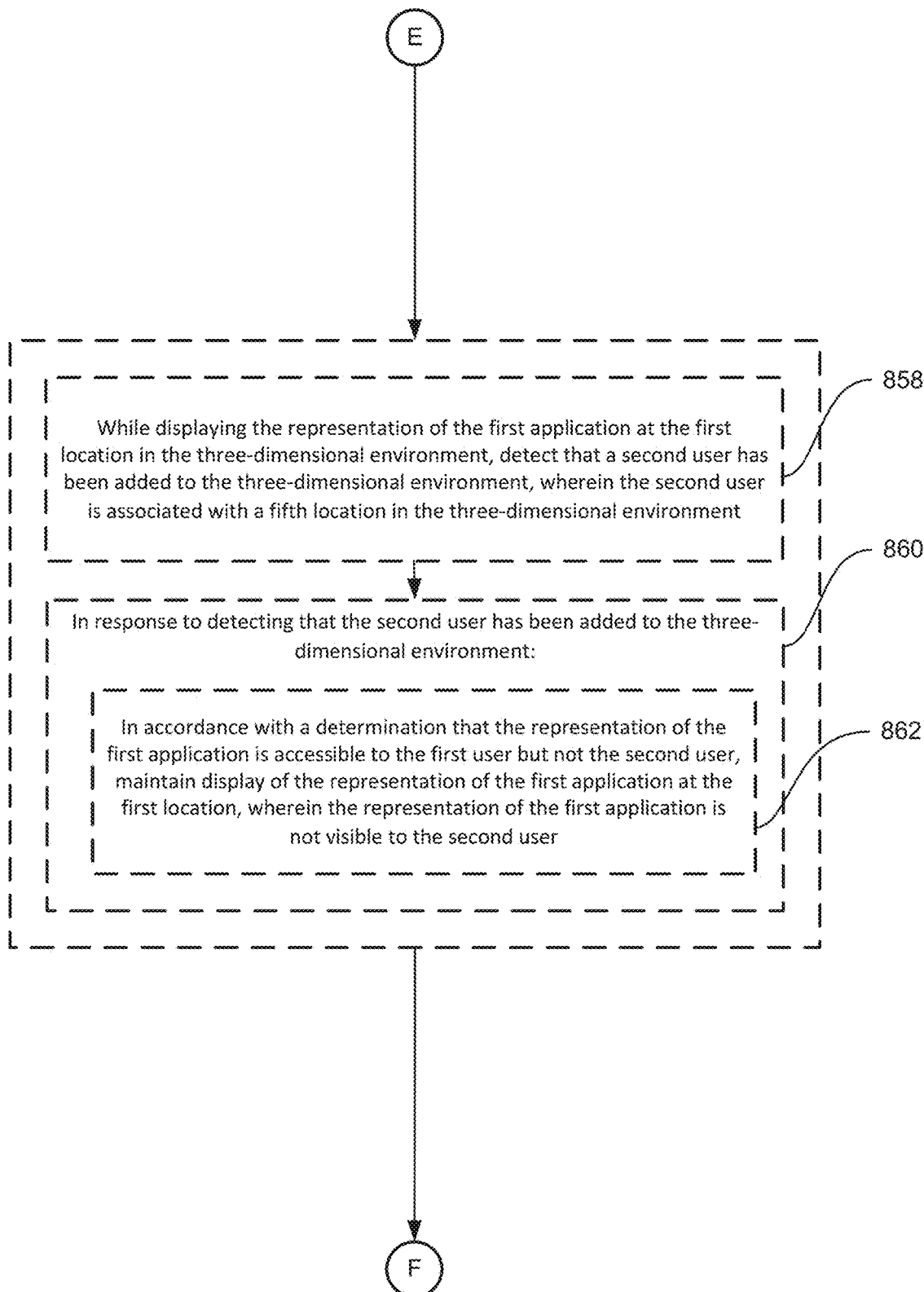
Figure 8G:
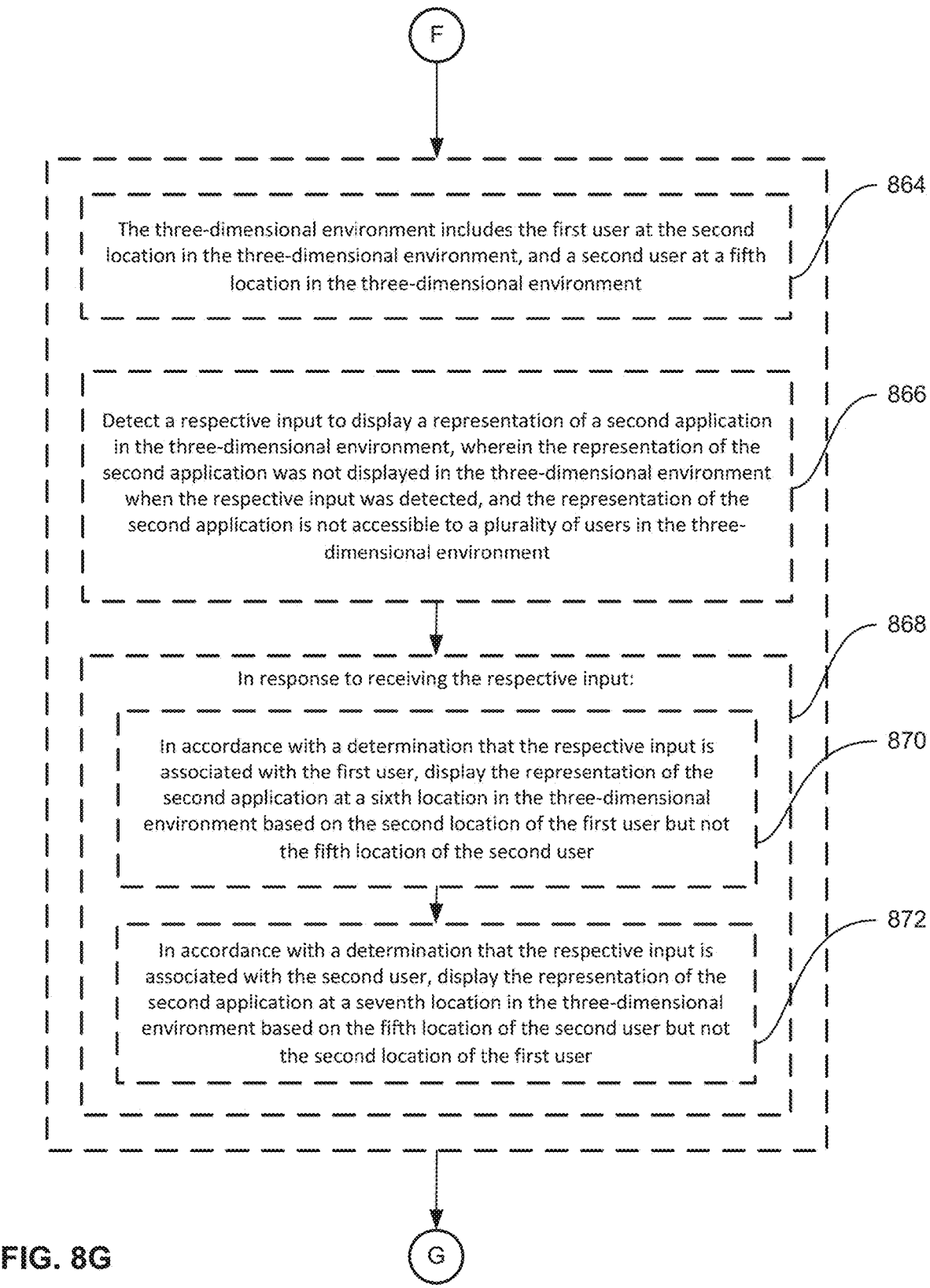
Figure 8H:
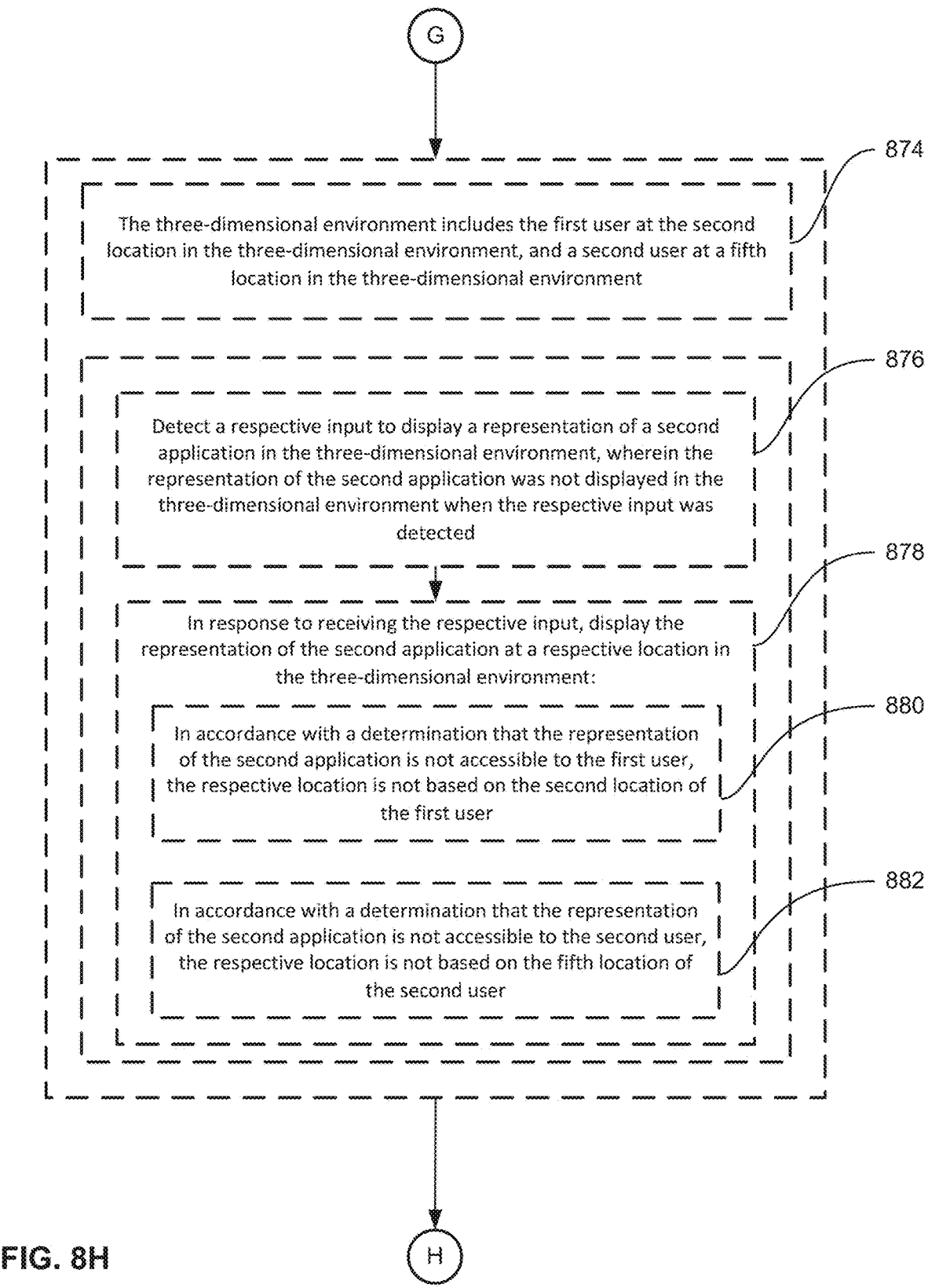
Figure 8I:
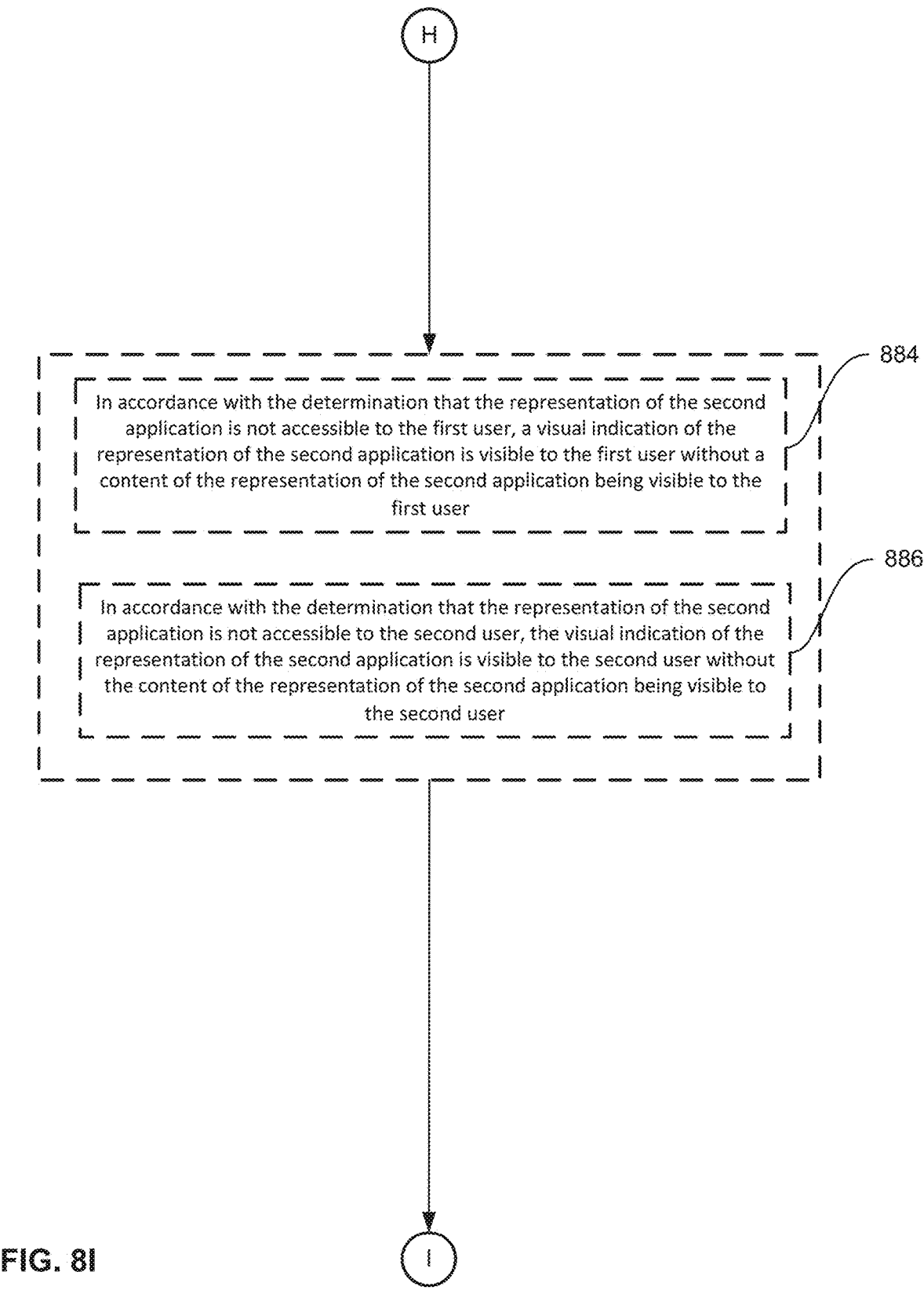
Figure 8J:
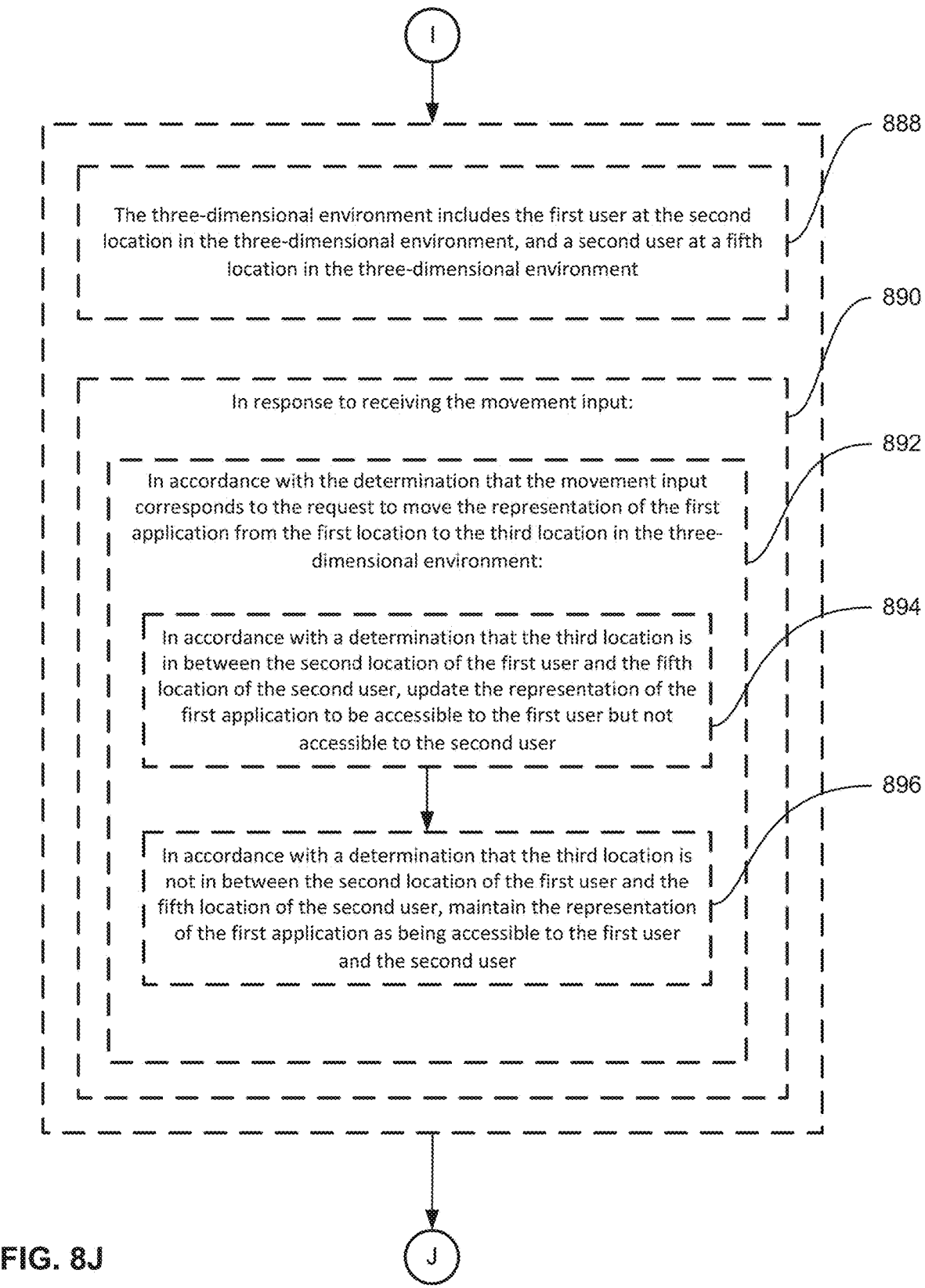
Figure 8K:
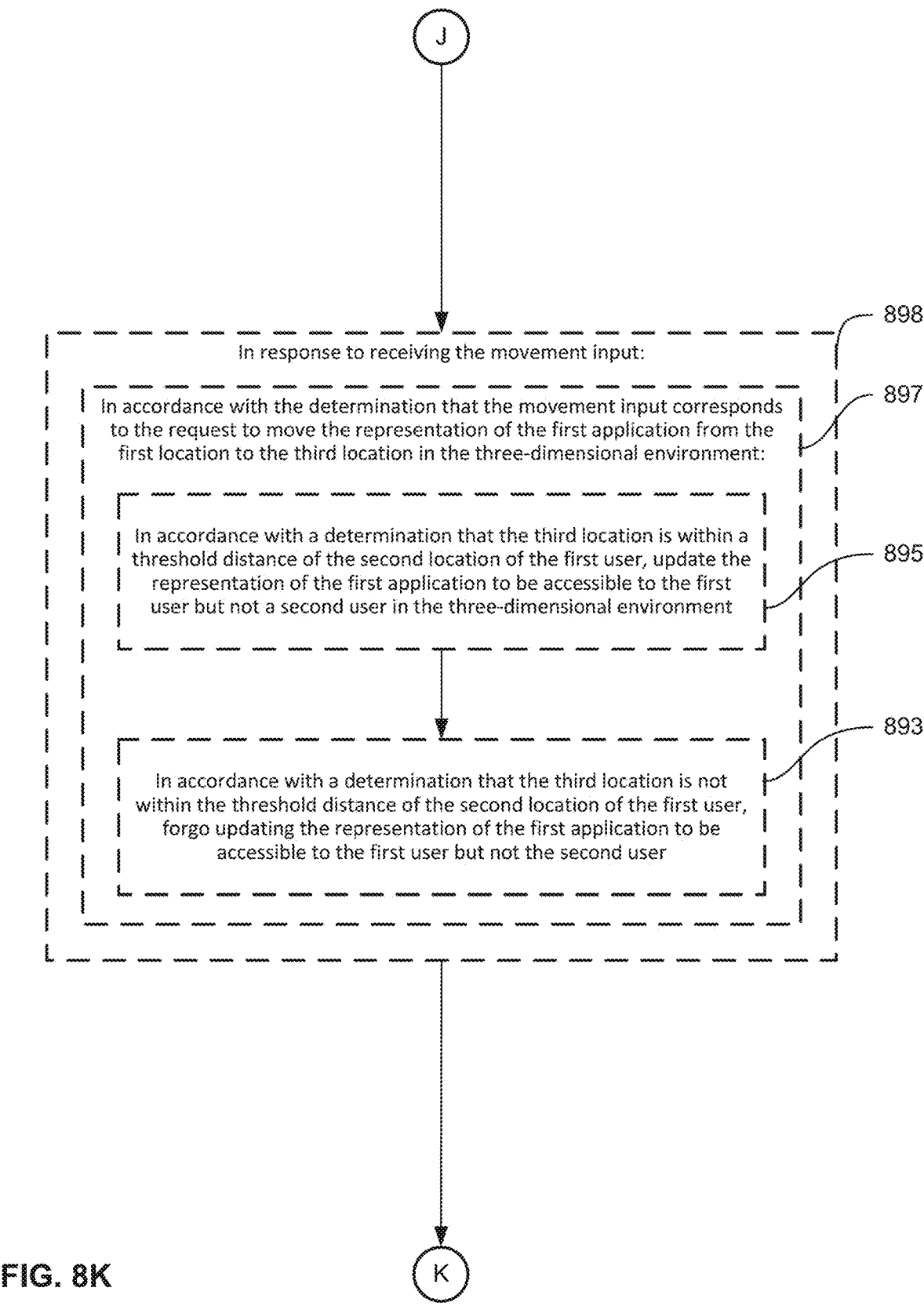
Figure 8M:
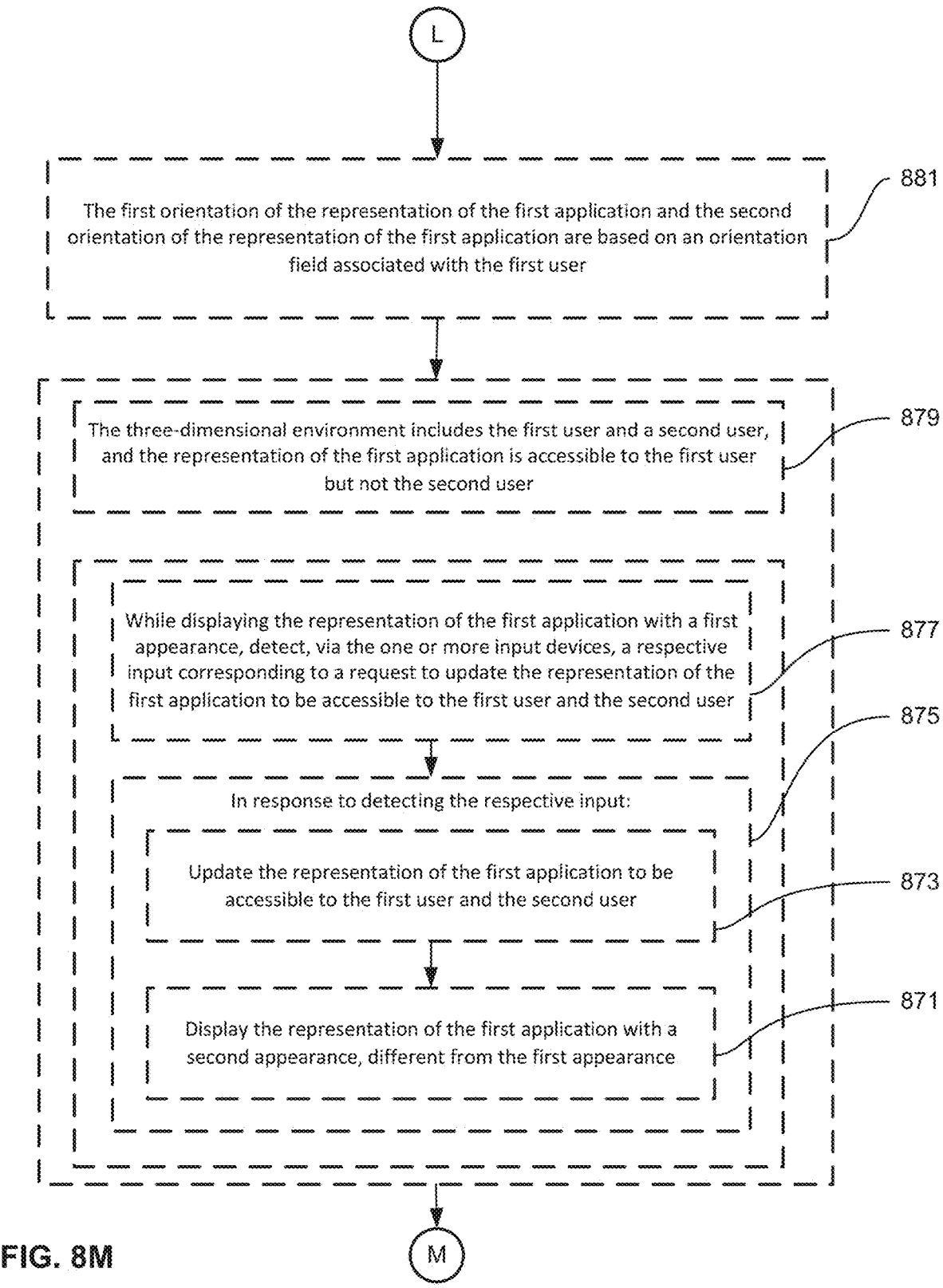
Figure 8N:
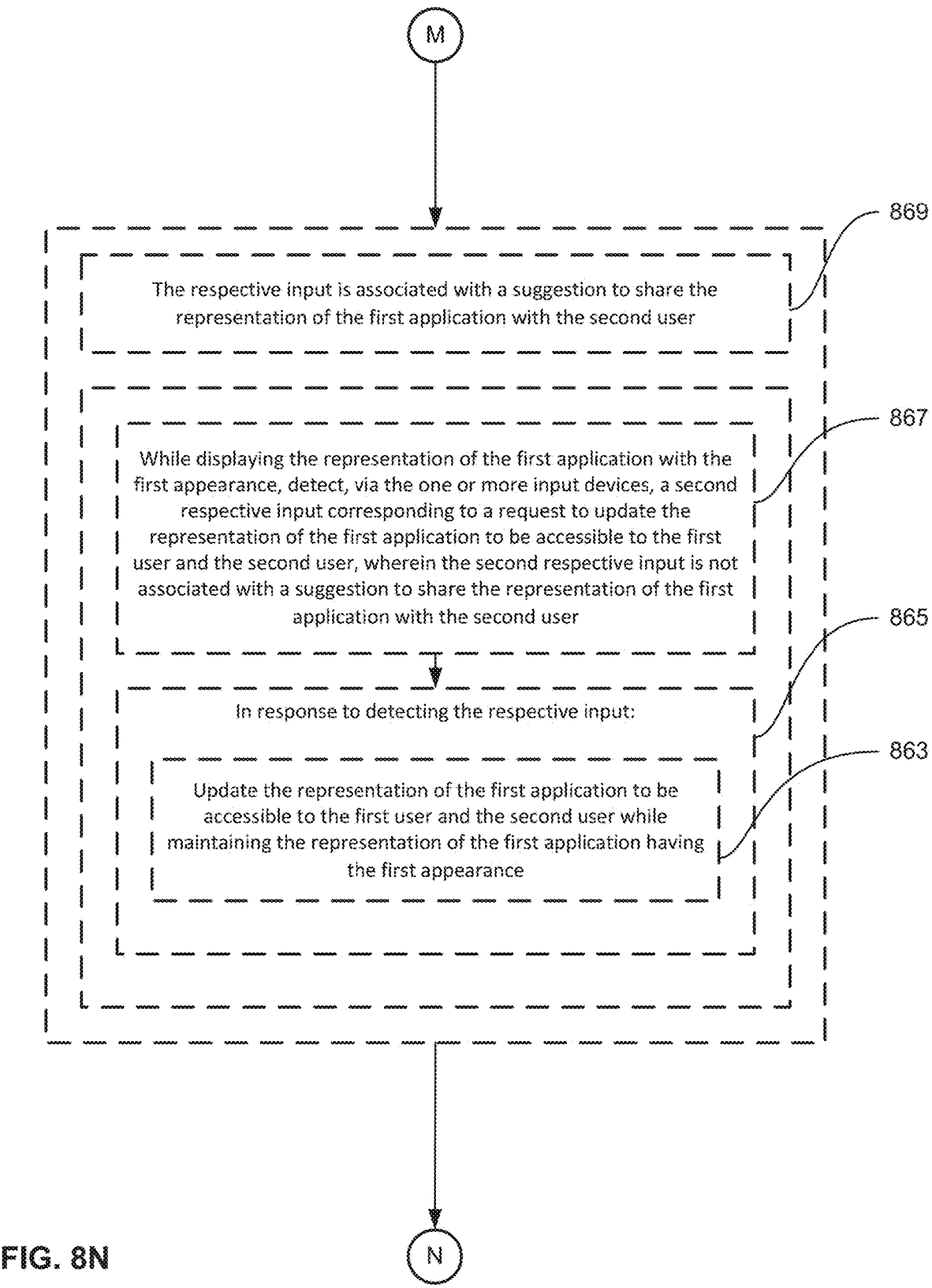
Figure 8O:
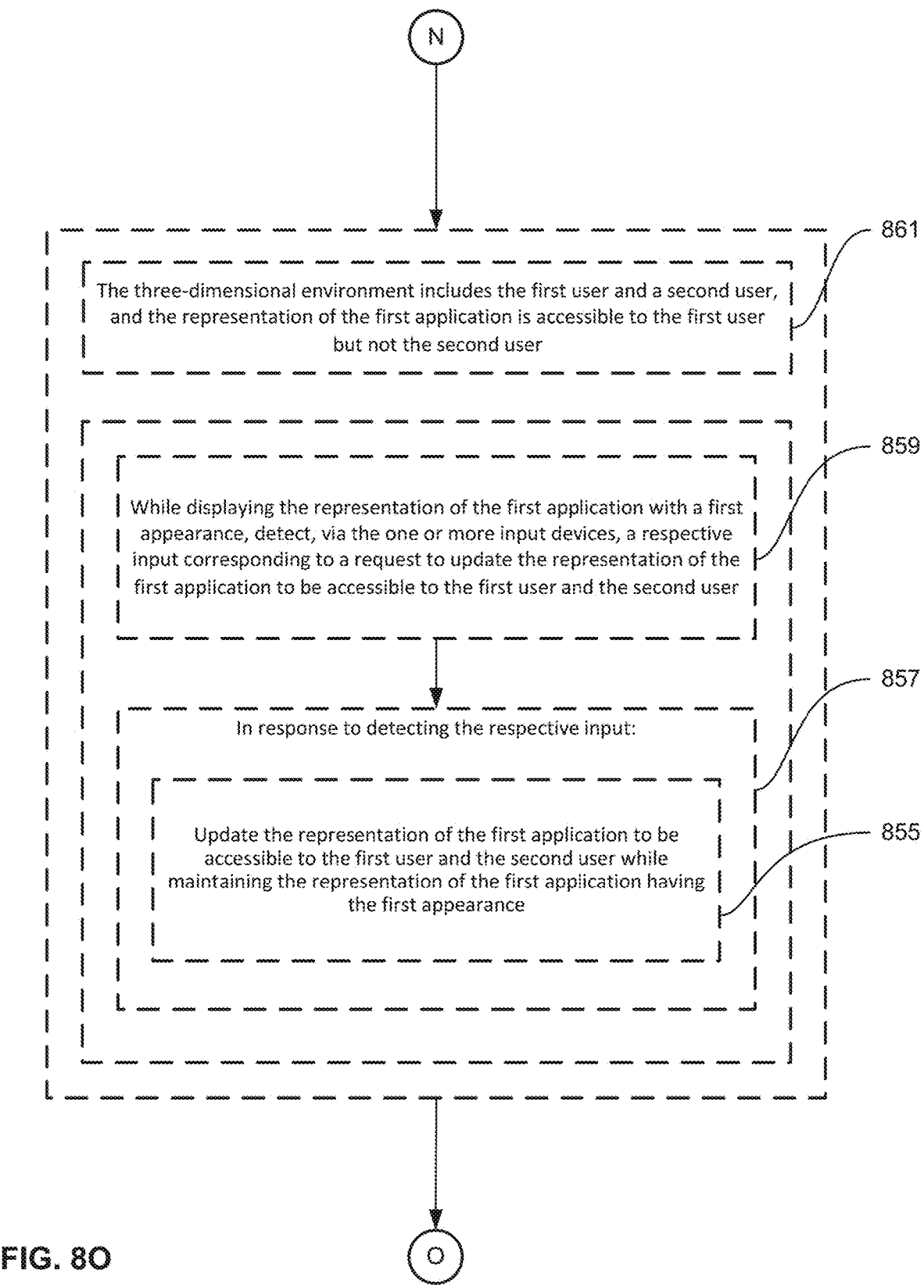
Figure 8P:
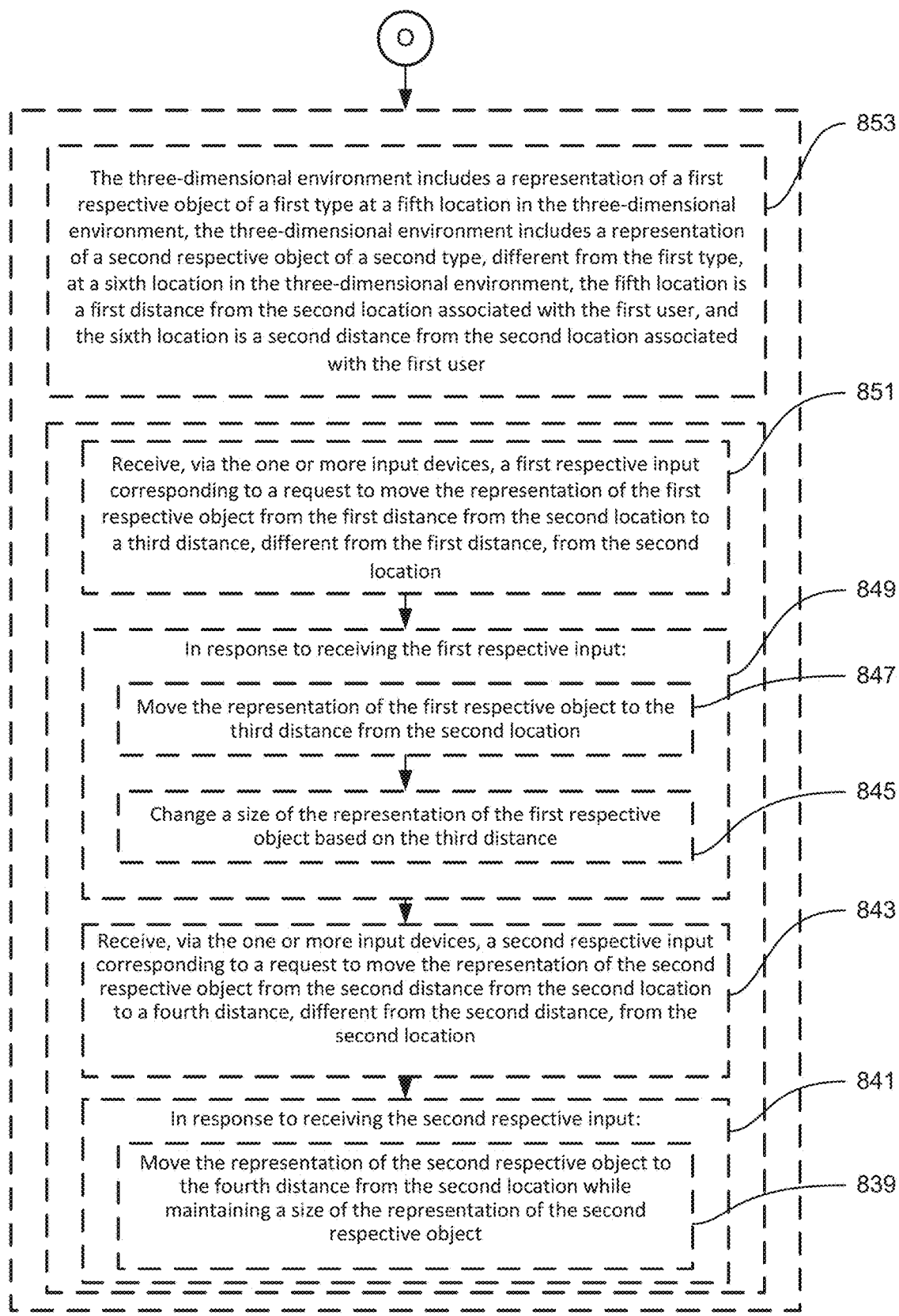

FIGS. 8A-8P is a flowchart illustrating a method of automatically updating the orientation of a virtual object in a three-dimensional environment based on a viewpoint of a user in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, such as in FIG. 7A, method 800 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device and/or a motion sensor (e.g., a hand tracking device, a hand motion sensor), etc.

In some embodiments, such as in FIG. 7A, the electronic device 100 (e.g., 101) displays (802), via the display generation component, a three-dimensional environment (e.g., 704) including a representation (e.g., 706) of a first application displayed at a first location in the three-dimensional environment (e.g., 704). In some embodiments, the three-dimensional environment is generated, displayed, or otherwise caused to be viewable by the device (e.g., the three-dimensional environment is a computer-generated reality (CGR) environment such as a virtual reality (VR) environment, a mixed reality (MR) environment, or an augmented reality (AR) environment, etc.). In some embodiments, the viewpoint from which the electronic device displays the environment corresponds to the location of the electronic device within a physical environment corresponding to the three-dimensional environment. In some embodiments, the viewpoint from which the electronic device displays the environment corresponds to a virtual location of a user of the electronic device within the three-dimensional environment.

In some embodiments, such as in FIG. 7A, the representation (e.g., 706) of the first application at the first location in the three-dimensional environment (e.g., 704) has a first orientation in the three-dimensional environment (e.g., 704) (804). In some embodiments, while the representation of the first application is displayed at the first location in the three-dimensional environment, the representation of the first application is displayed oriented towards a respective fixed frame of reference within the three-dimensional environment. For example, in response to detecting an input to launch the first application, the electronic device displays the representation of the first application at the first location with an orientation facing towards a location associated with the user from which the input to launch the first application was received.

In some embodiments, such as in FIG. 7A, a second location in the three-dimensional environment (e.g., 704) is associated with a first user (e.g., 714) in the three-dimensional environment (e.g., 704) (806). In some embodiments, the electronic device displays the three-dimensional environment from a viewpoint located at the second location in the three-dimensional environment. In some embodiments, the second location in the three-dimensional environment corresponds to a physical location of the electronic device in the physical surroundings of the electronic device. For example, the electronic device displays, via the display generation component, a virtual environment corresponding to the physical environment of the electronic device from a vantage point corresponding to the physical location of the electronic device in the physical environment.

In some embodiments, such as in FIG. 7A, while displaying the three-dimensional environment (e.g., 704) including the representation (e.g., 706) of the first application, the electronic device (e.g., 101) receives (808), via the one or more input devices, a movement input. In some embodiments, receiving the movement input includes detecting, via one or more sensors (e.g., accelerometers, gyroscopes, cameras, depth sensors, etc.) in communication with the electronic device, movement of the electronic device from a first physical location that corresponds to the second location in the three-dimensional environment to a second physical location. In some embodiments, receiving the movement input includes detecting, via an eye tracking device, movement of the gaze of the user (e.g., in conjunction with a selection input, such as detecting, via a hand tracking device, performance of a predetermined gesture with a hand of the user). In some embodiments, receiving the movement input includes detecting, via a hand tracking device, movement of a hand of the user, optionally in conjunction with detecting, via the hand tracking device, performance of a predetermined gesture. In some embodiments, the movement input is detected via an input device in communication with the electronic device, such as detecting activation of a key of a keyboard or virtual keyboard, movement of a mouse, movement of a contact on a touch-sensitive surface (e.g., touch screen, trackpad, etc.), or another directional input.

In some embodiments, such as in FIG. 7B, in response to receiving the movement input (810), in accordance with a determination that the movement input corresponds to a request to move the representation (e.g., 706) of the first application from the first location to a third location, different from the first location, in the three-dimensional environment (e.g., 704) (812) (e.g., without changing the location associated with the first user) the electronic device (e.g., 101) displays (814), via the display generation component 120, the representation (e.g., 706) of the first application at the third location in the three-dimensional environment (e.g., 704). In some embodiments, receiving the movement input corresponding to a request to move the representation of the first application from the first location to the third location includes detecting selection of a user interface element associated with the representation of the first application. In some embodiments, receiving the movement input corresponding to a request to move the representation of the first application from the first location to the third location includes detecting, via a hand tracking device, movement of the hand of a user, optionally in conjunction with detecting a selection input. In some embodiments, detecting the selection input includes detecting, via the hand tracking device, that the user performs a predetermined hand gesture. In some embodiments, detecting the selection input includes detecting, via the eye tracking device, that the user looks at the user interface element for a predetermined time (e.g., 0.1, 0.2, 0.3, 0.4, 0.5, 0.75, 1 second, etc.). In some embodiments, receiving the movement input corresponding to a request to move the representation of the first application from the first location to the third location includes detecting an input using an input device in communication with the electronic device, such as a keyboard, trackpad, mouse, or touch screen. In some embodiments, the third location is determined based on a directional input detected as part of detecting the movement input. Examples of detecting directional inputs include detecting, with a hand tracking device, movement of the user's hand in a respective direction; detecting, via an eye tracking device, movement of the user's gaze in a respective direction; detecting, via a touch sensitive surface, movement of a contact or a hovering object; detecting, via a keyboard, selection of a directional key (e.g., an arrow key or another key to which direction input is assigned); and detecting movement of an input device such as a mouse. In some embodiments, the directional input includes a magnitude and direction. In some embodiments, the distance by which the electronic device moves the representation of the first application corresponds to the magnitude of the directional input. In some embodiments, the direction in which the electronic device moves the representation of the first application corresponds to the direction of the directional input.

In some embodiments, such as in FIG. 7B, in response to receiving the movement input (810), in accordance with a determination that the movement input corresponds to a request to move the representation (e.g., 706) of the first application from the first location to a third location, different from the first location, in the three-dimensional environment (812), the electronic device (e.g., 101) updates (816) the orientation of the representation (e.g., 706) of the first application from the first orientation to a second orientation, different from the first orientation, relative to the three-dimensional environment (e.g., 704) based on the third location (and, optionally based on the second location associated with the first user). In some embodiments, the orientation of the representation of the first application is relative to a fixed frame of reference and is updated relative to the fixed frame of reference. In some embodiments, the orientation of the representation of the first application gradually changes as the representation of the first application is moved in response to the movement input so that the representation of the first application faces the user that provided the input to move the representation of the first application. For example, the representation of the first application is a virtual object that has a respective face on which information related to the first application is displayed and the electronic device rotates the representation of the first object so that the respective face is positioned towards the location associated with the first user in response to moving the virtual object from the first location to the third location. In some embodiments, the electronic device changes the orientation of the representation of the first application without receiving an input to change the orientation of the representation of the first application, and only receiving an input to move the representation of the first application. In some embodiments, moving the representation of the first application to a fourth location (different from the third location) causes the electronic device to display the representation of the first application at the fourth location with a third appearance (e.g., orientation), different from the second appearance (e.g., orientation), relative to the fixed frame of reference.

In some embodiments, such as in FIG. 7C, in response to receiving the movement input (810), in accordance with a determination that the movement input corresponds to a request to associate a fourth location, different from the second location, with the first user (e.g., 714) (e.g., without changing the location of the representation of the first application in the three-dimensional environment), the electronic (e.g., 101) device maintains (818) display of the representation (e.g., 706) of the first application at the first location in the three-dimensional environment (e.g., 704) without updating the orientation of the representation of the first application relative to the three-dimensional environment (e.g., 704). In some embodiments, receiving the movement input corresponding to the request to associate the fourth location with the first user includes detecting, via one or more sensors in communication with the electronic device (e.g., accelerometers, gyroscopes, camera(s), range sensors, etc.), movement of the electronic device from a respective location in the physical surroundings of the electronic device associated with the first location in the three-dimensional environment to a different respective location in the physical surroundings of the electronic device. In some embodiments, receiving the movement input corresponding to the request to associate the fourth location with the first user includes detecting, with a hand tracking device, movement of the user's hand in a respective direction; detecting, via an eye tracking device, movement of the user's gaze in a respective direction; detecting, via a touch sensitive surface, movement of a contact or a hovering object; detecting, via a keyboard, selection of a directional key (e.g., an arrow key or another key to which direction input is assigned); and detecting movement of an input device such as a mouse. In some embodiments, the fourth location is selected based on a magnitude and direction of movement of the movement input. In some embodiments, moving a representation of an application causes the orientation of the application to change based on the locations of the representation of the application and the user, but changing the location of the user does not cause the orientation of the representation of the application to change. In some embodiments, if there are two or more users in the three-dimensional environment, in response to detecting movement of a representation of an application, the electronic device updates the orientation of the representation according to one or more steps of method 1000.

The above-described manner of moving the representation of the first application and updating the orientation of the representation of the first application or changing a location associated with the first user without updating the orientation of the representation of the first application provides an efficient way of orienting the representation of the application towards a location associated with the user when moving the representation of the first application (e.g., by automatically changing the orientation of the representation of the first application) and an efficient way of updating the location associated with the user (e.g., by forgoing updating the orientation of the representation of the first application to save power) which additionally reduces power usage and improves battery life of the electronic device by enabling the user to use the electronic device more quickly and efficiently, while reducing errors in usage.

Figure 11A:
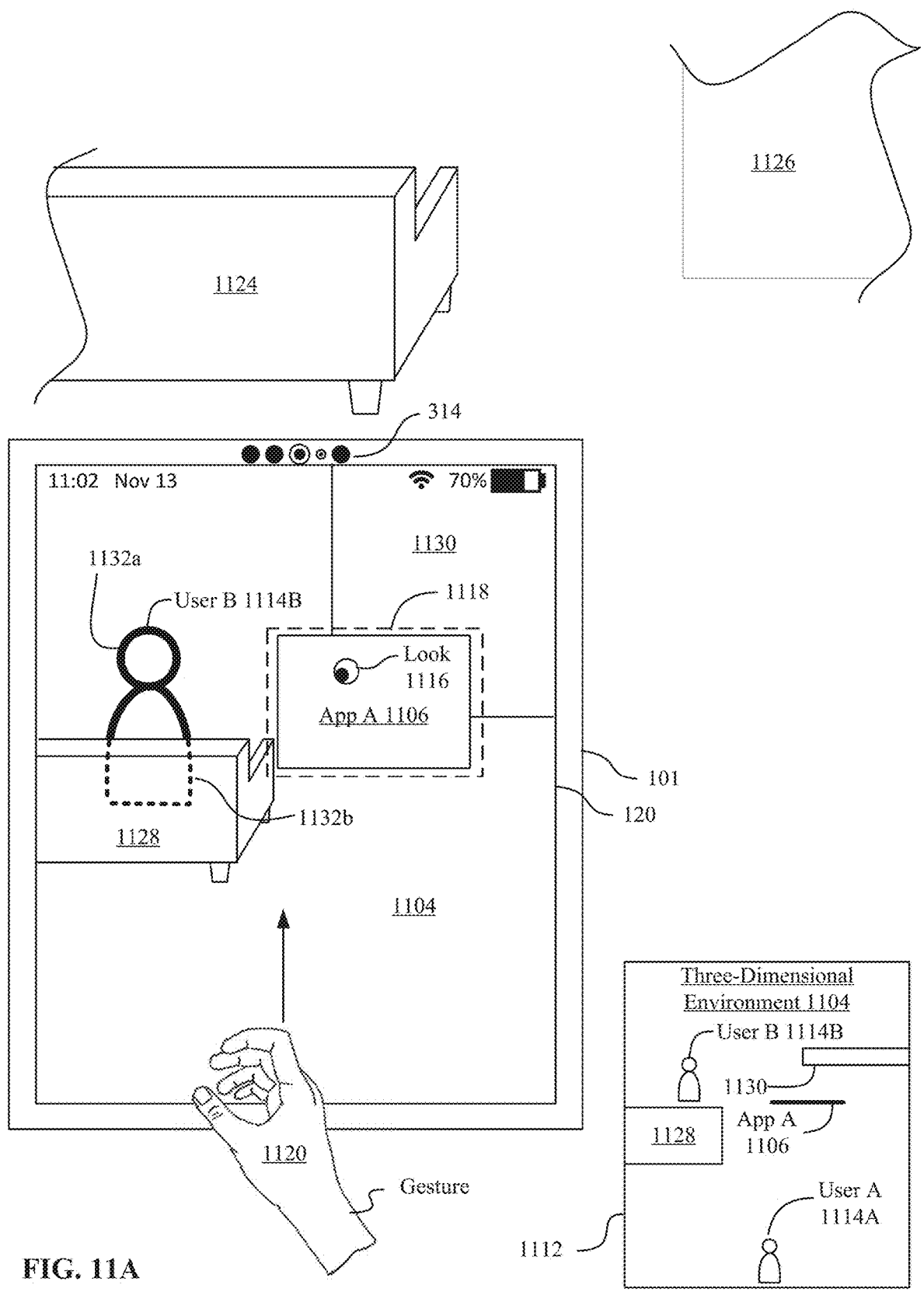
FIGS. 11A-11C illustrate examples of how an electronic device modifies an appearance of a real object that is between a virtual object and the viewpoint of a user in a three-dimensional environment in accordance with some embodiments.

In some embodiments, such as in FIG. 11A, the three-dimensional environment (e.g., 1104) comprises a representation of a physical environment of the electronic device (e.g., 101) displayed via the display generation component 120 (820). In some embodiments, the physical environment includes pass-through video (e.g., virtual representations of the physical environment of the electronic device). In some embodiments, the physical environment around the electronic device is captured by one or more visible light sensors (e.g., cameras) in communication with the electronic device and displayed via the display generation component as a photo-realistic representation of the physical environment. In some embodiments, the physical environment around the electronic device is passively presented to the user, for example, via a transparent or translucent display generation component.

The above-described manner of including a representation of the physical environment of the electronic device in the three-dimensional environment provides an efficient way of orienting virtual content of the three-dimensional environment relative to physical content of the physical environment of the electronic device which additionally reduces power usage and improves battery life of the electronic device by enabling the user to use the electronic device more quickly and efficiently (e.g., by reducing conflicts between virtual objects and physical objects and the time it takes to resolve such conflicts and by reducing user errors such as the user physically running into a physical object in the environment of the electronic device), while reducing errors in usage.

In some embodiments, such as in FIG. 7A, the three-dimensional environment (e.g., 704) comprises a virtual environment displayed via the display generation component 120 (822). In some embodiments, the virtual environment includes virtual objects that do not correspond to objects in and/or the physical environment of the electronic device. For example, a virtual environment includes virtual objects that create a virtual setting in which representations of applications are displayed.

The above-described manner of adjusting the orientation of the representation of the first application within a virtual environment provides an efficient way of automatically orienting the first application towards a location in the virtual environment associated with the user, which additionally reduces power usage and improves battery life of the electronic device by enabling the user to use the electronic device more quickly and efficiently, while reducing errors in usage.

In some embodiments, such as in FIG. 7A, the representation (e.g., 706) of the first application was displayed with a first size while the representation (e.g., 706) of the first application was displayed at the first location (824). In some embodiments, such as in FIG. 7B, in response to receiving the movement input (826), in accordance with the determination that the movement input corresponds to the request to move the representation (e.g., 706) of the first application from the first location to the third location, different from the first location, in the three-dimensional environment, the electronic device (e.g., 101) updates (828) the representation (e.g., 706) of the first application to be displayed with a second size, different from the first size, when it is displayed at the third location. In some embodiments, updating the size of the representation includes updating the amount of display area of the display generation component that is occupied by the representation (e.g., an thus displayed to the user). For example, in response to an input that moves the representation to a location that is closer to the virtual location associated with the user, the electronic device increases the size of the representation to convey that the representation is closer to the virtual location associated with the user than it was before the input was received. In some embodiments, updating the size of the representation includes updating a virtual size of the representation (e.g., the size of the representation relative to the three-dimensional environment). For example, in response to an input moving the representation to a virtual location that is closer to the location associated with the user, the electronic device forgoes modifying the display area in which the representation is displayed or modifies the display area in which the representation is displayed by an amount different from an amount that corresponds to moving the representation to a different virtual distance without changing the size of the representation. In some embodiments, while the representation is being moved from the first location to the third location, the electronic device displays an animation of the representation moving and gradually changing size while the representation moves.

The above-described manner of updating the size of the representation in response to the input corresponding to the request to move the object provides an efficient way of displaying the representation at the third location at an appropriate size (e.g., without a separate input to adjust the size of the representation) which additionally reduces power usage and improves battery life of the electronic device by enabling the user to use the electronic device more quickly and efficiently, while reducing errors in usage.

Figure 9A:
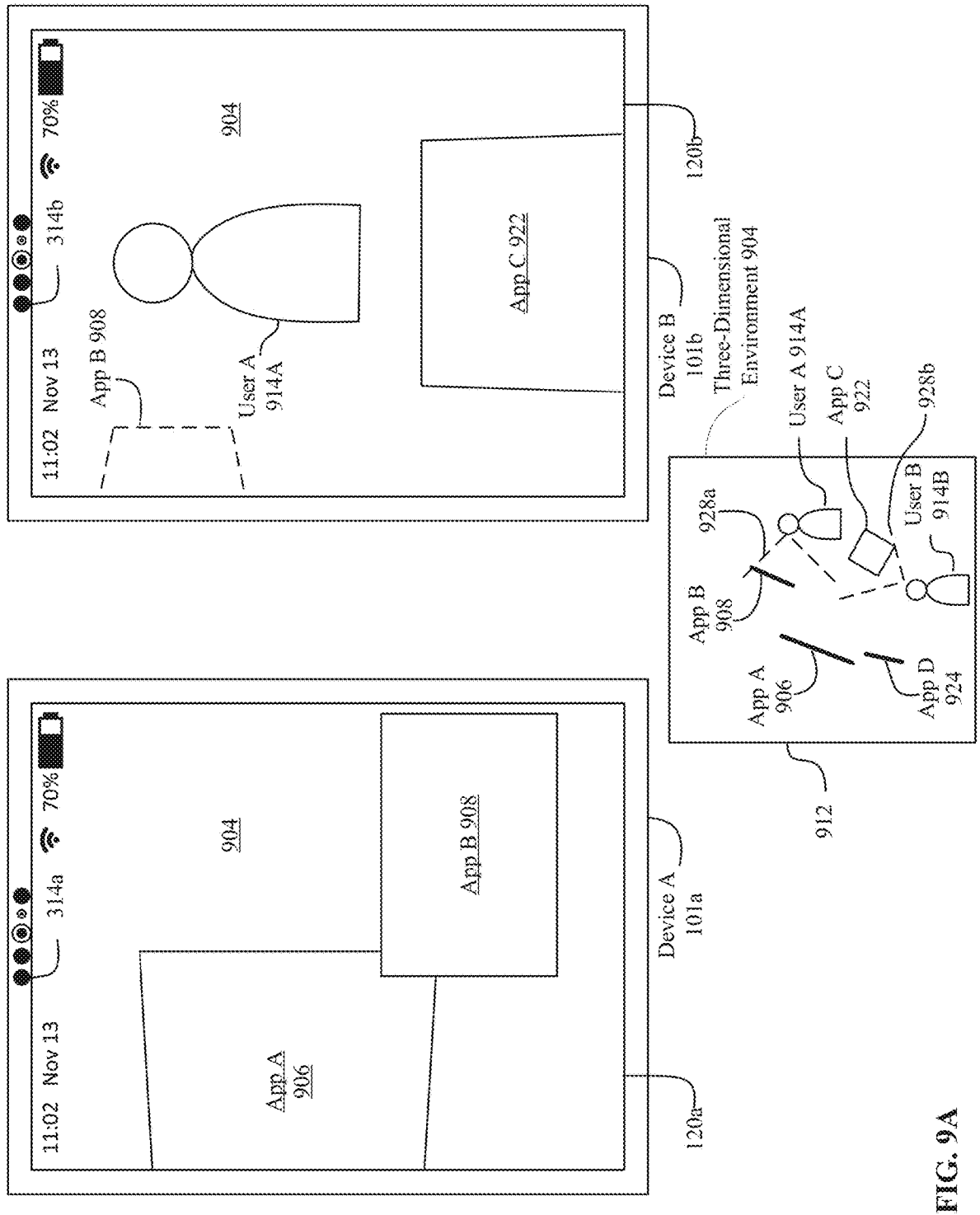
FIGS. 9A-9D illustrate examples of how an electronic device automatically updates the orientation of a virtual object in a three-dimensional environment based on viewpoints of a plurality of users in the three-dimensional environment in accordance with some embodiments.

In some embodiments, such as in FIG. 9A, updating (830) the orientation of the representation (e.g., 908) of the first application comprises, in accordance with a determination that the representation (e.g., 908) of the first application is accessible to the first user (e.g., 914A) but not a second user 914B associated with a fifth location in the three-dimensional environment (e.g., 904), updating the orientation of the representation (e.g., 908) of the first application based on the second location associated with the first user (e.g., 914A) and not based on the fifth location associated with the second user (e.g., 914B) (832). In some embodiments, the electronic device displays a representation of the second user at the fifth location in the three-dimensional environment and an electronic device of the second user displays the virtual environment from the viewpoint of the fifth location. In some embodiments, one or more applications in the virtual environment are displayed in a private mode in which not all of the users (e.g., one or more, but less than all) in the virtual environment have the ability to interact with and/or view the applications in the private mode. For example, if the first application is displayed in the private mode and accessible only to the first user, in response to an input to move the first application, the electronic device updates the orientation of the representation of the first application to be oriented towards the first user while the representation is being moved (e.g., and without regard to the location of the second user in the three-dimensional environment). In some embodiments, orienting the first application towards the first user is independent from the location of the second user. In some embodiments, such as in FIG. 9C, updating the orientation of the representation (e.g., 906) of the first application comprises (830), in accordance with a determination that the representation (e.g., 906) of the first application is accessible to the first user (e.g., 914A) and the second user (e.g., 914B) associated with the fifth location in the three-dimensional environment, updating the orientation of the representation (e.g., 906) of the first application based on the second location associated with the first user (e.g., 914A) and the fifth location associated with the second user (e.g., 914B) (834). In some embodiments, one or more applications in the virtual environment are displayed in a public mode in which all of the users in the virtual environment have the ability to interact with and/or view the applications in the public mode or in a shared mode in which the first user and the second user (and potential other users, but less than all users) have the ability to interact with and/or view the applications in the shared mode accessible to the first and second users. For example, if the first application is displayed in the shared mode and accessible to both the first and second users, in response to an input to move the first application, the electronic device updates the orientation of the representation of the first application to be oriented towards a shared viewpoint of the first and second users. In some embodiments, the orientation of the application is updated in accordance with the locations of both users according to one or more steps of method 1000.

The above-described manner of updating the orientation of the representation of the application based on the location(s) of only the user(s) that are able to interact with the application provides an efficient way of orientating applications such that all users with access to the application are able to easily view the representation of the application which additionally reduces power usage and improves battery life of the electronic device by enabling the user to use the electronic device more quickly and efficiently, while reducing errors in usage.

In some embodiments, electronic device (e.g., 101) detects (836) a respective input to display a representation of a second application in the three-dimensional environment (e.g., 704), wherein the representation of the second application was not displayed in the three-dimensional environment (e.g., 704) when the respective input was detected. In some embodiments, the input is an input to launch an application that was not running on the electronic device when the input was received, an input to view a user interface that was hidden when the input was received, or an input to display an additional representation of an application that was running on the electronic device without displaying the additional representation when the input was received. In some embodiments, in response to detecting the respective input, the electronic device (e.g., 101) displays (838) the representation of the second application at a respective location in the three-dimensional environment (e.g., 704) based on a number of users in the three-dimensional environment. In some embodiments, if there is one user in the three-dimensional environment, the electronic device displays the representation at a first respective location based on the location associated with the user. In some embodiments, if there are two users in the three-dimensional environment, the electronic device displays the representation at a second respective location different from the first respective location based on the locations associated with both two users (e.g., oriented towards a location between both users where both users are on the same side of the representation, or located between two users where the two users are on different sides of the representation). In some embodiments, the location within the three-dimensional environment at which the representation is initially presented is based on the location(s) of the users that are able to interact with and/or view the representation. For example, if there are three users in a virtual environment and all users are able to interact with and/or view the representation, the electronic device displays the representation at a respective location in the three-dimensional environment based on the locations associated with each of the three users. In some embodiments, the initial location of the representation is selected according to one or more steps of method 1000.

The above-described manner of displaying the representation of the second application at a location in the three-dimensional environment based on the number of users in the three-dimensional environment provides an efficient way of initially presenting the second representation at a location that is suitable for all of the relevant users in the virtual environment which additionally reduces power usage and improves battery life of the electronic device by enabling the user to use the electronic device more quickly and efficiently (e.g., by reducing the number of inputs needed to move the representation to a location that is suitable for all of the users in the three-dimensional environment), while reducing errors in usage.

In some embodiments, such as in FIG. 7A, in accordance with a determination that the three-dimensional environment (e.g., 704) includes the first user (e.g., 714) and no other users, the respective location is in front of the first user (e.g., 714) (840). In some embodiments, the user is associated with a respective location and orientation within the three-dimensional environment and the representation is placed at a location in the line of sight of the user with an orientation towards the location associated with the user. In some embodiments, such as in FIG. 9A, in accordance with a determination that the three-dimensional environment (e.g., 904) includes the first user (e.g., 914A) and a second user (e.g., 914B), the respective location is positioned based on locations of the first user (e.g., 914A) and the second user (e.g., 914B) (842). In some embodiments, the respective location is between locations of the first user and the second user. In some embodiments, the respective location is equidistant from the locations of the first user and the second user. In some embodiments, the first user and second user are each associated with locations within the three-dimensional environment and the representation is presented at a location that is between the locations associated with the users (e.g., such that a first side of the representation is oriented towards the first user and/or away from the second user, and a second side of the representation is oriented towards the second user and/or away from the first user). In some embodiments, the electronic device presents the representation with a first orientation based on the location associated with the first user and the electronic device of the second user presents the representation with a second orientation based on the location associated with the second user.

The above-described manner of placing the application in a different manners when there is one user present versus when there are two users present provides efficient ways of presenting the representation in a way that is easily viewable to the users that are able to access the representation which additionally reduces power usage and improves battery life of the electronic device by enabling the user to use the electronic device more quickly and efficiently (e.g., by reducing the number of inputs needed to move the representation to a location that is easily viewable to the user(s)), while reducing errors in usage.

In some embodiments, such as in FIG. 7A, in accordance with a determination that the three-dimensional environment (e.g., 704) includes the first user (e.g., 714) and no other users, the representation of the second application is displayed oriented towards the first user (844). In some embodiments, the user is associated with a respective location and orientation within the three-dimensional environment and the representation is placed at a location in the line of sight of the user with an orientation towards the location associated with the user. In some embodiments, such as in FIG. 9A, in accordance with a determination that the three-dimensional environment (e.g., 904) includes the first user (e.g., 914A) and a second user (e.g., 914B), the representation of the second application is displayed oriented towards a location between the first user and the second user (846). In some embodiments, the representation of the second application is displayed at a location that is not between the locations associated with the users. In some embodiments, the location and orientation of the representation of the second application are such that a respective face/side of the representation of the application is oriented towards the locations associated with the users (e.g., a location between the users, such as a "shared" location). In some embodiments, both users are on the same side of the representation of the second application (e.g., both on the front side of the representation of the second application). In some examples, the location of the representation of the second application is selected according to one or more steps of method 1000.

The above-described manner of placing the application in a different manners when there is one user present versus when there are two users present provides efficient ways of presenting the representation in a way that is easily viewable to the users that are able to access the representation which additionally reduces power usage and improves battery life of the electronic device by enabling the user to use the electronic device more quickly and efficiently (e.g., by reducing the number of inputs needed to move the representation to a location that is easily viewable to the user(s)), while reducing errors in usage.

In some embodiments, such as in FIG. 7A, in accordance with a determination that the three-dimensional environment (e.g., 704) includes the first user (e.g., 714) and no other users, the respective location is a first distance from the first user (848). In some embodiments, the respective location is the first distance from a location in the three-dimensional environment that is associated with the user. In some embodiments, the first distance is determined based on the location associated with the user and location(s) of one or more other objects (e.g., virtual objects, real objects) in the three-dimensional environment. In some embodiments, such as in FIG. 9A, in accordance with a determination that the three-dimensional environment (e.g., 904) includes the first user (e.g., 914A) and a second user (e.g., 914B) (850), the respective location is a second distance, different from the first distance, from the first user (e.g., 914A) (e.g., and a third distance from the second user (e.g., a location in the three-dimensional environment associated with the second user)). In some embodiments, the respective location is the second distance away from a location in the three-dimensional environment associated with the first user. In some embodiments, the distance is selected such that the first user and the second user are both able to view the representation of the first application. The respective location, second distance, and third distance, are optionally selected based on the locations associated with the first user and the second user and/or location(s) of one or more other objects (e.g., virtual objects, real objects) in the three-dimensional environment. In some embodiments, the respective location is selected according to one or more steps of method 1000. In some embodiments, while there is one user in the three-dimensional environment, the electronic device displays the representation a first distance from the user and while there are more than one user in the three-dimensional environment, the electronic device displays the representation a second distance (e.g., greater than the first distance) from the shared point of interest (e.g., a location between all of the users, a region of the environment including all of the users, etc.) of the users.

The above-described manner of placing the application at different distances from the users when there is one user present versus when there are two users present provides efficient ways of presenting the representation in a way that is easily viewable to the users that are able to access the representation which additionally reduces power usage and improves battery life of the electronic device by enabling the user to use the electronic device more quickly and efficiently (e.g., by reducing the number of inputs needed to move the representation to a location that is easily viewable to the user(s)), while reducing errors in usage.

Figure 13A:
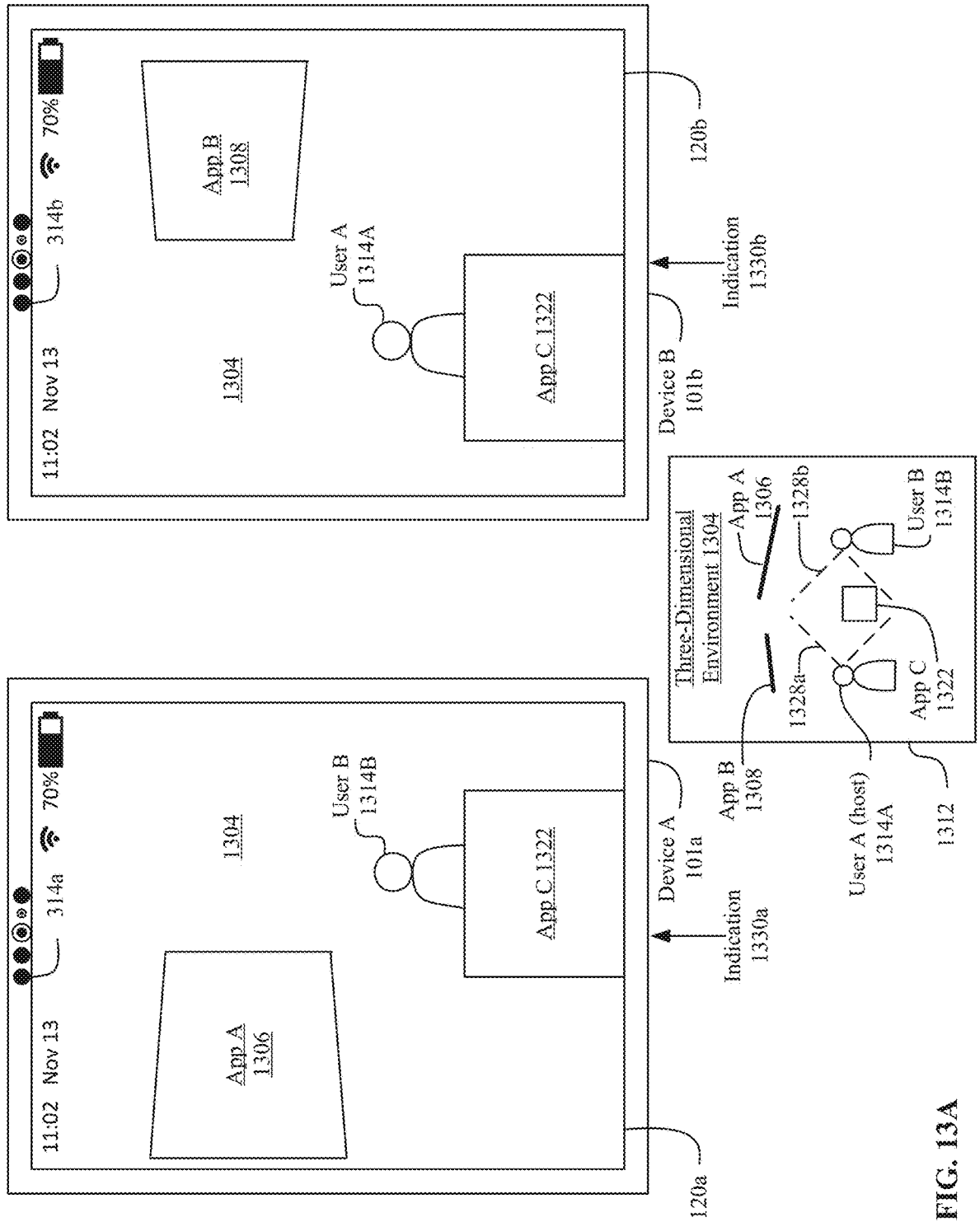
FIGS. 13A-13C illustrate examples of how an electronic device automatically selects a location for a user in a three-dimensional environment that includes one or more virtual objects and/or other users in accordance with some embodiments.

In some embodiments, such as in FIG. 13A, while displaying the representation 1306 of the first application at the first location in the three-dimensional environment 1304, the electronic device (e.g., 101) detects (852) that a second user has been added to the three-dimensional environment 1304 (e.g., detecting indication 1330a or 1330b), wherein the second user is associated with a fifth location in the three-dimensional environment. In some embodiments, the electronic device detects an input corresponding to a request to add the second user to the three-dimensional environment or the electronic device receives an indication (e.g., via a network connection) that the second user is joining the three-dimensional environment. In some embodiments, prior to detecting the second user being added to the three-dimensional environment, the first user is the only user in the three-dimensional environment. In some embodiments, such as in FIG. 13B, in response to detecting that the second user 1314C has been added to the three-dimensional environment 1304 (854), in accordance with a determination that the representation 1306 of the first application is accessible to the first user 1314A and the second user 1314C, the electronic device (e.g., 101) moves (856) the representation 1306 of the first application from the first location to a sixth location in the three-dimensional environment based on the second location and the fifth location (e.g., electronic device (e.g., 101a) or (e.g., 101b) is able to move representation 1306 in response to user C 1314C joining the three-dimensional environment 1304). In some embodiments, the sixth location is selected according to one or more steps of method 1000. In some embodiments, in response to detecting the second user being added to the three-dimensional environment, the electronic device updates the representation of the first application to be displayed at a location and/or with an orientation that makes the representation visible to both users. For example, the representation includes a respective side on which content is displayed and the sixth location is a location at which the electronic device is able to orient the respective side of the representation towards the locations associated with both users. In some embodiments, only the location of the representation of the first application changes. In some embodiments, only the orientation of the representation of the first application changes. In some embodiments, the location and orientation of the representation of the first application changes.

The above-described manner of moving the representation of the first application based on the second location and fifth location provides an efficient way of updating the three-dimensional environment so the first user and the second user are both able to view the representation of the first application which additionally reduces power usage and improves battery life of the electronic device by enabling the user to use the electronic device more quickly and efficiently (e.g., by reducing inputs needed to place the representation at a location at which both users are able to see the representation), while reducing errors in usage.

In some embodiments, such as in FIG. 13A, while displaying the representation 1306 of the first application at the first location in the three-dimensional environment 1304, the electronic device (e.g., 101) detects (858) that a second user has been added to the three-dimensional environment 1304 (e.g., detecting indication 1330a or 1330b), wherein the second user is associated with a fifth location in the three-dimensional environment. In some embodiments, the electronic device detects an input corresponding to a request to add the second user to the three-dimensional environment or the electronic device receives an indication (e.g., via a network connection) that the second user is joining the three-dimensional environment. In some embodiments, prior to detecting the second user being added to the three-dimensional environment, the first user is the only user in the three-dimensional environment. In some embodiments, in response to detecting that the second user has been added to the three-dimensional environment (860), in accordance with a determination that the representation (e.g., 908) of the first application is accessible to the first user (e.g., 914A) but not the second user (e.g., 914B), such as in FIG. 9B, the electronic device (e.g., 101) maintains (862) display of the representation of the first application (e.g., 908) at the first location, wherein the representation of the first application is not visible to the second user (e.g., the electronic device (e.g., 101a) maintains display of representation (e.g., 908) in response to an additional user joining the three-dimensional environment (e.g., 904) because representation (e.g., 908) is accessible only to the user A (e.g., 914A)). In some embodiments, the representation of the first application is displayed in a private mode in which the first user is able to interact with and/or view the first application but other users in the three-dimensional environment are not able to interact with and/or view the first application. For example, the electronic device of the second user forgoes displaying the representation of the first application because the second user does not have access to the first application. In some embodiments, after the second user joins the three-dimensional space, the electronic device continues to display the representation of the first application at the same location and orientation with which the representation was displayed before the second user joined the three-dimensional space.

The above-described manner of maintaining display of representations of applications that are not accessible to the second user after the second user is added to the three-dimensional space provides an efficient way of displaying representations of applications not visible to other users in the three-dimensional environment which additionally reduces power usage and improves battery life of the electronic device by forgoing calculating an updated location of the representation of the first application when the second user does not have access to the first application.

In some embodiments, such as in FIG. 9A, the three-dimensional environment includes the first user (e.g., 914A) at the second location in the three-dimensional environment, and a second user (e.g., 914B) at a fifth location in the three-dimensional environment (e.g., 904) (864). In some embodiments, the electronic device displays a representation of the second user at the fifth location in the three-dimensional environment and the electronic device of the second user displays the three-dimensional environment with a viewpoint at the fifth location in the three-dimensional environment. In some embodiments, the electronic device (e.g., 101) detects (866) a respective input to display a representation of a second application in the three-dimensional environment, wherein the representation of the second application was not displayed in the three-dimensional environment when the respective input was detected, and the representation of the second application is not accessible to a plurality of users in the three-dimensional environment, such a representation (e.g., 908) in FIG. 9A, which is accessible to user A (e.g., 914A) and not user B (e.g., 914B). In some embodiments, the second application is in a private mode in which the first user that provided the input is able to access and/or view the second application, but other users in the three-dimensional environment are not able to access and/or view the second application. In some embodiments, the respective input corresponds to a request to launch the second application, a request to display a representation of the second application that had previously been hidden, or a request to display an additional representation of the second application in addition to a representation of the second application that is already displayed by the electronic device. In some embodiments, in response to receiving the respective input (868), in accordance with a determination that the respective input is associated with the first user (e.g., 914A) (e.g., the electronic device that detects the respective input is provided by the first user), the electronic device (e.g., 101) displays (870) the representation (e.g., 908) of the second application at a sixth location in the three-dimensional environment (e.g., 904) based on the second location of the first user (e.g., 914A) but not the fifth location of the second user (e.g., 914B), such as in FIG. 9A. In some embodiments, if the first user provides the input corresponding to the request to display the representation of the second application, the electronic device displays the representation of the second application at a location and/or orientation based on the location associated with the first user. For example, the representation of the second application is displayed at a location proximate to the second location and/or oriented towards the second location. In some embodiments, the sixth location is selected independent from the location(s) of users in the three-dimensional environment other than the first user. In some embodiments, in response to receiving the respective input (868), in accordance with a determination that the respective input is associated with the second user (e.g., the electronic device that detects the respective input is provided by the second user), the electronic device (e.g., 101) displays (872) the representation of the second application at a seventh location in the three-dimensional environment based on the fifth location of the second user but not the second location of the first user (e.g., if representation (e.g., 908) were accessible to user B (e.g., 914B) instead of user A (e.g., 914A) in FIG. 9A). In some embodiments, if the second user provides the input corresponding to the request to display the representation of the second application, the electronic device displays the representation of the second application at a location and/or orientation based on the location associated with the second user. For example, the representation of the second application is displayed at a location proximate to the fifth location and/or oriented towards the fifth location. In some embodiments, the sixth location is selected independent from the location(s) of users in the three-dimensional environment other than the second user.

The above-described manner of placing the representation of the second application at a location based on the location associated with the user that provided the input to display the representation of the second application provides an efficient way of placing an application at a location that is visible to the user that requested display of the application which additionally reduces power usage and improves battery life of the electronic device by enabling the user to use the electronic device more quickly and efficiently (e.g., by reducing the inputs needed to place the application at a location that is easily visible to the user that requested display of the application), while reducing errors in usage.

In some embodiments, such as in FIG. 9A, the three-dimensional environment (e.g., 904) includes the first user at the second location in the three-dimensional environment, and a second user at a fifth location in the three-dimensional environment (874). In some embodiments, the electronic device displays a representation of the second user at the fifth location in the three-dimensional environment and the electronic device of the second user displays the three-dimensional environment from a viewpoint at the fifth location in the three-dimensional environment). In some embodiments, the electronic device (e.g., 101) detects (876) a respective input to display a representation of a second application in the three-dimensional environment, wherein the representation of the second application was not displayed in the three-dimensional environment when the respective input was detected (e.g., receiving an input to display one of representations (e.g., 906, 908, or 922) in the three-dimensional environment (e.g., 904) illustrated in FIG. 9A). In some embodiments, the second application is in a private mode in which some, but not all, of the users in the three-dimensional environment are able to access and/or view the application. In some embodiments, the respective input corresponds to a request to launch the second application, a request to display a representation of the second application that had previously been hidden, or a request to display an additional representation of the second application in addition to a representation of the second application that is already displayed by the electronic device. In some embodiments, in response to receiving the respective input, the electronic device (e.g., 101) displays (878) the representation of the second application (e.g., one of representations (e.g., 906, 908, or 922) in three-dimensional environment (e.g., 904) in FIG. 9A) at a respective location in the three-dimensional environment (e.g., three-dimensional environment (e.g., 904) in FIG. 9A). In some embodiments, in accordance with a determination that the representation of the second application is not accessible to the first user (e.g., in a manner similar to how representation (e.g., 908) is not accessible to user B (e.g., 914B) in FIG. 9A), the respective location is not based on the second location of the first user (880). In some embodiments, the second application is accessible to the second user and optionally one or more additional users in the three-dimensional environment other than the first user. In some embodiments, if the second application is only accessible to the second user, the respective location is based on the fifth location. In some embodiments, if the second application is accessible to the second user and one or more additional users, the respective location is based on all of the locations of the users that have access to the application and is not based on the locations of one or more users that do not have access to the application. In some embodiments, the electronic device places the representation of the second application in accordance with the positions of multiple users according to one or more steps of method 1000. In some embodiments, in accordance with a determination that the representation of the second application is not accessible to the second user (e.g., in a manner similar to how representation (e.g., 908) is not accessible to user B (e.g., 914B) in FIG. 9A), the respective location is not based on the fifth location of the second user (882). In some embodiments, the second application is accessible to the first user and optionally one or more additional users in the three-dimensional environment other than the second user. In some embodiments, if the second application is only accessible to the first user, the respective location is based on the second location. In some embodiments, if the second application is accessible to the first user and one or more additional users, the respective location is based on all of the locations of the users that have access to the application and is not based on the locations of one or more users that do not have access to the application. In some embodiments, the electronic device places the representation of the second application in accordance with the positions of multiple users according to one or more steps of method 1000.

The above-described manner of not basing the respective location of the second application on the locations of users that do not have access to the second application provides an efficient way of setting the criteria with which to place the representation of the second application which additionally reduces power usage and improves battery life of the electronic device by simplifying the complexity of determining a position of the second application, while reducing errors in usage.

In some embodiments, such as in FIG. 9A, in accordance with the determination that the representation (e.g., 908) of the second application is not accessible to the first user (e.g., 914B), a visual indication of the representation of the second application is visible to the first user without a content of the representation of the second application being visible to the first user (884) (e.g., representation (e.g., 908) displayed by electronic device B (e.g., 101b) in FIG. 9A). In some embodiments, the visual indication is an object displayed at the location of the representation of the second application that indicates that an object that is not accessible to the first user is being displayed. In some embodiments, the indication includes an indication that the object is an application user interface. In some embodiments, the indication does not include an indication that the object is an application user interface. In some embodiments, the indication includes an indication of the name of the second application. In some embodiments, the indication does not include the indication of the name of the second application. In some embodiments, the indication has the same dimensions and/or shape as the representation of the second user interface. In some embodiments, the indication has different dimensions and/or shape than the dimensions of the representation of the second user interface. In some embodiments, such as in FIG. 9A, in accordance with the determination that the representation (e.g., 908) of the second application is not accessible to the second user, the visual indication of the representation of the second application is visible to the second user without the content of the representation of the second application being visible to the second user (886) (e.g., representation (e.g., 908) displayed by electronic device B (e.g., 101b) in FIG. 9A). In some embodiments, the visual indication is an object displayed at the location of the representation of the second application that indicates that an object that is not accessible to the second user is being displayed. In some embodiments, the indication includes an indication that the object is an application user interface. In some embodiments, the indication does not include an indication that the object is an application user interface. In some embodiments, the indication includes an indication of the name of the second application. In some embodiments, the indication does not include the indication of the name of the second application. In some embodiments, the indication has the same dimensions and/or shape as the representation of the second user interface. In some embodiments, the indication has different dimensions and/or shape than the dimensions of the representation of the second user interface.

The above-described manner of displaying a visual indication of the second application that does not include the content of the representation of the second application provides an efficient way of preventing the user that does not have access to the second application from placing a virtual object at the location of the second application which additionally reduces power usage and improves battery life of the electronic device by enabling the user to use the electronic device more quickly and efficiently (e.g., such as by reducing the number of inputs needed to avoid placing two objects at the same location in the three-dimensional environment), while reducing errors in usage.

In some embodiments, such as in FIG. 9A, the three-dimensional environment (e.g., 904) includes the first user (e.g., 914A) at the second location in the three-dimensional environment, and a second user (e.g., 914B) at a fifth location in the three-dimensional environment (888). In some embodiments, the electronic device displays a representation of the second user at the fifth location in the three-dimensional environment and the electronic device of the second user displays the three-dimensional environment from a viewpoint at the fifth location in the three-dimensional environment. In some embodiments, the representation of the respective application is accessible to and/or viewable by the first user and the second user before the movement input is received. In some embodiments, in response to receiving the movement input (890), in accordance with the determination that the movement input corresponds to the request to move the representation of the first application from the first location to the third location in the three-dimensional environment (892), in accordance with a determination that the third location is in between the second location of the first user and the fifth location of the second user, the electronic device (e.g., 101) updates (894) the representation of the first application to be accessible to the first user but not accessible to the second user (e.g., representation (e.g., 908) is accessible to user A (e.g., 914A) but not user B (e.g., 914B) in FIG. 9A). In some embodiments, the electronic device of the second user ceases displaying the representation and/or the content of the respective application. In some embodiments, in response to the movement input, the respective application is no longer accessible to one or more other users in the three-dimensional environment other than the first user and the second user. In some embodiments, in response to the movement input, the respective application is accessible only to the user that provided the movement input and is no longer accessible to any other users in the three-dimensional environment. In some embodiments, such as in FIG. 9C, in response to receiving the movement input (890), in accordance with the determination that the movement input corresponds to the request to move the representation (e.g., 906) of the first application from the first location to the third location in the three-dimensional environment (e.g., 904) (892), in accordance with a determination that the third location is not in between the second location of the first user (e.g., 914A) and the fifth location of the second user (e.g., 914B), the electronic device (e.g., 101) maintains (896) the representation (e.g., 906) of the first application as being accessible to the first user (e.g., 914A) and the second user (e.g., 914B). In some embodiments, the electronic device of the second user updates display of the representation of the respective application to display the representation at the third location in the three-dimensional environment. In some embodiments, the respective application continues to be accessible to one or more other users in the three-dimensional environment in addition to the first user and the second user.

The above-described manner of updating the representation of the first application to no longer be accessible to the second user in accordance with the determination that the third location is between the second location and the fifth location provides an efficient way of removing other user's access to representations of applications which additionally reduces power usage and improves battery life of the electronic device by enabling the user to use the electronic device more quickly and efficiently, while reducing errors in usage.

In some embodiments, in response to receiving the movement input (898), in accordance with the determination that the movement input corresponds to the request to move the representation of the first application from the first location to the third location in the three-dimensional environment (897), in accordance with a determination that the third location is within a threshold distance of the second location of the first user, the electronic device (e.g., 101) updates (895) the representation of the first application to be accessible to the first user but not a second user in the three-dimensional environment (e.g., similar to how representation (e.g., 908) is accessible to user A (e.g., 914A) but not user B (e.g., 914B) in FIG. 9A). In some embodiments, the electronic device of the second user ceases displaying the representation of and/or the content of the respective application. In some embodiments, in response to the movement input, the respective application is no longer accessible to one or more other users in the three-dimensional environment other than the first user (e.g., the user that provided the movement input). In some embodiments, the electronic device updates the first application to be accessible to only one first user in accordance with a determination that (1) the third location is within a threshold distance of the second location and (2) the first user provided the movement input. For example, if a second user moves the representation of the application to a location within the threshold distance of the second location, the electronic device continues to present the first application to the second user and the first user. In some embodiments, such as in FIG. 9C, in response to receiving the movement input (898), in accordance with the determination that the movement input corresponds to the request to move the representation (e.g., 906) of the first application from the first location to the third location in the three-dimensional environment (897), in accordance with a determination that the third location is not within the threshold distance of the second location of the first user (e.g., 914A), the electronic device (e.g., 101) forgoes (893) updating the representation of the first application to be accessible to the first user (e.g., 914A) but not the second user (e.g., 914B). In some embodiments, the electronic device of the second user updates display of the representation of the respective application to display the representation at the third location in the three-dimensional environment. In some embodiments, the respective application continues to be accessible to one or more other users in the three-dimensional environment in addition to the first user and the second user.

The above-described manner of updating the representation of the first application to no longer be accessible to the second user in accordance with the determination that the third location is within the predetermined threshold distance from the second location provides an efficient way of removing other user's access to representations of applications which additionally reduces power usage and improves battery life of the electronic device by enabling the user to use the electronic device more quickly and efficiently, while reducing errors in usage.

In some embodiments, in response to receiving the movement input (891), in accordance with the determination that the movement input corresponds to the request to move the representation of the first application from the first location to the third location in the three-dimensional environment (889), in accordance with a determination that the third location is within a threshold distance of a fifth location associated with the second user, the electronic device (e.g., 101) updates (887) the representation of the first application to be accessible to the second user but not the first user in the three-dimensional environment (e.g., in a manner similar to how representation (e.g., 906) is accessible to user A (e.g., 914A) but not user B (e.g., 914B) in FIG. 9A). In some embodiments, the electronic device of the first user ceases displaying the representation of the second application and the electronic device of the second user displays the representation of the second application at the third location in the three-dimensional environment. In some embodiments, while the first application is accessible to the second user but not the first user, the second user is able to view the first application, provide input to the first application, hear audio associated with the first application, move the representation of the first application within the three-dimensional environment, etc. and the first user is not able to view the first application, provide input to the first application, hear audio associated with the first application, move the representation of the first application within the three-dimensional environment, etc. In some embodiments, the electronic device only updates the first application to be accessible to the second user but not the first user if (1) the third location is within the threshold of the fifth location and (2) the second user provided the movement input. In some embodiments, the electronic device updates the first application to be accessible to the second user but not the first user if the third location is within the threshold of the fifth location irrespective of which user provided the movement input. In some embodiments, the first application is accessible to the first user but not the second user when the movement input is received (e.g., from the first user). In some embodiments, in accordance with a determination that the third location is equally spaced between the first user and the second user, the electronic device orients the representation of the first application towards whichever user provide the input to move the representation of the first application. In some embodiments, such as in FIG. 9C, in response to receiving the movement input (891), in accordance with the determination that the movement input corresponds to the request to move the representation (e.g., 906) of the first application from the first location to the third location in the three-dimensional environment (889), in accordance with a determination that the third location is not within the threshold distance of the fifth location associated with the second user (e.g., 914B), the electronic device (e.g., 101) forgoes (885) updating the representation of the first application to be accessible to the second user (e.g., 914B) but not the first user (e.g., 914A). In some embodiments, in accordance with a determination that the third location is not within the threshold distance of any location associated with a user in the three-dimensional environment, the representation of the second application is accessible to all of the users in the three-dimensional environment. In some embodiments, in accordance with a determination that the third location is within the threshold distance of a third respective user in the three-dimensional environment other than the second user and the first user, the electronic device updates the representation of the second application to be accessible to the third respective user without being accessible to the first user or the second user.

The above-described manner of updating the representation of the first application to be accessible to the second user but not the first user in accordance with the determination that the third location is within the threshold distance of the fifth provides an efficient way of updating an application to be visible to one user only, which additionally reduces power usage and improves battery life of the electronic device by enabling the user to use the electronic device more quickly and efficiently, while reducing errors in usage.

In some embodiments, such as in FIG. 7A, the electronic device (e.g., 101) concurrently displays (883), in the three-dimensional environment (e.g., 704), the representation (e.g., 706) of the first application at the first location in the three-dimensional environment, and a representation (e.g., 708) of a second application at a fifth location in the three-dimensional environment, wherein the representation (e.g., 706) of the first application is displayed with a first respective orientation in the three-dimensional environment (e.g., 704), and the representation of the second application (e.g., 708) is displayed with a second respective orientation, different from the first respective orientation, in the three-dimensional environment (e.g., 704). In some embodiments, when there are multiple representations of different applications in the three-dimensional environment, the orientations of the representations of applications are different from each other. In some embodiments, the representations of the applications are oriented towards the second location associated with the user and the representations of the applications are displayed at different locations such that none of the representations block the user's view of another representation. In some embodiments, in this arrangement, the orientations of the representations are different from one another.

The above-described manner of displaying the representations of the first and second applications with different orientations provides an efficient way of presenting the representations such that neither representation blocks the user's view of another representation which additionally reduces power usage and improves battery life of the electronic device by enabling the user to use the electronic device more quickly and efficiently (e.g., by reducing the number of inputs needed to view the various representations), while reducing errors in usage.

In some embodiments, the first orientation of the representation (e.g., 706) of the first application, such as in FIG. 7A, and the second orientation of the representation (e.g., 706) of the first application, such as in FIG. 7B, are based on an orientation field associated with the first user (881). In some embodiments, the orientation field defines an orientation towards the location of the first user for every location in the three-dimensional environment. In some embodiments, an object displayed at a respective location in the three-dimensional environment is displayed with an orientation corresponding to the orientation field at the respective location. In some embodiments, the orientation field defines the direction normal to a surface of a respective object that includes content when the respective object is placed at a respective location within the orientation field. In some embodiments, the orientation field points towards the location associated with the user if there is one user in the three-dimensional environment. In some embodiments, if there are multiple users in the three-dimensional environment, the electronic device creates an orientation field that is based on (e.g., is a mathematical combination, such as a vector sum, of orientation fields associated with a plurality of users (e.g., each user) in the three-dimensional environment. In some embodiments, the orientation and placement of objects in a three-dimensional environment including multiple users is set according to one or more steps of method 1000. In some embodiments, in response to detecting an input to move an object in the three-dimensional environment, the electronic device moves the object to a location corresponding to the movement input and updates the orientation of the object according to the attention field at the location corresponding to the movement input. In some embodiments, the attention field is two-dimensional and based on the two-dimensional location(s) of the user(s) in the three-dimensional environment (e.g., the attention field is the same for all vertical heights in the three-dimensional environment). In some embodiments, the attention field is three-dimensional and based on the three-dimensional location(s) of the user(s) in the three-dimensional environment (e.g., the attention field depends on the vertical locations of the user(s)).

The above-described manner of orientating the representation of the first application and second application according to an attention field provides an efficient way of calculating the orientations of the representations which additionally reduces power usage and improves battery life of the electronic device by reducing the computational complexity of updating the orientations of objects when the electronic device initiates display of objects or when objects are moved by the user.

In some embodiments, such as in FIG. 7A, the three-dimensional environment (e.g., 904) includes the first user (e.g., 914A) and a second user (e.g., 914B), and the representation (e.g., 908) of the first application is accessible to the first user but not the second user (879). In some embodiments, the electronic device of the first user presents the representation of the first application but the electronic device of the second user does not present the representation of the first application. In some embodiments, the first user is able to view, hear audio of, provide input to, and/or move the representation of the first application while the first application is accessible to the first user. In some embodiments, the second user is unable to view, hear audio of, provide input to, and/or move the representation of the first application while the first application is not accessible to the second user. In some embodiments, such as in FIG. 9B, while displaying the representation (e.g., 908) of the first application with a first appearance (e.g., a first size, a first position, and/or a first orientation), the electronic device (e.g., 101) detects (877), via the one or more input devices, a respective input corresponding to a request to update the representation (e.g., 908) of the first application to be accessible to the first user (e.g., 914A) and the second user (e.g., 914B). In some embodiments, the request is a request to share the first application with the respective second user and optionally any other users present in the three-dimensional environment. In some embodiments, once the first application is accessible to the second user, the electronic device of the second user presents the representation of the first application and the second user is optionally able to interact with the first application in the three-dimensional environment. In some embodiments, the first user and the second user are able to view, hear audio of, provide input to, and/or move the representation of the first application while the first application is accessible to the first user and the second user. In some embodiments, such as in FIG. 9C, in response to detecting the respective input (875), the electronic device (e.g., 101) updates (873) the representation (e.g., 908) of the first application to be accessible to the first user (e.g., 914A) and the second user (e.g., 914B). In some embodiments, the electronic device of the second user initiates display of the representation of the first application and the electronic device of the first user continues to display the representation of the first application. In some embodiments, in response to detecting the respective input (875), the electronic device (e.g., 101) displays (871) the representation of the first application with a second appearance, different from the first appearance (e.g., if the appearance of representation (e.g., 908) in FIG. 9C were different from the appearance of representation (e.g., 908) in FIG. 9B). In some embodiments, the electronic device of the first user updates the appearance of the representation of the first application in response to the request to make the first application accessible to the second user. For example, the electronic device updates the size, orientation, and/or position of the representation of the first application, such as to orient the representation of the first application towards both the first user and the second user. In some embodiments, the representation of the first application is moved towards the second user. In some embodiments, the representation of the first application is displayed at a larger size (e.g., so both users are able to more easily view the content at a further distance than before the first application was shared).

The above-described manner of updating the representation of the first application in response to the request to make the first application accessible to the second user provides an efficient way to present the representation with an appearance that is more easily visible to both users, which additionally reduces power usage and improves battery life of the electronic device by enabling the user to use the electronic device more quickly and efficiently (e.g., by reducing the inputs needed to update the appearance of the representation of the first application after the first application is shared), while reducing errors in usage.

Figure 9B:
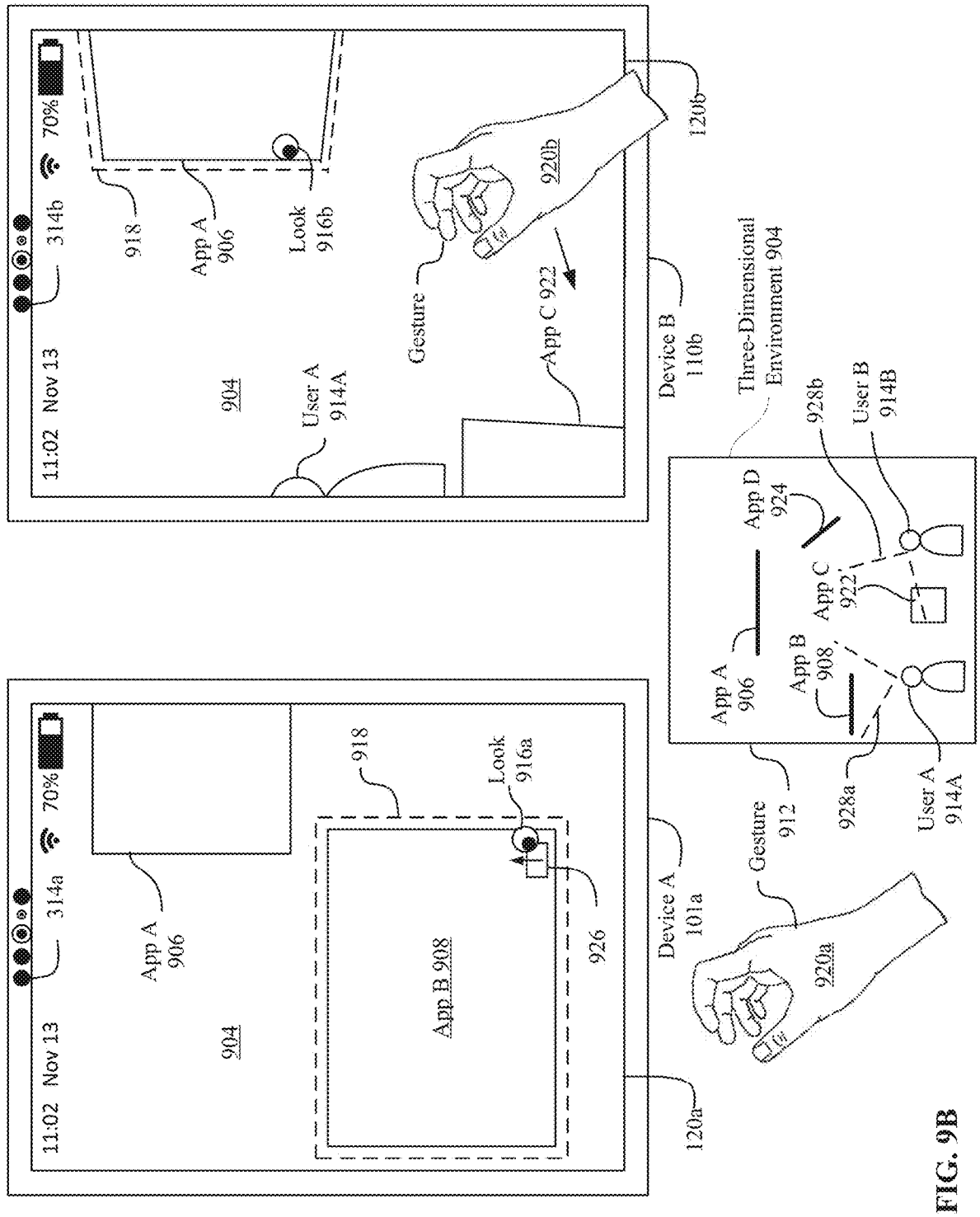

In some embodiments, the respective input is associated with a suggestion to share the representation of the first application with the second user (869) (e.g., if electronic device (e.g., 101*a*) presented an indication to share representation (e.g., 908) prior to receiving the input to share representation (e.g., 908) illustrated in FIG. 9B). In some embodiments, the electronic device presents a prompt to share the first application and the input corresponding to the request to make the first application accessible to the second user is directed towards the prompt. In some embodiments, the prompt is displayed in response to the second user entering the three-dimensional environment. In some embodiments, the prompt is presented in response to initiation of a respective operation of the first application other than a request to display the prompt (e.g., a request to present content within the application). In some embodiments, the prompt is presented in response to a request from the second user. In some embodiments, the prompt is presented because the first application is a content-displaying application and/or because the first user had previously shared access to the first application with the second user and/or other users). In some embodiments, such as in FIG. 9B, while displaying the representation (e.g., 908) of the first application with the first appearance, the electronic device detects (867), via the one or more input devices, a second respective input corresponding to a request to update the representation (e.g., 908) of the first application to be accessible to the first user (e.g., 914A) and the second user (e.g., 914B), wherein the second respective input is not associated with a suggestion to share the representation (e.g., 908) of the first application with the second user (e.g., 914B). In some embodiments, the request to update the representation to be accessible to the second user is initiated by the first user. For example, the electronic device detects selection of an option to share the first application that is displayed in a menu that is presented in response to a request to present the menu, rather than selection or acceptance of a prompt suggesting the first application be shared. In some embodiments, the first user and the second user are able to view, hear audio of, provide input to, and/or move the representation of the first application while the first application is accessible to the first user and the second user. In some embodiments, such as in FIG. 9C, in response to detecting the respective input (865), the electronic device (e.g., 101) updates (863) the representation (e.g., 908) of the first application to be accessible to the first user (e.g., 914A) and the second user (e.g., 914B) while maintaining the representation (e.g., 908) of the first application having the first appearance. In some embodiments, the electronic device of the first user and the electronic device of the second user both display the representation with the first appearance. In some embodiments, the orientation of the representation of the first application in the three-dimensional environment does not change. In some embodiments, the position of the representation of the first application in the three-dimensional environment does not change. In some embodiment, the size of the representation of the first application in the three-dimensional environment does not change.

The above-described manner of updating the appearance of the representation of the first application when the request to make the representation accessible to the second user is associated with a sharing suggestion provides an efficient way of presenting the representation with an appearance that is easily visible to both the first user and the second user in situations in which sharing the application is suggested, which additionally reduces power usage and improves battery life of the electronic device by enabling the user to use the electronic device more quickly and efficiently (e.g., by reducing the inputs needed to update the appearance of the representation of the first application), while reducing errors in usage.

In some embodiments, such as in FIG. 9A, the three-dimensional environment (e.g., 904) includes the first user (e.g., 914A) and a second user (e.g., 914B), and the representation (e.g., 908) of the first application is accessible to the first user (e.g., 914A) but not the second user (e.g., 914B) (861). In some embodiments, the electronic device of the second user forgoes presenting the representation of the first application. In some embodiments, such as in FIG. 9B, while displaying the representation (e.g., 908) of the first application with a first appearance, the electronic device (e.g., 101) detects (859), via the one or more input devices, a respective input corresponding to a request to update the representation (e.g., 908) of the first application to be accessible to the first user (e.g., 914A) and the second user (e.g., 914B). In some embodiments, such as in FIG. 9C, in response to detecting the respective input (857), the electronic device (e.g., 101) updates (855) the representation (e.g., 908) of the first application to be accessible to the first user (e.g., 914A) and the second user (e.g., 914B) while maintaining the representation (e.g., 908) of the first application having the first appearance. In some embodiments, both the electronic devices of the first user and the second user display the representation of the first application with the first appearance. In some embodiments, the first appearance includes a respective size, location, and/or orientation relative to a fixed frame of reference in the three-dimensional space. In some embodiments, the orientation of the representation of the first application in the three-dimensional environment does not change. In some embodiments, the position of the representation of the first application in the three-dimensional environment does not change. In some embodiment, the size of the representation of the first application in the three-dimensional environment does not change. In some embodiments, the electronic devices of the first user and the second user display the three-dimensional space from different perspectives and/or viewpoints. In some embodiments, the first user and the second user are able to view, hear audio of, provide input to, and/or move the representation of the first application while the first application is accessible to the first user and the second user.

The above-described manner of maintaining the first appearance of the representation of the first application in response to the request to make the representation accessible to the second user provides an efficient way of sharing the representation without computing an updated appearance for the representation which additionally reduces power usage and improves battery life of the electronic device by reducing the complexity of the operation to share the representation with the second user, while reducing errors in usage.

In some embodiments, such as in FIG. 7A the three-dimensional environment (e.g., 704) includes a representation (e.g., 706) of a first respective object of a first type at a fifth location in the three-dimensional environment, the three-dimensional environment (e.g., 704) includes a representation (e.g., 710) of a second respective object of a second type (e.g., a type of object that does not dynamically scale when moved around the three-dimensional environment (e.g., 704), different from the first type, at a sixth location in the three-dimensional environment (e.g., 704), the fifth location is a first distance from the second location associated with the first user (e.g., 714A), and the sixth location is a second distance from the second location associated with the first user (e.g., 714A) (853). In some embodiments, the first and second objects are representations of applications, items of content, files, or other virtual objects. In some embodiments, the first type of object is a type of object that has a dynamic virtual size based on the distance between the object and the user(s) in the three-dimensional environment. In some embodiments, the second type of object is a type of object that has a fixed virtual size that does not depend on the distance between the object and the user(s) in the virtual environment. In some embodiments, such as in FIG. 7A, the electronic device (e.g., 101) receives (851), via the one or more input devices, a first respective input corresponding to a request to move the representation (e.g., 706) of the first respective object from the first distance from the second location to a third distance, different from the first distance, from the second location. In some embodiments, such as in FIG. 7B, in response to receiving the first respective input (849), the electronic device (e.g., 101) moves (847) the representation (e.g., 706) of the first respective object to the third distance from the second location of the first user (e.g., 714A). In some embodiments, the electronic device updates the orientation of the first respective object in response to the first respective input as described here in method 800 and/or method 1000. In some embodiments, such as in FIG. 7B, in response to receiving the first respective input (849), the electronic device (e.g., 101) changes (845) a size (e.g., relative to the size of the representation while the representation was displayed at the fifth location) of the representation (e.g., 706) of the first respective object based on the third distance. In some embodiments, the electronic device changes the virtual size of the first respective object in response to the input to move the first respective object. For example, if the first respective object is moved to a distance further away from the second location, the electronic device increases the virtual size of the first respective object to maintain visibility of the first respective object (e.g., and the display area of the first object remains the same, increases, or decreases). As another example, if the first respective object is moved to a distance closer to the second location, the electronic device decreases the virtual size of the first respective object to preserve space in the display area for other objects (e.g., and the display area of the first object remains the same, increases, or decreases). In some embodiments, the electronic device receives (843), via the one or more input devices, a second respective input corresponding to a request to move the representation of the second respective object from the second distance from the second location to a fourth distance, different from the second distance, from the second location (e.g., receiving a request to move object (e.g., 710) in FIG. 7A). In some embodiments, in response to receiving the second respective input (841), the electronic device (e.g., 101) moves (839) the representation of the second respective object to the fourth distance from the second location while maintaining a size (e.g., relative to the size of the representation while the representation was displayed at the fifth location) of the representation of the second respective object (e.g., maintaining the size of object (e.g., 710) in the three-dimensional environment (e.g., 704) in response to moving object (e.g., 710) to a different distance from the user (e.g., 714) in the three-dimensional environment (e.g., 704) in FIG. 7A). In some embodiments, in response to the second respective input, the electronic device moves the second respective object and continues to display the second respective object at a fixed virtual size. In some embodiments, maintaining the fixed virtual size of the respective second object includes updating the display area used to display the second respective object. For example, if the second respective object is moved further away from the user in the three-dimensional environment, the display generation component uses less display area to display the second respective object. As another example, if the second respective object is moved closer to the user in the three-dimensional environment, the display generation component uses more display area to display the second respective object. In some embodiments, a user interface element associated with the second virtual object (e.g., a menu bar, an option that, when selected and/or interacted with, initiates a process to move the second virtual object, such as described with reference to method 1000) is displayed at a variable virtual size that depends on the distance between the user and the second respective object in the three-dimensional environment, as described with reference to method 1000.

The above-described manner of changing the size of the first respective object and maintaining the size of the second respective object provides an efficient way of scaling the size of objects for improved visibility and a way of displaying realistic virtual objects with fixed virtual sizes which additionally reduces power usage and improves battery life of the electronic device by enabling the user to use the electronic device more quickly and efficiently, while reducing errors in usage.

FIGS. 9A-9D illustrate examples of how electronic devices 101a and/or 101b automatically update the orientation of a virtual object in a three-dimensional environment based on viewpoints of a plurality of users in the three-dimensional environment in accordance with some embodiments.

FIG. 9A illustrates electronic devices 101a and 101b displaying, via display generation components 120a and 120b, a three-dimensional environment 904 on a user interface. As described above with reference to FIGS. 1-6, the electronic devices 101a and 101b optionally include a display generation component 120a and 120b (e.g., a touch screen) and a plurality of image sensors 314a and 314b. The image sensors optionally include one or more of a visible light camera, an infrared camera, a depth sensor, or any other sensor the electronic devices 101a and 101b would be able to use to capture one or more images of a user or a part of the user while the user interacts with the electronic devices 101a and 101b. In some embodiments, display generation component 120a and/or 120b is a touch screen that is able to detect gestures and movements of a user's hand. In some embodiments, the user interfaces shown below could also be implemented on head-mounted displays that include display generation components that display the user interfaces to the users and sensors to detect the physical environments and/or movements of the users' hands (e.g., external sensors facing outwards from the users), and/or gazes of the users (e.g., internal sensors facing inwards towards the faces of the users).

In some embodiments, a three-dimensional environment 904 is accessible to a plurality of users. In FIG. 9A, electronic device A 101a displays the three-dimensional environment 904 for user A (e.g., from the perspective of user A), and electronic device B 101b displays the three-dimensional environment 904 for user B (e.g., from the perspective of user B). The three-dimensional environment 904 includes a representation 914A of user A, a representation 914B of user B, a representation 908 of App B, a representation 906 of App A, a representation 922 of App C, and a representation 924 of App D. In FIG. 9A, the representation 906 of App A, the representation 908 of App B, and the representation 924 of App D include content on one side of the representations, whereas the representation 922 of App C includes content visible from multiple sides. For example, Apps A, B, and D could be content applications (e.g., video players, music players, photo galleries) or other applications including two dimensional user interfaces (e.g., web browsers, e-mail applications, word processing applications, two-dimensional games) while App C could be a virtual board game or other virtual content that is visible from multiple sides (e.g., three-dimensional content). In the example illustrated in FIG. 9A, the representation 906 of App A, the representation 922 of App C, and the representation 924 of App D are accessible to user A 914A and user B 914B and the representation 908 of App B is accessible to user A 914A but not accessible to user B 914B. Thus, user A 914A and user B 914B are both able to view and interact with the representation 906 of App A, the representation 922 of App C, and the representation 924 of App D, whereas only user A 914A is able to view and interact with the representation 908 of App B.

Legend 912 indicates the positions and orientations of the objects and users in the three-dimensional environment 904 including the field of view 928a of user A 914A and the field of view 928b of user B 914B. Thus, electronic device A 101a displays a portion of the three-dimensional environment 904 in the field of view 928a of user A 914A and electronic device B 101b displays a portion of the three-dimensional environment 904 in the field of view 928b of user B 914B. Electronic device A 101a displays the representation 906 of App A and the representation 908 of App B. Electronic device B 101b displays a representation of user A 914A (e.g., an avatar of user A 914A) and a representation 922 of App C. In some embodiments, electronic device B 101b displays an indication of the representation 908 of App B (e.g., at its size and/or location) without displaying the content of the representation 908 of App B because user B 914B does not have access to the representation 908 of App B. In some embodiments, electronic device B101b forgoes displaying an indication of the representation 908 of App B.

In some embodiments, the positions and/or orientations of the virtual objects in the three-dimensional environment 904 are selected automatically (e.g., in response to an input to move one of the objects, in response to an input to initiate display of the objects, etc.) based on the positions of the users 914A and/or 914B in the three-dimensional environment 904. For example, the electronic devices 101a and/or 101b select/update the orientations, sizes, and/or positions of single-sided objects, such as the representations 906 and 908 of App A and App B so that the side with the content of the representations 906 and 908 are oriented towards user A 914A and user B 914B in the three-dimensional environment 904. As another example, the electronic devices 101a and/or 101b select/update the orientations, sizes, and/or positions of multi-sided objects, such as representation 922 of App C to be between user A 914A and user B 914B In some embodiments, the electronic devices 101a and 101b construct and/or have access to a vector field superimposed on the three-dimensional environment 904 where the vectors point to a shared point of interest of the users 914A and 914B. In some embodiments, the vector field is three-dimensional. In some embodiments, the vector field is the vector-summed result of the sums of a vector field pointing towards the position of user A 914A in the three-dimensional environment 904 and a vector field pointing towards the position of user B 914B in the three-dimensional environment 904 (or, more generally, a sum of vector fields each pointing toward one of the plurality of users in the three-dimensional environment, including a vector field of each user in the three-dimensional environment 904). Thus, if a virtual object (e.g., a representation of an application) is placed at a height that is above eye level of one or more users, the electronic devices 101a and 101b orient the virtual object so that it is facing downward towards the viewpoints of the users. The shared point of interest of the users is optionally a location in the three-dimensional environment 904 between the users towards which virtual objects are oriented in order for the virtual objects to be visible to both users in the three-dimensional environment 904.

In some embodiments, the electronic device 101a and/or 101b prioritizes the user that is closer to a respective virtual object over a user that is further from the virtual object when determining the orientation of the object. For example, the representation 924 of App D is closer to user B 914B in the three-dimensional environment 904, so the orientation of the representation 924 of App D faces user B 914B more than user A 914A. In some embodiments, when a first user's of a respective virtual object is blocked (e.g., by another user or another virtual object), the orientation of the respective virtual object is based on the locations of the other users in the three-dimensional environment 904 (whose views of the respective object are not blocked) without being based on the location of the first user (or any other users whose views of the respective virtual object are blocked). For example, if there was a virtual object between user A 914A and the representation 906 of App A in the three-dimensional environment 904 in FIG. 9A, the orientation and/or size of representation 905 of App A would be based on the location of user B 914B without being based on the location of user A 914A. In some embodiments, when a first user is unable to view a respective virtual object because the distance between the first user and the respective virtual object exceeds a threshold (e.g., 4, 5, 10, etc. meters), the orientation of the respective virtual object is based on the locations of the other users in the three-dimensional environment 904 (who are within the threshold distance of the respective virtual object) without being based on the location of the first user (or any other users who are further than the threshold distance from the respective virtual object). For example, if the three-dimensional environment 904 illustrated in FIG. 9A included an additional object within the threshold distance of user A 914A but further than the threshold distance from user B 914B, the orientation and/or size of the additional object would be based on the location of user A 914A without being based on the location of user B 914B.

In some embodiments, constructing the vector field corresponding to the automatic orientations of the virtual objects includes establishing a region of the three-dimensional environment 904 beyond which virtual objects have an orientation based on the boundary of the region rather than being based on the locations of the users in the three-dimensional environment. For example, in FIG. 9A, user A 914A and user B 914B are located within the region and the orientations of any virtual objects within the region of the three-dimensional environment 904 (e.g., the representation of App C 922) are based on the positions of one or more users as described above and below. In this example, outside of the region, the electronic devices 101a and 101b orient virtual objects to face the location of the boundary of the region closest to the location of the virtual objects. Thus, in some embodiments, regardless of the distance of objects from the boundary of the region, an object outside of the region at a location closest to a respective point along the boundary of the region will have the same respective orientation irrespective of the object's distance from the boundary of the region. In some embodiments, within the region, changing the distance of an object from a respective point along the boundary of the region changes the orientation of the object even if the object remains closest to the respective point along the boundary of the region. In some embodiments, objects that are outside of the region and within a threshold distance (e.g., 0.2, 0.5, 0.7, 1, etc. meter) of the boundary of the region are oriented according to the locations of the users in the three-dimensional environment 904 (e.g., the criteria used to orient objects within the region) and the boundary of the region (e.g., the criteria used to orient objects outside of the region). Thus, in some embodiments, the electronic device 101a and/or 101b is able to "blend" the different algorithms used inside the region and outside of the region when placing objects outside of and within a threshold distance of the region.

In some embodiments, the electronic device 101*a* and/or 101*b* automatically updates the orientation of a virtual object in response to a user request to move the object within the three-dimensional environment 904 as described above with reference to FIGS. 9A-10T and/or when initially displaying the virtual object in the three-dimensional environment 904. For example, the orientation of the representation 906 of App A in FIG. 9A is automatically selected based on the positions of user A 914A and user B 914B in the three-dimensional environment 904. In some embodiments, in response to a request to display a virtual object in the three-dimensional environment 904, the electronic device 101*a* and/or 101*b* selects an initial position of the virtual object and selects the orientation based on the locations of the users 914A and 914B and other objects in the three-dimensional environment 904. In some embodiments, the initial position of the virtual object is not based on the orientation of the users 914A and 914B (e.g., the fields of view 928*a* and 928*b* of the users). For example, the initial position of representation 906 of App A is the position illustrated in FIG. 9A regardless of which directions in the three-dimensional environment 904 user A 914A and user B 914B are facing while in the positions illustrated in FIG. 9A. Thus, in some embodiments, the initial placement of virtual objects in a three-dimensional environment are based on the positions of the users in the three-dimensional environment. For example, the representation 906 of App A and the representation 924 of App D are placed at locations at which both users 914A and 914B are able to see a side of the representations including the content of the representations, while the representation 922 of App C is placed between the users 914A and 914B so that the users are able to view different sides of the representation (e.g., for a virtual board game).

FIG. 9B illustrates another example of the three-dimensional environment 904 described above with reference to FIG. 9A. In FIG. 9B, the positions of the users 914A and 914B and other objects in the three-dimensional environment 904 are different from their positions in FIG. 9A. In some embodiments, the initial positions and orientations of the representation 906 of App A, the representation 924 of App D, the representation 922 of App C, and the representation 908 of App B are different in FIG. 9B than in FIG. 9A because the initial positions and orientations of these objects are based on the positions of the users 914A and 914B in the three-dimensional environment and the positions of the users 914A and 914B are different in FIG. 9B than they were in FIG. 9A.

It should be understood that, in some embodiments, FIGS. 9A and 9B illustrate the initial positions and orientations of the objects in the three-dimensional environment 904 or the automatically selected orientations of the objects in response to user input moving the objects. In some embodiments, the electronic devices 101*a* and/or 101*b* do not update the orientations and/or positions of virtual objects in response to one or more users updating their positions in the three-dimensional environment 904. In response to detecting one or more of the users 914A or 914B changing their position within the three-dimensional environment 904, the electronic devices 101*a* and 101*b* forgo updating the positions and orientations of the virtual objects, but update the vector field used to determine the initial position and orientation of new objects added to the three-dimensional environment 904, and the orientation of objects that are moved around the three-dimensional environment 904.

Legend 912 of FIG. 9B illustrates the field of view 928*a* of user A 914*a* and the field of view 928*b* of user B 914B in the three-dimensional environment 904. Electronic device 101*a* displays the three-dimensional environment 904 from the viewpoint of user A 914*a*, including the representation 906 of App A and the representation 908 of App B. Electronic device 101*b* displays the three-dimensional environment 904 from the viewpoint of user B 914*b*, including the representation 906 of App A, the representation 922 of App C, and a representation (e.g., avatar) of user A 914A. Although the field of view 928*b* of user B 914B includes the representation 908 of App B as shown in legend 912, electronic device B 101*b* does not display the representation 908 of App B because the representation 908 of App B is not accessible to user B.

Moreover, because user B 914B does not have access to the representation 908 of App B, in some embodiments, the orientation of the representation 908 of App B is based on the location of user A 914A without being based on the location of user B 914B in the three-dimensional environment 904. For example, the representation 908 of App A and the representation 924 of App D are oriented towards both user A 914A and user B 914B, but the representation 908 of App B is oriented towards user A 914A and is at an angle at which it would be difficult for user B 914B to view the content of the representation 908 if user B 914B had access to the representation 908.

In some embodiments, an electronic device 101*a* and/or 101*b* initially displays representations of applications in a private mode in which the user that requested display has access to the representation of the application without other users in the three-dimensional environment 904 having access to the representation. For example, electronic device A 101*a* displays representation 908 of App B in private mode so that user A 914A has access to the representation 908 without user B 914B having access to the representation 908 in response to detecting a request from user A 914A to display the representation 908 until a request to make the representation 908 accessible to user B 914B is received from user A 914A. In some embodiments, if there are additional users in the three-dimensional environment 904 other than user A 914A and user B 914B, the request to make the representation 908 of App B accessible to user B 914B is either a request to make the representation 908 accessible to all of the users in the three-dimensional environment 914 or a request to make the representation 908 accessible to user B 914B without being accessible to the other users (e.g., with or without maintaining the ability of user A 914A to access the representation 908).

FIG. 9B illustrates electronic device A 101*a* detecting an input to make the representation 908 of App B accessible to user B 914*b* and electronic device B101*b* detecting an input to move the representation 906 of App A. For example, electronic device A 101*a* detects the gaze 916*a* of user A 914A directed to an option 926 to share the representation 908 of App B while detecting user A 914A performing a gesture with their hand 920*a*. Electronic device B 101*b* detects the gaze 916*b* of user B 914B directed to the representation 906 of App A while detecting user B 914B performing a gesture with their hand 920*b* and movement of the hand 920*b* while maintaining the gesture with their hand 920*b*. In some embodiments, the gesture detected by the electronic devices is the user touching a thumb to another finger (e.g., index, middle, ring, little finger) on the same hand as the thumb.

In some embodiments, electronic device A 101*a* displays an indication 918 around the representation 908 of App B that indicates the user's gaze 916*a* is on the representation 908. In some embodiments, the indication 918 is displayed in response to detecting the gaze 916a of the user on the representation 908 of App B. In some embodiments, in response to detecting the gaze of user A 914A on the indication 918, electronic device A 101a displays an option 926 to make the representation 908 of App B accessible to user B 914B. In some embodiments, electronic device A 101a displays additional options (e.g., an option to move representation 908, an option to cease display of representation 908, etc.) in response to detecting the gaze of the user on the indication 918. Although indication 918 is illustrated in FIG. 9B as surrounding the representation 908, in some embodiments, indication 918 is displayed adjacent to one edge of the representation 908 (e.g., indication 918 is a bar along the bottom or along another edge of representation 908). Electronic device A 101a detects the gaze 916a of user A 914a on the option 926 to share the representation 908 of App B while detecting user A 914a performing a gesture with their hand 920a (e.g., touching a thumb to another finger (e.g., index, middle, ring, little finger) on the same hand as the thumb). In response, electronic device A 101a makes the representation 908 of App B accessible to user B 914B, as will be described in more detail below with reference to FIG. 9C.

In some embodiments, in FIG. 9B, electronic device B 101b displays an indication 918 around the representation 906 of App A that indicates the user's gaze 916b is on the representation 906. In some embodiments, the indication 918 is displayed in response to detecting the gaze 916b of the user on the representation 906 of App A. Although indication 918 is illustrated in FIG. 9B as surrounding the representation 906, in some embodiments, indication 918 is displayed adjacent to one edge of the representation 906 (e.g., indication 918 is a bar along the bottom or along another edge of representation 906). Electronic device B 101b detects the gaze 916b of user B 914b on the indication 918 around representation 906 while detecting user B 914b performing a gesture with their hand 920b (e.g., touching a thumb to another finger (e.g., index, middle, ring, little finger) on the same hand as the thumb). In response, electronic device A 101b initiates a process to move representation 906 of App A in the three-dimensional environment 904 in accordance with movement of hand 920b (e.g., or the arm of hand 920b), as will be described in more detail below with reference to FIG. 9C. In some embodiments, any user with access to a respective virtual object in the three-dimensional environment 904 is able to move the virtual object in the three-dimensional environment 904 in a similar manner. For example, user A 914A is able to move the representation 906 of App A in a manner similar to the manner in which user B 914B moves the representation 906 of App A.

Figure 9C:
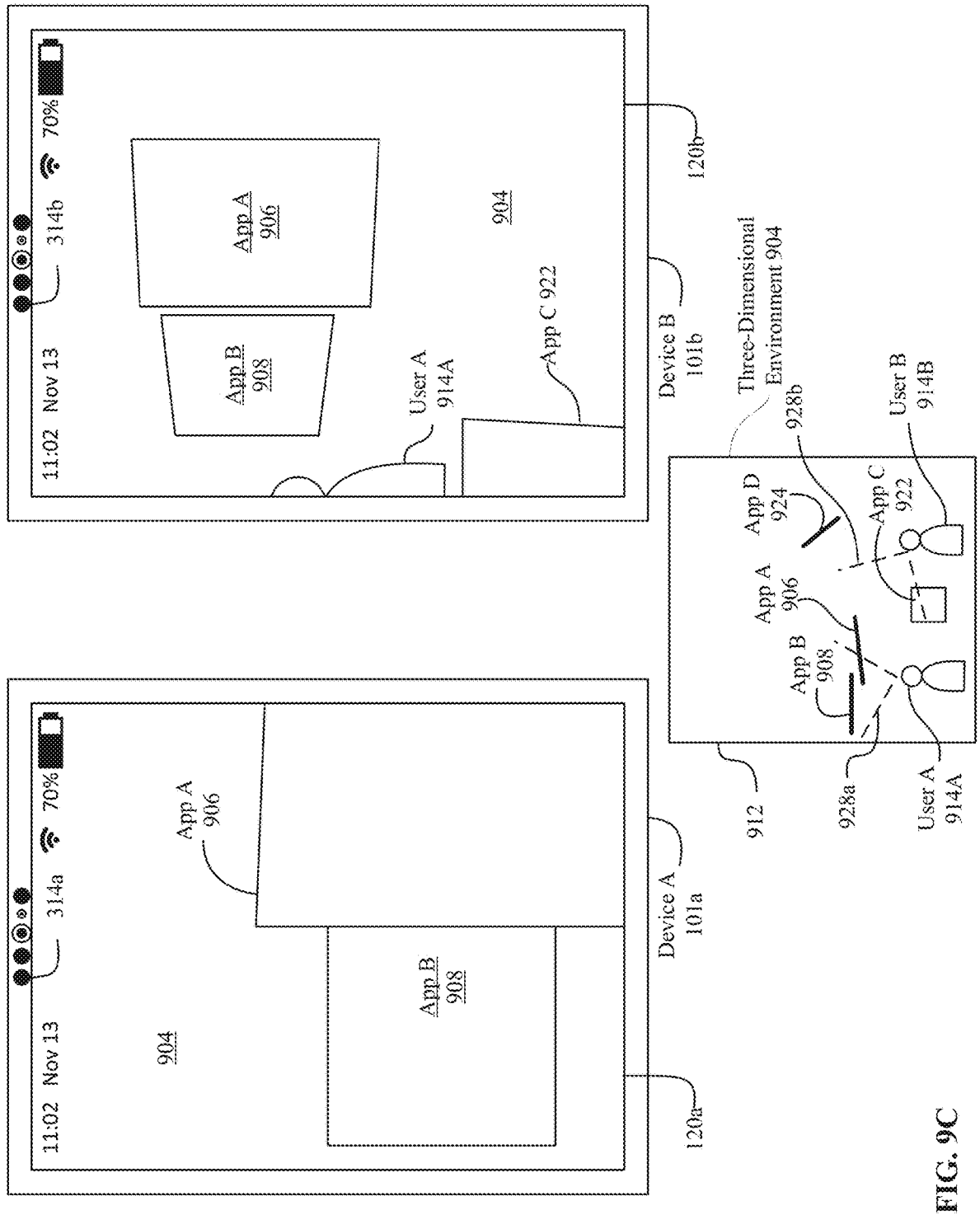

FIG. 9C illustrates the three-dimensional environment 904 after receiving the request of user A 914A to make the representation 908 of App B accessible to user B 914B, and the request of user B 914B to move the representation 906 of App A illustrated in FIG. 9B. In response to the request of user A 914A to make the representation 908 of App B accessible to user B 914B, electronic device B 101b displays representation 908 of App B in the three-dimensional environment 904. In response to the request of user B 914B to move the representation 906 of App A, electronic devices 101a and 101b update the location, orientation, and size of representation 906 of App A in the three-dimensional environment 904.

In some embodiments, an electronic device resists placing virtual objects within a threshold distance (e.g., 0.1, 0.2, 0.3, 0.4, 0.5, etc. meters) of users in the three-dimensional environment 904. For example, the electronic device avoids placing objects within the personal space of the users so the users' views of the rest of the three-dimensional environment are not obstructed. Although the movement of the hand 920b of user B 914B illustrated in FIG. 9B may correspond to moving the representation 906 of App A to a location within the threshold distance of user A 914A, the electronic devices display the representation 906A of App A at a location in the three-dimensional environment 904 that is the threshold distance away from user A 914A in the three-dimensional environment in response to the request to move the representation 906 of App A provided by user B 914b in FIG. 9B. In some embodiments, before termination of the movement input (e.g., detecting user B 914b ceasing to perform the predetermined gesture (e.g., touching a thumb to another finger (e.g., index, middle, ring, little finger) on the same hand as the thumb) associated with the movement input), the electronic devices 101a and/or 101b move the representation 906 of App A in accordance with movement of user B's hand 920b, including displaying the representation 906 of App A at a location within the threshold distance of user A 914A. In some embodiments, in response to detecting termination of the movement input, the electronic device 101a and/or 101b displays an animation of the representation 906 of App A moving from the location within the threshold distance of user A 914A to a location at least the threshold distance away from user A 914A. In some embodiments, while the movement input is being provided, the electronic device 101a and/or 101b does not display the representation 906 of App A at the location within the threshold distance of user A 914A and displays the representation 906 the threshold distance away from user A 914A in response to a movement input that corresponds to moving the representation 906 to a location within the threshold distance of user A 914A.

In some embodiments, the electronic devices 101a and/or 101b do not allow users 914A and 914B to place a virtual object at a location at which it is impossible for both users 914A and 914B to view the content of the virtual object. For example, the electronic device 101a and/or 101b also resists placing unidirectional representations of applications (e.g., representations 906, 908, and 924 of App A, App B and App D, respectively, that include content on one side) between two users (e.g., user A 914A and user B 914B) in the three-dimensional environment 904 because if the unidirectional representation is between the users, then the side of the representation with content cannot face both users. In some embodiments, in response to a movement input that corresponds to moving a unidirectional representation of an application to a location between user A 914A and user B 914B (e.g., an input to move representation 906 or 908 to the location of representation 922 (e.g., while representation 922 is not displayed at the location illustrated in FIG. 9B)), the electronic device 101a and/or 101b displays the representation at a location at least a threshold distance (e.g., 5, 10, 15, 20, etc. centimeters) from a line directly between the two users 914A and 914B. In some embodiments, the electronic device 101a and/or 101b displays the representation in accordance with the movement input (e.g., including displaying the representation between the two users 914A and 914B) while the movement input is being provided, and moves the representation to a location at least a threshold distance (e.g., 5, 10, 15, 20, etc. centimeters) from a line directly between the two users 914A and 914B in response to detecting termination of the movement input. In some embodiments, while the movement input is being provided, the electronic device 101a and/or 101b displays the representation at least a threshold distance (e.g., 5, 10, 15, 20, etc. centimeters) from a line directly between the two users 914A and 914B while the movement input is being provided in response to an amount of movement that corresponds to moving the representation to a location between the two users 914A and 914B. In some embodiments, the electronic device 101a and/or 101b move a representation from one side of the line between the two users 914A and 914B to the other side of the line between the two users 914A and 914B in response to detecting a movement input that corresponds to moving the representation past the line directly between the two users.

In some embodiments, the electronic device 101a and/or 101b resizes the representation 906 of App A based on the locations of user A 914A and user B 914B in response to updating the location of the representation 906 of App A in response to a movement input, such as the input provided by user B 914B in FIG. 9B. Because the representation 906 of App A is closer to both users in FIG. 9C than it is in FIG. 9B, the size of the representation 906 of App A in the three-dimensional environment 904 is smaller in FIG. 9C than it is in FIG. 9B, as shown in legend 912 of both figures. Likewise, in response to an input moving a representation of an application further away from users 914A and 914B in the three-dimensional environment 904, the electronic device 101a and/or 101b increases the size of the representation in the three-dimensional environment 904. In some embodiments, the electronic device 101a and/or 101b displays the representation 906 of App A at a size that is large enough to be legible to the user that is further away from the updated location of the representation 906 of App A (e.g., user B 914B). For example, in FIG. 9C, the size of the representation 906 of App A is selected to be large enough to be legible to user B 914B because user B 914B is further away from representation 906 than user A 914A is from representation 906. In some embodiments, the electronic device 101a and/or 101b does not update the size of some objects in response to the distance between the objects and the users changing. In some embodiments, even if the electronic device 101a and/or 101b maintains the size of an object in response to changing the distance between the object and the users 914A and 914B, the size with which indication 918 is displayed in response to detecting a user's gaze on the object updates (e.g., to become smaller when closer to the users and larger when further away from the users).

Thus, in some embodiments, as described with reference to FIGS. 9B and 9C, when a representation of an application is accessible to a plurality of users 914A and 914B in the three-dimensional environment 904, the orientation and/or sizing of the representation is updated in accordance with the positions of the plurality of users 914A and 914B in the three-dimensional environment 904. In some embodiments, when a representation of an application is accessible to only one user in the three-dimensional environment 904, the orientation and/or sizing of the representation is updated in accordance with the position of the user with access to the representation in a manner similar to the manner described above with reference to FIGS. 7A-8P. In some embodiments, the orientation and/or location of a representation of an application remains the same in response to an input to share the representation (e.g., the input provided by user A 914A in FIG. 9B) and does not update automatically until the representation is repositioned while it is accessible to the plurality of users. For example, the position, orientation, and/or size of the representation 908 of App B is the same in FIG. 9C in response to being shared as they were in FIG. 9B before the input to share the representation 908 was received by electronic device A 101a. In some embodiments, if one of the users 914A or 914B were to move representation 908, the electronic device 101a and/or 101b would move the representation 908 in accordance with the input and automatically update the size and orientation of the representation 908 in accordance with the positions of representation 906, user A 914A, and user B 914B so that user A 914A and user B 914B are able to view the representation 906 after (and, optionally, while) the movement input is received.

As described above with reference to FIGS. 9A-9C, in some embodiments, the electronic device 101a and/or 101b updates the orientation and/or size of virtual objects automatically in accordance with the locations of user A 914A and user B 914B in the three-dimensional environment 904 (e.g., in response to a request to move a virtual object, when initially displaying a virtual object). Thus, in some embodiments, if the number of users in the three-dimensional environment 904 changes (e.g., by adding or removing users), the automatic orientation of a respective object at a respective position in the three-dimensional environment 904 will also change.

Figure 9D:
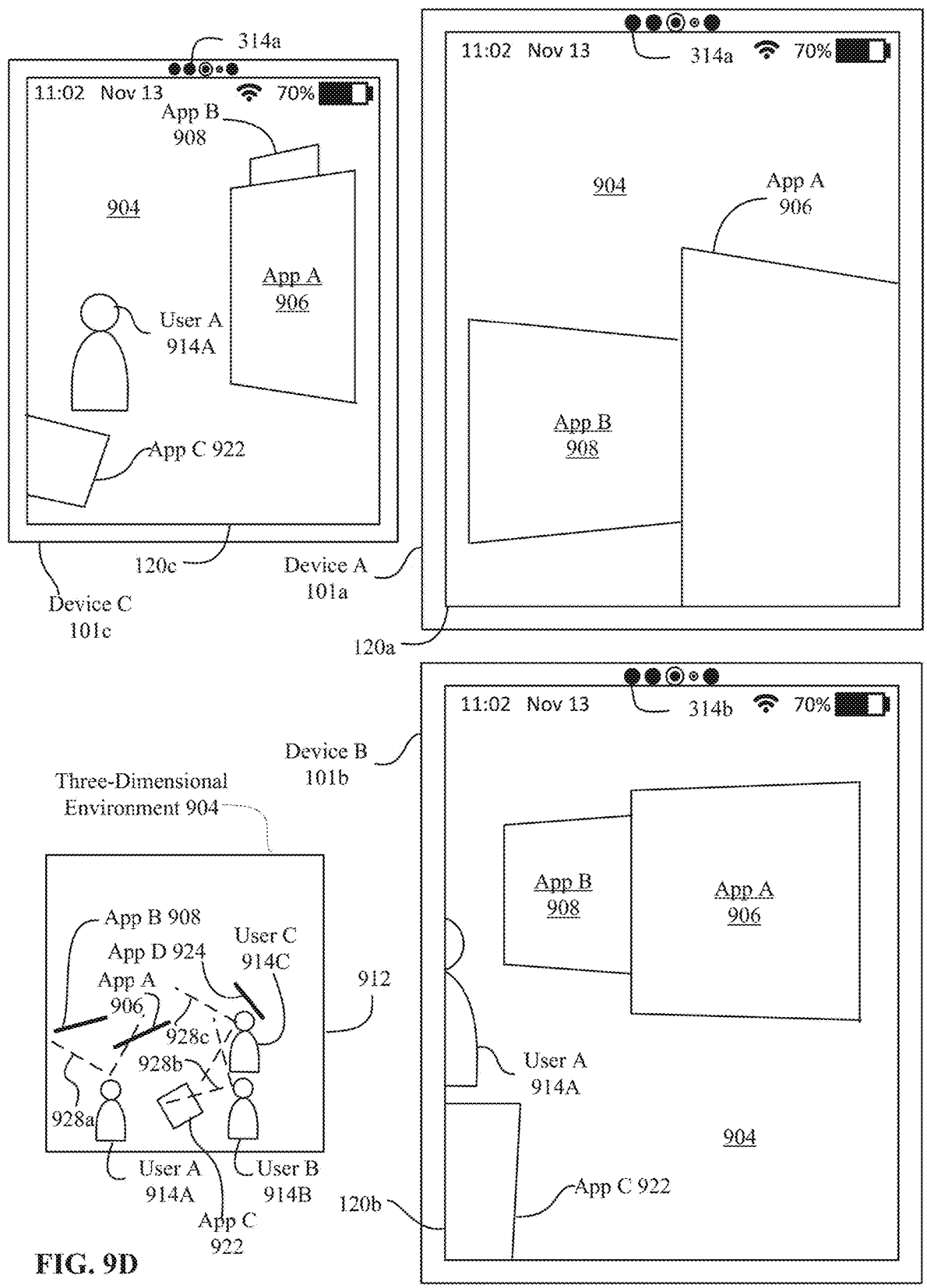

FIG. 9D illustrates display of three-dimensional environment 904 at each of electronic device A 101a, electronic device B 101b, and electronic device C 101c. Electronic device A 101a illustrates a portion of the three-dimensional environment 904 within the field of view 928a of user A 914A, including the representation 906 of App A and the representation 908 of App B. Electronic device B 101b illustrates a portion of the three-dimensional environment 904 within the field of view 928b of user B 914B, including the representation 906 of App A, the representation 908 of App B, the representation 922 of App C, and a representation of User A 914A. Electronic device C 101c illustrates a portion of the three-dimensional environment 904 within the field of view 928c of user C 914C, including the representation 906 of App A, the representation 908 of App B, the representation 922 of App C, and the representation of user A 914A.

In some embodiments, in response to user C 914C joining the three-dimensional environment 904, electronic device 101a, 101b, and/or 101c automatically selects the initial position of user C 914C in the three-dimensional environment 904. Exemplary ways in which an electronic device selects the initial position of a user in a three-dimensional environment are described in more detail below with reference to FIGS. 13A-14L. In some embodiments, an electronic device automatically selects a position for a user in response to the user joining the three-dimensional environment or in response to receiving a user input to reset the user's view of the three-dimensional environment. For example, in response to detecting the request to reset the three-dimensional environment, the electronic device positions the user according to one or more rules (e.g., one or more of the rules described below with reference to FIGS. 13A-14L). In this way, the electronic device is able to update the display of the objects and other users in the three-dimensional environment for the user without updating the positions and/or orientations of the other users and objects in the three-dimensional environment.

FIG. 9D illustrates the three-dimensional environment 904 previously described with reference to FIG. 9C with the addition of user C 914C. FIG. 9D illustrates the representations 906, 908, 922, and 924 of App A, B, C, and D, respectively displayed at the same locations in three-dimensional environment 904 as the locations of these objects in FIG. 9C. The orientations of representations 906, 908, 922, and 924 of App A, B, C, and D, respectively are different in FIG. 9D than they are in FIG. 9C because the user arrangement present in the three-dimensional environment 904 is different in FIG. 9D than in FIG. 9C (e.g., user C 914C is added). In some embodiments, the electronic device 101*a*, 101*b*, and/or 101*c* does not update the orientations of the representations 906, 908, 922, and 924 of App A, B, C, and D, respectively in response to user C 914C being added to the three-dimensional environment 904. Rather, FIG. 9D optionally illustrates the automatic orientation of representations 906, 908, 922, and 924 of App A, B, C, and D, respectively if these objects were to be moved to the locations shown in FIG. 9D. In some embodiments, the orientations and/or sizes of representation 906, 808, 922, and 924 of App A, B, C, and D, respectively are updated as shown in FIG. 9D in response to user C 914C joining the three-dimensional environment 904.

For example, the representations 908 and 906 of App B and A, respectively are tilted more towards the right in FIG. 9D than in FIG. 9C, because user C 914C is to the right of these objects, so that representations 908 and 906 are at least partially visible to user C 914C (e.g., via electronic device C 101*c*). As another example, the representation 922 of App C is rotated counterclockwise so that one of the sides of the representation 922 is oriented towards both user B 914B and user C 914C so that user C 914C is able to view at least part of the representation 922 of App C. In FIG. 9D, user A 914A is still able to view another side of the representation 922 of App C because the representation 922 of App C includes content on multiple sides (e.g., the sides facing the users, all of the sides, etc.).

Figure 10A:
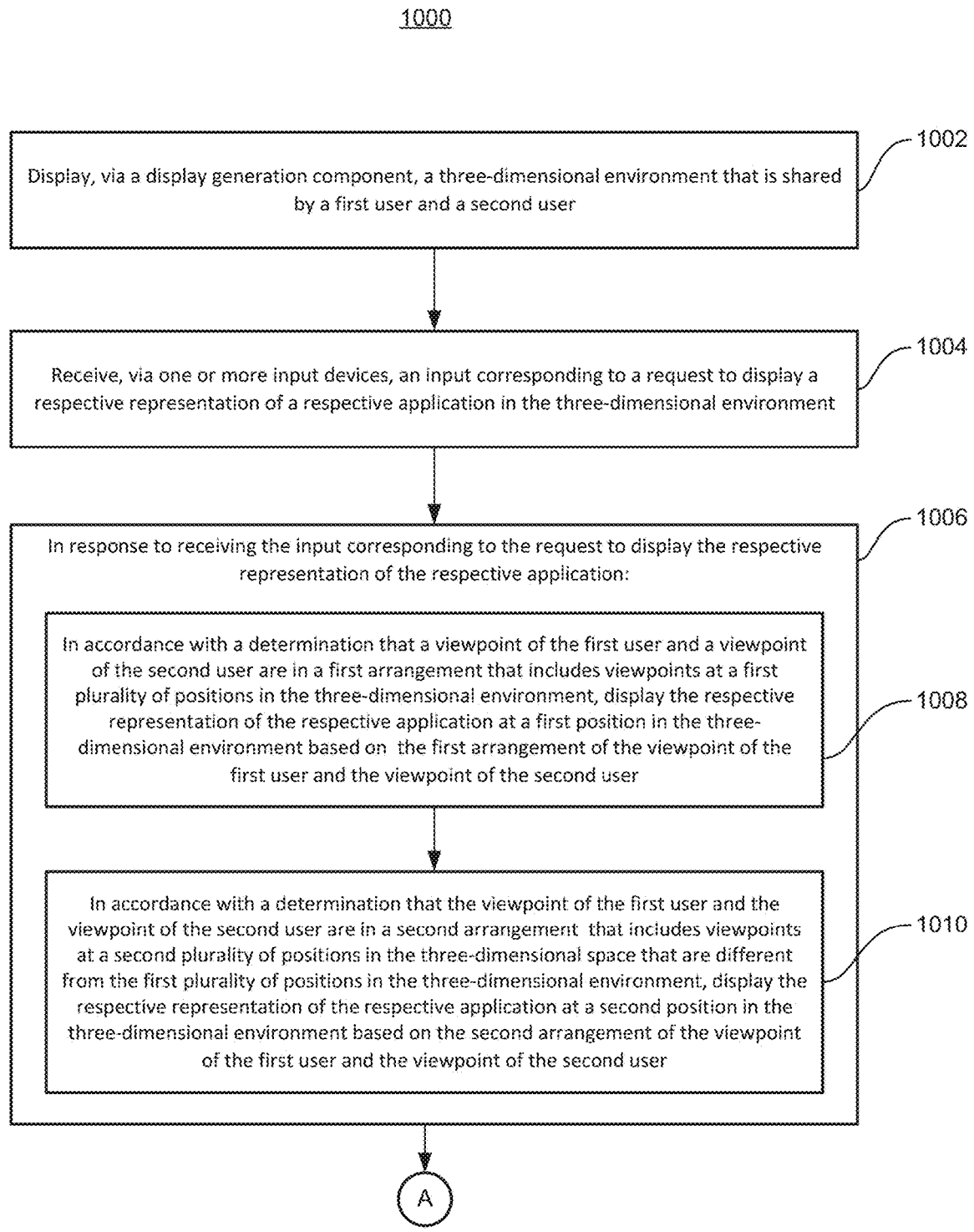
FIGS. 10A-10T is a flowchart illustrating a method of automatically updating the orientation of a virtual object in a three-dimensional environment based on viewpoints of a plurality of users in the three-dimensional environment in accordance with some embodiments.
Figure 10B:
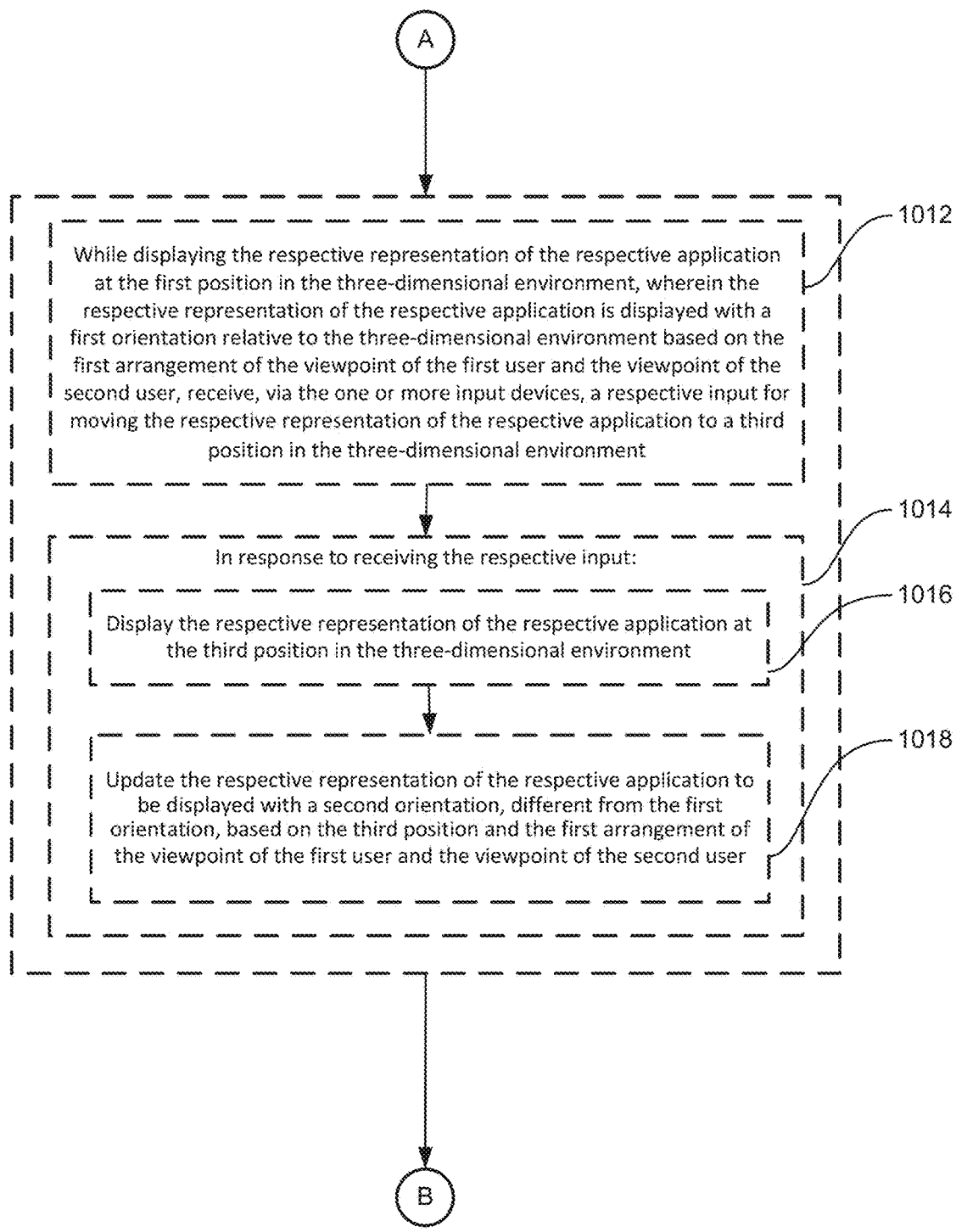
Figure 10C:
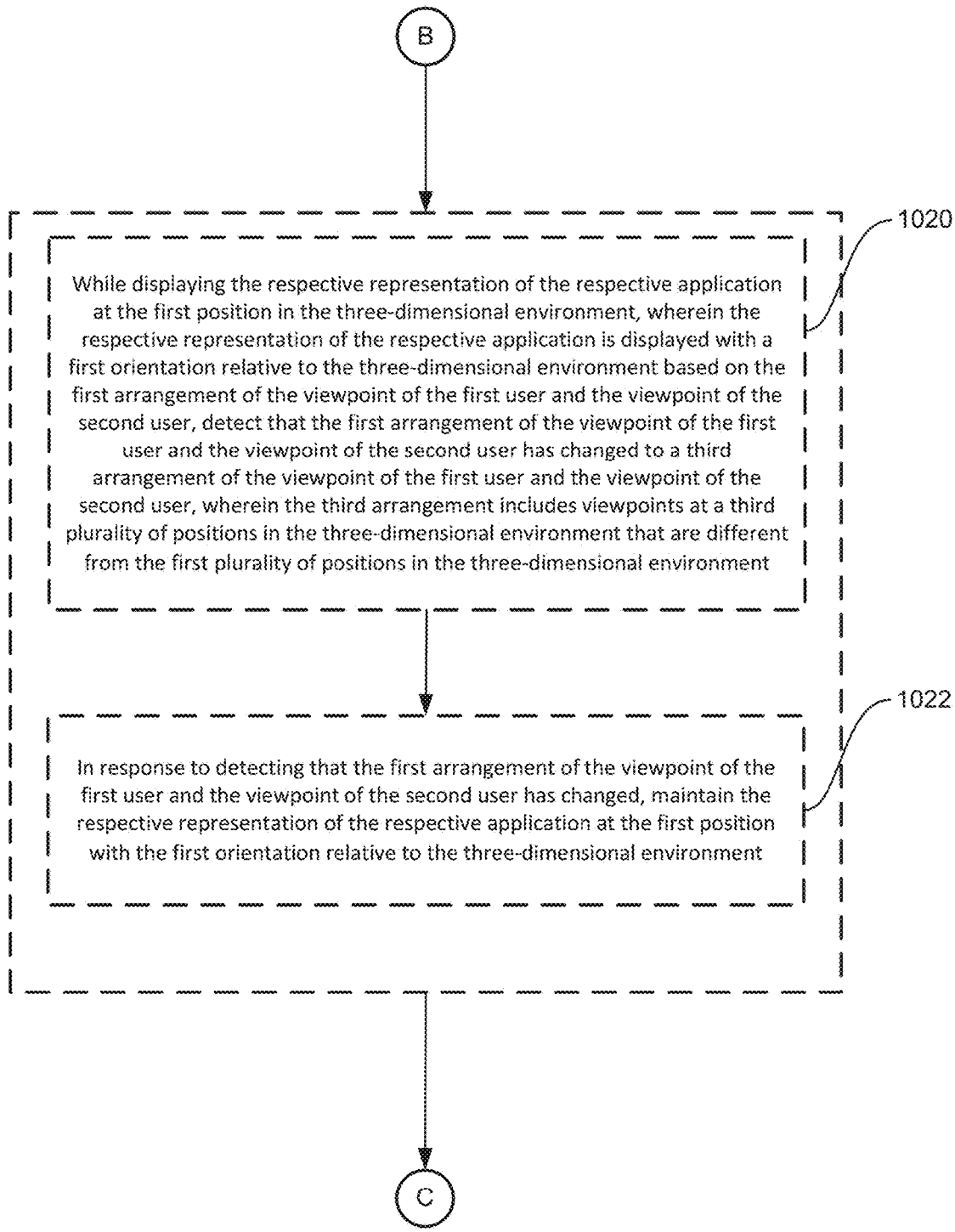
Figure 10D:
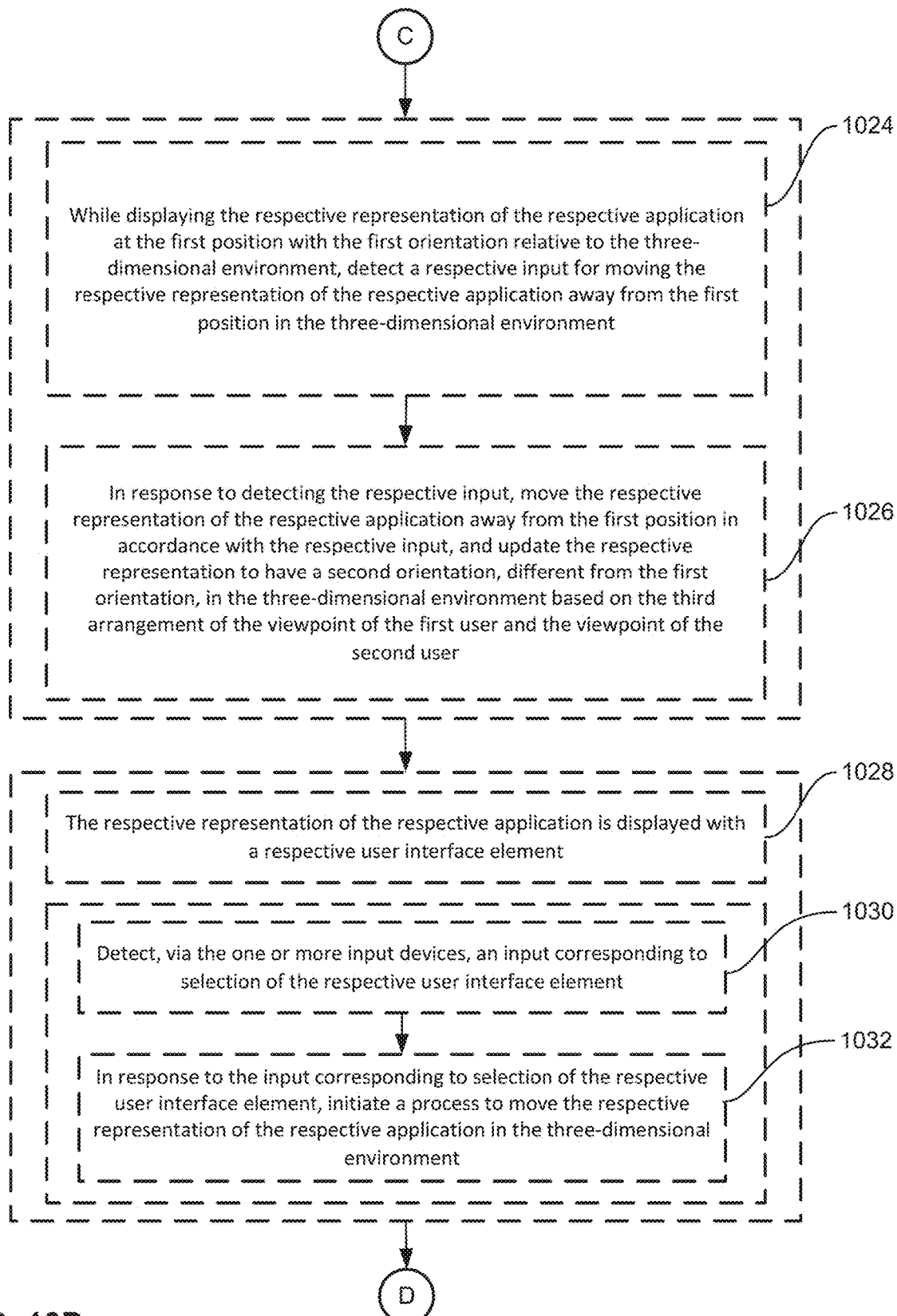
Figure 10E:
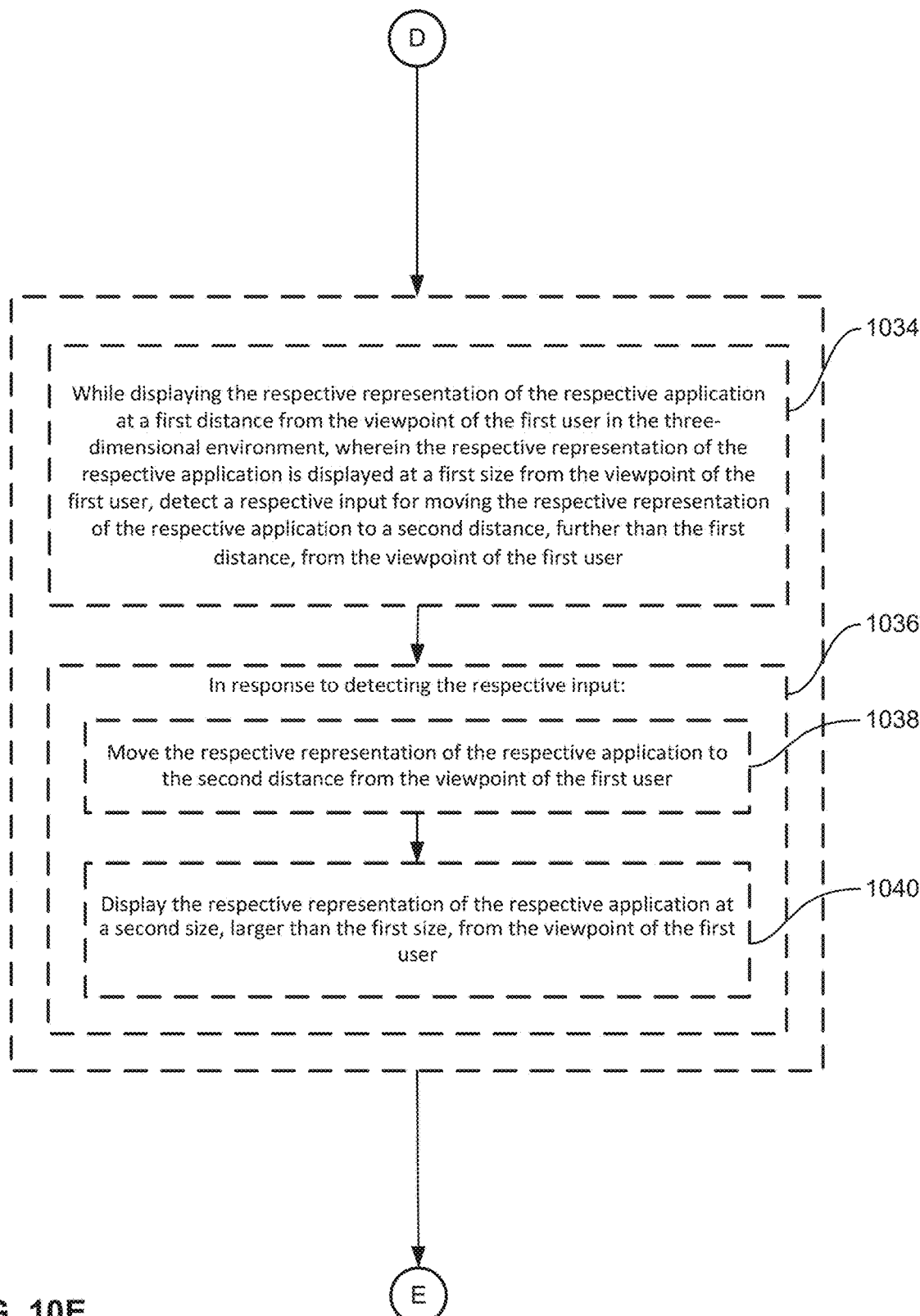
Figure 10F:
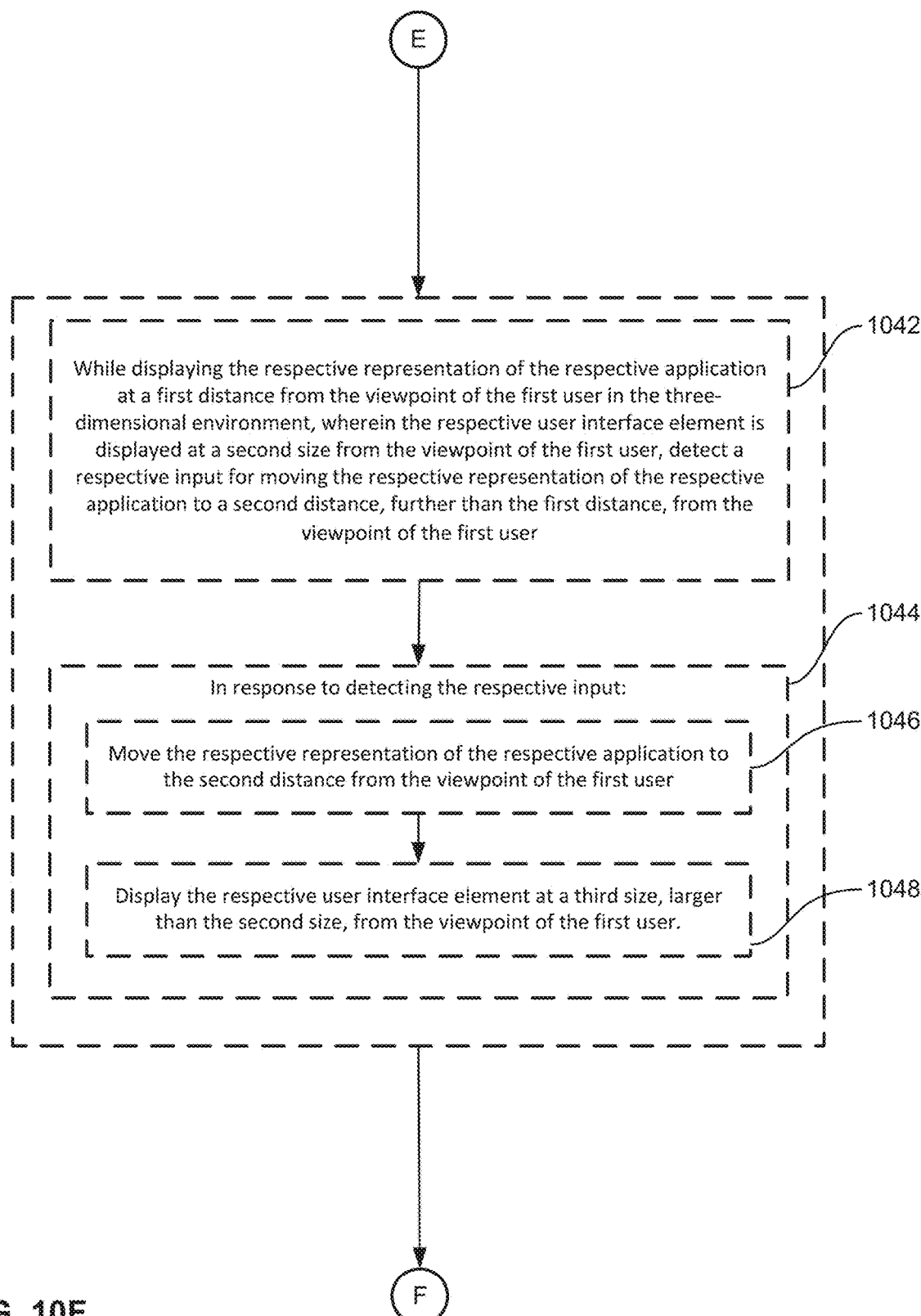
Figure 10G:
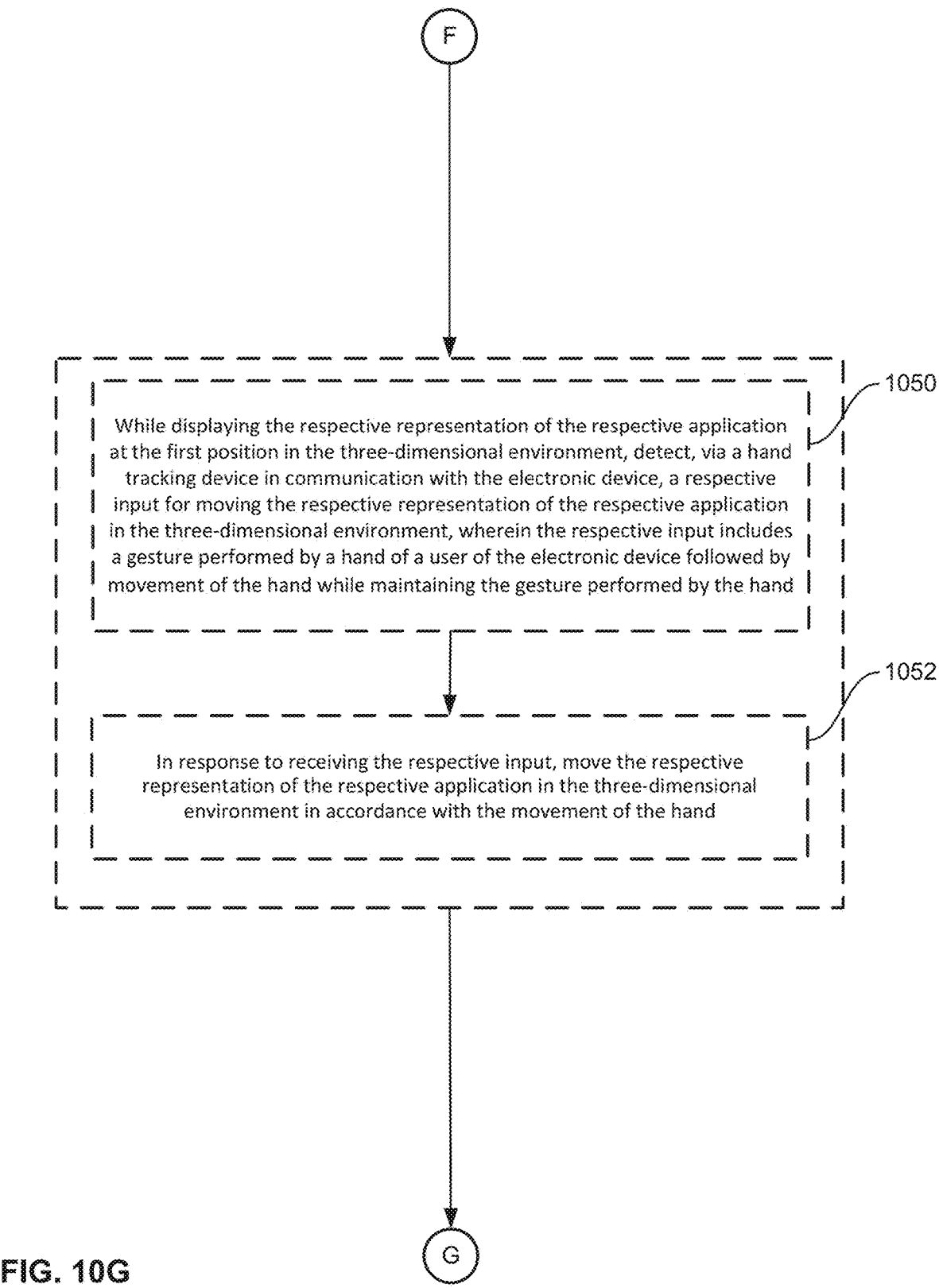
Figure 10H:
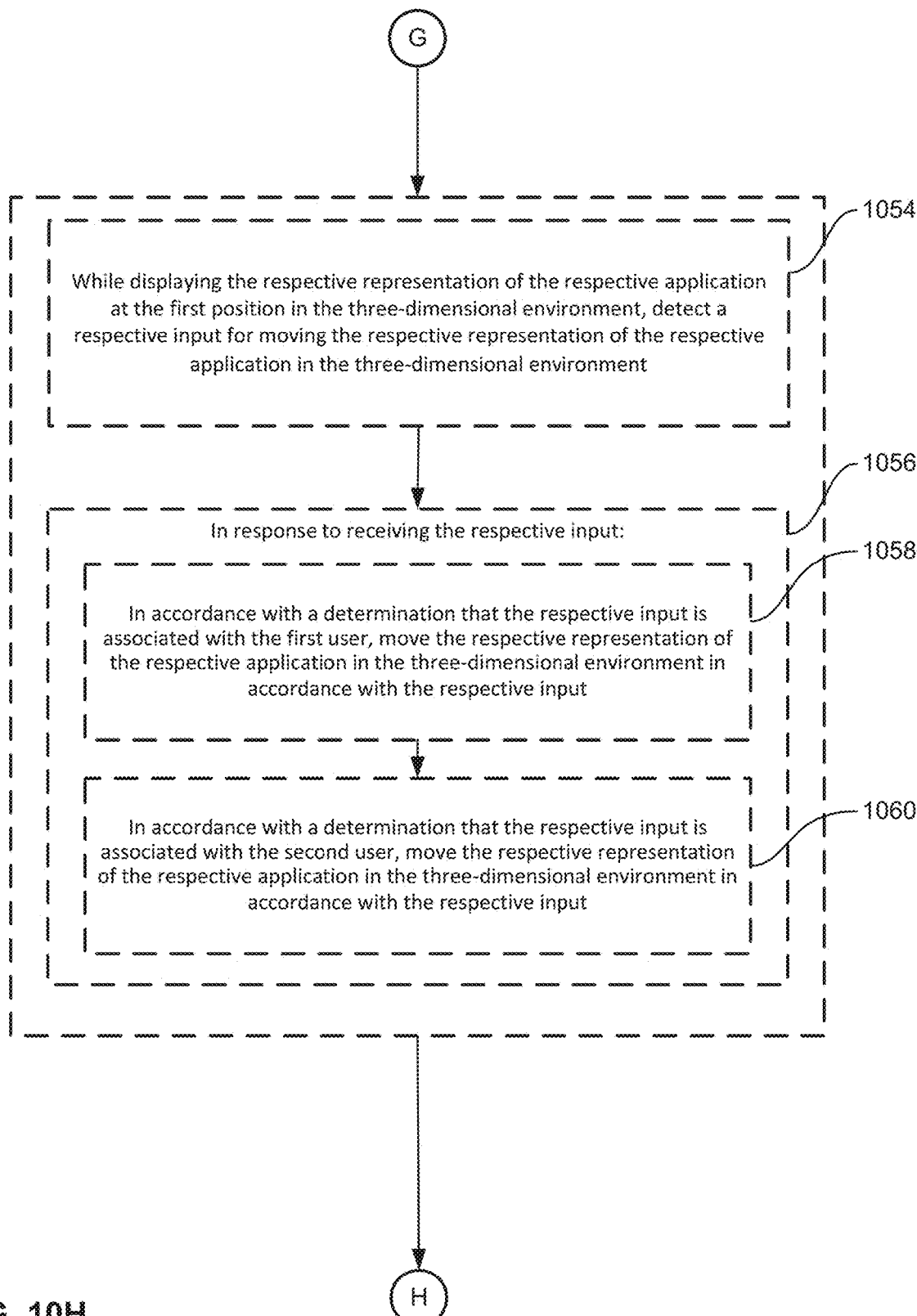
Figure 10I:
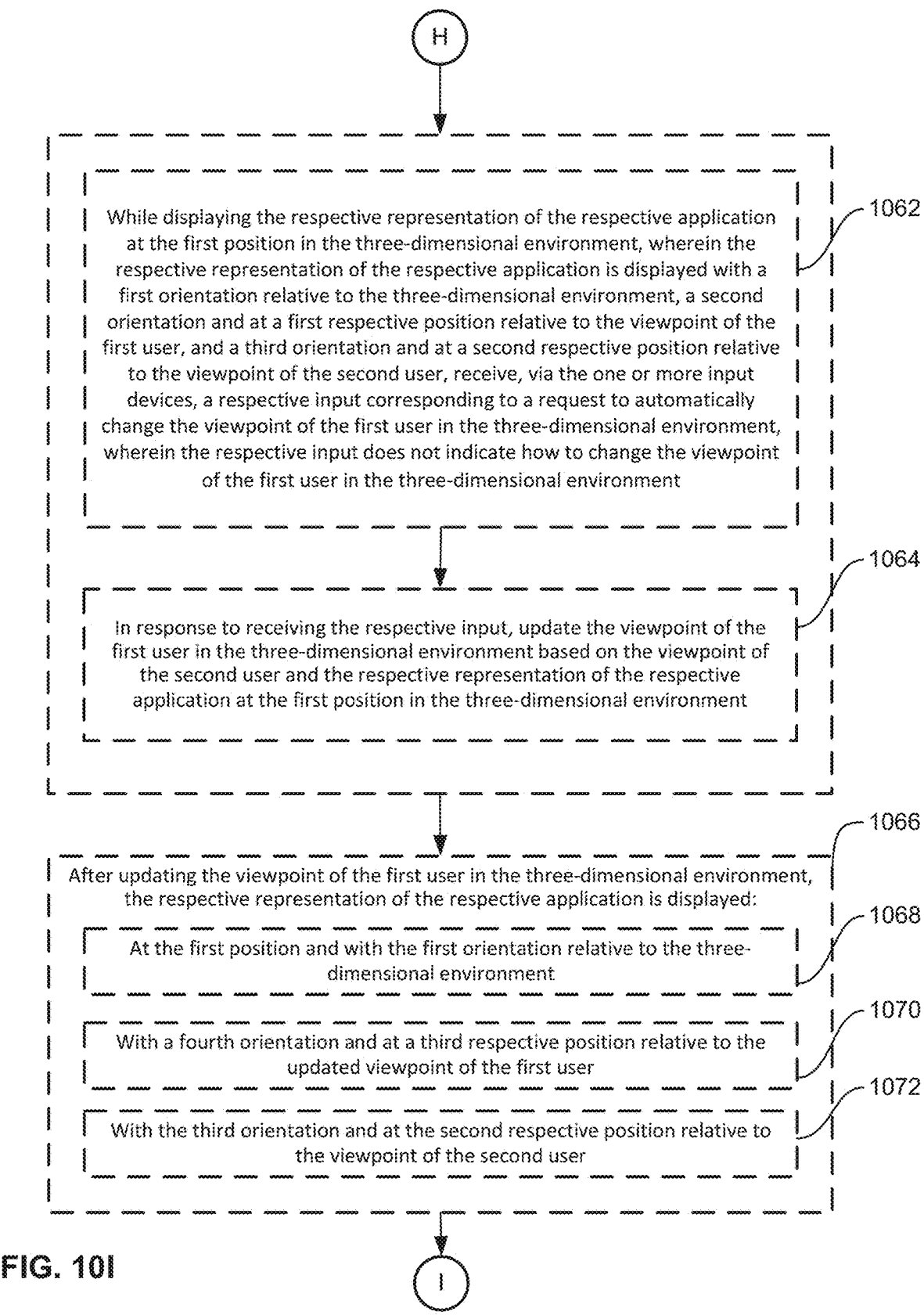
Figure 10J:
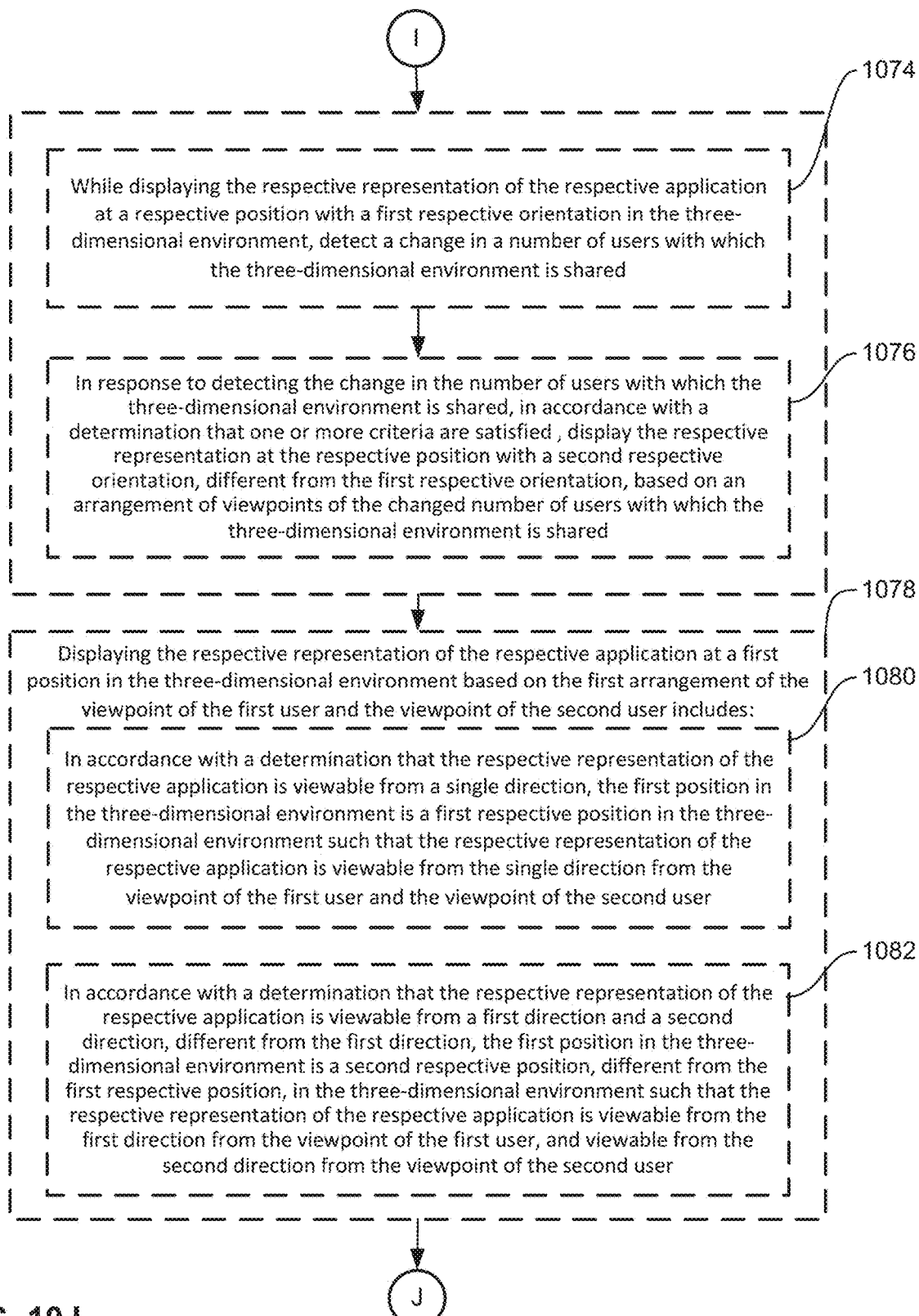
Figure 10K:
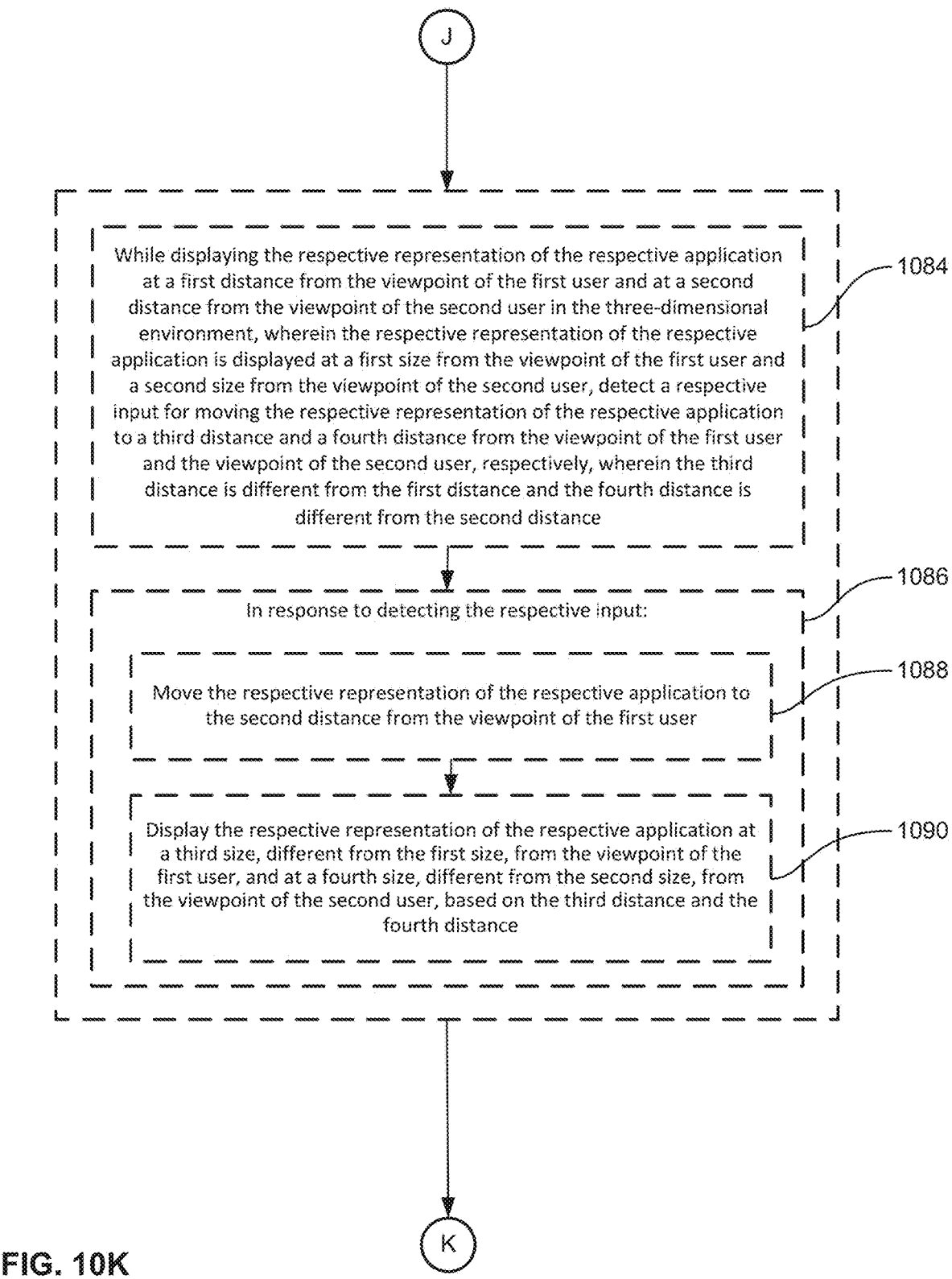
Figure 10L:
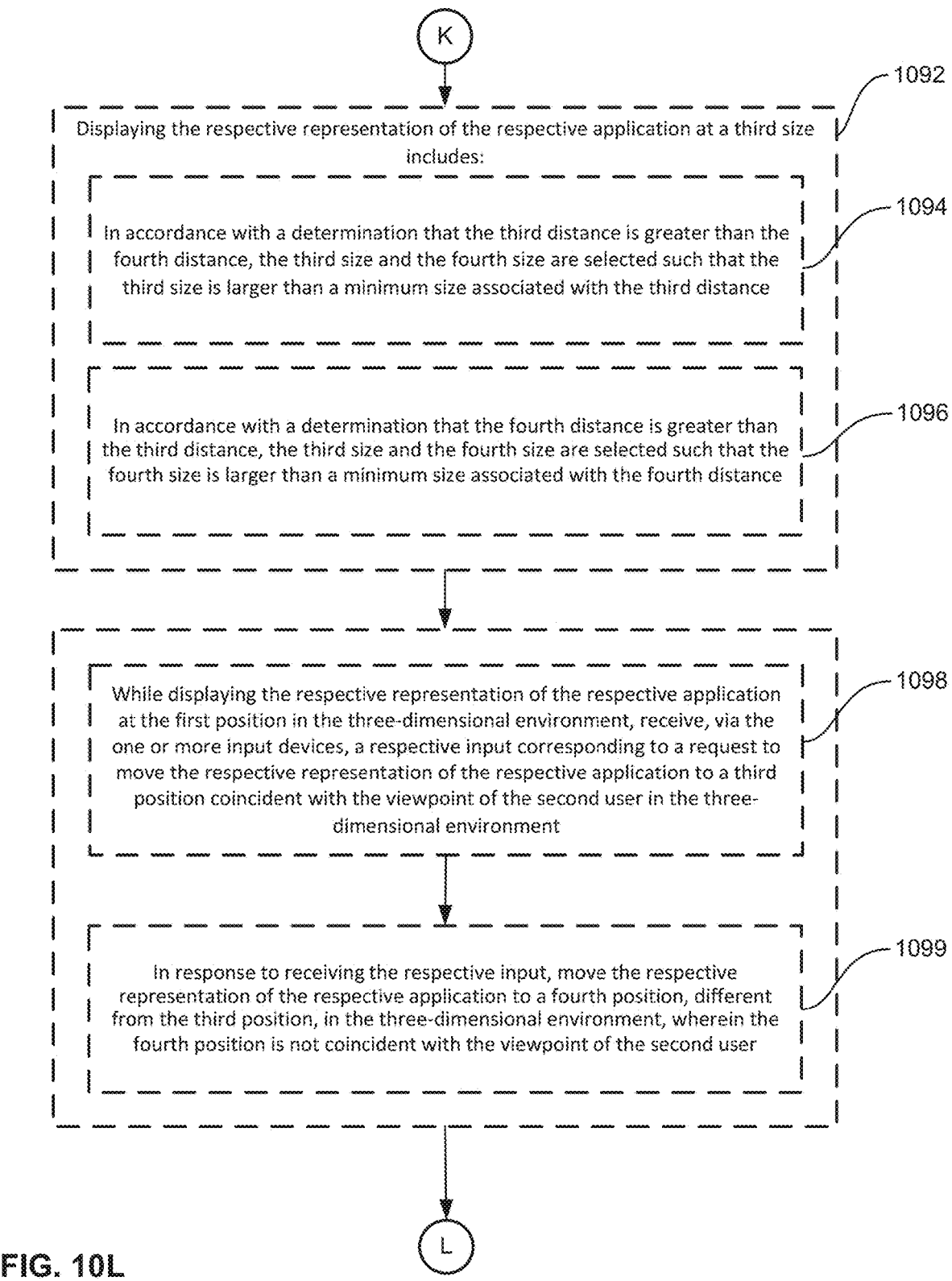
Figure 10M:
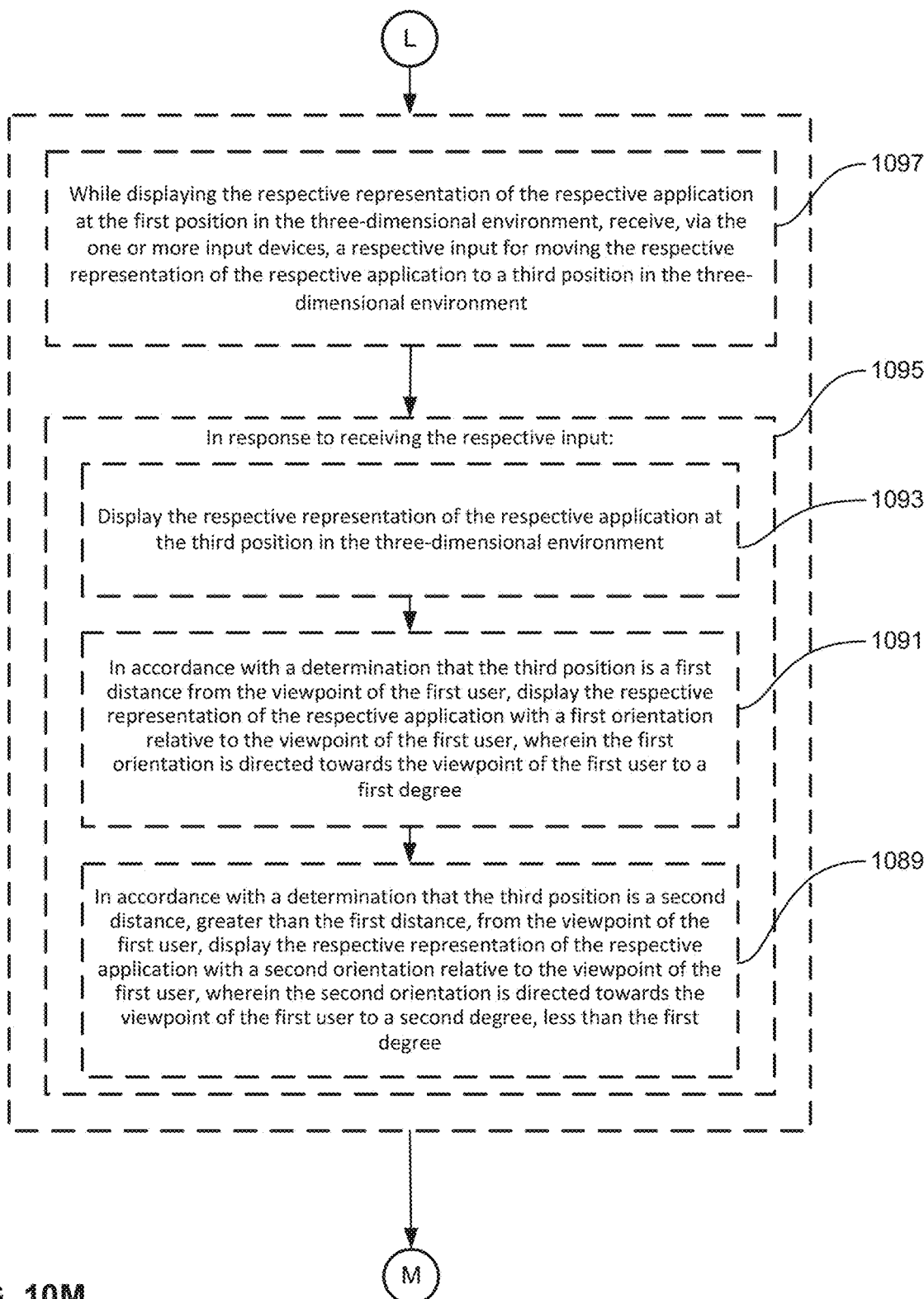
Figure 10N:
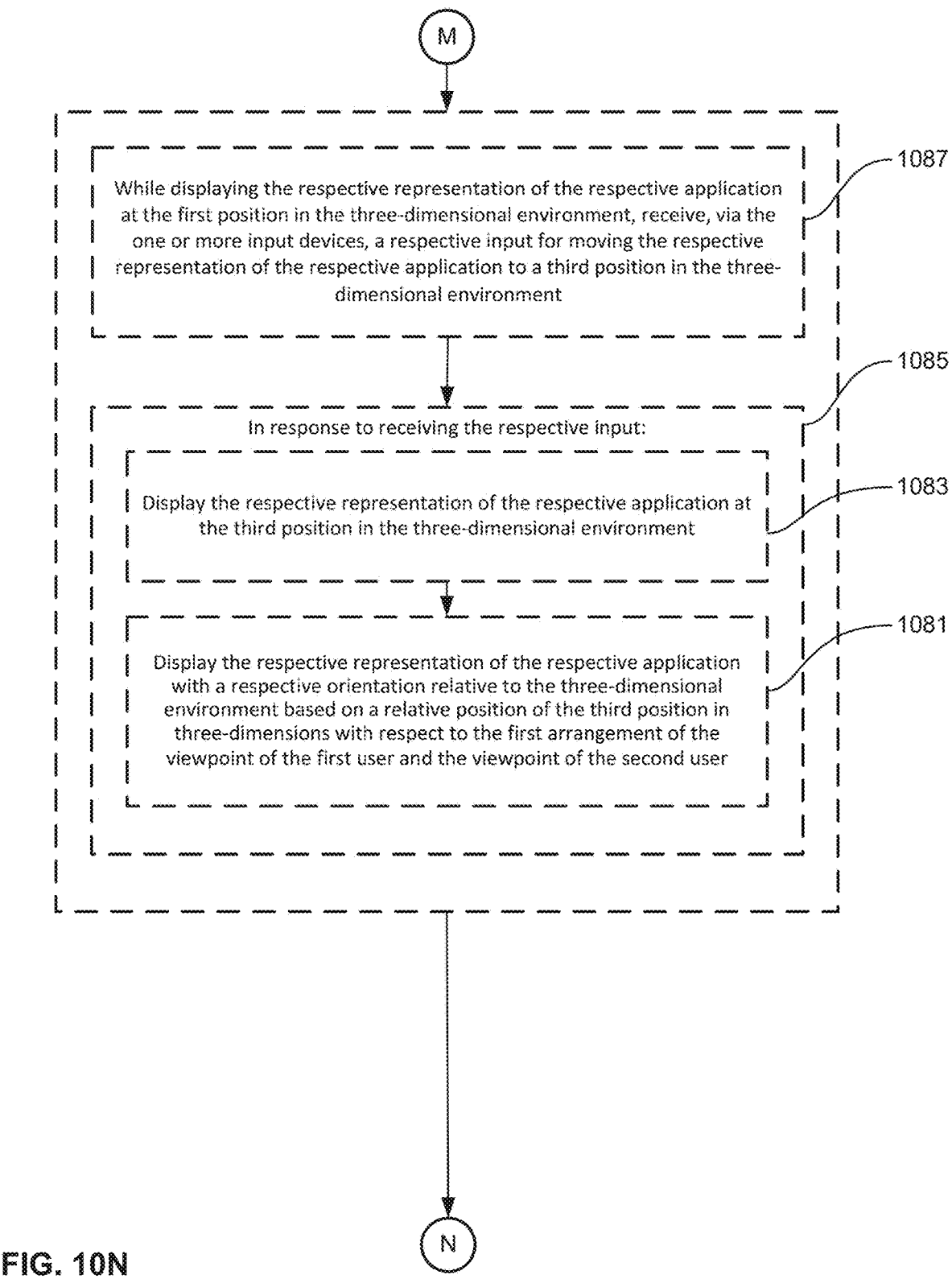
Figure 10O:
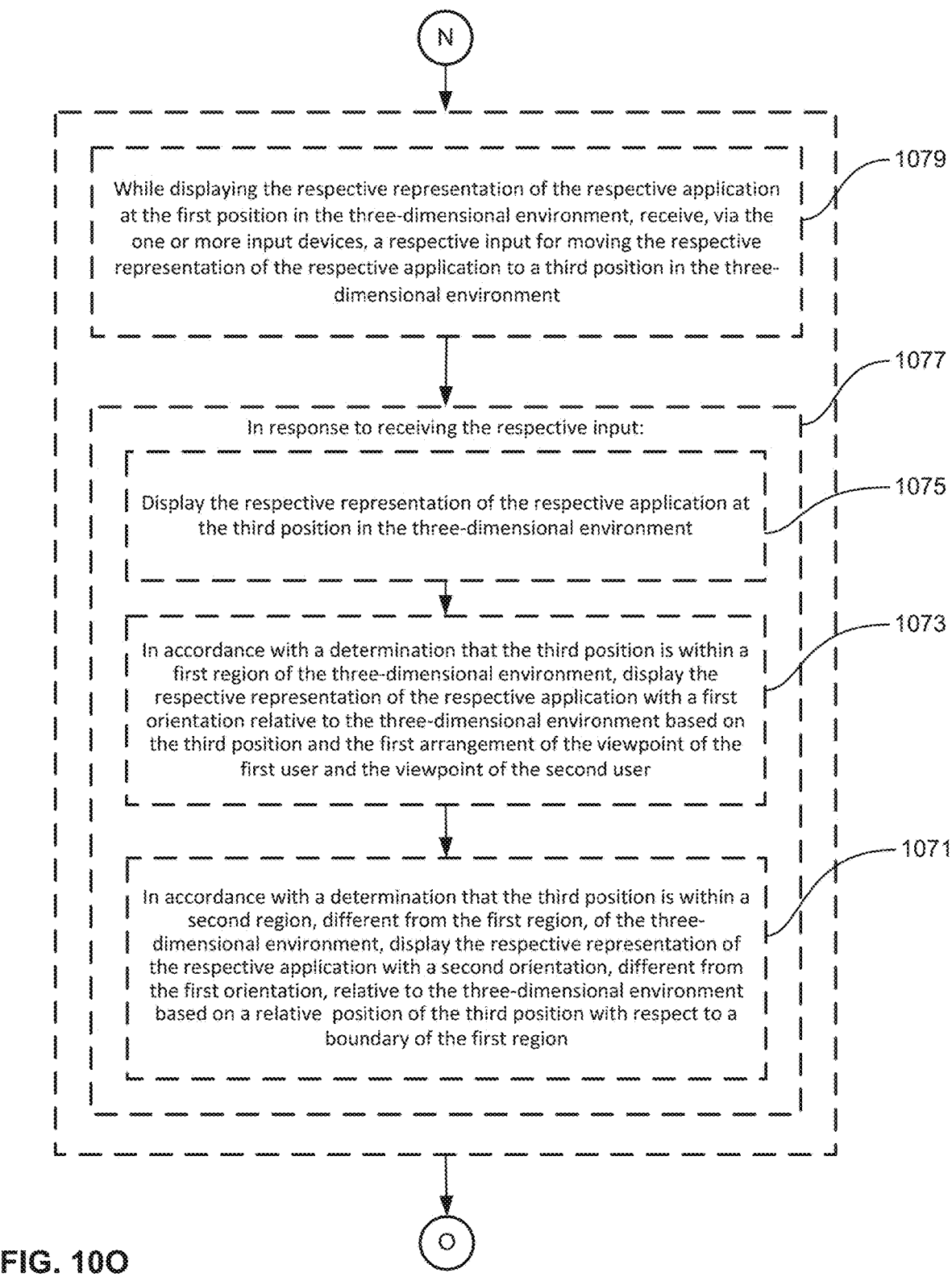
Figure 10P:
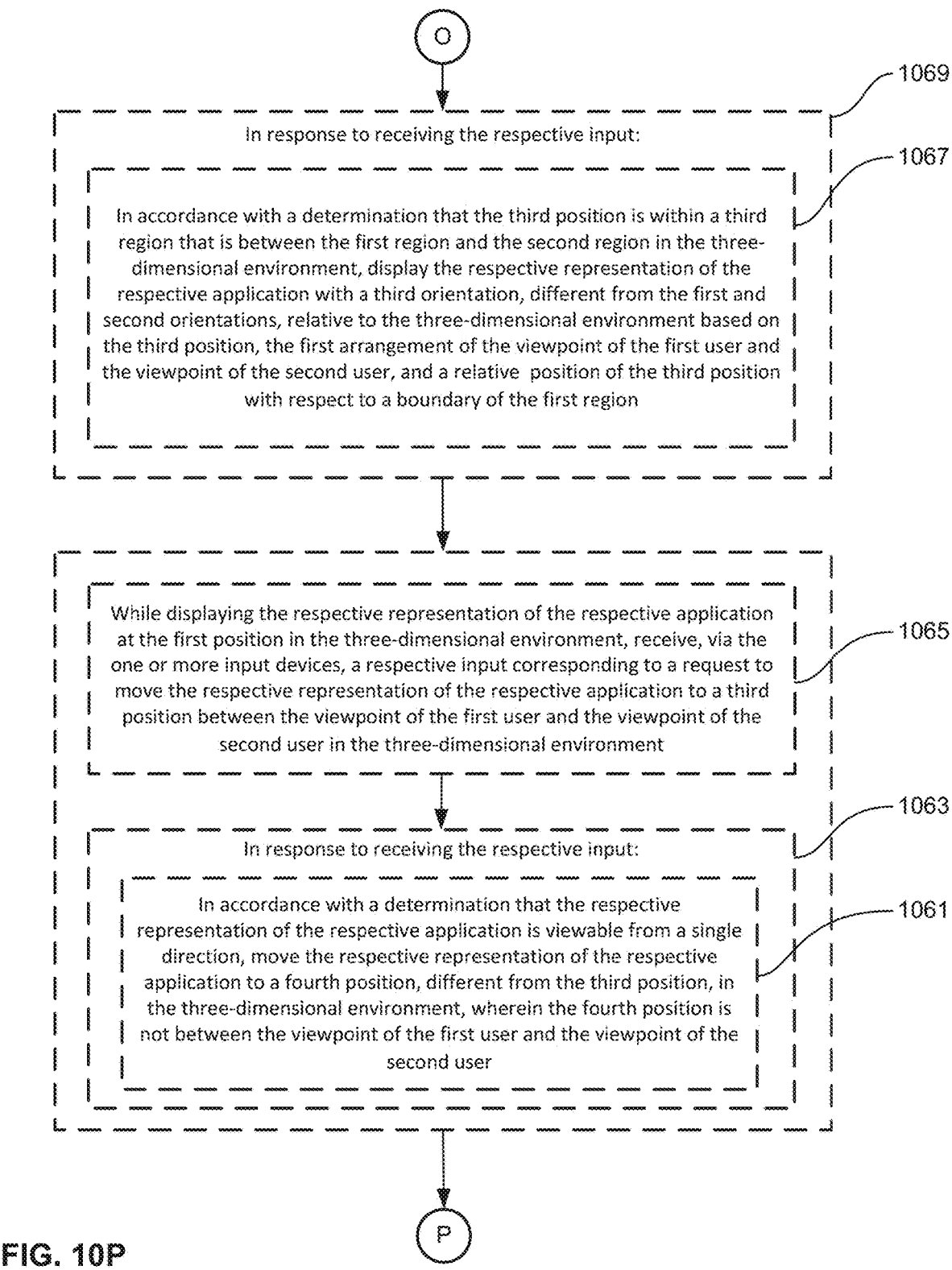
Figure 10Q:
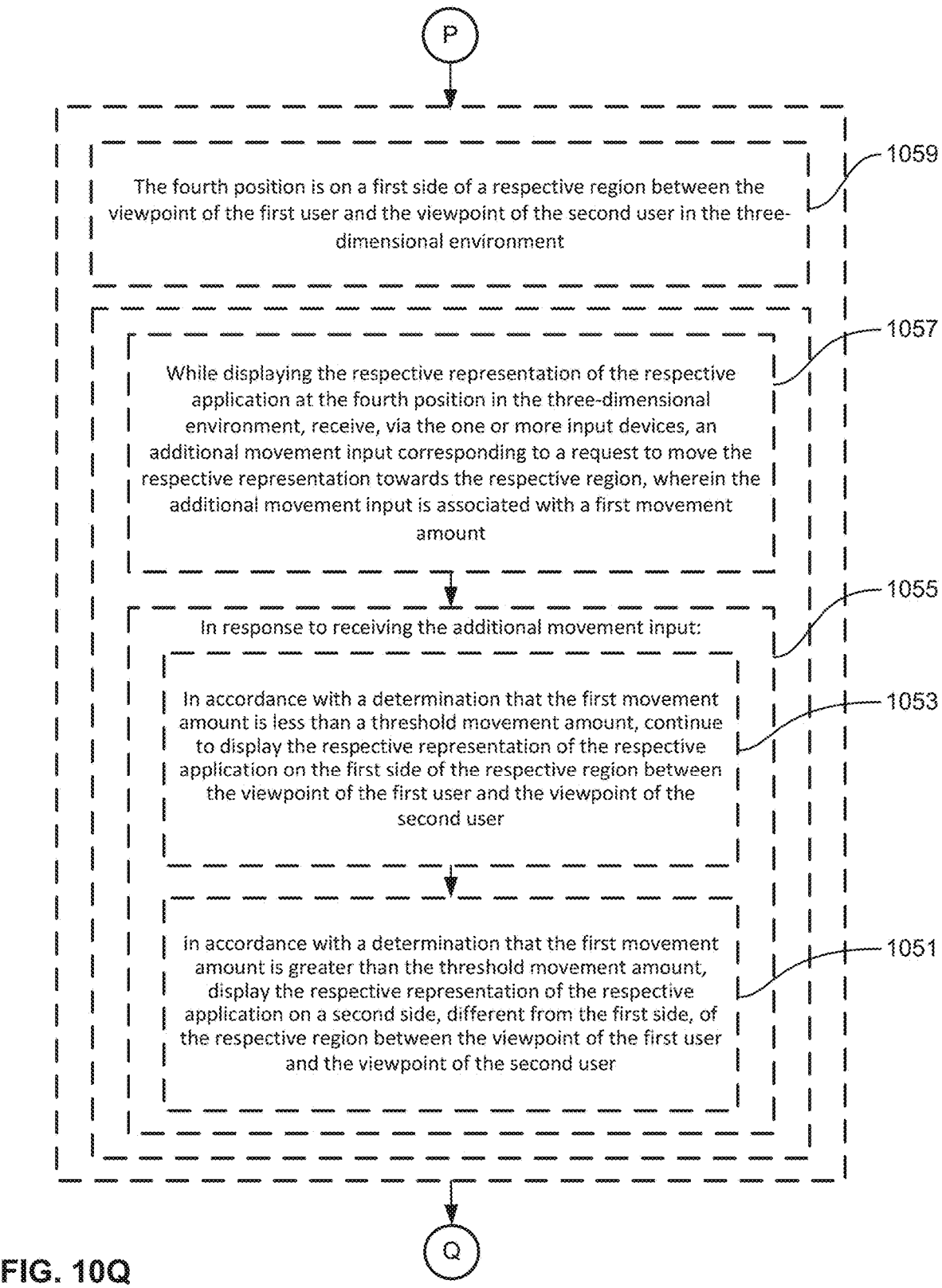
Figure 10R:
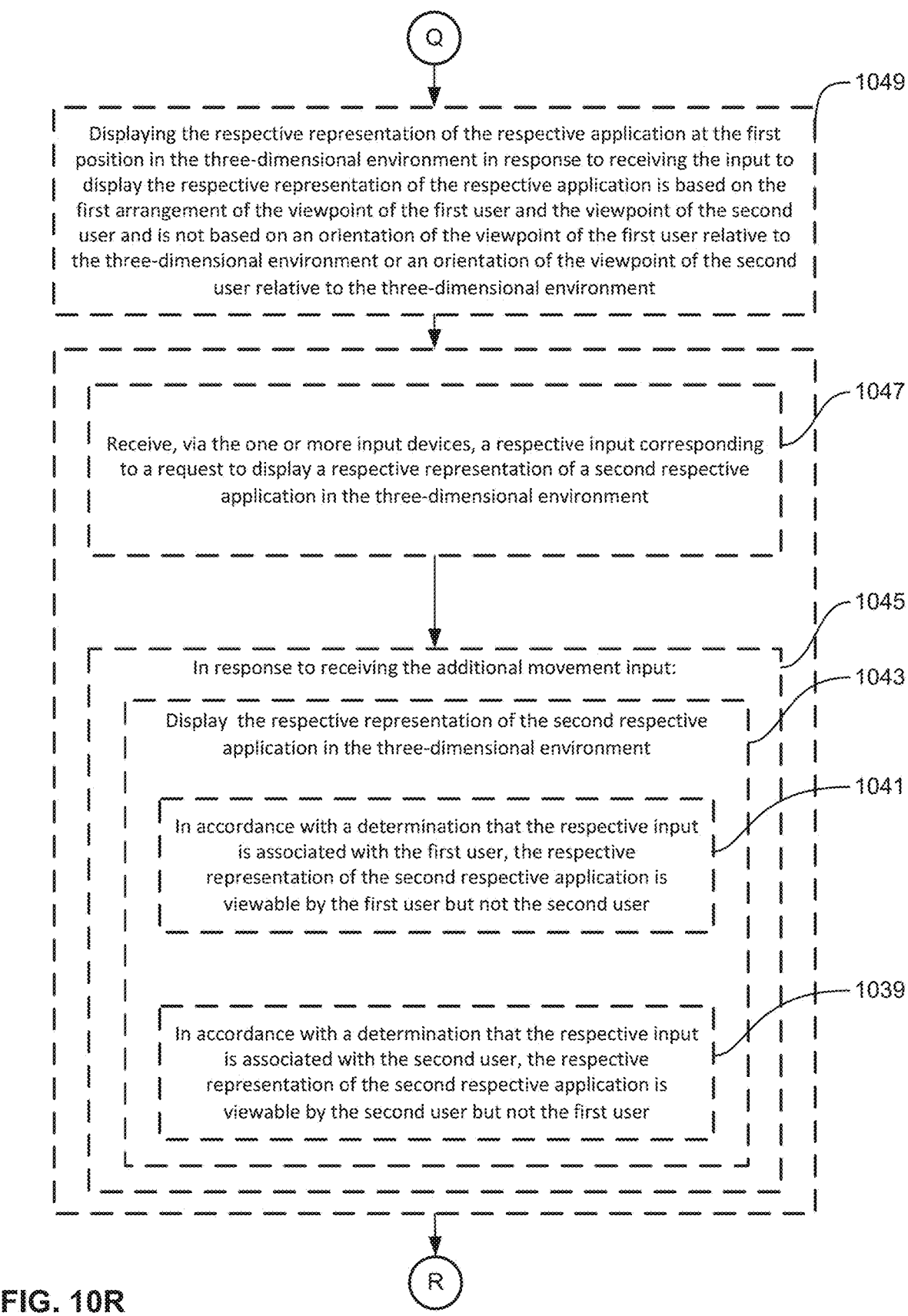
Figure 10S:
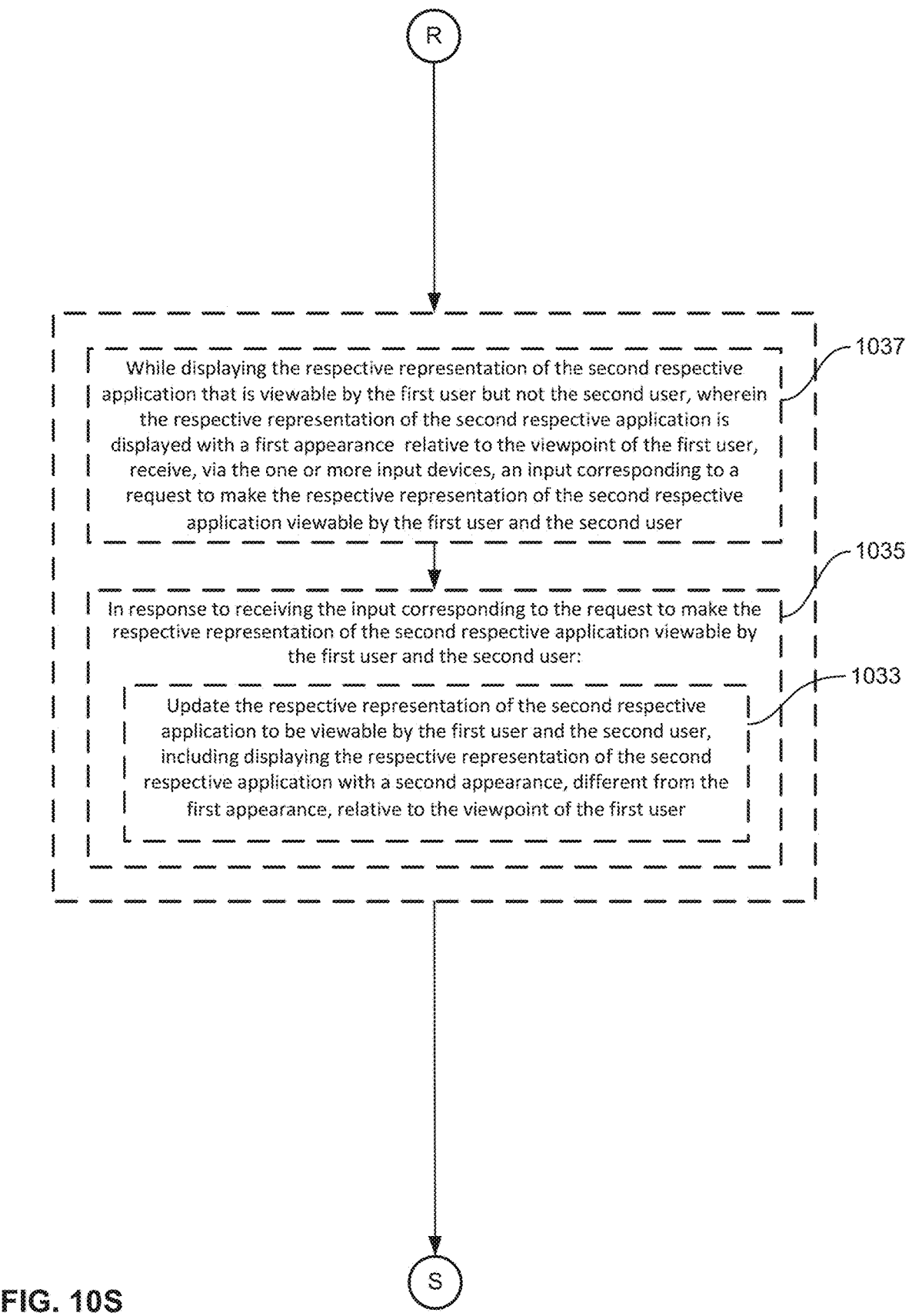
Figure 10T:
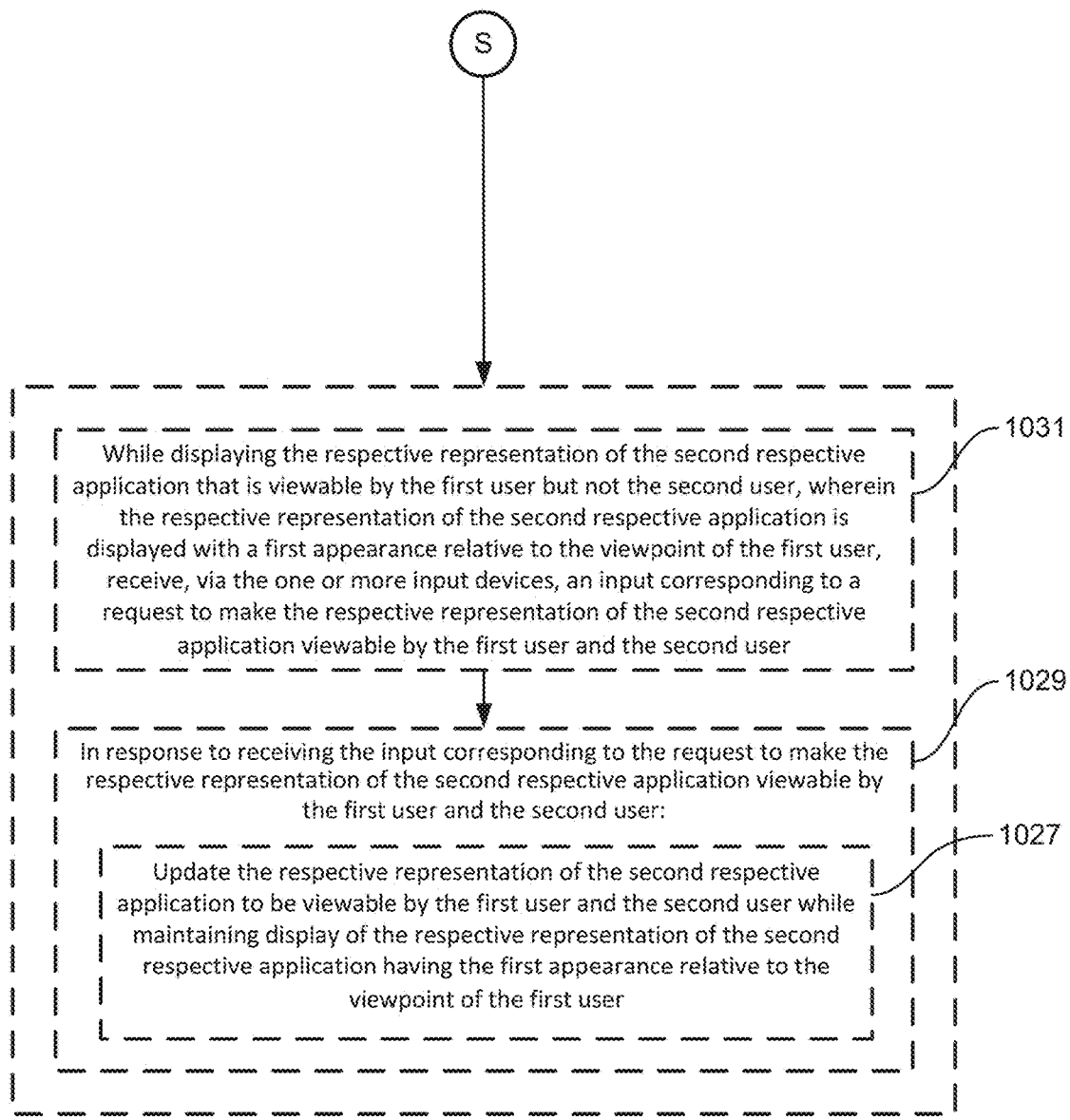

FIGS. 10A-10T is a flowchart illustrating a method of automatically updating the orientation of a virtual object in a three-dimensional environment based on viewpoints of a plurality of users in the three-dimensional environment in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, method 1000 is performed at an electronic device in communication with a display generation component and one or more input devices (e.g., a mobile device (e.g., a tablet, a smartphone, a media player, or a wearable device), or a computer. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device and/or a motion sensor (e.g., a hand tracking device, a hand motion sensor), etc.

In some embodiments, such as in FIG. 9A, the electronic device (e.g., 101) displays (1002), via the display generation component 120, a three-dimensional environment (e.g., 904) that is shared by a first user (e.g., 914A) and a second user (e.g., 914B). In some embodiments, the three-dimensional environment is generated, displayed, or otherwise caused to be viewable by the device (e.g., the three-dimensional environment is a computer-generated reality (CGR) environment such as a virtual reality (VR) environment, a mixed reality (MR) environment, or an augmented reality (AR) environment, etc.). In some embodiments, the electronic device associated with the first user displays the three-dimensional environment from a viewpoint corresponding to the position and orientation of the first user in the three-dimensional environment. In some embodiments, another electronic device (e.g., different from the electronic device) associated with the second user displays the three-dimensional environment from a viewpoint corresponding to the position and orientation of the second user in the three-dimensional environment. In some embodiments, the three-dimensional environment includes virtual objects representing physical objects in the environment in which the first user is located and/or virtual objects representing physical objects in the environment in which the second user is located. In some embodiments, the location in the three-dimensional environment corresponding to the first user is a location corresponding to the physical location of the electronic device associated with the first user within a physical environment of the electronic device associated with the first user. In some embodiments, the location in the three-dimensional environment corresponding to the second user is a location corresponding to the physical location of the other electronic device associated with the second user within a physical environment of the other electronic device associated with the second user. In some embodiments, the electronic device displays an avatar of the first user at the location in the three-dimensional environment associated with the first user and/or displays an avatar of the second user at the location in the three-dimensional environment corresponding to the second user.

In some embodiments, the electronic device (e.g., 101) receives (1004), via the one or more input devices, an input corresponding to a request to display a respective representation of a respective application in the three-dimensional environment (e.g., prior to displaying one of representations (e.g., 906), (e.g., 908), or (e.g., 922), receiving an input requesting to display the one of representations (e.g., 906), (e.g., 908), or (e.g., 922) in FIG. 9A). In some embodiments, the input includes an input associated with a request to launch the respective application and/or a request to display an additional representation of the respective application that is already running on the electronic device. In some embodiments, the respective representation of the respective application is a user interface of the respective application. In some embodiments, the respective representation of the respective application is a virtual object associated with the respective application.

In some embodiments, in response to receiving the input corresponding to the request to display the respective representation of the respective application (1006), in accordance with a determination that a viewpoint of the first user (e.g., 914A) and a viewpoint of the second user (e.g., 914B) are in a first arrangement (e.g., a spatial arrangement) that includes viewpoints at a first plurality of positions in the three-dimensional environment (e.g., 904), such as in FIG. 9A (e.g., the viewpoint of the first user and the viewpoint of the second user are at the first plurality of positions (e.g., and orientations) in the three-dimensional environment), the electronic device (e.g., 101) displays (1008) the respective representation (e.g., 906) of the respective application at a first position in the three-dimensional environment (e.g., 904) based on the first arrangement of the viewpoint of the first user (e.g., 914A) and the viewpoint of the second user (e.g., 914B). In some embodiments, the first position is a position that satisfies one or more placement criteria. In some embodiments, the one or more placement criteria include criteria that are satisfied based at least in part on the locations and optionally orientations of the first and second user in the three-dimensional environment. In some embodiments, the one or more placement criteria include a criterion that is satisfied when both users are able to see the respective representation of the respective application from their viewpoints in the three-dimensional environment. In some embodiments, the placement criteria include a criterion that is satisfied when the orientation of the respective representation is such that the content of the respective representation is facing the positions of the first user and second user in the three-dimensional environment.

In some embodiments, in response to receiving the input corresponding to the request to display the respective representation of the respective application (1006), in accordance with a determination that the viewpoint of the first user (e.g., 914A) and the viewpoint of the second user (e.g., 914B) are in a second arrangement (e.g., a spatial arrangement) that includes viewpoints at a second plurality of positions in the three-dimensional environment (e.g., 904) that are different from the first plurality of positions in the three-dimensional environment (e.g., 904), such as in FIG. 9B (e.g., the viewpoint of the first user and the viewpoint of the second user are at the second plurality of positions (e.g., and orientations) in the three-dimensional environment), the electronic device (e.g., 101) displays (1010) the respective representation (e.g., 906) of the respective application at a second position in the three-dimensional environment (e.g., 904) based on the second arrangement of the viewpoint of the first user (e.g., 914A) and the viewpoint of the second user (e.g., 914B). In some embodiments, the difference between the first plurality of positions and the second plurality of positions is a difference in the position of the viewpoint of one of the users while the position of the viewpoint of one or more other users are the same. In some embodiments, if the positions of the viewpoints of the first user and the second user are swapped, the position at which the respective representation is displayed is the same. In some embodiments, the position at which the respective representation is displayed depends on the positions of the viewpoints of the users irrespective of the orientations of the viewpoints of the user. In some embodiments, the position at which the respective representation is displayed depends on the positions and orientations of the viewpoints of the users. In some embodiments, the electronic device displays the respective representation of the respective application at a different location depending on the positions of the viewpoints of the first and second users in the three-dimensional environment. In some embodiments, the representation of the respective application is a bi-directional representation meant to be viewed by the first user and the second user from opposite sides of the respective representation of the respective application. For example, the respective representation is a virtual board game and the electronic device is configured to display the respective representation at a position between the locations of the viewpoints of the first and second users. As an example, if the position of the first user is to the right of the position of the second user relative to a frame of reference, the electronic device displays the respective representation to the right of the second user and to the left of the first user relative to the frame of reference. In this example, if the first user is to the left of the second user relative to a frame of reference, the electronic device displays the respective representation to the left of the second user and to the left of the first user relative to the frame of reference.

The above-described manner of displaying the respective representation of the respective application at a location that depends on the positions of the viewpoints of the users in the three-dimensional environment provides an efficient way of displaying the respective representation at a location convenient for the users, which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at the first position in the three-dimensional environment (e.g., 904), wherein the respective representation (e.g., 906) of the respective application is displayed with a first orientation relative to the three-dimensional environment (e.g., 904) based on the first arrangement of the viewpoint of the first user (e.g., 914A) and the viewpoint of the second user (e.g., 914B), the electronic device (e.g., 101) receives (1012), via the one or more input devices, a respective input for moving the respective representation (e.g., 906) of the respective application to a third position in the three-dimensional environment (e.g., 904). In some embodiments, the input includes selection of an option that, when selected, causes the electronic device to initiate a process to move the respective representation. In some embodiments, detecting the input includes detecting, via a hand tracking device (e.g., one or more cameras, depth sensors, proximity sensors, touch sensors (e.g., touch screen, trackpad)) that the user performs a gesture (e.g., tapping their thumb to a finger (e.g., index finger, middle finger, ring finger, little finger) on the same hand as the thumb), moves their hand while performing the gesture, and releases the gesture. In some embodiments, the electronic device moves the representation in accordance with the movement of the user's hand. In some embodiments, such as in FIG. 9C, in response to receiving the respective input (1014), the electronic device (e.g., 101) displays (1016) the respective representation (e.g., 906) of the respective application at the third position in the three-dimensional environment (e.g., 904). In some embodiments, such as in FIG. 9C, in response to receiving the respective input (1014), the electronic device (e.g., 101) updates (1018) the respective representation (e.g., 906) of the respective application to be displayed with a second orientation, different from the first orientation, based on the third position and the first arrangement of the viewpoint of the first user (e.g., 914A) and the viewpoint of the second user (e.g., 914B). In some embodiments, while the electronic device is moving the respective representation in accordance with the respective input, the electronic device displays an animation of the respective representation moving and changing orientation as the respective representation moves from the first position to the third position. In some embodiments, the second orientation is an orientation that faces the viewpoints of the first and second users while the respective representation is at the third position. In some embodiments, the respective representation is updated in accordance with one or more steps of methods 800 and/or 1200.

The above-described manner of updating the position of the respective representation in accordance with the third position and the first arrangement of the viewpoints of the first and second users provides an efficient way of displaying the respective representation in an orientation that is visible to the first and second users which additionally reduces power usage and improves battery life of the electronic device by enabling the user to use the electronic device more quickly and efficiently (e.g., by reducing the inputs needed to adjust the orientation of the representation in accordance with the change in the position of the representation), while reducing errors in usage.

In some embodiments, while displaying the respective representation (e.g., 906) of the respective application at the first position in the three-dimensional environment (e.g., 904), such as in FIG. 9C, wherein the respective representation (e.g., 906) of the respective application is displayed with a first orientation relative to the three-dimensional environment (e.g., 904) based on the first arrangement of the viewpoint of the first user (e.g., 914A) and the viewpoint of the second user (e.g., 914B), the electronic device (e.g., 101) detects (1020) that the first arrangement of the viewpoint of the first user (e.g., 914A) and the viewpoint of the second user (e.g., 914B) has changed to a third arrangement of the viewpoint of the first user (e.g., 914A) and the viewpoint of the second user (e.g., 914B), wherein the third arrangement includes viewpoints at a third plurality of positions in the three-dimensional environment (e.g., 904) that are different from the first plurality of positions in the three-dimensional environment (e.g., if user A (e.g., 914A) and/or user B (e.g., 914B) in FIG. 9C were to change position within three-dimensional environment (e.g., 904)). In some embodiments, the position of the viewpoint of one or more of the first user and the second user has changed. For example, one or more of the users changes position within the three-dimensional environment. In some embodiments, the electronic device detects an input corresponding to a request to change the position of a first user of the electronic device. In some embodiments, the request to change position of the first user of the electronic device is movement of the electronic device within the physical environment of the electronic device that is detected via one or more accelerometers, gyroscopes, distance sensors, cameras, etc. In some embodiments, in response to detecting that the first arrangement of the viewpoint of the first user and the viewpoint of the second user has changed, the electronic device (e.g., 101) maintains (1022) the respective representation (e.g., 906) of the respective application at the first position with the first orientation relative to the three-dimensional environment (e.g., 904), such as in FIG. 9C. In some embodiments, the electronic device does not change the orientation or position of the respective representation in response to detecting a change in the position of one or more of the users in the three-dimensional environment. In some embodiments, the electronic device updates the three-dimensional environment from the viewpoint of the user that moved in accordance with one or more steps of method 800.

The above-described manner of maintaining the respective representation at the first position and first orientation in the three-dimensional environment when the arrangement of the viewpoints of the first and second users changes provides an efficient way of updating the arrangement of the viewpoints of the first and second users without computing a new position or orientation with which to update the respective representation which additionally reduces power usage and improves battery life of the electronic device by reducing the complexity of computations of the electronic device.

In some embodiments, such as in FIG. 9B, while displaying the respective representation (e.g., 906) of the respective application at the first position with the first orientation relative to the three-dimensional environment (e.g., 904), the electronic device (e.g., 101) detects (1024) a respective input for moving the respective representation (e.g., 906) of the respective application away from the first position in the three-dimensional environment (e.g., 904). In some embodiments, the electronic device detects selection of an option that, when selected, causes the electronic device to initiate a process to move the respective representation within the three-dimensional environment. In some embodiments, detecting the input includes detecting, via a hand tracking device (e.g., one or more cameras, depth sensors, proximity sensors, touch sensors (e.g., touch screen, trackpad)) that the user performs a gesture (e.g., tapping their thumb to a finger (e.g., index finger, middle finger, ring finger, little finger) on the same hand as the thumb), moves their hand while performing the gesture, and releases the gesture. In some embodiments, the electronic device moves the representation in accordance with the movement of the user's hand. In some embodiments, such as in FIG. 9C, in response to detecting the respective input, the electronic device (e.g., 101) moves (1026) the respective representation (e.g., 906) of the respective application away from the first position in accordance with the respective input, and updates the respective representation (e.g., 906) to have a second orientation, different from the first orientation, in the three-dimensional environment (e.g., 906) based on the third arrangement of the viewpoint of the first user (e.g., 914A) and the viewpoint of the second user (e.g., 914B). In some embodiments, the electronic device updates the orientation of the representation in accordance with the arrangement of the viewpoints of the users while the input to move the respective representation is being received. For example, the representation is initially displayed at a first position and orientation while the viewpoints of the users are in a first arrangement, the arrangement of viewpoints changes to an updated arrangement, and an input to move the respective representation is received. In this example, the orientation of the respective representation changes based on the updated arrangement of the viewpoints of the users and the updated position of the respective representation in response to the input to move the respective representation (e.g., but not before detecting the input to move the respective representation). In some embodiments, the second orientation of the respective representation based on the third arrangement of the viewpoint of the first user and the viewpoint of the second user is an orientation that faces the viewpoints of the users at the current location of the respective representation. In some embodiments, the respective representation is updated in accordance with one or more steps of methods 800 and/or 1200.

The above-described manner of updating the orientation of the respective representation based on the third arrangement of the viewpoints of the first and second users provides an efficient way of displaying the representation at an orientation that is visible to the users when the representation is moved which additionally reduces power usage and improves battery life of the electronic device by enabling the user to use the electronic device more quickly and efficiently (e.g., by reducing the inputs needed to adjust the orientation of the respective representation), while reducing errors in usage.

In some embodiments, such as in FIG. 9B, the respective representation (e.g., 906) of the respective application is displayed with a respective user interface element (e.g., 918) (1028). In some embodiments, the electronic device (e.g., 101) detects (1030), via the one or more input devices, an input corresponding to selection of the respective user interface element (e.g., 918) (e.g., if the user's gaze (e.g., 916*b*) were on user interface element (e.g., 918) while the user performs the gesture with their hand (e.g., 920*b*) in FIG. 9B). In some embodiments, in response to the input corresponding to selection of the respective user interface element (e.g., 918), the electronic device (e.g., 101) initiates (1032) a process to move the respective representation (e.g., 906) of the respective application in the three-dimensional environment (e.g., 904). In some embodiments, in response to a second input directed towards the respective user interface element, the electronic device updates the respective user interface element to include a plurality of selectable options including a selectable option that, when selected, causes the electronic device to initiate a process to move the respective representation. In some embodiments, the respective user interface element is a system object that is displayed in association with each of the other application representations and other objects in the user interface. In some embodiments, the respective user interface element is displayed in response to detecting, via an eye tracking device, that the gaze of the user is directed towards the respective representation of the respective application. In some embodiments, the electronic device moves the representation in response to detecting, via a hand tracking device (e.g., one or more cameras, depth sensors, proximity sensors, touch sensors (e.g., touch screen, trackpad)) that the user performs a gesture (e.g., tapping their thumb to a finger (e.g., index finger, middle finger, ring finger, little finger) on the same hand as the thumb) while looking at the respective user interface element, moves their hand while performing the gesture, and releases the gesture. In some embodiments, the electronic device moves the representation in accordance with the movement of the user's hand. In some embodiments, the respective user interface element is displayed adjacent an edge (e.g., bottom edge) of the representation of the respective application.

The above-described manner of displaying the respective representation with a respective user interface element that is interactable to move the respective representation in the three-dimensional environment provides an efficient way of initiating a process to move the respective representation, which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at a first distance from the viewpoint of the first user 614A in the three-dimensional environment (e.g., 904), wherein the respective representation (e.g., 906) of the respective application is displayed at a first size from the viewpoint of the first user (e.g., 914A), the electronic device (e.g., 101) detects (1034) a respective input for moving the respective representation (e.g., 906) of the respective application to a second distance, further than the first distance, from the viewpoint of the first user (e.g., 914A). In some embodiments, such as in FIG. 9C, in response to detecting the respective input (1036), the electronic device (e.g., 101) moves (1038) the respective representation (e.g., 906) of the respective application to the second distance from the viewpoint of the first user (e.g., 914A) (e.g., displaying the respective representation of the respective application at an updated position in the three-dimensional environment that is the second distance from the viewpoint of the first user). In some embodiments, such as in FIG. 9C, in response to detecting the respective input (1036), the electronic device (e.g., 101) displays (1040) the respective representation (e.g., 906) of the respective application at a second size, larger than the first size, from the viewpoint of the first user (e.g., 914A). In some embodiments, the display generation component uses the same display area to display the respective representation at the second distance and at the first distance, thereby making the virtual size of the respective representation larger. In some embodiments, the display generation component uses more display area to display the respective representation at the second distance compared to the display area used to display the respective representation at the first distance. In some embodiments, the size with which the respective representation is displayed from the viewpoint of the second user is updated in accordance with the updated distance between the respective representation and the viewpoint of the second user. In some embodiments, the size of the respective representation is the same from the viewpoint of the first user and the viewpoint of the second user and the size of the respective representation is updated in accordance with the distance of the respective representation to the viewpoint of the first user and the distance of the respective representation to the viewpoint of the second user. In some embodiments, in accordance with a determination that the respective representation is moved to a position that is closer to the viewpoint of the first user and/or the viewpoint of the second user, the electronic device updates the respective representation to be displayed at a smaller size.

The above-described manner of increasing the size of the respective representation in response to detecting the respective representation being moved further from the viewpoint of the first user provides an efficient way of maintaining legibility of the respective representation which additionally reduces power usage and improves battery life of the electronic device by enabling the user to use the electronic device more quickly and efficiently (e.g., by reducing the inputs needed to adjust the size of the respective representation), while reducing errors in usage.

In some embodiments, such as in FIG. 9B, while displaying the respective representation (e.g., 906) of the respective application at a first distance from the viewpoint of the first user (e.g., 914A) in the three-dimensional environment (e.g., 904), wherein the respective user interface element (e.g., 918) is displayed at a second size from the viewpoint of the first user (e.g., 914A) (e.g., and the respective representation of the respective application is displayed at the first size from the viewpoint of the first user), the electronic device (e.g., 101) detects (1042) a respective input for moving the respective representation (e.g., 906) of the respective application to a second distance, further than the first distance, from the viewpoint of the first user (e.g., 914A). In some embodiments, in response to detecting the respective input (1044), the electronic device (e.g., 101) moves (1046) the respective representation (e.g., 906) of the respective application to the second distance from the viewpoint of the first user (e.g., 914A), such as in FIG. 9C (e.g., displaying the respective representation of the respective application at an updated position in the three-dimensional environment that is the second distance from the viewpoint of the first user). In some embodiments, in response to detecting the respective input (1044), the electronic device (e.g., 101) displays (1048) the respective user interface element at a third size, larger than the second size, from the viewpoint of the first user (e.g., updating the size of user interface element (e.g., 918) in accordance with changing the distance of representation (e.g., 906) from user A (e.g., 914A). In some embodiments, the display generation component uses the same display area to display the respective user interface element at the second distance and at the first distance, thereby making the virtual size of the respective user interface element larger. In some embodiments, the display generation component uses more display area to display the respective user interface element at the second distance compared to the display area used to display the respective user interface element at the first distance. In some embodiments, the size with which the respective user interface element is displayed from the viewpoint of the second user is updated in accordance with the updated distance between the respective user interface element and the viewpoint of the second user. In some embodiments, the size of the respective user interface element is the same from the viewpoint of the first user and the viewpoint of the second user and the size of the respective user interface element is updated in accordance with the distance of the respective user interface element to the viewpoint of the first user and the distance of the respective user interface element to the viewpoint of the second user. In some embodiments, in accordance with a determination that the respective user interface element is moved to a position that is closer to the viewpoint of the first user and/or the viewpoint of the second user, the electronic device updates the respective user interface element to be displayed at a smaller size. Therefore, in some embodiments, the electronic device updates the size of the respective user interface element even if the size of the object remains the same. In some embodiments, the electronic device displays the respective representation of the respective application at the first size from the viewpoint of the first user at the second distance from the viewpoint of the user. In some embodiments, the display generation component uses less display area to display the respective representation of the respective application after the respective representation is moved further from the viewpoint of the first user to maintain the virtual size of the respective representation. In some embodiments, the electronic device maintains the size of the respective representation from the viewpoint of the second user as the respective representation is moved around the three-dimensional environment. In some embodiments, the electronic device maintains the size of the respective representation from the viewpoint of the first user and/or the viewpoint of the second user independent of the distance between the respective representation and the viewpoint of the first user and/or the viewpoint of the second user. In some embodiments, in response to an input moving the respective representation closer to the viewpoint of the first user and/or the viewpoint of the second user, the electronic device maintains the size of the respective representation. In some embodiments, in response to the input moving the respective representation closer to the viewpoint of the first user and/or the viewpoint of the second user, the electronic device increases the display area used to present the respective representation to maintain the virtual size of the respective representation at the closer distance from the viewpoint of the first user and/or viewpoint of the second user.

The above-described manner of displaying the respective representation at the same size and displaying the respective user interface element at a different size in response to detecting a change in the distance between the viewpoint of the first user and the respective representation and respective user interface element provides an efficient way of maintaining legibility of the respective user interface element displayed with a virtual object with a constant size, which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at the first position in the three-dimensional environment (e.g., 904), the electronic device (e.g., 101) detects (1050), via a hand tracking device in communication with the electronic device, a respective input for moving the respective representation (e.g., 906) of the respective application in the three-dimensional environment (e.g., 904), wherein the respective input includes a gesture performed by a hand (e.g., 920b) of a user (e.g., 914B) of the electronic device 101b followed by movement of the hand (e.g., 920b) while maintaining the gesture performed by the hand (e.g., 920b). In some embodiments, the gesture is the user touching their thumb to one of their other fingers (e.g., index finger, middle finger, ring finger, little finger) while the user is looking at a respective user interface element that is selectable to move the respective representation (e.g., detected via an eye tracking device) and the electronic device detects movement of the hand (e.g., with the hand tracking device) while the thumb is touching the other finger. In some embodiments, such as in FIG. 9C, in response to receiving the respective input, the electronic device (e.g., 101) moves (1052) the respective representation (e.g., 906) of the respective application in the three-dimensional environment (e.g., 904) in accordance with the movement of the hand (e.g., 920b). In some embodiments, the electronic device moves the respective representation of the respective application in accordance with the movement of the hand in response to detecting the gaze of the user on the respective representation while the gesture is detected. In some embodiments, the respective representation is updated in accordance with one or more steps of methods 800 and/or 1200.

The above-described manner of moving the respective representation in accordance with the movement of the hand in response to detecting the gesture performed by the hand of the user provides an efficient way of controlling the position of the respective representation which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at the first position in the three-dimensional environment (e.g., 904), the electronic device (e.g., 101) detects (1054) a respective input for moving the respective representation (e.g., 906) of the respective application in the three-dimensional environment (e.g., 904). In some embodiments, the respective input includes selection of an option that, when selected, causes the electronic device to initiate a process to move the respective representation. In some embodiments, the process to move the respective representation includes detecting, via a hand tracking device, that the hand of the user is performing a gesture and moving the respective representation in accordance with the movement of the hand. In some embodiments, in response to receiving the respective input (1056), in accordance with a determination that the respective input is associated with the first user (e.g., 914A), the electronic device (e.g., 101) moves (1058) the respective representation (e.g., 906) of the respective application in the three-dimensional environment (e.g., 904) in accordance with the respective input, such as in FIG. 9C. In some embodiments, the electronic device of the first user detects the respective input for moving the respective representation of the respective application. In some embodiments, the electronic device of the first user and the electronic device of the second user display the movement of the respective representation in response to the electronic device of the first user detecting the respective input. In some embodiments, in response to receiving the respective input (1056), in accordance with a determination that the respective input is associated with the second user (e.g., 914B), the electronic device (e.g., 101) moves (1060) the respective representation (e.g., 906) of the respective application in the three-dimensional environment (e.g., 904) in accordance with the respective input, such as in FIG. 9C. In some embodiments, the electronic device of the second user detects the respective input for moving the respective representation of the respective application. In some embodiments, the electronic device of the first user and the electronic device of the second user display the movement of the respective representation in response to the electronic device of the second user detecting the respective input. In some embodiments, the respective representation is updated in accordance with one or more steps of methods 800 and/or 1200.

The above-described manner of moving the respective representation of the respective application in response to the respective input irrespective of whether the respective input is associated with the first user or the second user provides an efficient way of moving the respective representation of the respective application which additionally reduces power usage and improves battery life of the electronic device by enabling the user to use the electronic device more quickly and efficiently (e.g., by enabling either user to move the representation, thus saving time compared to one user having to ask the other user to move the representation), while reducing errors in usage.

In some embodiments, while displaying the respective representation (e.g., 922) of the respective application at the first position in the three-dimensional environment (e.g., 904), wherein the respective representation (e.g., 922) of the respective application is displayed with a first orientation relative to the three-dimensional environment (e.g., 904), a second orientation and at a first respective position relative to the viewpoint of the first user (e.g., 914A), and a third orientation and at a second respective position relative to the viewpoint of the second user (e.g., 914B), such as in FIG. 9A, the electronic device (e.g., 101) receives (1062), via the one or more input devices, a respective input corresponding to a request to automatically change the viewpoint of the first user (e.g., 914A) in the three-dimensional environment (e.g., 904), wherein the respective input does not indicate how to change the viewpoint of the first user (e.g., 914A) in the three-dimensional environment (e.g., 904). In some embodiments, the input corresponds to a request to reset the three-dimensional environment from the viewpoint of the first user. In some embodiments, the input is the selection of an option displayed in the three-dimensional environment that is displayed in accordance with a determination that the location associated with the first user is at least a threshold distance from the objects and other user(s) in the three-dimensional environment. In some embodiments, in response to receiving the respective input, the electronic device (e.g., 101) updates (1064) the viewpoint of the first user (e.g., 914A) in the three-dimensional environment (e.g., 904) based on the viewpoint of the second user (e.g., 914B) and the respective representation (e.g., 922) of the respective application at the first position in the three-dimensional environment (e.g., 904). In some embodiments, the electronic device of the second user continues to display the respective representation of the respective application with the third orientation and the second respective position relative to the viewpoint of the second user. In some embodiments, in response to the respective input, the electronic device updates the position and orientation of the viewpoint of the first user automatically according to one or more criteria based on the positions of the viewpoints of the other users in the three-dimensional environment, the representations of applications in the three-dimensional environment, and/or other objects in the three-dimensional environment according to one or more steps of method 1400. For example, the position of the first user is automatically updated based on user and virtual object placement rules.

The above-described manner of automatically updating the viewpoint of the first user in the three-dimensional environment in response to the respective input provides an efficient way of presenting the three-dimensional environment according to one or more criteria from the viewpoint of the first user without requiring manual re-arrangement of the objects in the three-dimensional environment or manual selection of the updated location of the first user which additionally reduces power usage and improves battery life of the electronic device by enabling the user to use the electronic device more quickly and efficiently, while reducing errors in usage.

In some embodiments, after updating the viewpoint of the first user in the three-dimensional environment, the respective representation (e.g., 922) of the respective application is displayed (1066) at the first position and with the first orientation relative to the three-dimensional environment (e.g., 904) (1068), such as in FIG. 9A. In some embodiments, the position of the respective representation of the respective application in the three-dimensional environment and the orientation of the respective representation relative to a fixed frame of reference in the three-dimensional environment do not change in response to the respective input. In some embodiments, the other users see the position of the representation of the first user update in response to the input (e.g., the representation of the first user "jumps" from a first respective location to a second respective location in the three-dimensional environment). In some embodiments, a system maintains the three-dimensional environment that includes location information of virtual objects (e.g., representations of users, applications, virtual objects) and each user has a view of the three-dimensional environment from their own viewpoint. In some embodiments, the viewpoint of each user includes representations of physical objects (e.g., pass-through video of photorealistic representations of the environment of the electronic device) in the environment of the first user's electronic device. For example, the electronic device of the first user presents the three-dimensional environment with one or more physical objects in the physical environment of the electronic device of the first user and the electronic device of the second user presents the three-dimensional environment with one or more physical objects in the physical environment of the second user. In some embodiments, the three-dimensional environment further includes virtual objects in addition to physical objects. In some embodiments, after updating the viewpoint of the first user (e.g., 914A) in the three-dimensional environment (e.g., 904), the respective representation (e.g., 922) of the respective application is displayed (1066) with a fourth orientation and at a third respective position relative to the updated viewpoint of the first user (e.g., 914A) (1070). In some embodiments, when the viewpoint of the first user changes, the orientation and position of the respective representation of the respective application relative to the viewpoint of the first user changes. In some embodiments, after updating the viewpoint of the first user (e.g., 914A) in the three-dimensional environment (e.g., 904), the respective representation (e.g., 922) of the respective application is displayed (1066) with the third orientation and at the second respective position relative to the viewpoint of the second user (e.g., 914B) (1072), such as in FIG. 9A. In some embodiments, the orientation and position of the respective representation of the respective application relative to the viewpoint of the second user do not change in response to the respective input. In some embodiments, the location of the first user in the three-dimensional environment and the location of the first user relative to the viewpoint of the second user change in response to the respective input. In some embodiments, the electronic device of the second user displays movement of a representation of the first user from one location to another location (e.g., to the "reset" location automatically determined by an electronic device) in the three-dimensional environment in response to the respective input.

The above-described manner of maintaining the position of the respective representation in the three-dimensional environment after the viewpoint of the first user changes provides an efficient way of automatically positioning the first user, which is more efficient than manually repositioning the first user and/or one or more objects or other users in the three-dimensional environment, which additionally reduces power usage and improves battery life of the electronic device by enabling the user to use the electronic device more quickly and efficiently (e.g., by reducing the inputs needed to revert the viewpoint of the second user), while reducing errors in usage.

In some embodiments, while displaying the respective representation (e.g., 906) of the respective application at a respective position with a first respective orientation in the three-dimensional environment (e.g., 904), such as in FIG. 9C, the electronic device (e.g., 101) detects (1074) a change in a number of users with which the three-dimensional environment (e.g., 904) is shared (e.g., the first or second user leaves the three-dimensional environment and/or one or more additional users join the three-dimensional environment). In some embodiments, in response to detecting the change in the number of users with which the three-dimensional environment is shared, in accordance with a determination that one or more criteria are satisfied (e.g., the respective representation of the respective application is moved away from the first respective position and back to the first respective position after the change in the number of users, or representations of applications are able to change orientation based on users leaving or joining without having to be moved), the electronic device (e.g., 101) displays (1076) the respective representation (e.g., 906) at the respective position with a second respective orientation, different from the first respective orientation, based on an arrangement of viewpoints of the changed number of users with which the three-dimensional environment (e.g., 904) is shared, such as in FIG. 9D. In some embodiments, the orientation of the respective representation of the respective application is based on the arrangement of the viewpoints of one or more or all of the users in the three-dimensional environment so if the number of users in the three-dimensional environment changes, the arrangement of the viewpoints will change and the orientation of the respective representation in response to moving the respective representation to the first position in the three-dimensional environment will also change. For example, while there are two users in the three-dimensional environment, in response to an input to move the respective representation to the first respective position in the three-dimensional environment, the electronic device displays the respective representation at the first respective position in the three-dimensional environment with a first orientation. As another example, while there are three users in the three-dimensional environment, in response to an input to move the respective representation to the first respective position in the three-dimensional environment, the electronic device displays the respective representation at the first respective position in the three-dimensional environment with a second orientation different from the first orientation. In some embodiments, the electronic device does not update the orientation of the respective representation in response to the number of users in the three-dimensional environment changing. In some embodiments, the electronic device updates the orientation of the respective representation in response to the number of users in the three-dimensional environment changing (e.g., to orient the respective representation towards one or more or all of the users in the three-dimensional environment).

The above-described manner of displaying the respective representation at the respective position with the second orientation in response to detecting the change in the number of users in the three-dimensional environment provides an efficient way of orienting the respective representation towards one or more or all of the users in the three-dimensional environment, which additionally reduces power usage and improves battery life of the electronic device by enabling the user to use the electronic device more quickly and efficiently, while reducing errors in usage.

In some embodiments, such as in FIG. 9A, the electronic device (e.g., 101) displays (1078) the respective representation (e.g., 906) of the respective application at a first position in the three-dimensional environment (e.g., 904) based on the first arrangement of the viewpoint of the first user (e.g., 914A) and the viewpoint of the second user (e.g., 914B). In some embodiments, such as in FIG. 9A, in accordance with a determination that the respective representation (e.g., 906) of the respective application is viewable from a single direction (e.g., an object including virtual content such as video content on one side of the object (e.g., a virtual television)), the first position in the three-dimensional environment (e.g., 904) is a first respective position in the three-dimensional environment (e.g., 904) such that the respective representation (e.g., 906) of the respective application is viewable from the single direction from the viewpoint of the first user (e.g., 914A) and the viewpoint of the second user (e.g., 914B) (1080). In some embodiments, the first position is selected such that the single direction of the respective representation is oriented towards the viewpoints of the first and second users. In some embodiments, such as in FIG. 9A, in accordance with a determination that the respective representation (e.g., 922) of the respective application is viewable from a first direction and a second direction (e.g., a virtual board game visible from multiple orientations around the virtual board game), different from the first direction, the first position in the three-dimensional environment (e.g., 904) is a second respective position, different from the first respective position, in the three-dimensional environment (e.g., 904) such that the respective representation (e.g., 922) of the respective application is viewable from the first direction from the viewpoint of the first user (e.g., 914A), and viewable from the second direction from the viewpoint of the second user (e.g., 914B) (1082). In some embodiments, the first position is between the viewpoints of the first and second users so that the first direction faces the viewpoint of the first user and the second direction faces the viewpoint of the second user.

The above-described manner of selecting a different position for the respective representation depending on whether the respective representation is viewable from a single direction or viewable from multiple directions provides an efficient way of placing the respective representation in a position that is visible to both the first user and the second user which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at a first distance from the viewpoint of the first user (e.g., 914A) and at a second distance from the viewpoint of the second user (e.g., 914B) in the three-dimensional environment (e.g., 904), wherein the respective representation (e.g., 906) of the respective application is displayed at a first size from the viewpoint of the first user (e.g., 914A) and a second size from the viewpoint of the second user (e.g., 914B), the electronic device (e.g., 101) detects (1084) a respective input for moving the respective representation of the respective application (e.g., 906) to a third distance and a fourth distance from the viewpoint of the first user (e.g., 914A) and the viewpoint of the second user (e.g., 914B), respectively, wherein the third distance is different from the first distance and the fourth distance is different from the second distance. In some embodiments, the respective representation moves to a location that is further from both the viewpoints of the first user and the second user. In some embodiments, the representation moves to a location that is closer to both the viewpoints of the first user and the second user. In some embodiments, the respective representation moves to a location that is further from the viewpoint of the first user and closer to the viewpoint of the second user. In some embodiments, the respective representation moves to a location that is closer to the viewpoint of the first user and further from the viewpoint of the second user. In some embodiments, the first and second sizes are the same. In some embodiments, the first and second sizes are different. In some embodiments, the size of the respective representation is a virtual size of the representation in the three-dimensional environment and the amount of display area used to display the representation depends on the size of the representation and the distance of the representation from the viewpoint of the user. In some embodiments, in response to detecting the respective input (1086), the electronic device moves (1088) the respective representation of the respective application to the third distance from the viewpoint of the first user (e.g., and the fourth distance from the viewpoint of the second user). In some embodiments, such as in FIG. 9C, in response to detecting the respective input (1086), the electronic device displays (1090) the respective representation of the respective application at a third size, different from the first size, from the viewpoint of the first user, and at a fourth size, different from the second size, from the viewpoint of the second user, based on the third distance and the fourth distance. In some embodiments, the third and fourth sizes are the same. In some embodiments, the third and fourth sizes are different. In some embodiments, the size of the respective representation is a virtual size of the representation in the three-dimensional environment and the amount of display area used to display the representation depends on the size of the representation and the distance of the representation from the viewpoint of the user. In some embodiments, in response to moving the respective representation away from a viewpoint of a first user, the electronic device increases the size of the respective representation. In some embodiments, in response to moving the respective representation towards a viewpoint of a first user, the electronic device decreases the size of the respective representation. In some embodiments, the size of the respective representation is updated in accordance with the average or another combination of the distance to the viewpoint of the first user and the viewpoint of the second user irrespective of which user provided the input to move the representation of the application.

The above-described manner of updating the size of the representation in accordance with the third and fourth distances from the respective representation to the viewpoints of the first and second users, respectively, provides an efficient way of maintaining legibility of the respective representation when it is moved away from one or more viewpoints and conserving display area for other objects when the respective representation is moved towards one or more viewpoints which additionally reduces power usage and improves battery life of the electronic device by enabling the user to use the electronic device more quickly and efficiently, while reducing errors in usage.

In some embodiments, such as in FIG. 9B, displaying (1092) the respective representation (e.g., 906) of the respective application at a third size includes, in accordance with a determination that the third distance is greater than the fourth distance, selecting the third size and the fourth size such that the third size is larger than a minimum size associated with the third distance (1094). In some embodiments, such as in FIG. 9B, displaying (1092) the respective representation of the respective application (e.g., 906) at a third size includes, in accordance with a determination that the fourth distance is greater than the third distance, selecting the third size and the fourth size such that the fourth size is larger than a minimum size associated with the fourth distance (1096). In some embodiments, the updated size of the respective representation is at least a minimum size based on the viewpoint that is furthest from the respective representation. In some embodiments, the third and fourth size are the same. In some embodiments, the third and fourth size are different In some embodiments, in accordance with a determination that the greater distance does not change due to the movement input, the electronic device maintains the size of the respective representation even if one or more other distances between users and the representation change in response to the movement input.

The above-described manner of selecting the third and fourth sizes based on a minimum size associated with the distance to the viewpoint that is further from the respective representation provides an efficient way of presenting the respective representation at a size that is legible for both users which additionally reduces power usage and improves battery life of the electronic device by enabling the user to use the electronic device more quickly and efficiently (e.g., by reducing the number of inputs needed to present the representation at a legible size), while reducing errors in usage.

In some embodiments, such as in in FIG. 9B, while displaying the respective representation (e.g., 906) of the respective application at the first position in the three-dimensional environment (e.g., 904), the electronic device (e.g., 101) receives (1098), via the one or more input devices, a respective input corresponding to a request to move the respective representation (e.g., 906) of the respective application to a third position coincident with the viewpoint of the second user (e.g., 914A) in the three-dimensional environment (e.g., 904). In some embodiments, the electronic device detects an input associated with the first user that corresponds to a request to move the respective representation to the location of the second user in the three-dimensional environment. In some embodiments, the third position is coincident with the viewpoint of the second user if any part of the representation is at or within a threshold distance of the location of the viewpoint of the second user. In some embodiments, the third position is coincident with the viewpoint of the second user if at least a threshold amount of the viewpoint of the second user will be blocked by the respective representation when it is within the threshold distance. In some embodiments, such as in FIG. 9C, in response to receiving the respective input, the electronic device (e.g., 101) moves (1099) the respective representation (e.g., 906) of the respective application to a fourth position, different from the third position, in the three-dimensional environment (e.g., 904), wherein the fourth position is not coincident with the viewpoint of the second user (e.g., 914A). In some embodiments, the fourth position is within a predetermined threshold of the viewpoint of the second user. In some embodiments, in response to the input, the electronic device displays the respective representation at a location that is within a threshold distance of, but not coincident with, the viewpoint of the second user.

The above-described manner of moving the respective representation of the respective application to the fourth position that is not coincident with the viewpoint of the second user in response to the request to move the respective representation to a third location that is coincident with the viewpoint of the second user provides an efficient way of moving the respective representation to an alternative position that is visible to the first and second users which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at the first position in the three-dimensional environment (e.g., 904), the electronic device (e.g., 101) receives (1097), via the one or more input devices, a respective input for moving the respective representation (e.g., 906) of the respective application to a third position in the three-dimensional environment (e.g., 904). In some embodiments, in response to receiving the respective input (1095), the electronic device (e.g., 101) displays (1093) the respective representation (e.g., 906) of the respective application at the third position in the three-dimensional environment (e.g., 904). In some embodiments, such as in FIG. 9C, in response to receiving the respective input (1095), in accordance with a determination that the third position is a first distance from the viewpoint of the first user (e.g., 914A), the electronic device (e.g., 101) displays (1091) the respective representation (e.g., 906) of the respective application with a first orientation relative to the viewpoint of the first user (e.g., 914A), wherein the first orientation is directed towards the viewpoint of the first user (e.g., 914A) to a first degree. In some embodiments, the electronic device orients the respective representation in accordance with the positions of the viewpoints of all users in the three-dimensional environment. In some embodiments, the electronic device prioritizes orienting the representation towards the viewpoint(s) that is (are) closest to the third position of the respective representation. For example, if the viewpoint of the first user is a smaller distance to the respective representation than the distance between the viewpoint of the second user and the respective representation, the electronic device orients the respective representation towards the viewpoint of the first user more than the electronic device orients the respective representation towards the viewpoint of the second user. In some embodiments, such as in FIG. 9C, in response to receiving the respective input (1095), in accordance with a determination that the third position is a second distance, greater than the first distance, from the viewpoint of the first user (e.g., 914B), the electronic device (e.g., 101) displays (1089) the respective representation (e.g., 906) of the respective application with a second orientation relative to the viewpoint of the first user (e.g., 914B), wherein the second orientation is directed towards the viewpoint of the first user (e.g., 914B) to a second degree, less than the first degree. For example, if the viewpoint of the first user is a greater distance to the respective representation than the distance between the viewpoint of the second user and the respective representation, the electronic device orients the respective representation towards the viewpoint of the first user less than the electronic device orients the respective representation towards the viewpoint of the second user. In some embodiments, the closer a viewpoint of a first user is to the respective representation, the more the electronic device orients the respective representation towards the viewpoint of the first user. In some embodiments, the electronic device places the respective representation at least a minimum distance from the viewpoint of the first user. In some embodiments, if the respective representation is moved to a position that does not allow one or more users in the three-dimensional environment to view the representation, the viewpoints of the users that are not able to view the representation are not a factor in determining the orientation of the respective representation. For example, if a representation that is only visible from one side is placed between two users, the representation will be oriented with the visible side towards the viewpoint of the user that is closer to the representation. In some embodiments, it is possible for a user to place a representation of an application at a location and orientation at which the user is not able to view the representation, but one or more other users in the three-dimensional environment are able to view the representation. In some embodiments, it is not possible to place the respective representation within a threshold volume of a user's head.

The above-described manner of adjusting the degree to which the respective representation is oriented towards the viewpoint of the first user based on the distance between the viewpoint of the first user and the respective representation provides an efficient way prioritizing the visibility of representations of applications according to distance from the representation which additionally reduces power usage and improves battery life of the electronic device by enabling the user to use the electronic device more quickly and efficiently (e.g., by reducing the inputs needed to adjust the orientation of the representation), while reducing errors in usage.

In some embodiments, such as in FIG. 9B, while displaying the respective representation (e.g., 906) of the respective application at the first position in the three-dimensional environment (e.g., 904), the electronic device (e.g., 101) receives (1087), via the one or more input devices, a respective input for moving the respective representation (e.g., 906) of the respective application to a third position in the three-dimensional environment (e.g., 904). In response to receiving the respective input (1085), the electronic device (e.g., 101) displays (1083) the respective representation (e.g., 906) of the respective application at the third position in the three-dimensional environment. In response to receiving the respective input (1085), the electronic device (e.g., 101) displays (1081) the respective representation (e.g., 906) of the respective application with a respective orientation relative to the three-dimensional environment (e.g., 904) based on a relative position of the third position in three-dimensions with respect to the first arrangement of the viewpoint of the first user (e.g., 914A) and the viewpoint of the second user (e.g., 914B), such as in FIG. 9C. In some embodiments, the electronic device orients the respective representation towards the viewpoints of the first and second users in three dimensions. For example, if the respective representation is forward, above, and to the left of the viewpoint of the first user, the orientation of the respective representation is downward, back and to the right relative to the viewpoint of the first user. As another example, if a representation is moved towards or through the floor of the three-dimensional environment, the electronic device tilts the representation up. In this example, the further down the representation is moved, the further up the representation tilts. In some embodiments, the electronic device orients the respective representation towards the viewpoints of the first and second users in two dimensions (e.g., irrespective of the height of the users and/or the respective representation in the three-dimensional environment).

The above-described manner of displaying the respective representation with the respective orientation towards the viewpoints of the first and second users relative to three dimensions provides an efficient way of presenting the respective representation at an orientation that is visible from the viewpoints of the first and second users in the three-dimensional environment which additionally reduces power usage and improves battery life of the electronic device by enabling the user to use the electronic device more quickly and efficiently, while reducing errors in usage.

In some embodiments, such as in FIG. 9B, while displaying the respective representation (e.g., 906) of the respective application at the first position in the three-dimensional environment (e.g., 904), the electronic device (e.g., 101) receives (1079), via the one or more input devices, a respective input for moving the respective representation (e.g., 906) of the respective application to a third position in the three-dimensional environment. In some embodiments, in response to receiving the respective input (1077), the electronic device (e.g., 101) displays (1075) the respective representation (e.g., 906) of the respective application at the third position in the three-dimensional environment (e.g., 904). In some embodiments, in response to receiving the respective input (1077), in accordance with a determination that the third position is within a first region of the three-dimensional environment (e.g., 904), the electronic device (e.g., 101) displays (1073) the respective representation (e.g., 906) of the respective application with a first orientation relative to the three-dimensional environment based on the third position and the first arrangement of the viewpoint of the first user (e.g., 914A) and the viewpoint of the second user (e.g., 914B). In some embodiments, the first region of the three-dimensional environment is within a predetermined boundary of the viewpoints of the first user and the second user. In some embodiments, the first region of the three-dimensional environment is a threshold area surrounding all or a majority of the viewpoints of the users in the three-dimensional environment. In some embodiments, in response to receiving the respective input (1077), in accordance with a determination that the third position is within a second region, different from the first region, of the three-dimensional environment (e.g., 904), the electronic device (e.g., 101) displays (1071) the respective representation (e.g., 906) of the respective application with a second orientation, different from the first orientation, relative to the three-dimensional environment (e.g., 904) based on a relative (e.g., lateral, not perpendicular) position of the third position with respect to a boundary of the first region. In some embodiments, the second region is outside of the predetermined boundary from the viewpoints of the first and second users. In some embodiments, in accordance with the determination that the third position is within the second region, the respective orientation of the respective representation is the same as long as the third position is at a respective lateral position relative to the boundary of the first region irrespective of the (e.g., perpendicular) distance between the third position and the boundary of the first region. In some embodiments, in accordance with the determination that the third position is in the first region, the orientation of the respective representation optionally changes as the distance between the representation and the boundary of the first region changes even if the lateral position of the representation relative to the boundary of the first region remains the same. For example, while the respective representation moves along a line that is normal to the boundary of the first region, the orientation of the respective representation does not change while the respective representation is in the second region and the orientation of the respective representation may change as appropriate (e.g., based on the arrangement of the viewpoints of the first and second users) while the respective representation is in the first region in accordance with the position of the respective representation relative to the arrangement of the viewpoints of the first and second users.

The above-described manner of displaying the respective representation with an orientation based on the relative position of the representation and the boundary of the first region in accordance with a determination that the position of the representation is in the second region provides an efficient way of computing the orientation of the respective representation when the representation is in the second region, which additionally reduces power usage and improves battery life of the electronic device by reducing the complexity of a computation performed by the electronic device.

In some embodiments, in response to receiving the respective input (1069), such as in FIG. 9B, in accordance with a determination that the third position is within a third region that is between the first region and the second region in the three-dimensional environment (e.g., 904), the electronic device (e.g., 101) displays (1067) the respective representation (e.g., 906) of the respective application with a third orientation, different from the first and second orientations, relative to the three-dimensional environment (e.g., 904) based on the third position, the first arrangement of the viewpoint of the first user (e.g., 914A) and the viewpoint of the second user (e.g., 914B), and a relative (e.g., lateral, not perpendicular) position of the third position with respect to a boundary of the first region. In some embodiments, the degree to which the orientation is based on the first arrangement of the viewpoint of the first user and the viewpoint of the second user versus being based on the position of the representation relative to the boundary of the first region depends on whether the third position is closer to the first region or closer to the second region. In some embodiments, the closer the third position is to the first region, the more the orientation of the respective representation is based on the arrangement of the viewpoints of the first and second users and the closer the third position is to the second region, the more the orientation of the respective representation is based on the (e.g., lateral) position of the third position relative to the boundary of the first region.

The above-described manner of basing the position of the respective representation on the first arrangement of the viewpoints of the first and second users and the position of the representation relative to the boundary of the first region while the position of the representation is in the third region provides a gradual transition in the change in orientation of the representation as the representation moves from the first region to the second region which additionally reduces power usage and improves battery life of the electronic device by enabling the user to use the electronic device more quickly and efficiently (e.g., by making the orientation of the representation easier for the user to control), while reducing errors in usage.

In some embodiments, while displaying the respective representation (e.g., 906) of the respective application at the first position in the three-dimensional environment (e.g., 904), the electronic device (e.g., 101) receives (1065), via the one or more input devices, a respective input corresponding to a request to move the respective representation (e.g., 906) of the respective application to a third position between the viewpoint of the first user (e.g., 914A) and the viewpoint of the second user (e.g., 914B) in the three-dimensional environment. In some embodiments, in response to receiving the respective input (1063), in accordance with a determination that the respective representation (e.g., 906) of the respective application is viewable from a single direction, the electronic device (e.g., 101) moves (1061) the respective representation (e.g., 906) of the respective application to a fourth position, different from the third position, in the three-dimensional environment (e.g., 904), wherein the fourth position is not between the viewpoint of the first user (e.g., 914A) and the viewpoint of the second user (e.g., 914B). In some embodiments, in accordance with a determination that the respective representation is viewable from a plurality of directions, in response to the input to move the representation to the third position between the viewpoints of the first and second users, the electronic device displays the respective representation at the third position. In some embodiments, the fourth position is a predetermined threshold away from the third position. In some embodiments, in response to an input corresponding to a request to move the respective representation to the third position, the electronic device displays the representation at the fourth position instead. In some embodiments, while the movement input is being provided, the electronic device displays the representation at the third location and moves the representation to the fourth location in response to detecting the end of the movement input. In some embodiments, the electronic device does not display the representation at the third location while the input is being provided and displays the representation at the fourth location while the input corresponds to the third location.

The above-described manner of displaying the respective representation at the fourth position that is not between the viewpoints of the first and second users in accordance with the determination that the respective representation is visible from a single direction provides an efficient way of displaying the respective representation at a position and orientation that is visible to both the first and second users simultaneously, which additionally reduces power usage and improves battery life of the electronic device by enabling the user to use the electronic device more quickly and efficiently, while reducing errors in usage.

In some embodiments, the fourth position is on a first side of a respective region between the viewpoint of the first user (e.g., 914A) and the viewpoint of the second user (e.g., 914B) in the three-dimensional environment (e.g., 904) (1059). In some embodiments, while displaying the respective representation (e.g., 906) of the respective application at the fourth position in the three-dimensional environment (e.g., 904), the electronic device (e.g., 101) receives (1057), via the one or more input devices, an additional movement input corresponding to a request to move the respective representation (e.g., 906) towards the respective region, wherein the additional movement input is associated with a first movement amount. In some embodiments, the request is a request to move the respective representation in a direction towards the respective region to a position that is past the respective region (e.g., on a second side of the respective region opposite the first side). In some embodiments, in response to receiving the additional movement input (1055), in accordance with a determination that the first movement amount is less than a threshold movement amount, the electronic device (e.g., 101) continues (1053) to display the respective representation (e.g., 906) of the respective application on the first side of the respective region between the viewpoint of the first user (e.g., 914A) and the viewpoint of the second user (e.g., 914B). In some embodiments, the threshold movement amount is a first amount that corresponds to moving the respective representation a distance equal to the distance between the fourth position and a boundary of the respective region on the second side of the respective region that is opposite from the first side of the respective region. In some embodiments, the threshold movement amount is greater than the first amount. In some embodiments, in response to receiving the additional movement input (1055), in accordance with a determination that the first movement amount is greater than the threshold movement amount, the electronic device (e.g., 101) displays (1051) the respective representation (e.g., 906) of the respective application on a second side, different from the first side, of the respective region between the viewpoint of the first user (e.g., 914A) and the viewpoint of the second user (e.g., 914B). In some embodiments, the electronic device moves the respective representation through the respective region to the second side of the respective region. In some embodiments, the electronic device moves the respective representation to the second side of the respective region in response to detecting a movement amount that corresponds to a distance from the fourth position to the second side of the respective region. In some embodiments, if the movement amount is less than an amount corresponding to moving the representation through the respective region to the second side of the respective region, the electronic device continues displaying the representation on the first side of the respective region.

The above-described manner of displaying the respective representation on the first side of the respective region or on the second side of the respective region depending on the movement amount of the movement input provides an efficient way of avoiding placing the respective representation at a position that is not visible to both the first user and the second user, which additionally reduces power usage and improves battery life of the electronic device by enabling the user to use the electronic device more quickly and efficiently, while reducing errors in usage.

In some embodiments, displaying the respective representation (e.g., 906) of the respective application at the first position in the three-dimensional environment (e.g., 904) in response to receiving the input to display the respective representation of the respective application is based on the first arrangement of the viewpoint of the first user (e.g., 914A) and the viewpoint of the second user (e.g., 914B) and is not based on an orientation (e.g., which way the first user is facing in the three-dimensional environment) of the viewpoint of the first user (e.g., 914A) relative to the three-dimensional environment (e.g., 904) or an orientation (e.g., which way the second user is facing in the three-dimensional environment) of the viewpoint of the second user (e.g., 914B) relative to the three-dimensional environment (e.g., 904) (1049). In some embodiments, in accordance with a determination that the orientation of the viewpoint of the first user is a first orientation and the orientation of the viewpoint of the second user is a second orientation, the first position is a respective position in the three-dimensional environment. In some embodiments, in accordance with a determination that the orientation of the viewpoint of the first user is a third orientation different from the first orientation and/or the orientation of the viewpoint of the second user is a fourth orientation different from the second orientation, the first position is the respective position in the three-dimensional environment.

The above-described manner of displaying the respective representation at the first position irrespective of the orientations of the viewpoints of the first and second users provides an efficient way of selecting the first position which additionally reduces power usage and improves battery life of the electronic device by reducing the complexity of the calculation of the first position.

In some embodiments, the electronic device (e.g., 101) receives (1047), via the one or more input devices, a respective input corresponding to a request to display a respective representation (e.g., 908) of a second respective application in the three-dimensional environment (e.g., 904). In some embodiments, in response to receiving the respective input (1045), the electronic device (e.g., 101) displays (1043) the respective representation (e.g., 908) of the second respective application in the three-dimensional environment (e.g., 904). In some embodiments, in accordance with a determination that the respective input is associated with the first user (e.g., 914A), the respective representation (e.g., 908) of the second respective application is viewable by the first user (e.g., 914A) but not the second user (e.g., 914B), such as in FIG. 9B (1041). In some embodiments, the electronic device initially presents the second respective application in a private mode in which the second respective application is accessible to the first user without being accessible to (e.g., any) other users in three-dimensional environment. In some embodiments, in accordance with a determination that the respective input is associated with the second user (e.g., 914B), the respective representation (e.g., 908) of the second respective application is viewable by the second user (e.g., 914B) but not the first user (e.g., 914A) (1039). In some embodiments, the electronic device initially presents the second respective application in a private mode in which the second respective application is accessible to the first user without being accessible to (e.g., any) other users in three-dimensional environment. In some embodiments, in response to the respective input, the electronic device presents the second respective application in a shared mode in which other (e.g., all) users in the three-dimensional environment have access to the second respective application. In some embodiments, an item (e.g., attachment, file, virtual object) from a respective application inherits the sharing status of the respective application. For example, the electronic device displays a user interface of an e-mail application, including a message with an attachment and receives a request to display the attachment separately from the e-mail application. In this example, in response to the request to display the attachment separately, the electronic device displays the attachment with the same privacy mode (e.g., private or shared) as the privacy mode of the e-mail application. In some embodiments, the electronic device initially presents the second respective application in the shared mode in which other (e.g., all) users in the three-dimensional environment have access to the second respective application if the second respective application is opened as a result of device-provided suggestion to open the second respective application in the shared mode. In some embodiments, while the representation of the second respective application is visible to one first user in the three-dimensional environment, the electronic device detects selection of a selectable option to make the second respective application accessible to other (e.g., all) of the users in the three-dimensional environment. In some embodiments, the selectable option is displayed in association with the representation of the second respective application. In some embodiments, while the representation of the second respective application is visible to one first user only, the representation is displayed with a first visual characteristic (e.g., color or style of a border around the representation) and while the representation of the second respective application is visible to multiple (e.g., all) users in the three-dimensional environment, the representation is displayed with a second visual characteristic different from the first visual characteristic. In some embodiments, in response to a request to initiate display of the respective representation of the second respective application in a respective region of the three-dimensional environment associated with shared applications, the electronic device initially displays the representation of the second respective application such that the representation of the second respective application is accessible to multiple (e.g., all) users in the three-dimensional environment.

The above-described manner of presenting the second respective application such that the representation of the second respective application is only accessible to the user that requested display of the respective representation provides an efficient way of preserving the privacy of the user that requests display of the respective second application which additionally reduces power usage and improves battery life of the electronic device by enabling the user to use the electronic device more quickly and efficiently (e.g., by displaying the representation of the second respective application in the private mode without requiring an additional input specifying that the application should be displayed in the private mode), while reducing errors in usage.

In some embodiments, while displaying the respective representation (e.g., 908) of the second respective application that is viewable by the first user (e.g., 914A) but not the second user (e.g., 914B), such as in FIG. 9B, wherein the respective representation (e.g., 908) of the second respective application is displayed with a first appearance (e.g., position, size, orientation) relative to the viewpoint of the first user (e.g., 914A), the electronic device (e.g., 101) receives (1037), via the one or more input devices, an input corresponding to a request to make the respective representation (e.g., 908) of the second respective application viewable by the first user (e.g., 914A) and the second user (e.g., 914B), such as in FIG. 9B (e.g., a request to share the second respective application with the second user and/or other (e.g., all) of the users in the three-dimensional environment). In some embodiments, while the respective representation of the second respective application is displayed with the first appearance, the respective representation of the second respective application is displayed with a position and orientation that is oriented towards the viewpoint of the first user irrespective of the viewpoint of the second user. In response to receiving the input corresponding to the request to make the respective representation (e.g., 908) of the second respective application viewable by the first user (e.g., 914A) and the second user (e.g., 914B) (1035) such as in FIG. 9B, the electronic device (e.g., 101) updates (1033) the respective representation (e.g., 908) of the second respective application to be viewable by the first user (e.g., 914A) and the second user (e.g., 914B), including displaying the respective representation (e.g., 908) of the second respective application with a second appearance (e.g., size, position, orientation), different from the first appearance, relative to the viewpoint of the first user (e.g., 914B). In some embodiments, while the respective representation of the second respective application is displayed with the second appearance, the respective representation of the second application is displayed at a location and orientation that is oriented towards both viewpoints of the first and second users. In some embodiments, the representation moves from the viewpoint of both the first and second users. In some embodiments, the representation moves by no more than a threshold amount.

The above-described manner of updating the appearance of the respective representation of the second respective application in response to the request to make the respective representation of the second respective application viewable by the first and second users provides an efficient way of presenting the respective representation with an appearance that is easily visible to the first user and the second user, which additionally reduces power usage and improves battery life of the electronic device by enabling the user to use the electronic device more quickly and efficiently (e.g., by reducing the inputs needed to adjust the orientation of the respective representation after it is shared), while reducing errors in usage.

In some embodiments, such as in FIG. 9B, while displaying the respective representation (e.g., 908) of the second respective application that is viewable by the first user (e.g., 914A) but not the second user (e.g., 914B), wherein the respective representation of the second respective application is displayed with a first appearance (e.g., size, position, orientation) relative to the viewpoint of the first user (e.g., 914A), the electronic device (e.g., 101) receives (1031), via the one or more input devices, an input corresponding to a request to make the respective representation (e.g., 908) of the second respective application viewable by the first user (e.g., 914A) and the second user (e.g., 914B), such as in FIG. 9B (e.g., a request to share the second respective application with the second user and/or other (e.g., all) of the users in the three-dimensional environment). In some embodiments, while the respective representation of the second respective application is displayed with the first appearance, the respective representation of the second respective application is displayed with a position and orientation that is oriented towards the viewpoint of the first user irrespective of the viewpoint of the second user. In some embodiments, such as in FIG. 9C, in response to receiving the input corresponding to the request to make the respective representation (e.g., 9008) of the second respective application viewable by the first user (e.g., 914A) and the second user (e.g., 914B) (1029), the electronic device (e.g., 101) updates (1027) the respective representation (e.g., 908) of the second respective application to be viewable by the first user (e.g., 914A) and the second user (e.g., 914B) while maintaining display of the respective representation of the second respective application (e.g., 908) having the first appearance (e.g., size, position, orientation) relative to the viewpoint of the first user (e.g., 914A), such as in FIG. 9C. In some embodiments, the electronic device does not update the appearance of the respective representation of the second respective application until the respective representation of the second respective application is moved by the first user or the second user in the three-dimensional environment. In some embodiments, in response to an input to move the respective representation of the second respective application, the electronic device updates the position of the respective representation in accordance with the input and updates the orientation of the representation to be oriented towards the viewpoint of the first user and the viewpoint of the second user.

The above-described manner of maintaining the appearance of the respective representation of the second respective application in response to the request to make the respective representation visible to the first user and the second user provides an efficient way of sharing the respective representation of the second respective application with the second user without performing additional computations to change the appearance of the representation, which additionally reduces power usage and improves battery life of the electronic device by reducing the complexity of the operation to share the respective representation of the second respective application.

Figure 11B:
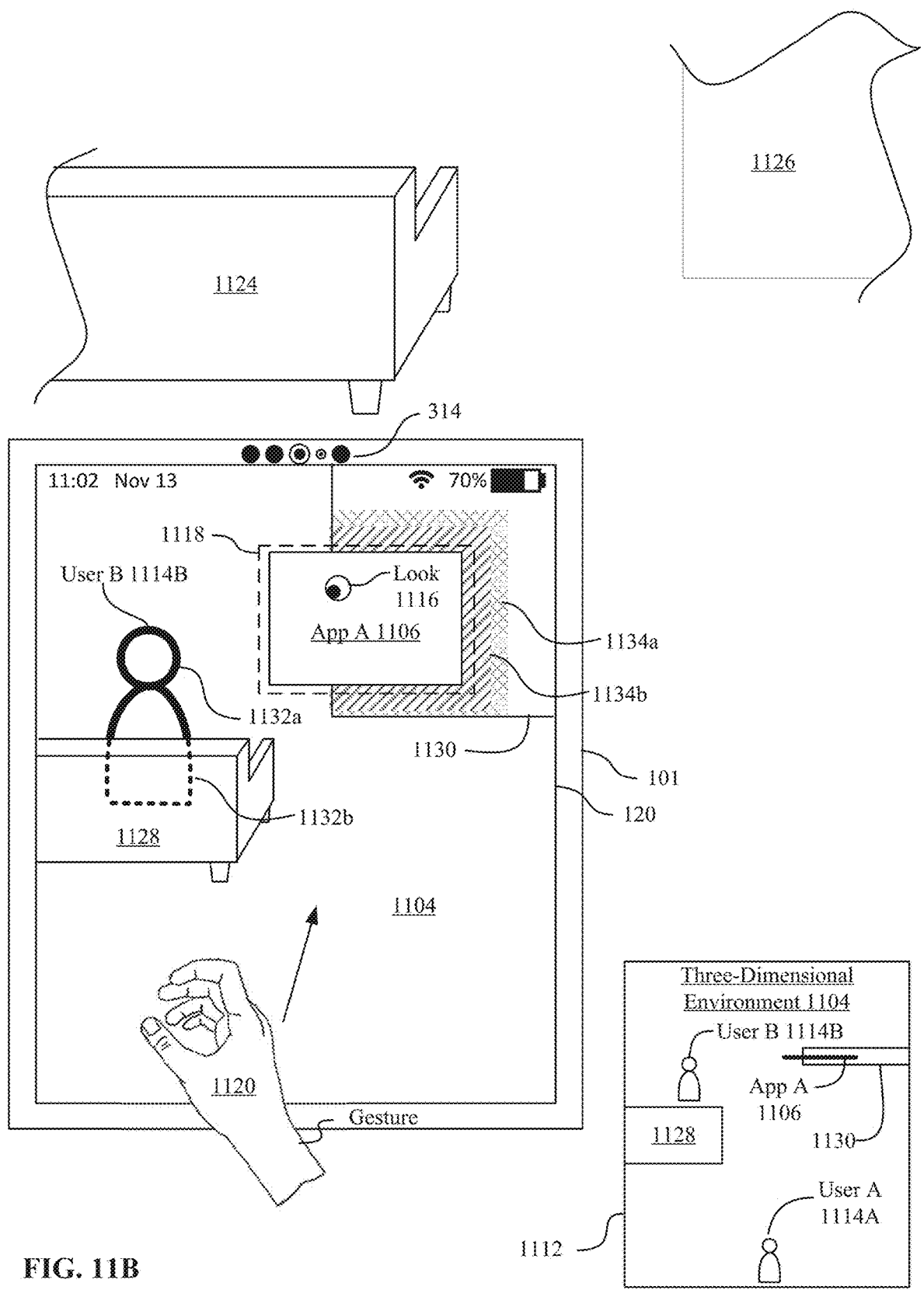
Figure 11C:
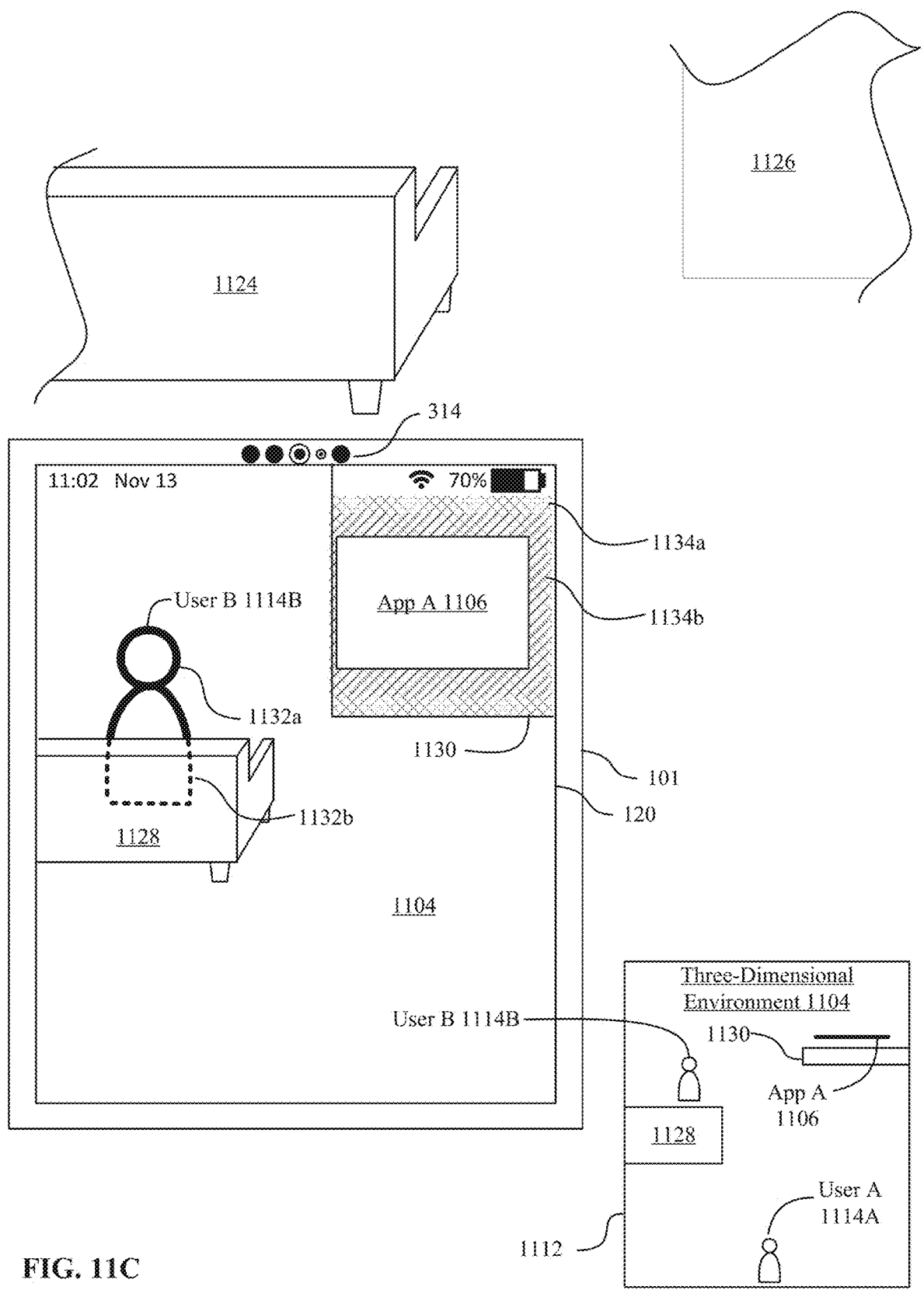
Figure 12A:
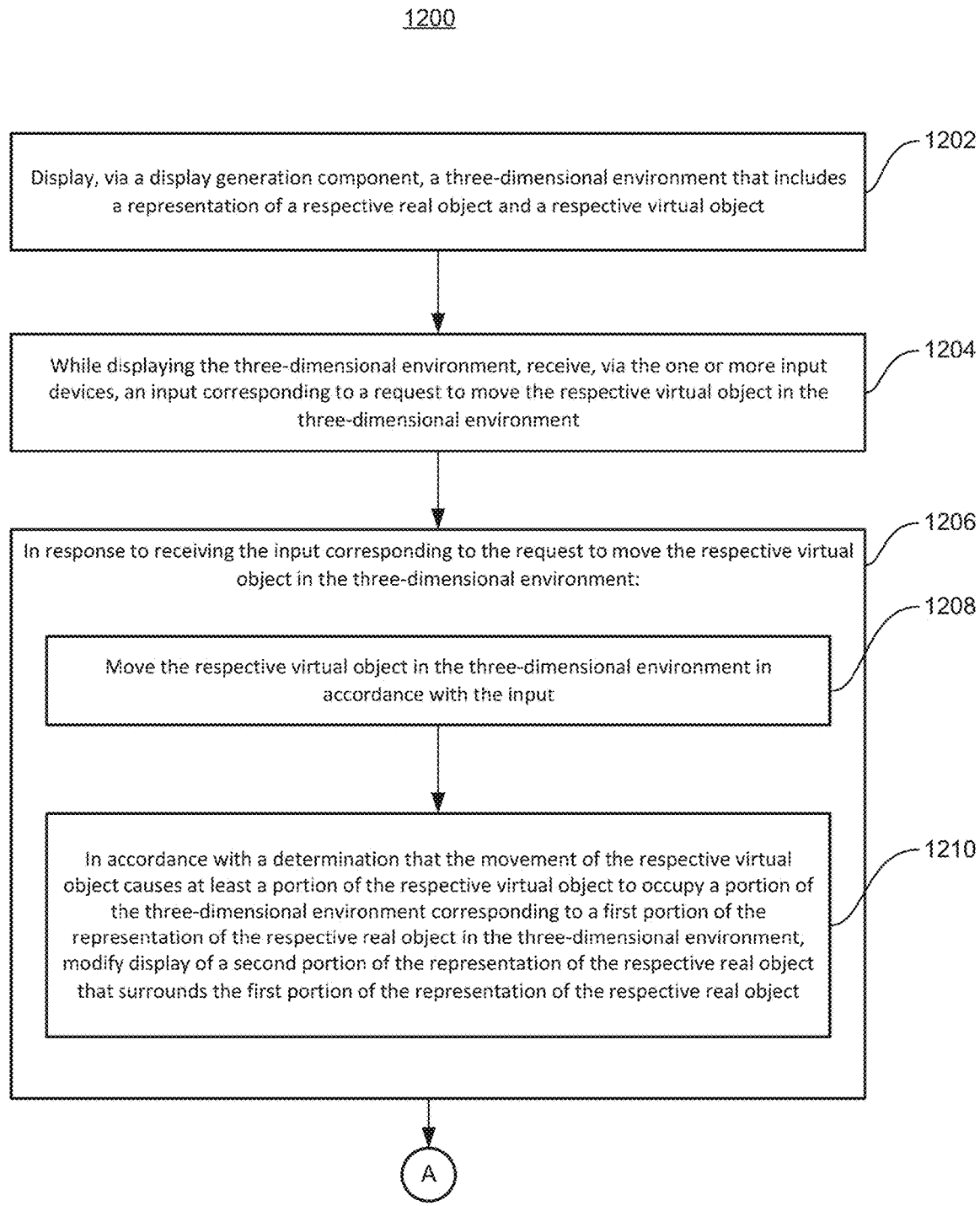
FIGS. 12A-12H is a flowchart illustrating a method of modifying an appearance of a real object that is between a virtual object and the viewpoint of a user in a three-dimensional environment in accordance with some embodiments.
Figure 12B:
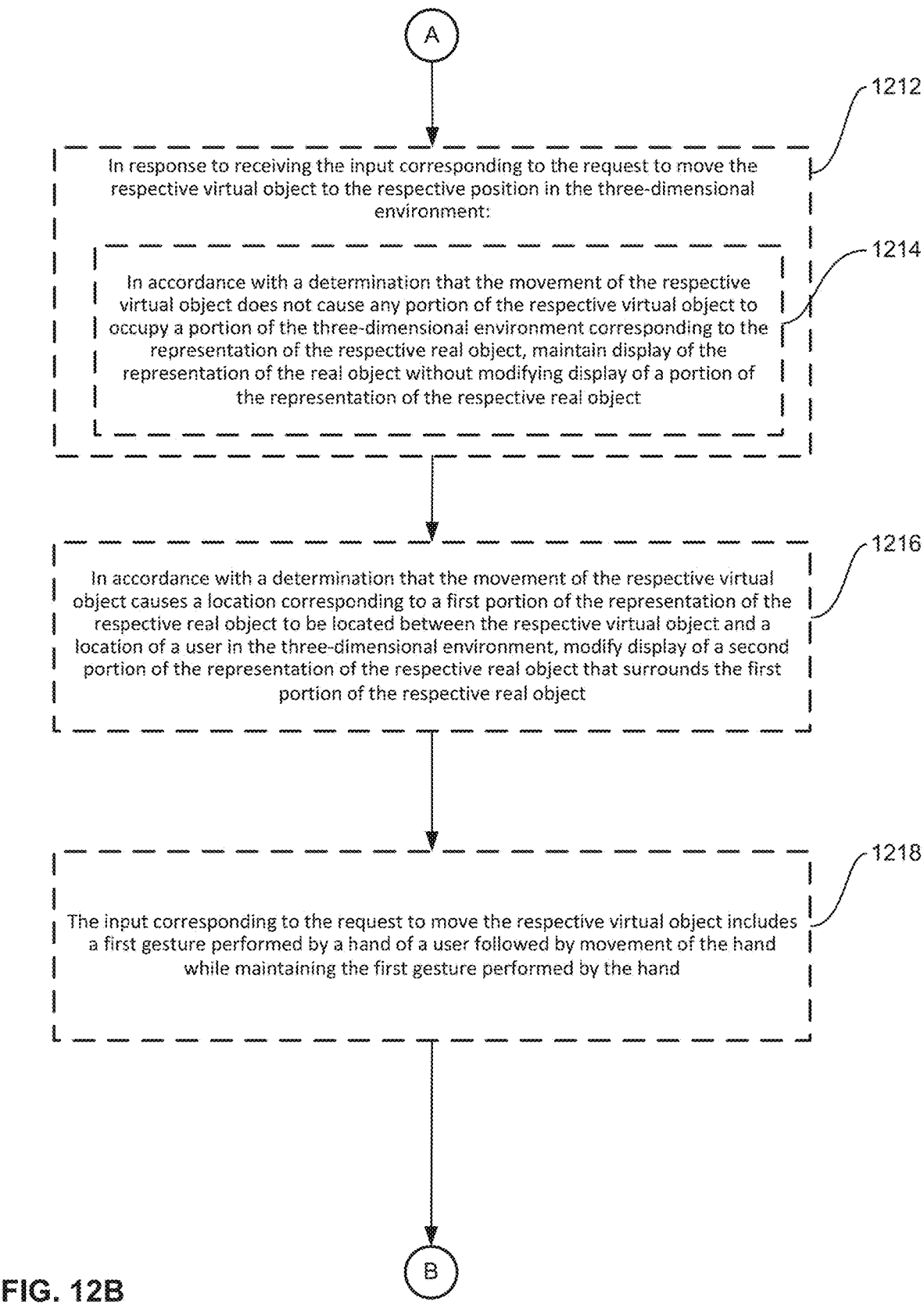
Figure 12C:
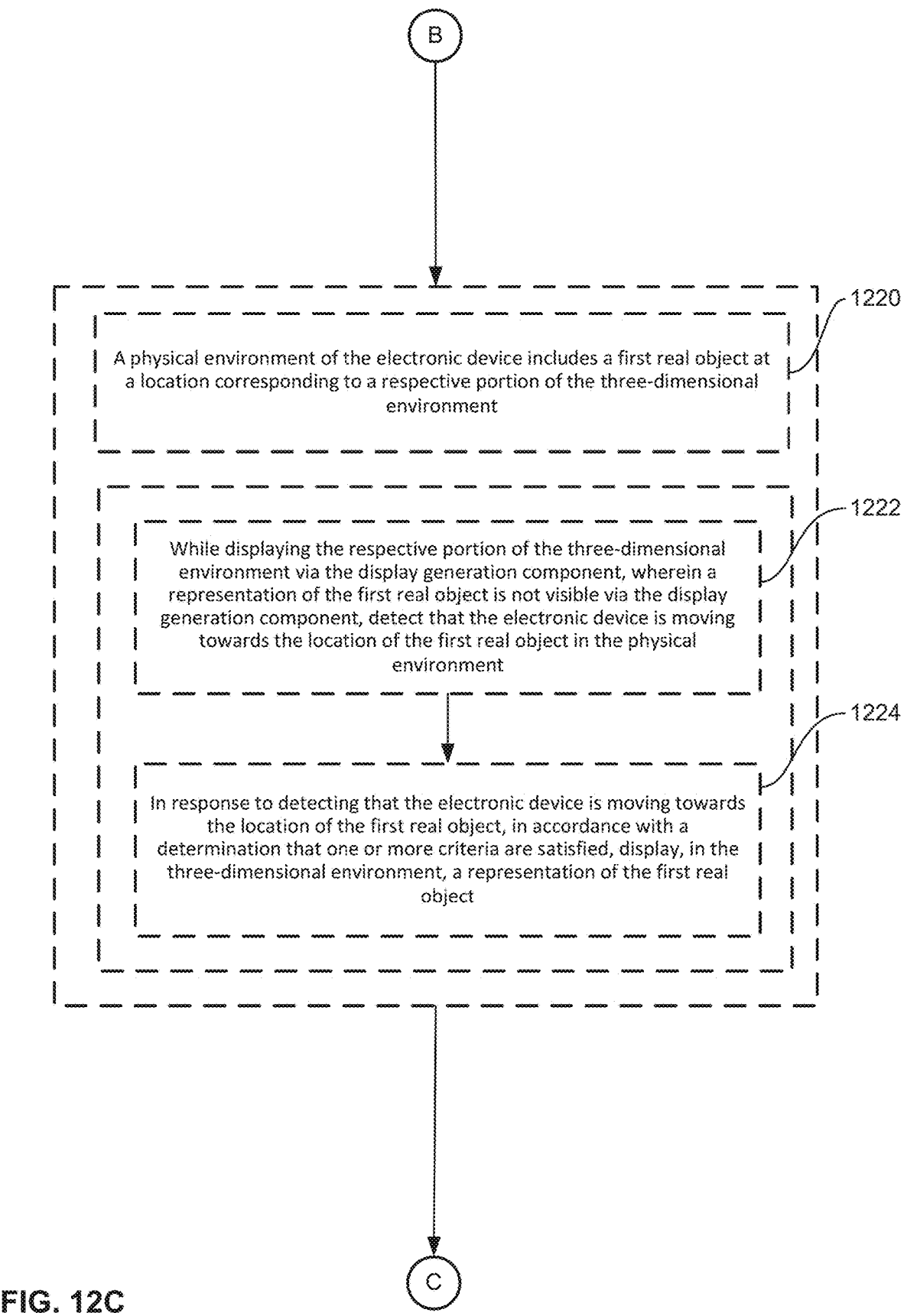
Figure 12D:
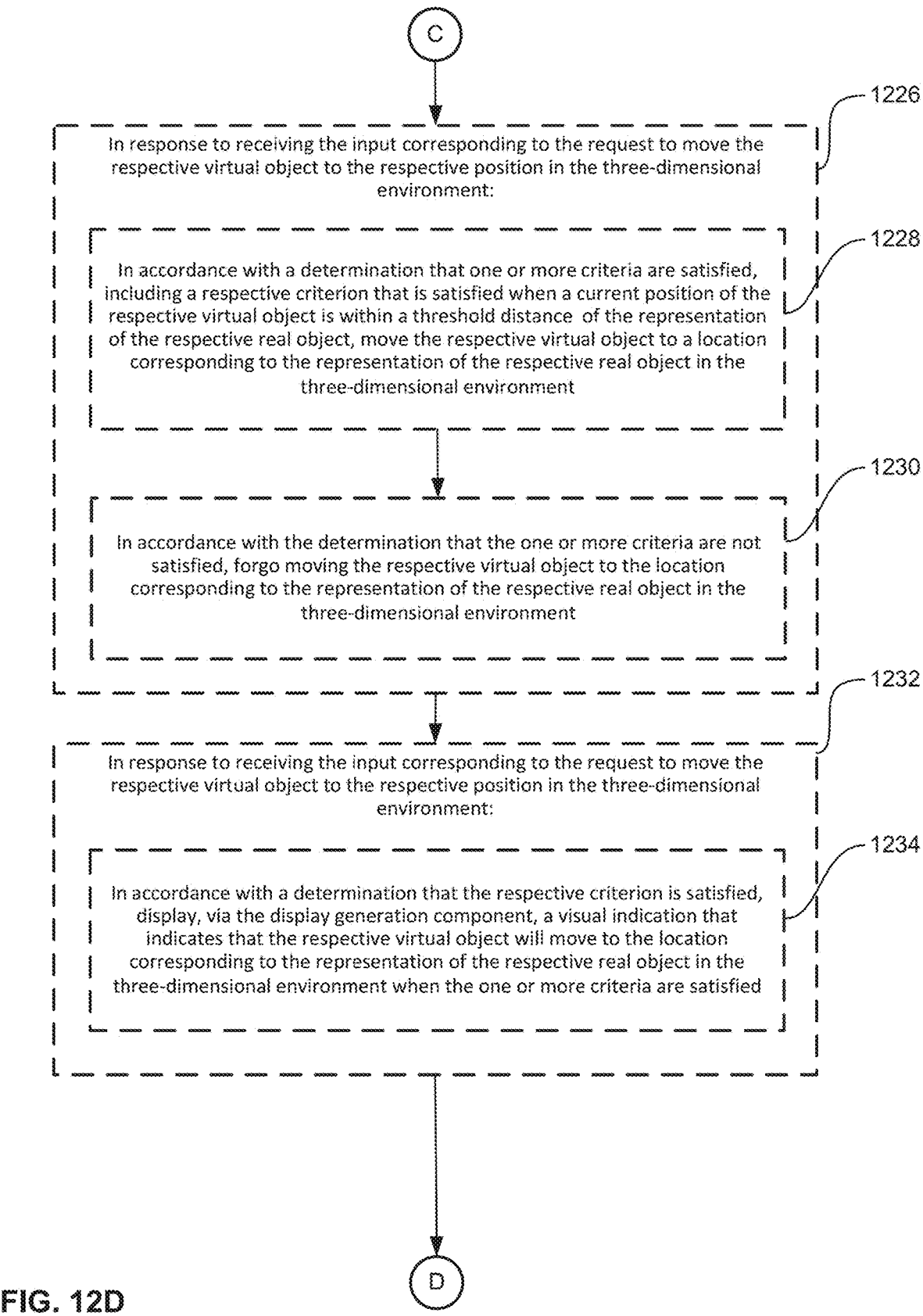
Figure 12E:
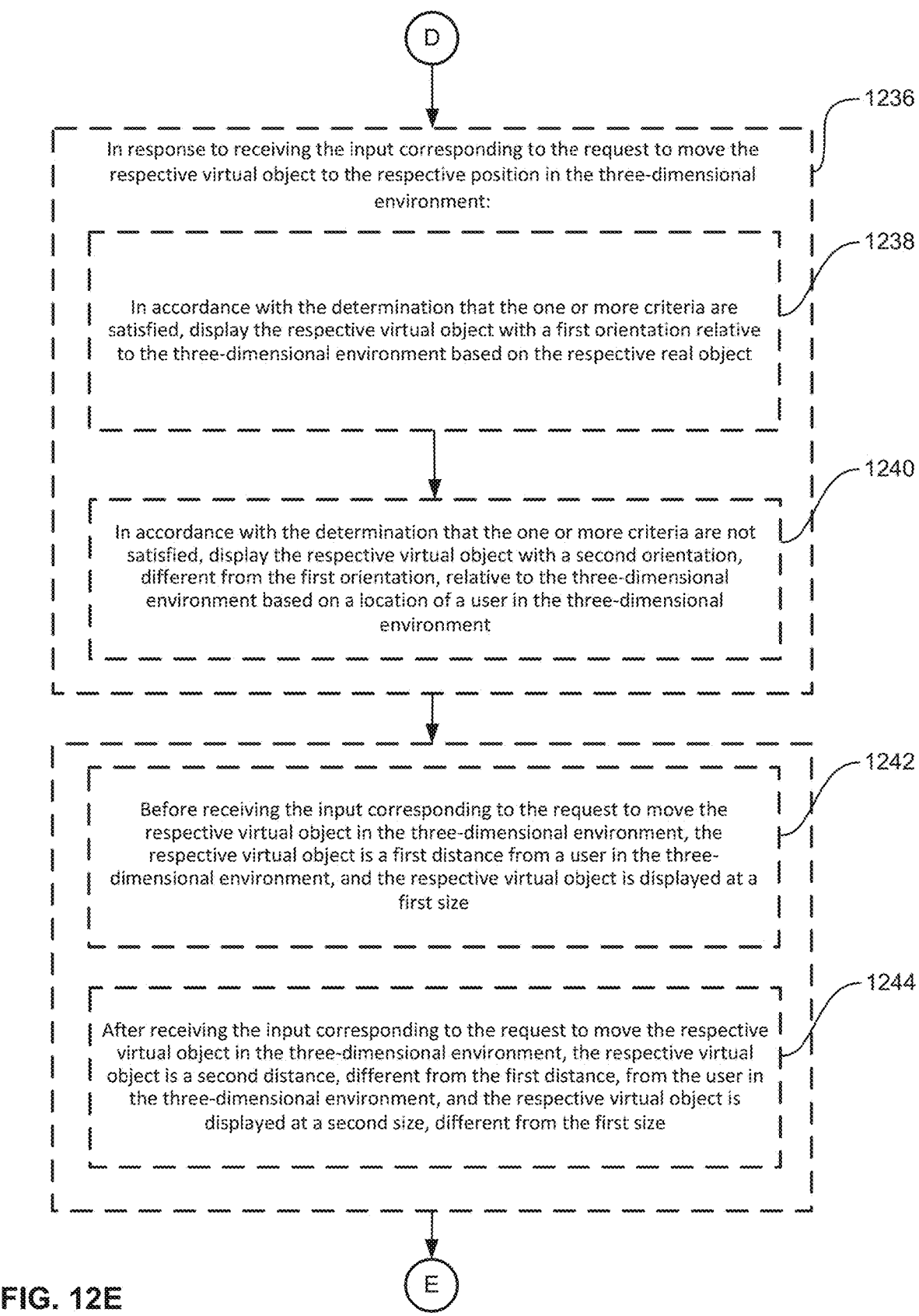
Figure 12F:
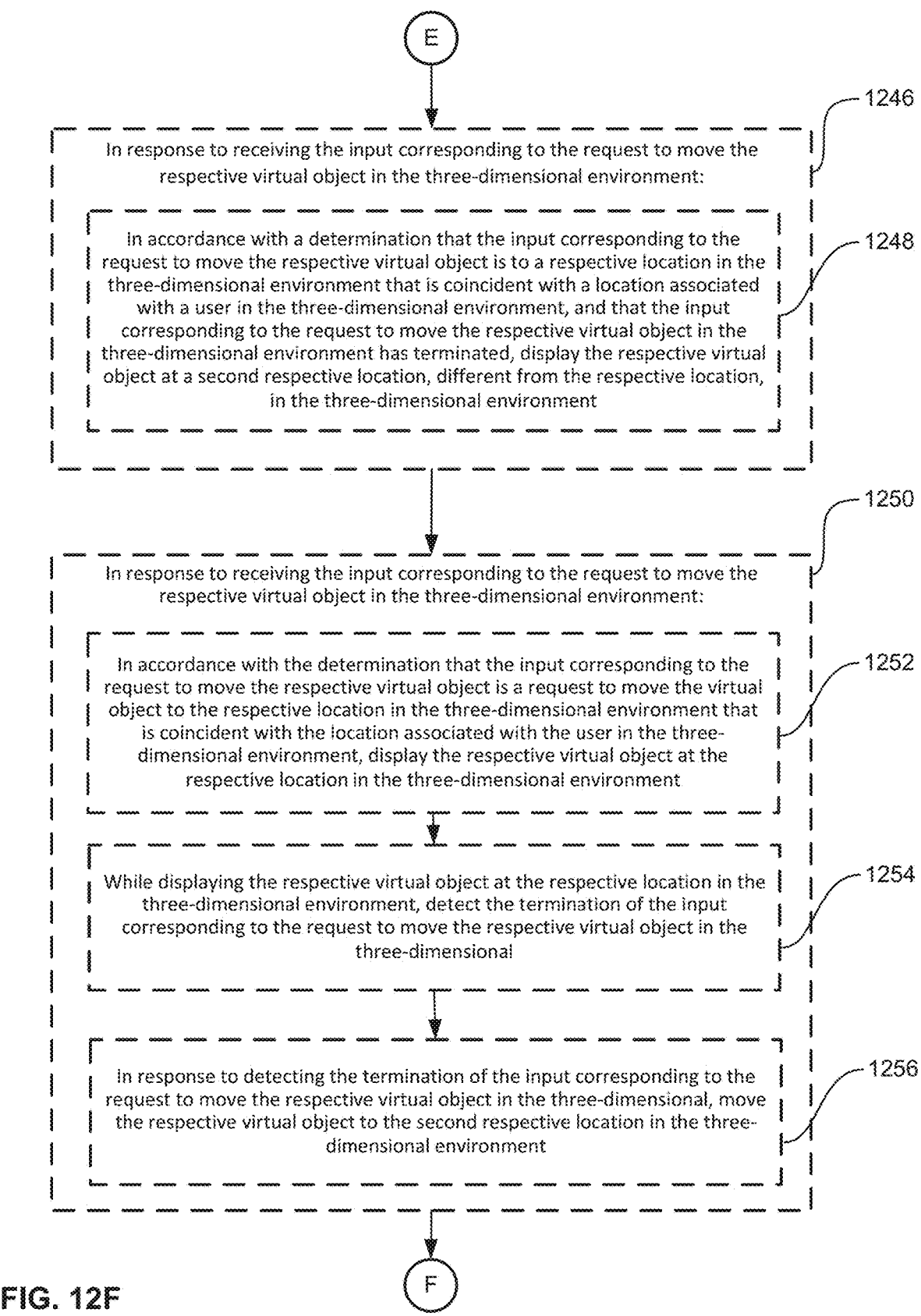
Figure 12G:
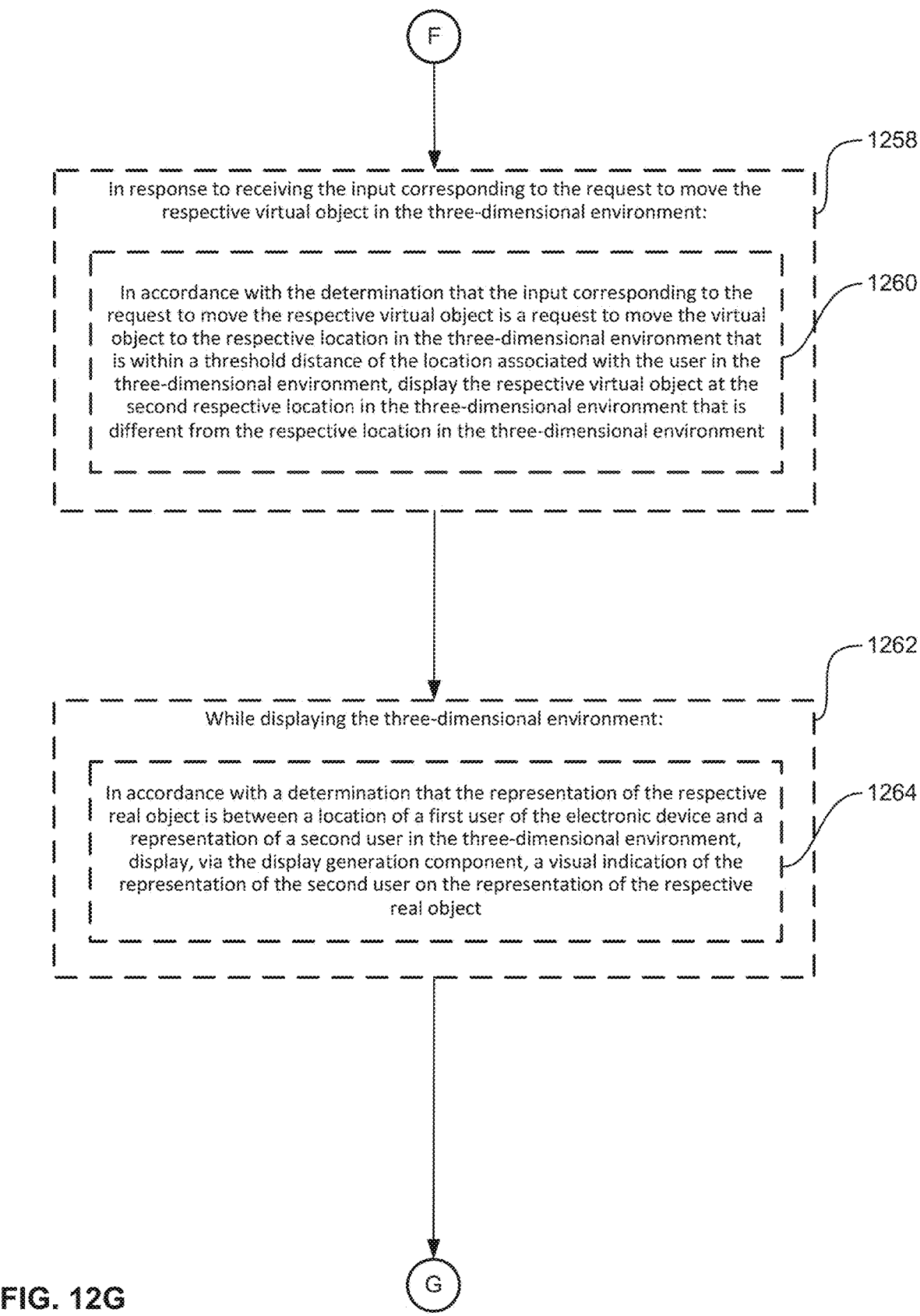
Figure 12H:
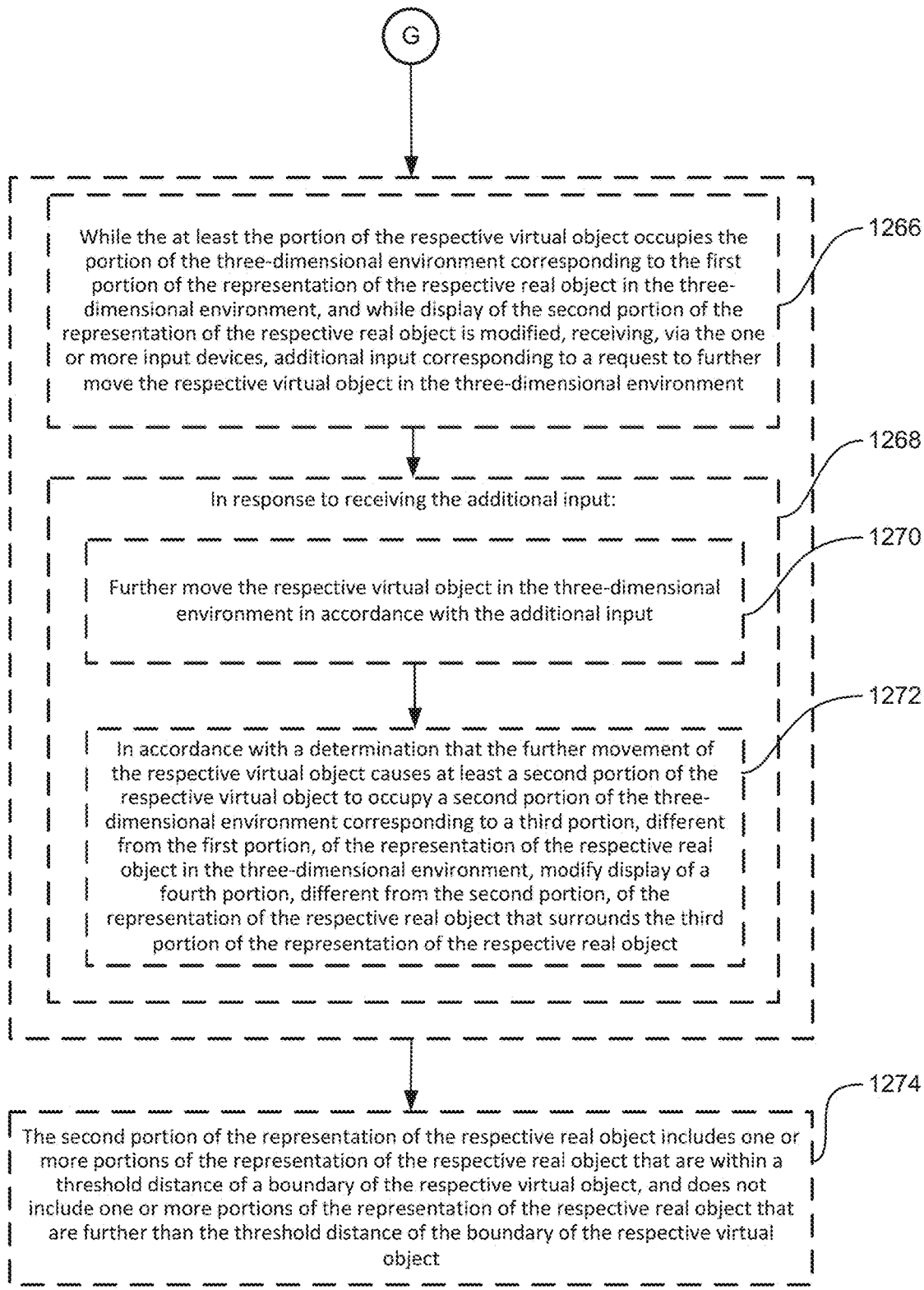

FIGS. 11A-11C illustrate examples of how an electronic device modifies an appearance of a real object that is between a virtual object and the viewpoint of a user in a three-dimensional environment in accordance with some embodiments.

FIG. 11A illustrates electronic device 101 displaying, via a display generation component 120, a three-dimensional environment 1104 on a user interface. As described above with reference to FIGS. 1-6, the electronic device 101 optionally includes a display generation component 120 (e.g., a touch screen) and a plurality of image sensors 314. The image sensors 314 optionally include one or more of a visible light camera, an infrared camera, a depth sensor, or any other sensor the electronic device 101 would be able to use to capture one or more images of a user or a part of the user while the user interacts with the electronic device 101. In some embodiments, display generation component 120 is a touch screen that is able to detect gestures and movements of a user's hand. In some embodiments, the user interfaces shown below could also be implemented on a head-mounted display that includes a display generation component that displays the user interface to the user and sensors to detect the physical environment and/or movements of the user's hands (e.g., external sensors facing outwards from the user), and/or gaze of the user (e.g., internal sensors facing inwards towards the face of the user).

In some embodiments, the physical environment of an electronic device 101 includes one or more physical objects. In FIG. 11A, the electronic device 101 is being used in a physical environment that includes a sofa 1124 and a wall 1126. The electronic device 101 displays a representation 1128 of the sofa 1124 and a representation 1130 of the wall 1126 in a three-dimensional environment 1104. In some embodiments, the representations 1128 and 1130 are photorealistic representations of the real objects 1124 and 1126 (e.g., "pass-through" video). In some embodiments, the representation 1128 and 1130 are portions of the physical objects 1124 and 1126 visible through a transparent portion of the display generation component 120 of electronic device 101.

The three-dimensional environment 1104 further includes the user of the electronic device 101, user A 1114A; a representation of another user, user B 1114B, in the three-dimensional environment 1104; and a representation 1106 of App A. Legend 1112 illustrates a bird's eye view of the three-dimensional environment 1104. The electronic device 101 displays the three-dimensional environment 1104 from the perspective of user A 1114A in the three-dimensional environment 1104. As shown in FIG. 11A, the representation 1128 of the sofa 1124 is positioned between user A 1114A and user B 1114B in the three-dimensional environment 1104. In some embodiments, when at least a portion of a user in the three-dimensional environment 1104 (e.g., user B 1114B) is obstructed by a representation of a real world object (e.g., representation 1128 of the sofa 1124), the electronic device 101 displays the obstructed portion of the user in a manner such that the obstructed portion of the user is visible through the representation of the real world object (e.g., so the user of the electronic device is able to see the obstructed portion of the user). For example, in FIG. 11A, the electronic device 101 displays a representation of user B 1114B that includes a portion 1132a that is unobstructed by the representation 1128 of the sofa 1124 and a portion 1132b that is obstructed by the representation 1128 of the sofa 1124. As shown in FIG. 11A, the portion 1132b of the representation of User B 1114B that is obstructed by the representation 1128 of the sofa 1124 is different from the portion 1132a of the representation of user B 1114B that is unobstructed by the representation 1128 of the sofa 1124 (e.g., formed of dashed lines instead of solid lines). In some embodiments, instead of using dashed lines, the electronic device 101 can modify portion 1132b of the representation of user B 1114B in a different manner, such as by increasing the translucency of, changing the colors of, or blurring the portion 1132b of the representation of user B 1114B that is obstructed by the representation 1128 of the sofa 1124. In this way, the electronic device 101 is able to display the entire representation of user B 1114B while indicating to user A 1114A that the representation 1128 of sofa 1124 is between user B 1114B and user A 1114A in the three-dimensional environment 1104. In some embodiments, if the entire representation of user B 1114B was obstructed by the representation 1128 of the sofa 1124, the electronic device 101 would display the entire representation of user B 1114B with the appearance of portion 1132b. In some embodiments, if the entire representation of user B 1114B was unobstructed by the representation 1128 of the sofa 1124, the electronic device 101 would display the entire representation of user B 1114B with the appearance of portion 1132a.

In some embodiments, the electronic device 101 modifies display of a representation of a real object in the physical environment of the electronic device 101 the representation of the real object is between a virtual object and a user in a three-dimensional environment 1104, as will now be described. As shown in FIG. 11A, three-dimensional environment 1104 includes a representation 1106 of App A. The representation 1106 of App A is optionally a user interface of an application that includes content on one side of representation 1105 (e.g., the side facing user A 1114A in the three-dimensional environment 1104). The electronic device 101 detects the gaze 1116 of user A 1114A on the representation 1106 of App A. In some embodiments, in response to detecting the gaze 1116 of user A 1114A on the representation 1106 of App A, the electronic device 101 displays an indication 1118 around representation 1106. Although FIG. 11A illustrates the indication 1118 as being a dashed line surrounding representation 1106, in some embodiments, the indication is a solid bar displayed along one edge of the representation 1106. While detecting the gaze 1116 of the user on representation 1106 (or on indication 1118), the electronic device 101 detects user A 1114A performing a gesture (e.g., touching a thumb to another finger (e.g., index, middle, ring, little finger) on the same hand as the thumb) with their hand 1120 and, in response, initiates a process to move the representation 1106 in the three-dimensional environment 1104. In some embodiments, the electronic device 101 moves the representation 1106 of App A in accordance with movement of the hand 1120 of user A 1114A while the user maintains the gesture. In some embodiments, in response to user A 1114A ceasing to perform the gesture with their hand 1120, the electronic device 101 ceases movement of the representation 1106 of App A.

In response to the input detected in FIG. 11A, the electronic device 101 updates the three-dimensional environment 1104 as shown in FIG. 11B. As shown in FIG. 11B, the representation 1106 of App A has been moved to a location in the three-dimensional environment 1104 at which the representation 1130 of the wall 1126 is displayed. Because at least a portion of the representation 1130 of the wall 1126 is between user A 1114A and the representation 1106 of App A (or because the representation 1106 of App A is within a threshold distance, such as 3, 6, 12 inches, of touching or being inside the representation 1130 of wall 1126), the electronic device 101 blurs a portion of the representation 1130 of the wall 1126. A portion 1134b of the representation 1130 surrounding representation 1106 that is within a threshold (e.g., 5, 10, 15, 20, 30, etc. centimeters) of the boundary of representation 1106 is displayed with a relatively high amount of blur and a portion 1134a of the representation 1130 surrounding representation 1106 that is within a threshold (e.g., 5, 10, 15, 20, 30, etc. centimeters) of the other portion 1134b of representation 1130 is displayed with a relatively low amount of blur. In some embodiments, portion 1134a of the representation 1130 of the wall 1126 is between the first threshold (e.g., 5, 10, 15, 20, 30 etc. centimeters) and a second threshold (e.g., 10, 15, 20, 30, 40, 60, 80, etc. centimeters) of the boundary of the representation 1106 of App A. In some embodiments, the representation 1130 of the wall 1126 includes additional portions (e.g., the portions partially surrounding portion 1134a) that are not blurred because they are not within the second threshold of the representation 1106 of App A 1106. In some embodiments, the electronic device 101 displays portions 1134a and 1134b of the representation 1130 with a gradient blur that is more blurred closer to the boundary of representation 1106. In some embodiments, the radius of the blur effect around the representation 1106 of App A is predetermined and portions of the representation 1130 of the wall 1126 that are further from the representation 1106 of App A than the predetermined radius are not blurred.

As shown in FIGS. 11A-11B, the electronic device 101 moves representation 1106 away from the user 1114A in the three-dimensional environment 1104. In some embodiments, in response to moving the representation 1106 away from the user, the electronic device 101 increases the size of representation 1106 in the three-dimensional environment 1104 (e.g., to maintain legibility of the representation 1106 displayed by display generation component 120). In some embodiments, the representation 1106 of App A is accessible to both user A 1114A and user B 1114B (e.g., user A 1114A and user B 1114B are both able to view, hear, and interact with the representation 1106 of App A) and the size of representation 1106 of App A is based on the distance between the representation 1106 and each of user A 1114*a* and user B 1114*b*, as described above with reference to FIGS. 9A-10T. In some embodiments, the representation 1106 of App A is accessible to user A 1114A without being accessible to user B 1114B (e.g., user A 1114A is able to see, hear, and interact with representation 1106 of App A, but user B 1114A is not) and the size of representation 1106 of App A is based on the distance between the representation 1106 and user A 1114*a* in the three-dimensional environment 1104 without being based on the distance between the representation 1106 and user B 1114*b* in the three-dimensional environment 1104, as described above with reference to FIGS. 7A-10T. In some embodiments, the size of representation 1106 is fixed in the three-dimensional environment 1104 regardless of the distance of representation 1106 from the user 1114A, as described above with reference to FIGS. 7A-10T.

As shown in FIG. 11B, the user provides an input to move the representation 1106 of App A further into the representation 1130 of the wall 1126. In FIG. 11B, the electronic device 101 detects the gaze 1116 of the user on representation 1106 (or on indication 1118 around representation 1106) while detecting the user performing a gesture (e.g., touching a thumb to another finger (e.g., index, middle, ring, little finger) on the same hand as the thumb) with their hand 1120. In response, the electronic device 101 initiates a process to move the representation 1106 of App A in accordance with movement of the user's hand 1120.

In response to the input illustrated in FIG. 11B, the electronic device 101 updates the position of representation 1106 of App A in the three-dimensional environment 1104 in accordance with the movement of the user's hand 1120, as shown in FIG. 11C. In FIG. 11C, the representation 1130 of the wall 1126 is between the updated location of the representation 1106 of App A and the location of user A 1114A in the three-dimensional environment 1104. The electronic device 101 displays the representation 1106 of App A at its updated location and blurs the portions 1134*a* and 1134*b* of the representation 1130 of the wall 1126 around the representation 1106 of App A as previously described. Because the location of the representation 1106 of App A is different in FIG. 11C than in FIG. 11B, the electronic device 101 blurs a different portions of the representation 1130 of the wall in FIG. 11C than in FIG. 11B (e.g., more of representation 1130 of wall 116 is blurred in FIG. 11C than in FIG. 11B, because more of representation 1106 overlaps with representation 1130 in FIG. 11C than in FIG. 11B).

Thus, in some embodiments, the electronic device 101 displays representations of other users and virtual objects in the three-dimensional environment 1104 even when representations of physical objects are between the user of the electronic device 101 and the other users and/or virtual objects in the three-dimensional environment 1104. In some embodiments, the electronic device 101 modifies the appearance of one or more objects in the three-dimensional environment 1104 in other ways. In some embodiments, the electronic device 101 forgoes display of one or more representations of one or more real objects in the physical environment of the electronic device 101 when displaying an immersive virtual environment. For example, the electronic device 101 forgoes display of the representations of one or more physical objects to display an immersive virtual environment, such as forgoing display of the representation 1128 of sofa 1124 and/or forgoing display of representation 1130 of wall 1126 in FIGS. 11A-11C while displaying representations of virtual objects and a virtual environment with display generation component 120. In some embodiments, in accordance with a determination that the electronic device 101 is moving towards a physical object and/or is within a threshold distance of a physical object, the electronic device 101 initiates display of a representation of at least a portion of the object. For example, while the electronic device 101 is not displaying the representation 1128 of the sofa 1124, the electronic device 101 detects the electronic device 101 moving towards the sofa 1124 in the physical environment of the electronic device 101. In this example, in response to detecting the electronic device 101 moving towards the sofa 1124, the electronic device 101 initiates display of the representation 1128 of the sofa 1124 in the three-dimensional environment 1104 (e.g., such as the display of representation 1128 of the sofa 1124 shown in FIG. 11A).

In some embodiments, the electronic device 101 facilitates additional interactions between virtual objects and representations of real objects in the three-dimensional environment 1104. For example, the electronic device 101 "snaps" virtual objects (e.g., representation 1106) to representations of real objects (e.g., furniture such as tables, sofas 1124, chairs, easels, shelves, etc.) and/or real surfaces (e.g., walls 1126, floors, countertops, etc.) in the physical environment of the electronic device 101 displayed in the three-dimensional environment 1104, such as representation 1106 being snapped to representation 1130 of wall 1126 if representation 1106 moves within a threshold distance (e.g., 10, 20, 30, 40, etc. centimeters) of representation 1130 of wall 1126. For example, in some embodiments, in response to an input to move a virtual object to a location within a threshold distance (e.g., 10, 20, 30, 40, etc. centimeters) of the real object or surface, the electronic device 101 displays the virtual object as though it is resting on (e.g., for a horizontal object or surface) or hanging from (e.g., for a vertical object or surface) the real object or surface. For example, while moving the representation 1106 of App A in FIG. 11B, in response to detecting that the representation 1106 of App A is within the threshold distance of the representation 1130 of wall 1126, the electronic device 101 displays the representation 1106 of App A as though it is hanging on the representation 1130 of wall 1126.

In some embodiments, while the input to move a virtual object is being provided, in accordance with a determination that the movement input corresponds to moving the virtual object within a threshold distance (e.g., 10, 20, 30, 40, etc. centimeters) of the real object or surface, the electronic device 101 displays an indication on the representation of the real object or surface that the virtual object will snap to the real object or surface in response to termination of the movement input. For example, while moving the representation 1106 of App A in FIG. 11B, the electronic device 101 displays an outline of the representation 1106 of App A that will be in contact with the representation 1130 of the wall 1126 in response to termination of the movement input when the representation 1106 of App A "snaps" to the representation 1130 of the wall 1126. In some embodiments, if a virtual object is "snapped" to a representation of a real object, the electronic device 101 forgoes updating the orientation of the virtual object in accordance with the location(s) of the user(s) in the three-dimensional environment 1104 because the orientation of the virtual object is determined based on the orientation of the real object or surface to which the virtual object is "snapped." For example, if the representation 1106 of App A is snapped to the representation 1130 of the wall 1126, the electronic device 101 displays the representation 1106 of App A parallel with the representation 1130 of the wall 1126 regardless of the position(s) of user A 1114A and/or user B 1114B in the three-dimensional environment 1104. In some embodiments, virtual objects that are not "snapped" to representations of real objects are displayed with orientations based on the location(s) of the user(s) in the three-dimensional environment 1104, as described above with reference to FIGS. 7A-10T.

In some embodiments, the electronic device 101 facilitates interactions between virtual objects and representations of users in the three-dimensional environment 1104. For example, as described above with reference to FIGS. 9A-10T, the electronic device 101 resists placing virtual objects within a threshold distance (e.g., 5, 10, 15, 30, 45, etc. centimeters) of representations of users in the three-dimensional environment 1104. For example, the electronic device 101 would resist placement of the representation 1106 of App within the threshold distance of the representation of user B 1114B in the three-dimensional environment 1104 in FIGS. 11A-11C similar to the way in which the electronic device 101 resisted placement of the representation 906 of App A within the threshold distance of user A 914A in three-dimensional environment 904 in FIGS. 9B-9C. Thus, in some embodiments, in response to an input corresponding to a request to display the representation 1106 of App A within the threshold distance of the representation of user B 1114, the electronic device 101 would display the representation 1106 of App A at a location that is the threshold distance away from the representation of user B 1114B in the three-dimensional environment 1104. In some embodiments, while the movement input is being provided, the electronic device 101 displays the representation 1106 of App A at a location that is the threshold distance away from the representation of user B 1114B in response to a movement input corresponding to moving the representation 1106 of App A to a location within the threshold distance of the representation of user B 1114B. In some embodiments, while the movement input is being provided, the electronic device 101 would display the representation 1106 of App A at a location corresponding to the request to move the representation 1106, including displaying the representation 1106 of App A within the threshold distance of the representation of user B 1114B and, in response to termination of the movement input, the electronic device 101 would display an animation of the representation 1106 of App A moving from the location within the threshold distance of the representation of user B 1114B to the location that is the threshold distance away from the representation of user B 1114B.

FIGS. 12A-12H is a flowchart illustrating a method of modifying an appearance of a real object that is between a virtual object and the viewpoint of a user in a three-dimensional environment in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, such as in FIG. 11A, method 1200 is performed at an electronic device (e.g., 101) in communication with a display generation component 120 and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device and/or a motion sensor (e.g., a hand tracking device, a hand motion sensor), etc.

In some embodiments, such as in FIG. 11A, the electronic device (e.g., 101) displays (1202), via the display generation component 120, a three-dimensional environment (e.g., 1104) that includes a representation (e.g., 1128) of a respective real object (e.g., 1124) (e.g., a pass-through object displayed in the user interface via the display generation component or a real world object visible through a portion of the display generation component that is at least partially transparent) and a respective virtual object (e.g., 1106). In some embodiments, the three-dimensional environment is generated, displayed, or otherwise caused to be viewable by the device (e.g., the three-dimensional environment is a computer-generated reality (CGR) environment such as a virtual reality (VR) environment, a mixed reality (MR) environment, or an augmented reality (AR) environment, etc.). In some embodiments, the three-dimensional environment includes features, such as boundaries and objects, including the respective real object, that correspond to features of a physical environment of the electronic device. For example, the respective real object is a representation of a physical object in the physical environment of the electronic device displayed at a virtual location in the three-dimensional environment that corresponds to the physical location of the physical object in the physical environment. In some embodiments, the real object is a pass-through object. In some embodiments, the physical object is visible through a portion of the display generation component that is at least partially transparent (e.g., the display generation component does not display a representation of the physical object). In some embodiments, the virtual object does not correspond to a physical object in the physical environment of the electronic device. In some embodiments, the virtual object is a representation of an application accessible to the electronic device, a file, an avatar of a user, or another user interface element.

In some embodiments, such as in FIG. 11A, while displaying the three-dimensional environment (e.g., 1104), the electronic device (e.g., 101) receives (1204), via the one or more input devices, an input corresponding to a request to move the respective virtual object (e.g., 1106) in the three-dimensional environment (e.g., 1104). In some embodiments, receiving the input includes detecting selection of the virtual object, an input corresponding to movement of the object, and/or an input ceasing selection of the virtual object. In some embodiments, detecting selection of the virtual object includes detecting, with an eye tracking device, that the user is looking at the virtual object for longer than a threshold period of time (e.g., 0.1, 0.2, 0.3, 0.4, 0.5, 0.75, 1 second, etc.). In some embodiments, detecting selection of the virtual object includes detecting, with a hand tracking device, that the user performs a predetermined gesture (e.g., virtually tapping the virtual object, touching their thumb to a respective finger (e.g., index finger, middle finger, ring finger, little finger)). In some embodiments, detecting selection of the virtual object includes detecting, via an input device in communication with the electronic device, selection of the virtual object, such as selection with a mouse, trackpad, touch screen, keyboard, or other input device. In some embodiments, detecting the input corresponding to movement of the virtual object includes detecting, via a hand tracking device, movement of the hand of the user, optionally while the hand is in a predetermined pose (e.g., tapping the thumb and a respective finger (e.g., index finger, middle finger, ring finger, little finger) together, extending one or more of the fingers, etc.). In some embodiments, detecting the input corresponding to movement of the virtual object includes detecting, via an input device in communication with the electronic device, a movement input, such as movement of a mouse, movement of a contact on a trackpad or touch screen, and/or selection of a key of a keyboard corresponding to a directional input. In some embodiments, detecting the input ceasing selection of the virtual object includes detecting, via a hand tracking device, a hand gesture meeting one or more criteria (e.g., ceasing to touch the thumb to a finger (e.g., index finger, middle finger, ring finger, little finger), ceasing to extend one or more fingers) and/or detecting the hand in a predetermined location that satisfied one or more criteria (e.g., lowering the hand from a position in front of the user to at the user's side). In some embodiments, receiving the input ceasing selection of the virtual object includes detecting, via an input device in communication with the electronic device, release of a selection input, such as liftoff of a contact on a touch sensitive surface and/or release of a mouse click or key press.

In some embodiments, such as in FIG. 11B, in response to receiving the input corresponding to the request to move the respective virtual object (e.g., 1106) in the three-dimensional environment (e.g., 1104) (1206), the electronic device 1208 moves the respective virtual object (e.g., 1106) in the three-dimensional environment (e.g., 1104) in accordance with the input. In some embodiments, the request to move the respective virtual object includes a direction component and a magnitude component. For example, a hand movement includes a direction component corresponding to the direction in which the hand moves and a magnitude component corresponding to the speed and/or distance by which the hand moves. As another example, a keyboard input includes a direction component corresponding to the key that was pressed and a magnitude component corresponding to the duration and/or number of key presses. In some embodiments, in response to the request to move the virtual object, the electronic device moves the virtual object in a direction corresponding to a direction of the input and/or by an amount corresponding to a magnitude of a movement component of the input.

In some embodiments, such as in FIG. 11B, in response to receiving the input corresponding to the request to move the respective virtual object in the three-dimensional environment (1206), in accordance with a determination that the movement of the respective virtual object causes at least a portion of the respective virtual object (e.g., 1106) to occupy a portion of the three-dimensional environment (e.g., 1104) corresponding to a first portion of the representation (e.g., 1130) of the respective real object (e.g., 1126) in the three-dimensional environment, the electronic device (e.g., 101) modifies (1210) display of a second portion (e.g., 1134*a*) of the representation (e.g., 1130) of the respective real object (e.g., 1126) that surrounds (e.g., or partially surrounds) the first portion (e.g., 1134*b*) of the representation (e.g., 1106) of the respective real object. In some embodiments, the display of the second portion of the real object is modified when the positions of the real object and the virtual object within the three-dimensional environment at least partially overlap, such as the location of the first portion of the real object being the same as a location of at least a portion of the virtual object or the virtual object being placed such that the real object is between the virtual object and a location corresponding to the user of the electronic device (e.g., a location of the vantage point at which the electronic device displays the three-dimensional environment). In some embodiments, modifying the display of the second portion of the respective real object includes displaying the second portion of the respective real object with reduced translucency, increased blur, different colors, or another difference compared to the display of the second portion of the respective real object while the location of the virtual object does not occupy a portion of the three-dimensional environment corresponding to a respective portion of the respective real object. In some embodiments, if the real object is visible through a transparent portion of the display generation component (e.g., the display generation component does not display the representation of the real object), the electronic device modifies the portion of the representation of the real object by displaying a portion of the real object overlaid on the location of the display generation component through which the real object is visible. In some embodiments, the real object includes a portion that is displayed in the same manner in which it was displayed before the electronic device received the input corresponding to the request to move the respective virtual object. In some embodiments, a portion of the real object that overlaps the virtual object is not displayed, even if the virtual position of the virtual object is behind the real object (e.g., from the perspective of the user). In some embodiments, in response to an input to move the virtual object to a location that overlaps the real object (e.g., from the perspective of the user), the electronic device displays a portion of the real object surrounding (or partially surrounding) the displayed virtual object with a modified appearance, such as a translucent, blurred, or otherwise modified appearance.

The above-described manner of modifying the display of the second portion of the respective real object in accordance with the determination that at least a portion of the respective virtual object occupies a portion of the three-dimensional environment corresponding to the first portion of the respective real object provides an efficient way of indicating the location of the respective virtual object when it otherwise may have been occluded by the respective real object, which additionally reduces power usage and improves battery life of the electronic device by enabling the user to use the electronic device more quickly and efficiently, while reducing errors in usage.

In some embodiments, in response to receiving the input corresponding to the request to move the respective virtual object (e.g., 1106) to the respective position in the three-dimensional environment (e.g., 1104) (1212), in accordance with a determination that the movement of the respective virtual object (e.g., 1106) does not cause any portion of the respective virtual object (e.g., 1106) to occupy a portion of the three-dimensional environment (e.g., 1104) corresponding to the representation (e.g., 1130) of the respective real object (e.g., 1126), the electronic device (e.g., 101) maintains (1214) display of the representation (e.g., 1130) of the real object (e.g., 1126) without modifying display of a portion of the representation (e.g., 1130) of the respective real object (e.g., 1126), such as in FIG. 11A. In some embodiments, if the respective virtual object momentarily occupies a portion of the three-dimensional environment corresponding to the representation of the respective real object while it is being moved, the electronic device displays the representation of the respective real object with a modified portion that surrounds the portion of representation of the real object that is at the same location as the respective virtual object while the respective virtual object overlaps the representation of the real object. In some embodiments, once the location of the respective virtual object does not include a portion of the representation of the real object and the real object is not in between the viewpoint of the user and the respective virtual object, the electronic device ceases modifying the portion of the representation of the real object.

The above-described manner of maintaining display of the representation of the real object without modifying display of a portion of the representation of the real object in accordance with the determination that the virtual object does not occupy a portion of the representation of the real object in the three-dimensional environment provides an efficient way of displaying movement of the respective virtual object without performing the additional operation of modifying the display of the representation of the real object, which additionally reduces power usage and improves battery life of the electronic device by reducing the complexity of device operations.

In some embodiments, in accordance with a determination that the movement of the respective virtual object (e.g., 1106) causes a location corresponding to a first portion of the representation (e.g., 1130) of the respective real object (e.g., 1126) to be located between the respective virtual object and a location of a user (e.g., 1114A) (e.g., a location corresponding to the viewpoint with the electronic device displays the three-dimensional environment) in the three-dimensional environment (e.g., 1104), such as in FIG. 11B, the electronic device (e.g., 101) modifies (1216) display of a second portion (e.g., 1134a) of the representation (e.g., 1130) of the respective real object (e.g., 1126) that surrounds (e.g., or partially surrounds) the first portion (e.g., 1134b) of the respective real object (e.g., 1126). In some embodiments, although the virtual object is fully or partially behind the real object from the viewpoint of the user, the electronic device displays the entire representation of the virtual object and modifies display of the portions of the real object adjacent to the representation of the virtual object.

The above-described manner of modifying display of the second portion of the representation of the respective real object in accordance with a determination that the movement of the respective real object causes a location corresponding to a first position of the representation of the respective real object to be located between the respective virtual object and the location of the user in the three-dimensional environment provides an efficient way of maintaining visibility of the virtual object in the three-dimensional environment, which additionally reduces power usage and improves battery life of the electronic device by enabling the user to use the electronic device more quickly and efficiently (e.g., by reducing the time and inputs needed to view the respective virtual object), while reducing errors in usage.

In some embodiments, such as in FIG. 11A, the input corresponding to the request to move the respective virtual object (e.g., 1106) includes a first gesture performed by a hand (e.g., 1120) of a user (e.g., 1114A) followed by movement of the hand (e.g., 1120) (e.g., or arm) while maintaining the first gesture performed by the hand (e.g., 1120) (1218). In some embodiments, the electronic device detects the gesture of the hand via a hand tracking device (e.g., one or more cameras, one or more depth sensors, one or more proximity or touch sensors, a touch screen, etc.). In some embodiments, the gesture is the user touching their thumb to a finger (e.g., index finger, middle finger, ring finger, little finger) of the same hand as the thumb. In some embodiments, the electronic device detects the user continuously touching the thumb and finger while moving the hand or arm. In some embodiments, the input corresponding to the request to move the respective virtual object includes detecting, via the eye tracking device, that the gaze of the user is on the respective virtual object while the first gesture is detected. In some embodiments, the electronic device updates the respective virtual object according to one or more steps of method 800 and/or 1000 in response to the input to move the respective virtual object.

The above-described manner of detecting a gesture performed by the hand of a user as an input corresponding to a request to move the respective virtual object provides an efficient way of accepting an input to move the virtual object which additionally reduces power usage and improves battery life of the electronic device by enabling the user to use the electronic device more quickly and efficiently, while reducing errors in usage.

In some embodiments, such as in FIG. 11B, a physical environment of the electronic device (e.g., 101) includes a first real object (e.g., 1124) at a location corresponding to a respective portion of the three-dimensional environment (e.g., 1104) (1220). In some embodiments, while displaying the respective portion of the three-dimensional environment (e.g., 1104) via the display generation component 120, wherein a representation (e.g., 1128) of the first real object (e.g., 1124) is not visible via the display generation component 120, the electronic device (e.g., 101) detects (1222) that the electronic device (e.g., 101) is moving towards the location of the first real object (e.g., 1124) in the physical environment. In some embodiments, the electronic device displays a portion of the three-dimensional environment corresponding to the location of the first real object in the physical environment of the electronic device without displaying the representation of the real object. For example, the electronic device displays a virtual object or user interface that obscures the location of the first real object. As another example, the electronic device displays the environment of the three-dimensional environment at the location of the first physical object without displaying a representation of the first physical object or in a manner that obscures the view of the first physical object through a transparent portion of the display generation component. In some embodiments, in response to detecting that the electronic device (e.g., 101) is moving towards the location of the first real object (e.g., 1124), in accordance with a determination that one or more criteria (e.g., criteria related to the distance between the electronic device and the first real object (e.g., the electronic device is closer than a threshold distance from the first real object), the speed of movement of the electronic device (e.g., the electronic device moves faster than a threshold speed towards the first real object)) are satisfied, the electronic device (e.g., 101) displays (1224), in the three-dimensional environment (e.g., 1104), a representation (e.g., 1128) of the first real object (e.g., 1124), such as in FIG. 11B. In some embodiments, the representation of the first real object "breaks through" display of one or more virtual objects or a virtual environment at the location in the three-dimensional environment corresponding to the location of the first real object in the physical environment of the electronic device. In some embodiments, the electronic device ceases display of one or more virtual objects and/or portions of a virtual environment displayed at a location of the display generation component through which the real object is visible (e.g., through a transparent portion of the display generation component). In some embodiments, the first real object only "breaks through" of a portion of the three-dimensional environment corresponding to the location of the first real object. In some embodiments, the first real object "breaks through" of the portion of the three-dimensional environment corresponding to the location of the real object and modifies and an additional portion (e.g., a portion of the three-dimensional environment within a threshold distance of the first real object, the whole three-dimensional environment). In some embodiments, the first real object "breaks through" the three-dimensional environment when the electronic device ceases display of one or more or all virtual elements in the regions of the three-dimensional environment that the first real object "breaks through". The above-described manner of displaying the representation of the first real object in response to detecting that the electronic device is moving towards the location of the first real object and that one or more criteria are satisfied provides an efficient way of presenting the first real object only when it is possible for the user to collide with the first real object and otherwise preserving display area for virtual content, which additionally reduces power usage and improves battery life of the electronic device by enabling the user to use the electronic device more quickly and efficiently, while reducing errors in usage.

In some embodiments, in response to receiving the input corresponding to the request to move the respective virtual object (e.g., 1106) to the respective position in the three-dimensional environment (e.g., 1104) (1226), such as in FIG. 11A, in accordance with a determination that one or more criteria are satisfied (e.g., close to physical object and selection/movement input has been terminated, such as the release of the movement gesture performed by the hand, the respective virtual object is a predetermined type of virtual object (e.g., content, application representation, virtual object (e.g., virtual television, board game, photo album), the real object is a predetermined type of real object (e.g., flat or vertical surface, floor, wall)), including a respective criterion that is satisfied when a current position of the respective virtual object (e.g., 1106) is within a threshold distance (e.g., 3, 6, 12 inches) of the representation (e.g., 1130) of the respective real object (e.g., 1126) (e.g., in the three-dimensional environment), the electronic device (e.g., 101) moves (1228) the respective virtual object (e.g., 1106) to a location corresponding to the representation (e.g., 1130) of the respective real object (e.g., 1126) in the three-dimensional environment (e.g., 1104). In some embodiments, the electronic device displays the respective virtual object so that it appears to rest on the respective real object. For example, the electronic device displays the respective virtual object to appear as though it is placed on a surface such as a floor, table, or other horizontal surface or to appear as though the object is hanging on a wall or other vertical surface. For example, in response to an input that corresponds to a request to move the respective virtual object to a location that is within a threshold distance above a floor in the physical environment of the electronic device, the electronic device displays the respective virtual object at a location that makes the respective virtual object appear to be placed on the floor. In some embodiments, such as in FIG. 11B, in accordance with the determination that the one or more criteria are not satisfied, the electronic device (e.g., 101) forgoes (1230) moving the respective virtual object (e.g., 1106) to the location corresponding to the representation (e.g., 1130) of the respective real object (e.g., 1126) in the three-dimensional environment (e.g., 1104). In some embodiments, the electronic device does not move the virtual object to the location corresponding to the representation of the real object until the end of the input to move the virtual object. For example, while the user is moving the virtual object, the electronic device displays the virtual object at locations corresponding to the movement without adjusting the locations to correspond to the real object. In some embodiments, the electronic device only displays the virtual object at the location corresponding to the real object if the movement input corresponds to a request to move the virtual object to a location within a threshold distance of the real object. For example, in response to an input to move the virtual object to a respective location that is greater than the threshold distance away from the real object, the electronic device displays the virtual object at the respective location rather than snapped to the real object.

The above-described manner of moving the respective virtual object to the location corresponding to the representation of the respective real object in the three-dimensional environment in accordance with the determination that the one or more criteria are satisfied provides an efficient way of moving the object to locations corresponding to real objects, which additionally reduces power usage and improves battery life of the electronic device by enabling the user to use the electronic device more quickly and efficiently (e.g., by reducing the time and/or number of inputs needed to place the virtual object at the location corresponding to the real object), while reducing errors in usage.

In some embodiments, in response to receiving the input corresponding to the request to move the respective virtual object (e.g., 1106) to the respective position in the three-dimensional environment (e.g., 1104) (1232) such as in FIG. 11A, in accordance with a determination that the respective criterion is satisfied (e.g., the virtual object is within the threshold distance of the real object in the three-dimensional environment), the electronic device (e.g., 101) displays (1234), via the display generation component, a visual indication that indicates that the respective virtual object (e.g., 1106) will move to the location corresponding to the representation (e.g., 1126) of the respective real object (e.g., 1130) in the three-dimensional environment (e.g., 1104) when the one or more criteria are satisfied. In some embodiments, the visual indication is an outline of a surface of the virtual object that will be in contact with the real object if the movement input is terminated while the virtual object is in its current position in the three-dimensional environment. For example, while detecting movement of a cone-shaped virtual object, in accordance with a determination that the virtual object is within the threshold distance of a real table in the physical environment, the electronic device displays an outline of the base of the cone (e.g., a dotted or dashed circle outline) at the location of the real table at which the cone will be placed if the movement input is terminated.

The above-described manner of displaying the visual indication in response to receiving the input corresponding to the request to move the respective virtual object to the respective position in the three-dimensional environment and that the respective criterion is satisfied provides an efficient way of informing the user that the virtual object will be moved to the location corresponding to the physical object which additionally reduces power usage and improves battery life of the electronic device by enabling the user to use the electronic device more quickly and efficiently (e.g., by reducing the time it takes to place the virtual object at the location corresponding to the real object), while reducing errors in usage.

In some embodiments, in response to receiving the input corresponding to the request to move the respective virtual object (e.g., 1106) to the respective position in the three-dimensional environment (e.g., 1104) (1236), such as in FIG. 11A, in accordance with the determination that the one or more criteria are satisfied, the electronic device (e.g., 101) displays (1238) the respective virtual object (e.g., 1106) with a first orientation relative to the three-dimensional environment (e.g., 1104) based on the respective real object (e.g., 1126). In some embodiments, the electronic device displays the virtual object with an orientation such that a surface of the virtual object that is at a location in the three-dimensional environment corresponding to the real object is parallel or substantially parallel to a surface of the real object that is closest to or in contact with the virtual object. Therefore, in some embodiments, the first orientation is not based on the location of the user in the three-dimensional environment, but is rather based on characteristics of the respective real object. In some embodiments, in response to receiving the input corresponding to the request to move the respective virtual object (e.g., 1106) to the respective position in the three-dimensional environment (e.g., 1104) (1236), in accordance with the determination that the one or more criteria are not satisfied, the electronic device (e.g., 101) displays (1240) the respective virtual object (e.g., 1106) with a second orientation, different from the first orientation, relative to the three-dimensional environment (e.g., 1104) based on a location of a user (e.g., 1114A) in the three-dimensional environment (e.g., 1104), such as in FIG. 11B (e.g., and not based on the characteristics of the respective real object). In some embodiments, the second orientation is directed towards a viewpoint of the user. In some embodiments, the second orientation is selected according to one or more steps of methods 800 or 1000.

The above-described manner of displaying the virtual object with a different orientation depending on whether the one or more criteria are satisfied provides an efficient way of placing the virtual object at a location associated with the physical object or placing the virtual object with an orientation that is easily visible to the user, which additionally reduces power usage and improves battery life of the electronic device by enabling the user to use the electronic device more quickly and efficiently (e.g., by reducing the time and inputs needed to display the virtual object with a desired orientation), while reducing errors in usage.

In some embodiments, before receiving the input corresponding to the request to move the respective virtual object (e.g., 1106) in the three-dimensional environment (e.g., 1104), the respective virtual object (e.g., 1106) is a first distance from a user (e.g., 1114A) in the three-dimensional environment (e.g., 1104), such as in FIG. 11A, and the respective virtual object (e.g., 1106) is displayed at a first size (1242). In some embodiments, after receiving the input corresponding to the request to move the respective virtual object (e.g., 1106) in the three-dimensional environment (e.g., 1104), such as in FIG. 11B, the respective virtual object (e.g., 1106) is a second distance, different from the first distance, from the user (e.g., 1114A) in the three-dimensional environment (e.g., 1104), and the respective virtual object (e.g., 1106) is displayed at a second size, different from the first size (1244). In some embodiments, the size of the respective virtual object is a virtual size of the object in the three-dimensional environment. In some embodiments, in response to an input moving the respective virtual object further from the viewpoint of the user in the three-dimensional environment, the electronic device increases the size of the virtual object. In some embodiments, moving the object further away and increasing the size of the virtual object causes the display generation component to use the same display area to display the virtual object even though it is further from the user. In some embodiments, the display area used to display the virtual object changes as the object is moved further away and the size of the object changes. In some embodiments, in response to an input to move the virtual object closer to the viewpoint of the user in the three-dimensional environment, the electronic device decreases the size of the virtual object. In some embodiments, moving the virtual object closer and decreasing the size of the virtual object causes the electronic device to use the same display area to display the virtual object even though the virtual object is closer to the user. In some embodiments, the display area used to display the virtual object changes as the object is moved closer and the size of the object changes. In some embodiments, in response to the request to move the virtual object, the electronic device updates the location of the virtual object and updates the orientation of the virtual object according to one or more steps of methods 800 and/or 1000.

The above-described manner of changing the size of the virtual object when the distance between the user and the virtual object in the three-dimensional environment changes provides an efficient way of displaying the virtual object at a size that is legible and allows space for other objects automatically when the object is moved, which additionally reduces power usage and improves battery life of the electronic device by enabling the user to use the electronic device more quickly and efficiently (e.g., by reducing the inputs needed to move and resize the virtual object), while reducing errors in usage.

In some embodiments, in response to receiving the input corresponding to the request to move the respective virtual object (e.g., 1106) in the three-dimensional environment (e.g., 1104) (1246), in accordance with a determination that the input corresponding to the request to move the respective virtual object (e.g., 1106) is to a respective location in the three-dimensional environment that is coincident with (e.g., or within a threshold distance (e.g., 0.1, 0.2, 0.3, 0.4, 0.5, 1, 2 etc. meters) of) a location associated with a user (e.g., 1114B) (e.g., the user of the electronic device or another user in the three-dimensional environment) in the three-dimensional environment (e.g., 1104), and that the input corresponding to the request to move the respective virtual object (e.g., 1106) in the three-dimensional environment (e.g., 1104) has terminated, the electronic device (e.g., 101) displays (1248) the respective virtual object (e.g., 1106) at a second respective location, different from the respective location, in the three-dimensional environment (e.g., 1104). In some embodiments, the electronic device displays an avatar corresponding to a first user at the location in the three-dimensional environment corresponding to the user. In some embodiments, the second respective location is a predetermined threshold distance (e.g., 0.1, 0.2, 0.3, 0.4, 0.5, 1, 2 etc. meters) away from the location associated with the user. In some embodiments, prior to detecting termination of the movement input, the electronic device displays the respective virtual object at the respective location. In some embodiments, prior to detecting termination of the movement input, the electronic device displays the virtual object at the second respective location and does not display the virtual object at the respective location at any time while the movement input is received. For example, while the user is providing the input to move the respective virtual object, the electronic device moves the respective virtual object in accordance with the input and displays the respective virtual object at the second respective location instead of the respective location when the movement input corresponds to moving the respective virtual object to the respective location. The above-described manner of displaying the virtual object at the second respective location in response to the movement input corresponding to a request to move the virtual object to the respective location coincident with a user in the three-dimensional environment provides an efficient way of displaying the virtual object at a location that is visible to the user which additionally reduces power usage and improves battery life of the electronic device by enabling the user to use the electronic device more quickly and efficiently, while reducing errors in usage.

In some embodiments, in response to receiving the input corresponding to the request to move the respective virtual object (e.g., 1106) in the three-dimensional environment (e.g., 1104) (1250), in accordance with the determination that the input corresponding to the request to move the respective virtual object (e.g., 1106) is a request to move the virtual object to the respective location in the three-dimensional environment (e.g., 1104) that is coincident with the location associated with the user (e.g., 1114B) (e.g., the user of the electronic device or another user in the three-dimensional environment) in the three-dimensional environment (e.g., 1104), the electronic device (e.g., 101) displays (1252) the respective virtual object (e.g., 1106) at the respective location in the three-dimensional environment (e.g., 1104). In some embodiments, while displaying the virtual object at the respective location in the three-dimensional environment, the electronic device ceases displaying a representation of the user. In some embodiments, while displaying the virtual object at the respective location in the three-dimensional environment, the electronic device modifies the transparency of one or more of the virtual object and a representation of the user so that both the virtual object and the representation of the user are visible in the three-dimensional environment. In some embodiments, in response to receiving the input corresponding to the request to move the respective virtual object (e.g., 1106) in the three-dimensional environment (1250), while displaying the respective virtual object (e.g., 1106) at the respective location in the three-dimensional environment (e.g., 1104), the electronic device (e.g., 101) detects (1254) the termination of the input corresponding to the request to move the respective virtual object (e.g., 1106) in the three-dimensional environment (e.g., 1104). In some embodiments, in response to receiving the input corresponding to the request to move the respective virtual object (e.g., 1106) in the three-dimensional environment (e.g., 1104) (1250), in response to detecting the termination of the input corresponding to the request to move the respective virtual object (e.g., 1106) in the three-dimensional environment (e.g., 1104), the electronic device (e.g., 101) moves (1256) the respective virtual object (e.g., 1106) to the second respective location in the three-dimensional environment (e.g., 1104). In some embodiments, while detecting the movement input, the electronic device displays the virtual object at the respective location and, in response to detecting the end of the movement input, the electronic device displays an animation of moving the virtual object from the respective location to the second respective location.

The above-described manner of moving the representation of the virtual object from the respective location to the second respective location in the three-dimensional environment provides an efficient way of displaying the virtual object at a location that makes the virtual object visible to the user which additionally reduces power usage and improves battery life of the electronic device by enabling the user to use the electronic device more quickly and efficiently, while reducing errors in usage.

In some embodiments, in response to receiving the input corresponding to the request to move the respective virtual object (e.g., 1106) in the three-dimensional environment (e.g., 1104) (1258), in accordance with the determination that the input corresponding to the request to move the respective virtual object (e.g., 1106) is a request to move the virtual object (e.g., 1106) to the respective location in the three-dimensional environment (e.g., 1104) that is within a threshold distance (e.g., 0, 1, 5, 10, 30, 100, etc. centimeters) of the location associated with the user (e.g., 1114B) (e.g., the user of the electronic device or another user in the three-dimensional environment) in the three-dimensional environment (e.g., 1104), the electronic device (e.g., 101) displays (1260) the respective virtual object (e.g., 1106) at the second respective location in the three-dimensional environment (e.g., 1104) that is different from the respective location in the three-dimensional environment (e.g., 1104). In some embodiments, the electronic device displays the virtual object at the second respective location instead of the respective location while the movement input is being detected by the electronic device. In some embodiments, the electronic device displays an avatar corresponding to the user at the respective location in the three-dimensional environment. In some embodiments, the second respective location is the threshold distance away from the location associated with the user. In some embodiments, while the user is providing the input to move the respective virtual object, the electronic device moves the respective virtual object in accordance with the input (e.g., towards the location associated with the user) and displays the respective virtual object at the second respective location instead of the respective location when the movement input corresponds to moving the respective virtual object to the respective location. In some embodiments, while the movement input is being provided, the electronic device displays the virtual object at the respective location and, in response to detecting an end of the movement input while the virtual object is at the respective location, the electronic device presents an animation of moving the virtual object from the respective location to the second respective location in the three-dimensional environment.

The above-described manner of displaying the virtual object at the second respective location instead of the respective location while the movement input is being detected provides an efficient way of informing the user of the location at which the virtual object will be displayed in response to the movement input, which additionally reduces power usage and improves battery life of the electronic device by enabling the user to use the electronic device more quickly and efficiently, while reducing errors in usage.

In some embodiments, such as in FIG. 11A, while displaying the three-dimensional environment (e.g., 1104) (1262), in accordance with a determination that the representation (e.g., 1128) of the respective real object (e.g., 1124) is between a location of a first user (e.g., 1114A) of the electronic device and a representation of a second user (e.g., 1114B) in the three-dimensional environment (e.g., 1104), the electronic device (e.g., 101) displays (1264), via the display generation component, a visual indication (e.g., 1132b) of the representation of the second user (e.g., an avatar of the second user) on the representation (e.g., 1128) of the respective real object (e.g., 1124). In some embodiments, the visual indication of the second user (e.g., the avatar of the second user) is displayed with a different visual characteristic while the real object is between the first and second users in the three-dimensional environment than a visual characteristic with which the representation of the second user is displayed when there are no objects between the first and second users in the three-dimensional environment. For example, while the real object is between the first user and the second user, the electronic device displays a transparent, translucent, outlined, or other version of the representation of the second user on or through the representation of the real object. In some embodiments, the electronic device ceases display of the representation of the second user in accordance with a determination that the distance between the first user and the second user in the three-dimensional environment exceeds a predetermined threshold. In some embodiments, in accordance with a determination that a portion of the avatar of the second user is blocked by a real object (e.g., the avatar is behind an object that is shorter than the avatar, the avatar has a first horizontal portion that is behind the real object from the viewpoint of the user and a second horizontal portion that is not behind a real object from the viewpoint of the user), the portion of the avatar of the second user that is blocked by the real object is displayed with the modified visual characteristic and the portion of the avatar that is not blocked by the real object is displayed with the unmodified visual characteristic.

The above-described manner of displaying the visual indication of the representation of the second user on the representation of the real object provides an efficient way of displaying both the visual indication of the representation of the second user and the representation of the real object which additionally reduces power usage and improves battery life of the electronic device by enabling the user to use the electronic device more quickly and efficiently, while reducing errors in usage.

In some embodiments, such as in FIG. 11B, while the at least the portion of the respective virtual object (e.g., 1106) occupies the portion of the three-dimensional environment (e.g., 1104) corresponding to the first portion (e.g., 1134b) of the representation (e.g., 1130) of the respective real object (e.g., 1126) in the three-dimensional environment (e.g., 1104), and while display of the second portion (e.g., 1134b) of the representation (e.g., 1130) of the respective real object (e.g., 1126) is modified, the electronic device (e.g., 101) receives (1266), via the one or more input devices, additional input corresponding to a request to further move the respective virtual object (e.g., 1106) in the three-dimensional environment (e.g., 1104) (e.g., detecting a second movement input or detecting continuation of the movement input). In some embodiments, such as in FIG. 11C, in response to receiving the additional input (1268), the electronic device (e.g., 101) further moves the respective virtual object (e.g., 1106) in the three-dimensional environment (e.g., 1104) in accordance with the additional input (1270). In some embodiments, such as in FIG. 11C, in response to receiving the additional input (1268), in accordance with a determination that the further movement of the respective virtual object (e.g., 1106) causes at least a second portion of the respective virtual object (e.g., 1106) to occupy a second portion of the three-dimensional environment (e.g., 1104) corresponding to a third portion, different from the first portion, of the representation (e.g., 1130) of the respective real object (e.g., 1126) in the three-dimensional environment (e.g., 1104), the electronic device (e.g., 101) modifies (1272) display of a fourth portion (e.g., 1134b), different from the second portion, of the representation (e.g., 1130) of the respective real object (e.g., 1126) that surrounds the third portion of the representation (e.g., 1130) of the respective real object (e.g., 1126). In some embodiments, modifying display of the fourth portion of the representation of the real object includes blurring and/or darkening the portion. In some embodiments, the portion of the real object that is displayed with a modified appearance depends on the portion of the real object that is coincident with or overlapping the virtual object. For example, the electronic device modifies the appearance of the portion of the real object that is adjacent to the portion of the real object that is coincident with or overlapping the virtual object. As another example, while a first portion of the virtual object is coincident with or overlapped by a first portion of the real object, the electronic device displays a second portion of the virtual object proximate to the first portion of the real object with the modified appearance and displays the entire virtual object. In this example, in response to an input to move the virtual object such that a second, larger portion of the virtual object is coincident with or overlapped by a third portion of the real object, the electronic device displays a fourth portion of the real object with the modified appearance and displays the entire virtual object. In some embodiments, as the electronic device detects an input to move the virtual object in a way that changes the portion of the real object that is coincident with or overlapping the virtual object, the electronic device updates display of the real object to modify display of a portion of the real object that is proximate to the portion of the real object that is currently coincident with or overlapping the real object.

The above-described manner of modifying the portion of the real object that is displayed with the modified appearance depending on the position of the virtual object provides an efficient way of displaying the virtual object with reduced visual clutter and cognitive dissonance, which additionally reduces power usage and improves battery life of the electronic device by enabling the user to use the electronic device more quickly and efficiently (e.g., by reducing discomfort and/or distraction of the user), while reducing errors in usage.

In some embodiments, such as in FIG. 11C, the second portion (e.g., 1134a) of the representation (e.g., 1130) of the respective real object (e.g., 1126) includes one or more portions of the representation (e.g., 1130) of the respective real object (e.g., 1126) that are within a threshold distance of a boundary of the respective virtual object (e.g., 1106), and does not include one or more portions of the representation (e.g., 1130) of the respective real object (e.g., 1126) that are further than the threshold distance of the boundary of the respective virtual object (e.g., 1106) (1274). In some embodiments, the degree to which portions of the real object are modified (e.g., blurred and/or darkened) depends on the distance between the respective portions of the real object and the virtual object. For example, a portion of the real object that is directly adjacent to the virtual object are modified more than a portion of the real object that is further away from the virtual object. In some embodiments, one or more portions of the real object that are a threshold distance (e.g., 0.1, 0.2, 0.3, 0.4, 0.5, etc. meters) away from the real object are displayed with an unmodified appearance.

The above-described manner of modifying the portions of the real object that are within a threshold distance of the virtual object provides an efficient way of maintaining unmodified display of other portions of the real object which additionally reduces power usage and improves battery life of the electronic device by enabling the user to use the electronic device more quickly and efficiently (e.g., by enabling the user to see unmodified portions of the real object), while reducing errors in usage.

Figure 13B:
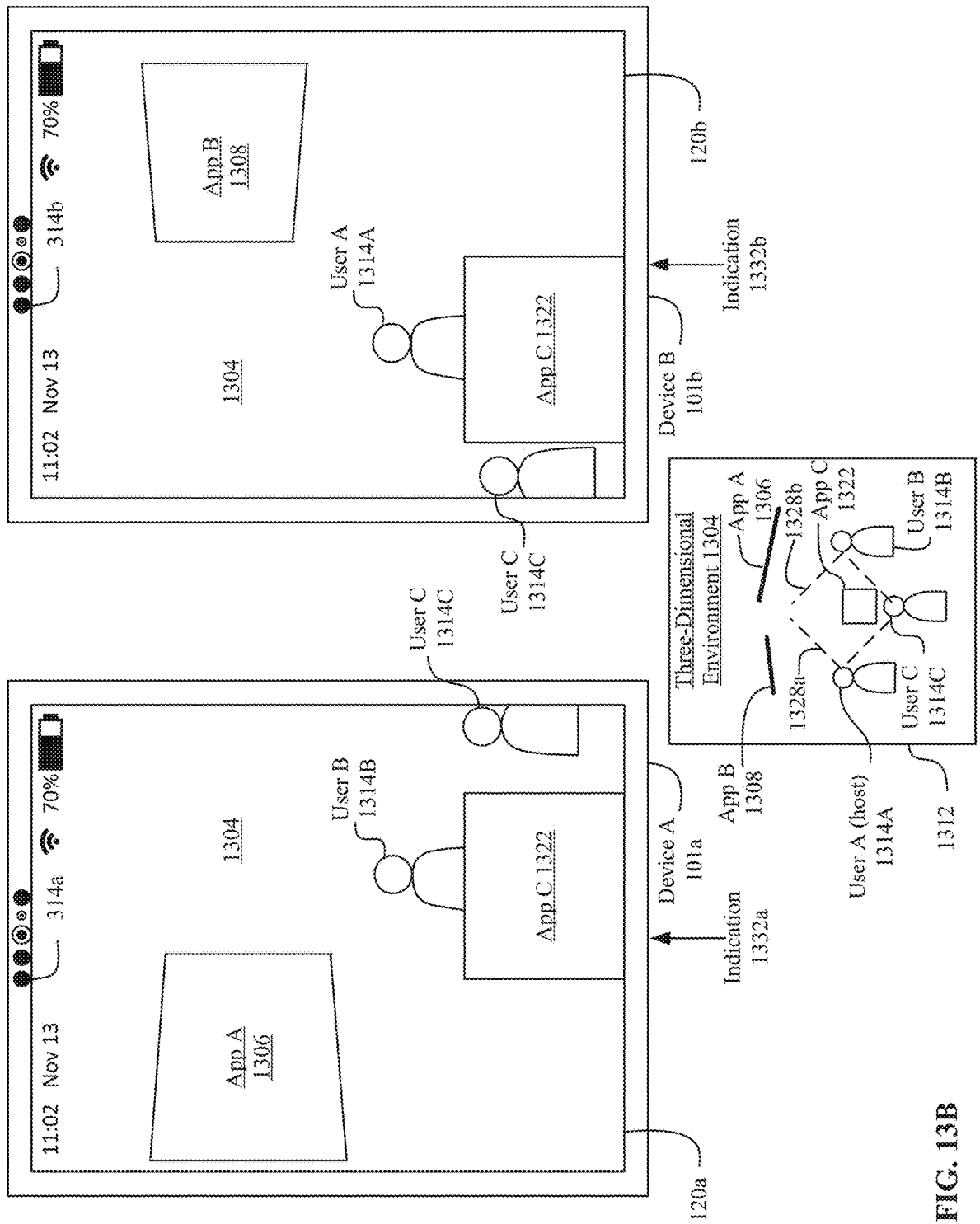
Figure 13C:
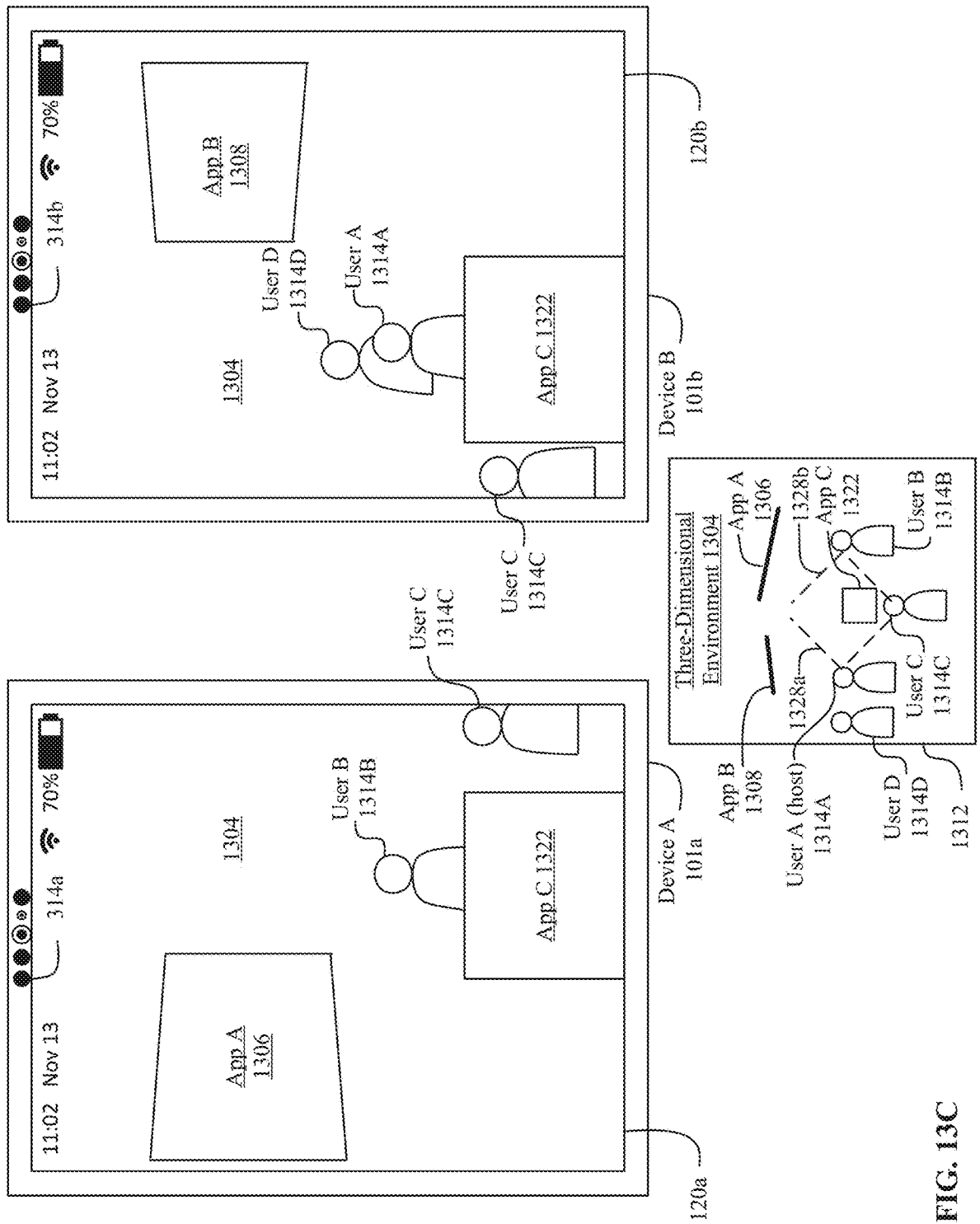
Figure 14A:
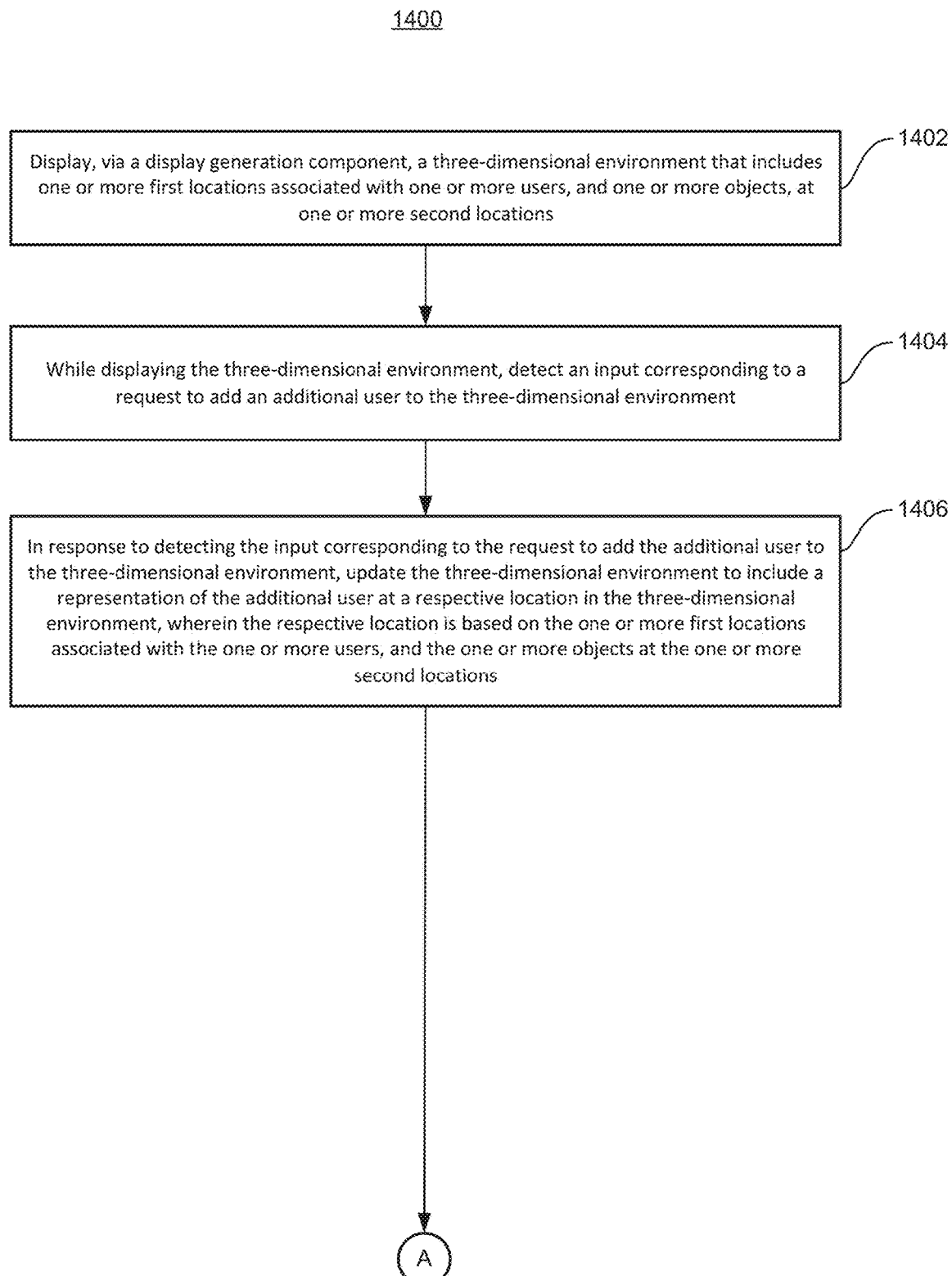
FIGS. 14A-14L is a flowchart illustrating a method of automatically selecting a location for a user in a three-dimensional environment that includes one or more virtual objects and/or other users in accordance with some embodiments.
Figure 14B:
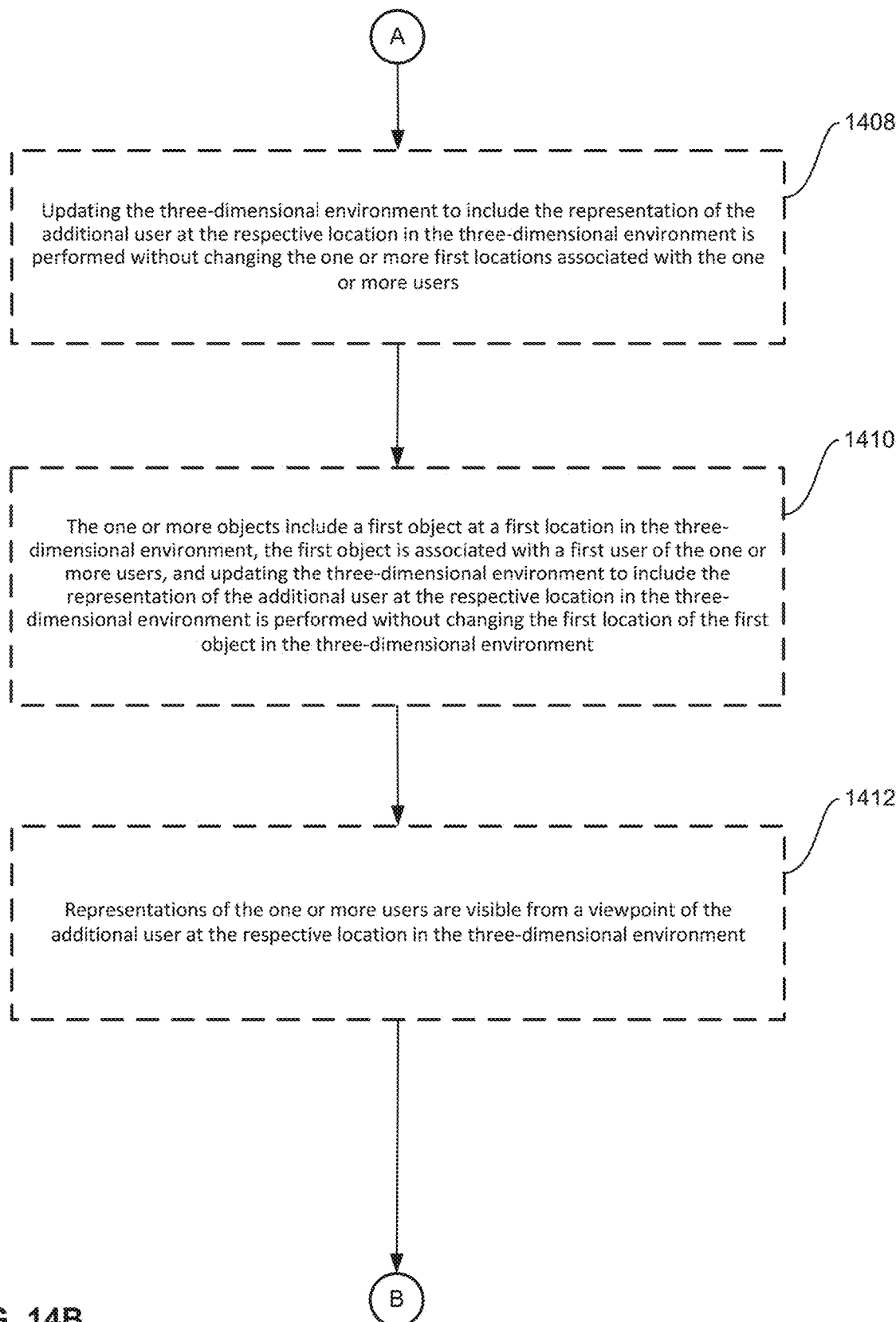
Figure 14C:
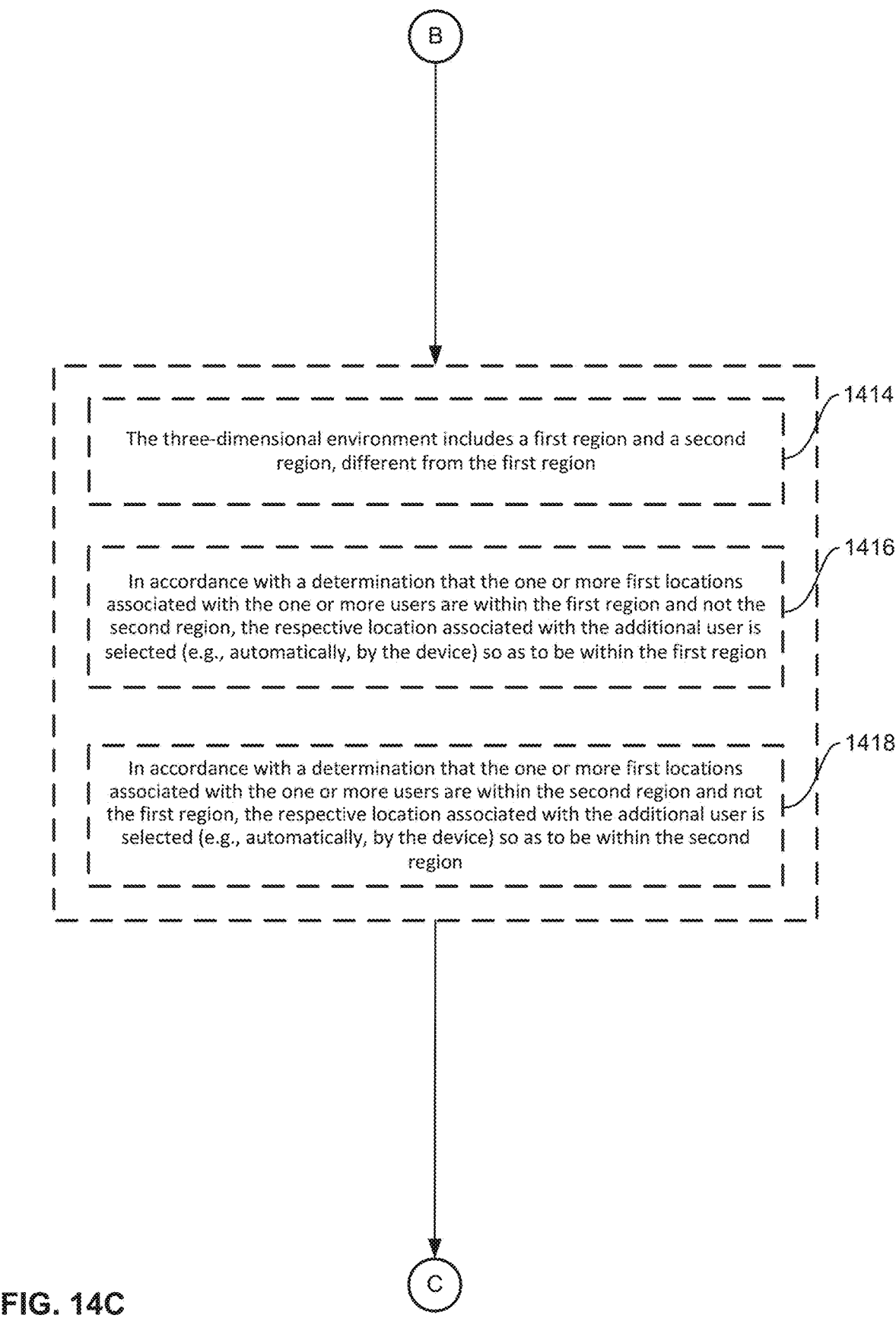
Figure 14D:
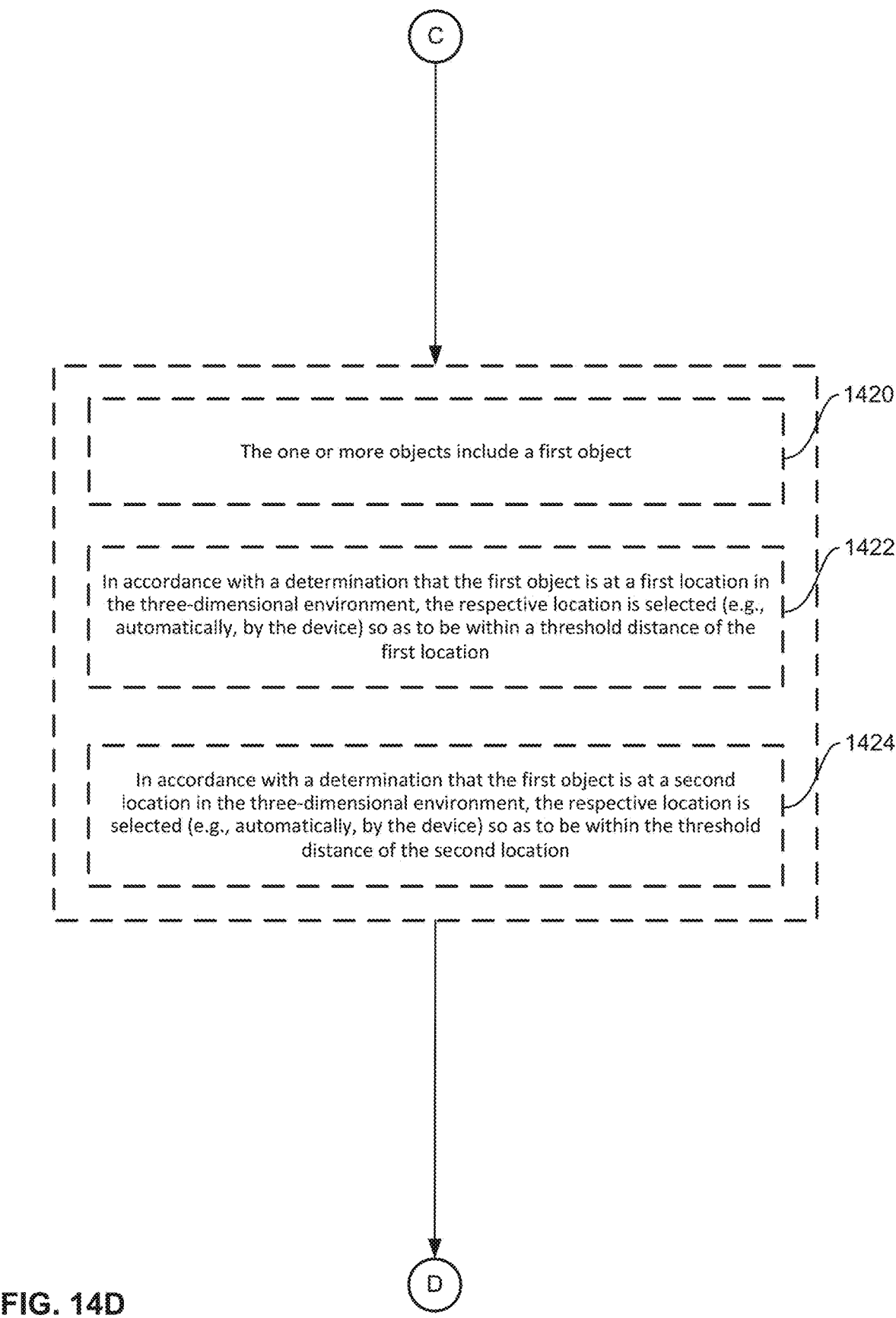
Figure 14E:
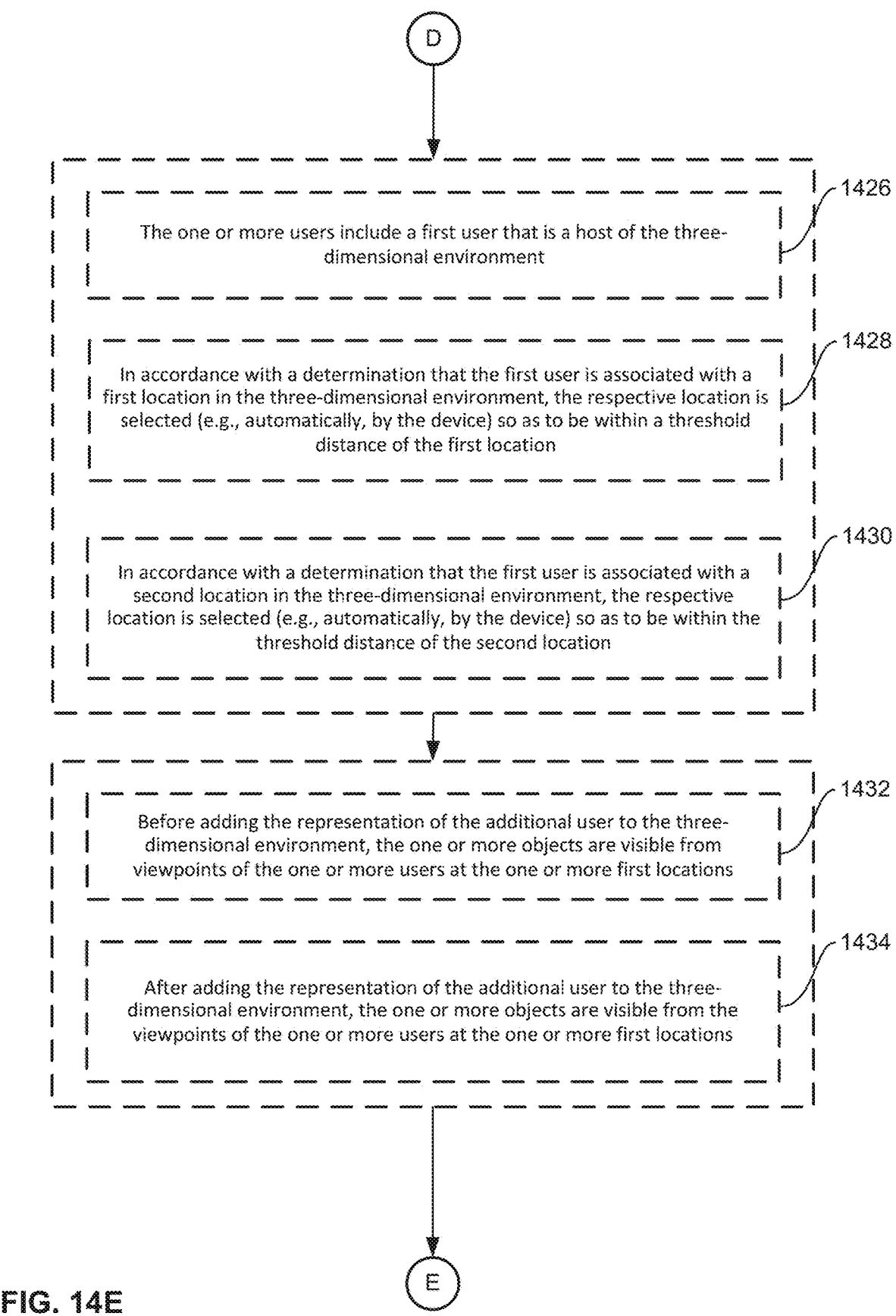
Figure 14F:
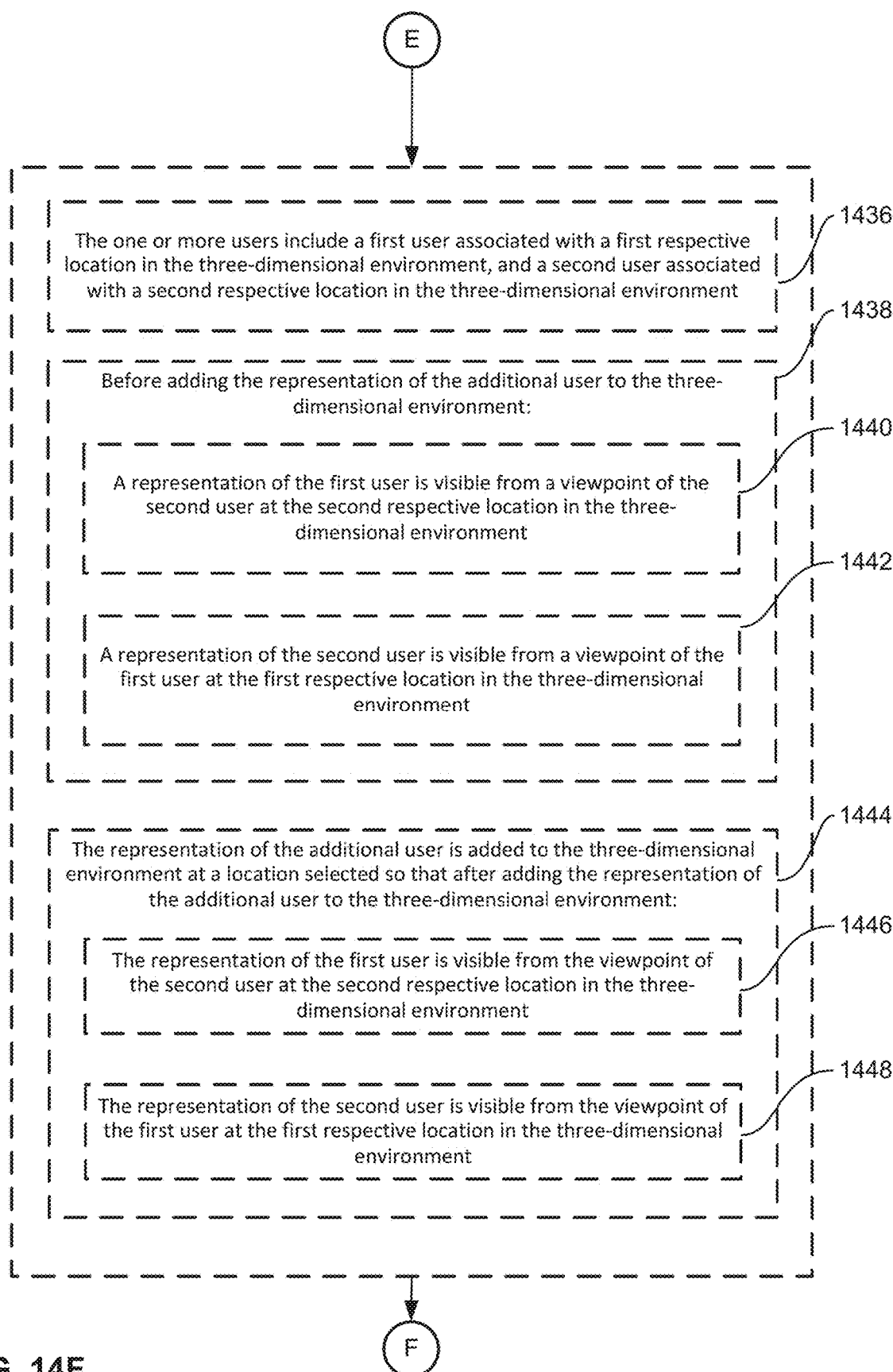
Figure 14G:
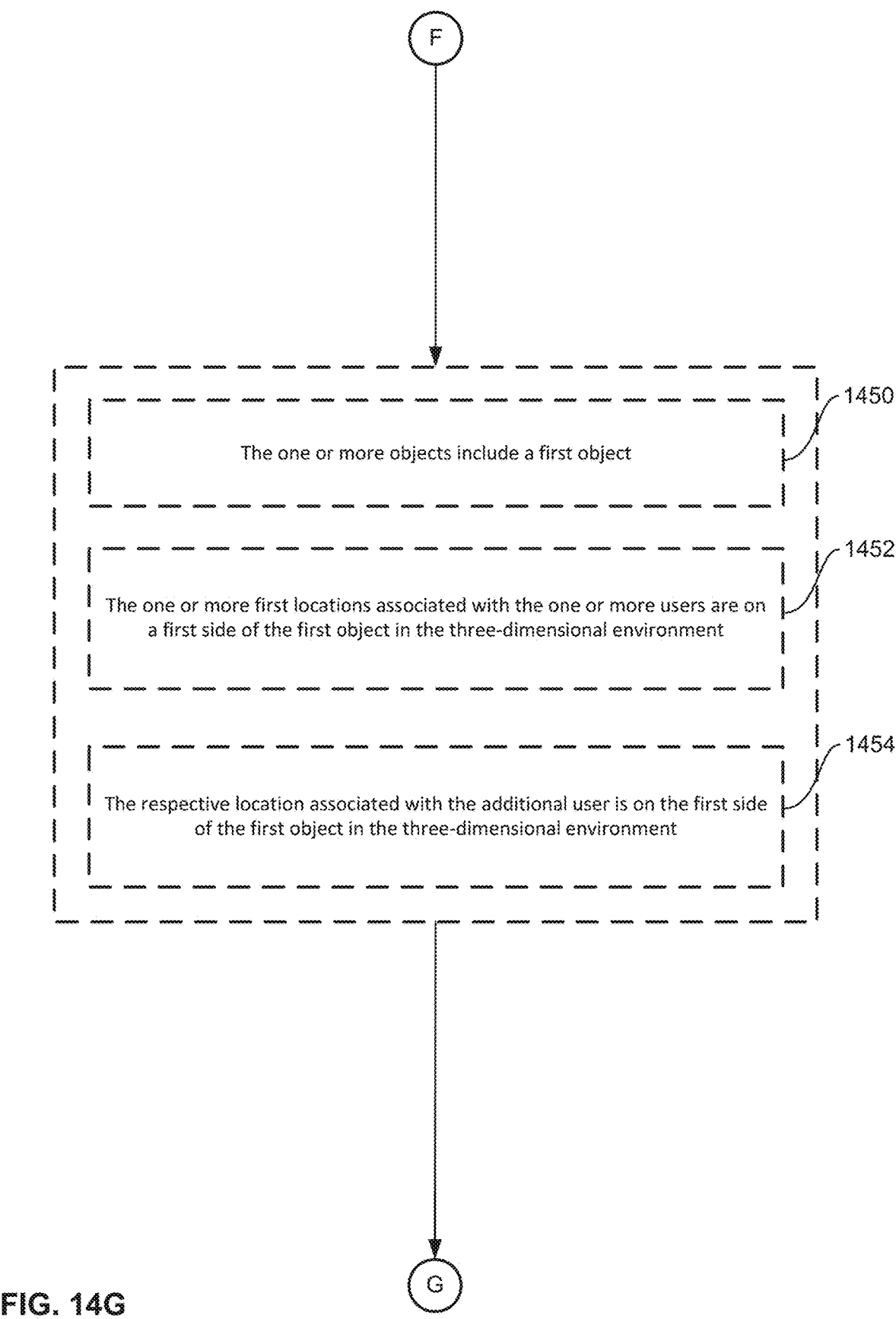
Figure 14H:
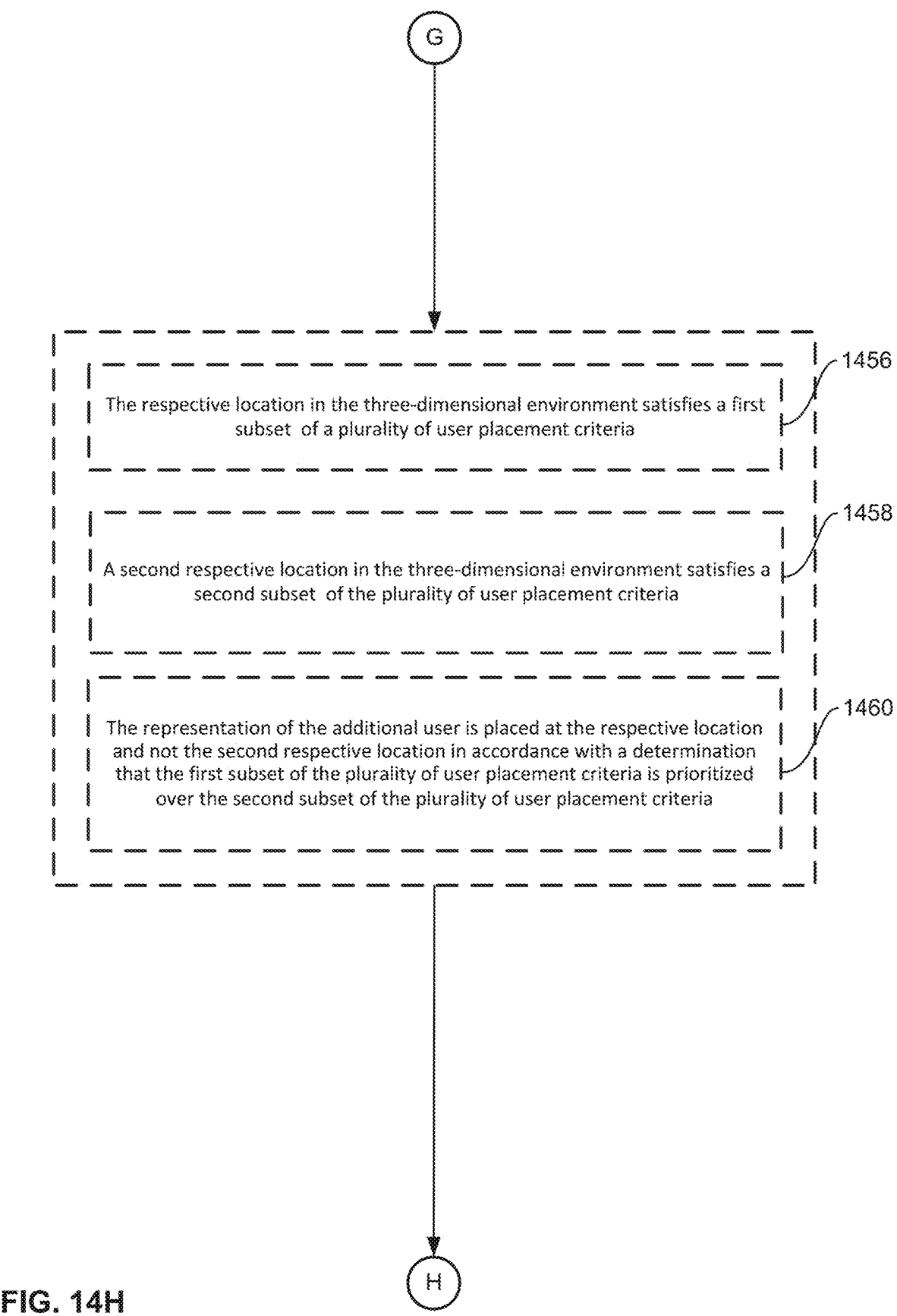
Figure 14I:
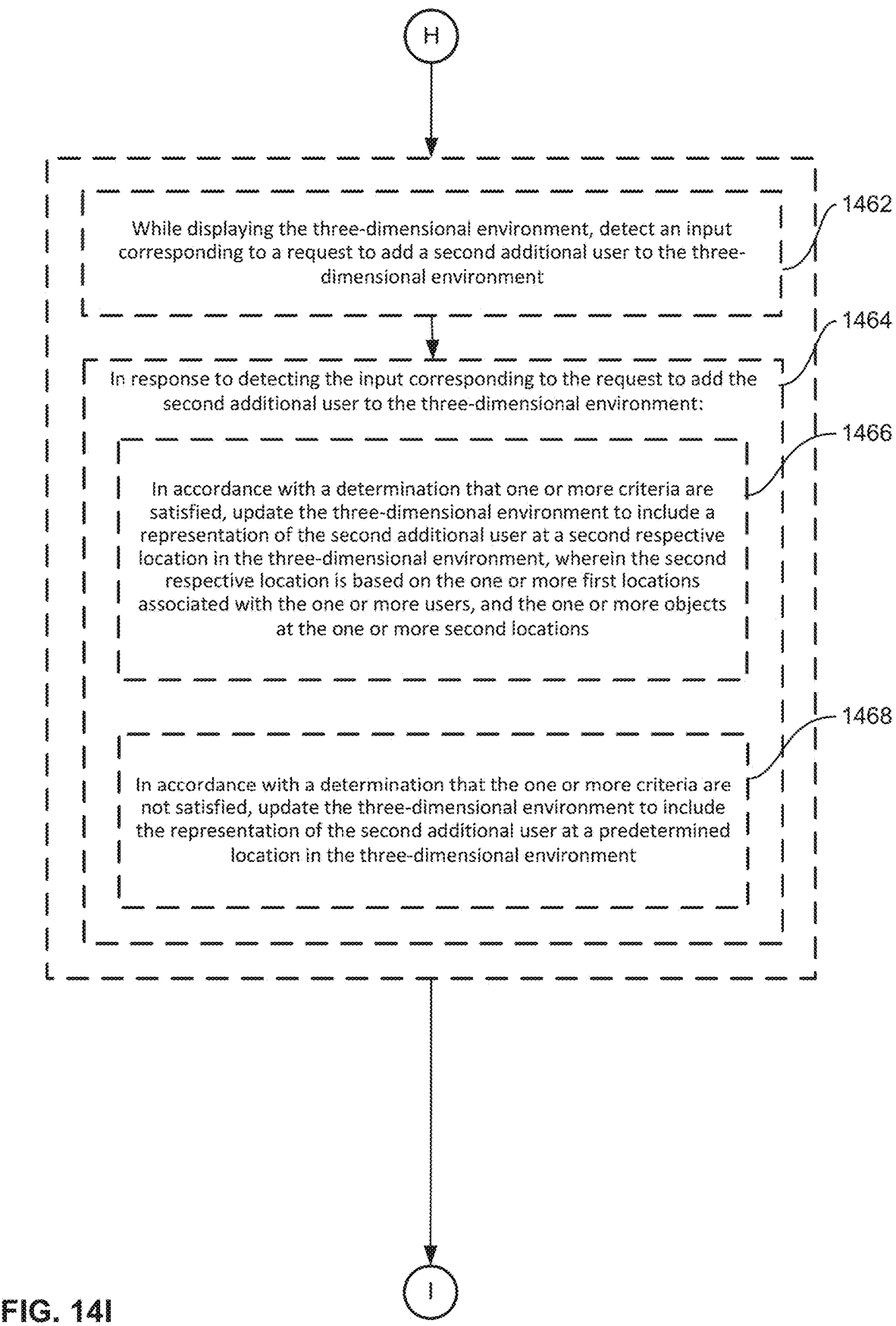
Figure 14J:
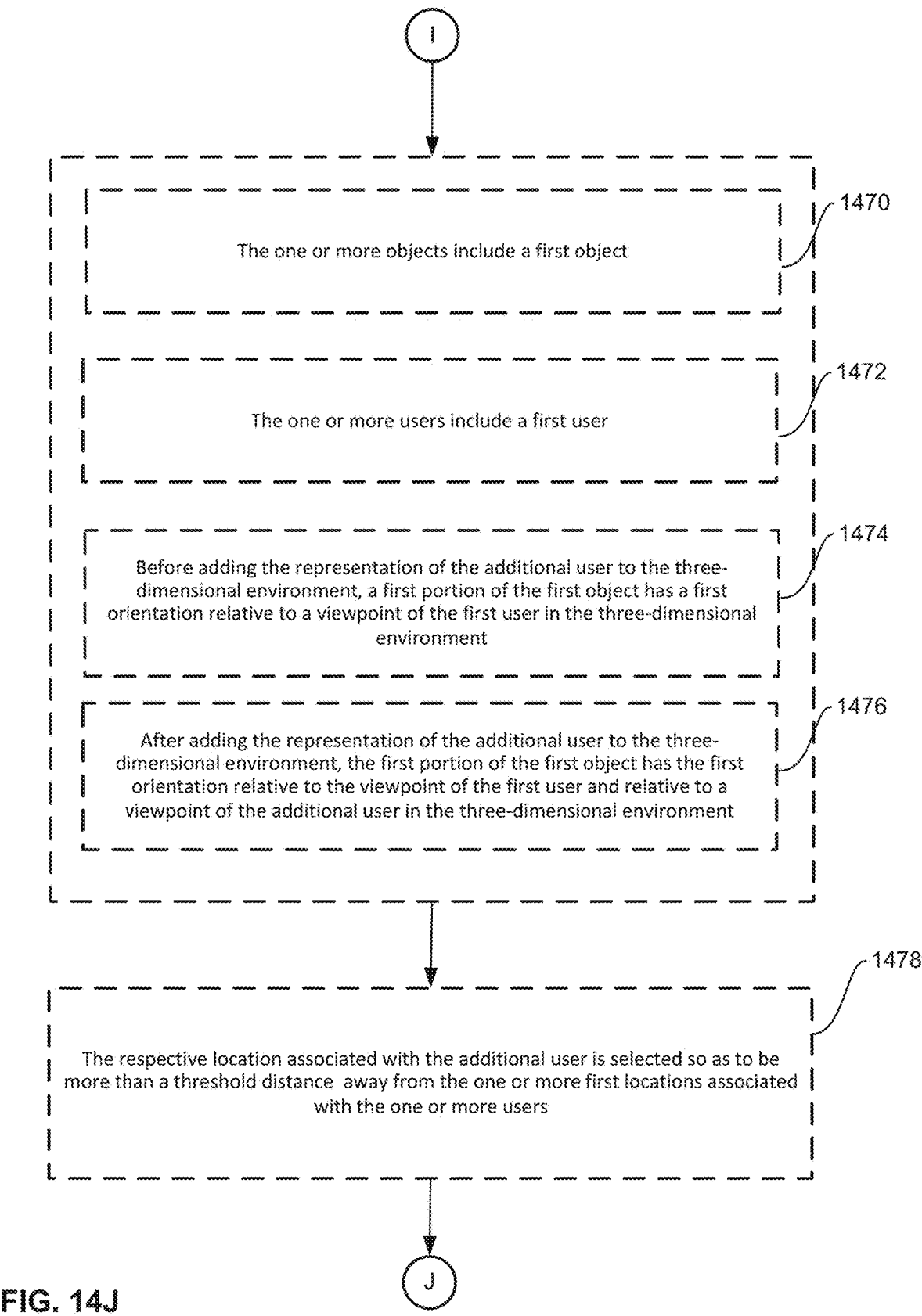
Figure 14K:
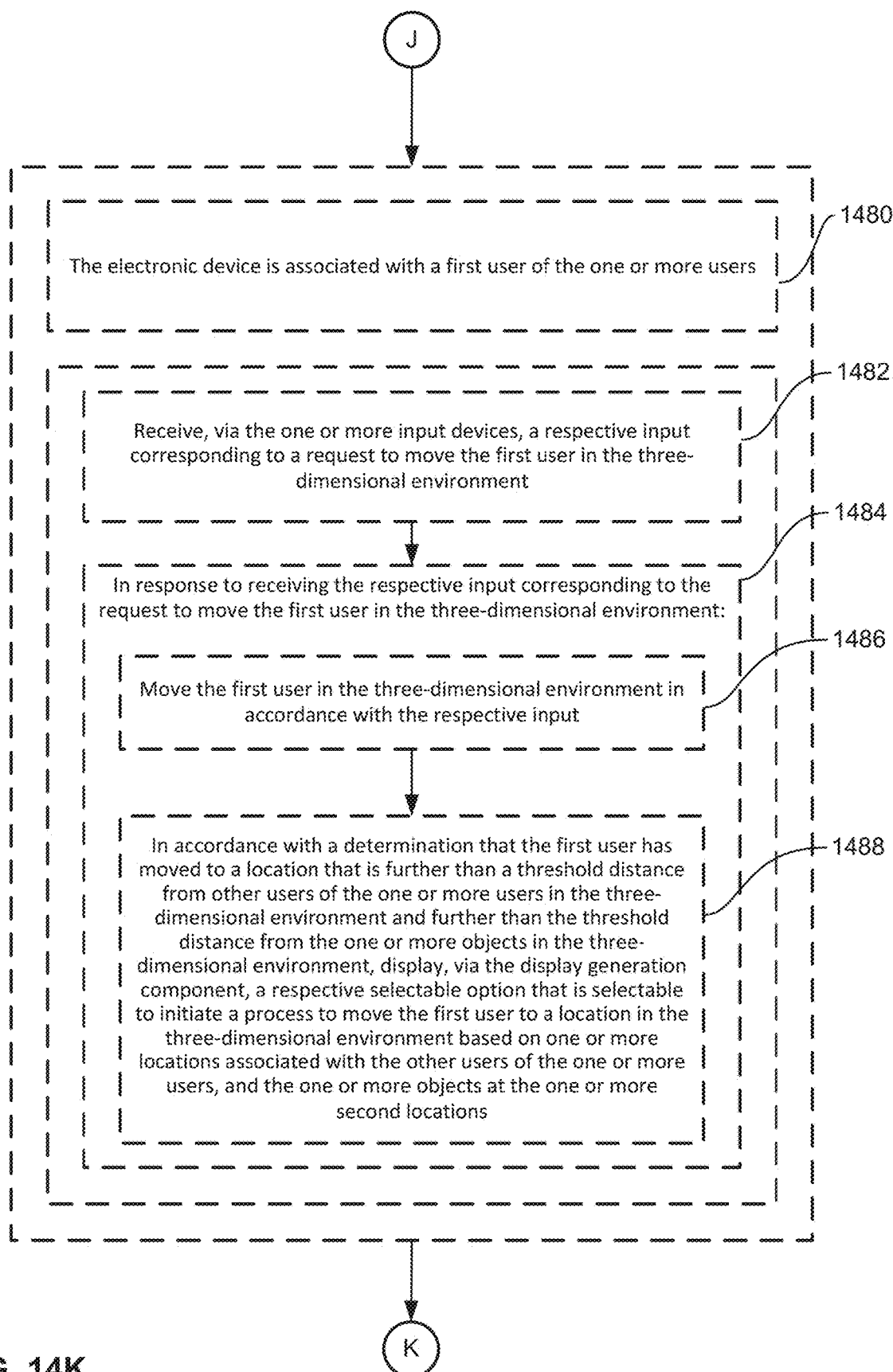
Figure 14L:
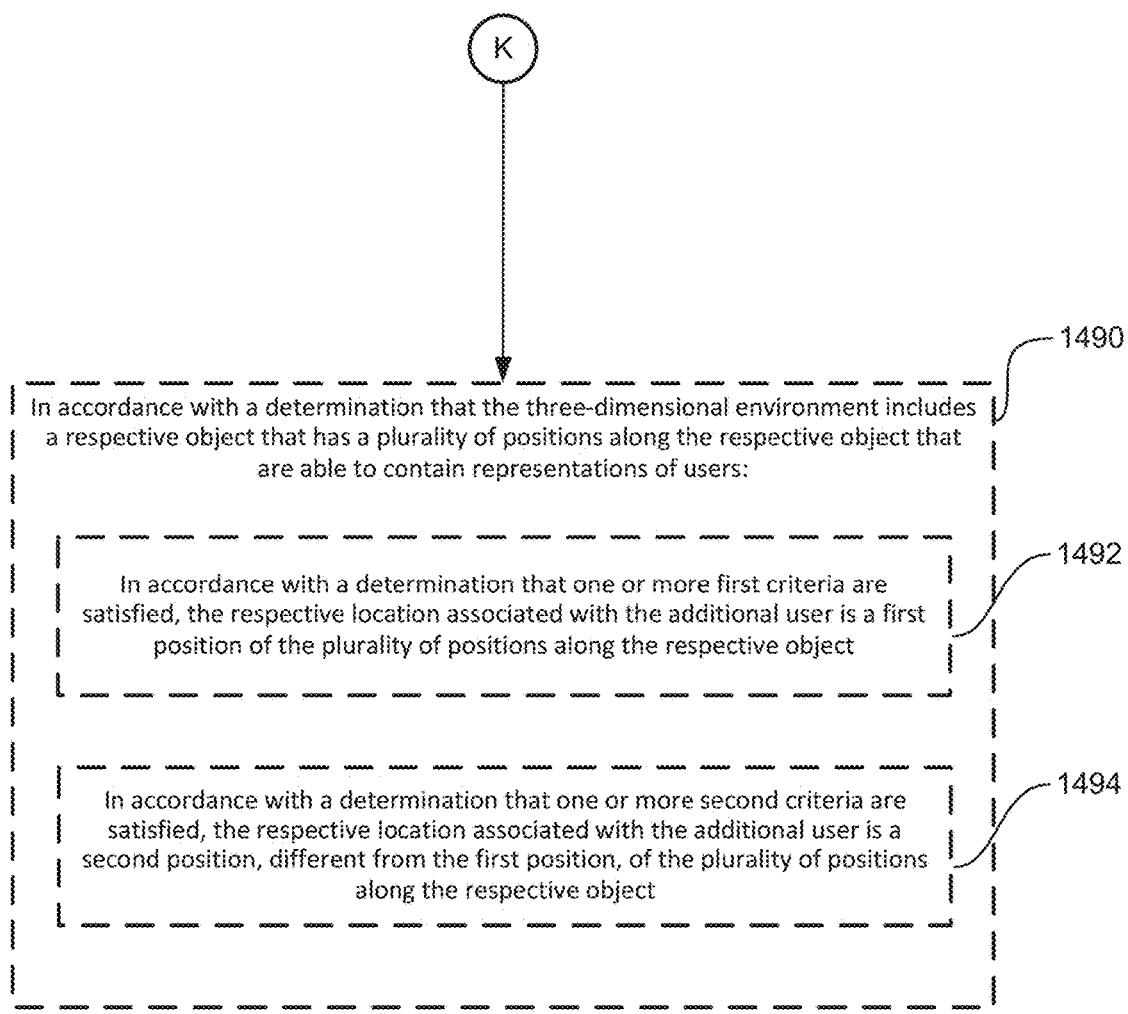

FIGS. 13A-13C illustrate examples of how an electronic device automatically selects a location for a user (e.g., an additional user) in a three-dimensional environment that includes one or more virtual objects and/or other users in accordance with some embodiments.

FIG. 13A illustrates electronic devices 101a and 101b displaying, via display generation components 120a and 120b, a three-dimensional environment 1304 on user interfaces. As described above with reference to FIGS. 1-6, the electronic devices 101a and 101b optionally include a display generation component 120a and 120b (e.g., a touch screen) and a plurality of image sensors 314a and 314b. The image sensors 314 optionally include one or more of a visible light camera, an infrared camera, a depth sensor, or any other sensor the electronic devices 101a and 101b would be able to use to capture one or more images of a user or a part of the user while the user interacts with the electronic devices 101a and 101b. In some embodiments, display generation component 120a and/or 120b is a touch screen that is able to detect gestures and movements of a user's hand. In some embodiments, the user interfaces shown below could also be implemented on head-mounted displays that include display generation components that display the user interfaces to the users and sensors to detect the physical environments and/or movements of the users' hands (e.g., external sensors facing outwards from the users), and/or gazes of the users (e.g., internal sensors facing inwards towards the face of the users).

As shown in FIG. 13A, the three-dimensional environment 1304 includes user A 1314A, user B 1314B, a representation 1306 of App A, a representation 1308 of App B, and a representation 1322 of App C. User A 1314A is the host of three-dimensional environment 1304. In some embodiments, a host of a three-dimensional environment 1304 has control over aspects of the three-dimensional environment 1304, such the power to approve or deny users that are able to join the three-dimensional environment 1304, the power to approve or deny display of one or more virtual objects, the power to close the three-dimensional environment 1304, and/or control over one or more other settings of the three-dimensional environment 1304, such as privacy settings, display settings, and the like. In some embodiments, the representations 1306 and 1308 of App A and App B, respectively, are unidirectional representations including content on one side of the representations. In some embodiments, the representation 1322 of App C is a multi-directional representation that is visible from multiple sides. In some embodiments, the placement and orientation of the representations 1306, 1308, and 1322 of Apps A, B, and C, respectively, can be automatically selected based on the locations of user A 1314A and user B 1314B in the three-dimensional environment 1304 as described above with reference to FIGS. 9A-10T.

In some embodiments, user A 1314A uses electronic device A 101a to view and interact with the three-dimensional environment 1304. Electronic device A 101a displays the three-dimensional environment 1304 from the viewpoint of user A 1314A, including display of portions of the three-dimensional environment 1304 within the field of view 1328a of user A 1314A. Thus, as shown in FIG. 13A, electronic device 101a displays a representation 1306 of App A, a representation 1322 of App C, and a representation of user B 1314B.

Likewise, in some embodiments, user B 1314B uses electronic device B 101b to view and interact with the three-dimensional environment 1304. Electronic device B 101b displays the three-dimensional environment 1304 from the viewpoint of user B 1314B, including display of portions of the three-dimensional environment 1304 within the field of view 1328b of user B 1314B. Thus, as shown in FIG. 13A, electronic device 101b displays a representation 1308 of App B, a representation 1322 of App C, and a representation of user A 1314A.

In some embodiments, additional users are able to join the three-dimensional environment 1304. For example, user A 1314A and/or user B 1314B are able to invite user C 1314C to the three-dimensional environment 1304. As another example, user C 1314C requests access to the three-dimensional environment 1304 from user A 1314A and/or user B 1314B. In some embodiments, because user A 1314A is the host of the three-dimensional environment 1304, user A 1314A has the ability to approve or deny requests to add users to the three-dimensional environment 1304 (e.g., approving or denying the request to add user C 1314C to the three-dimensional environment 1304). As shown in FIG. 13A, electronic device A 101a detects an indication 1330a of a third user joining the three-dimensional environment 1304 and electronic device B 101b detects indication 1330b of the third user joining the three-dimensional environment 1304.

FIG. 13B illustrates the three-dimensional environment 1304 after user C 1314C has joined the three-dimensional environment 1304. Electronic devices 101a and 101b update display of the three-dimensional environment 1304 to include a representation of user C 1314C because user C 1314C is in the field of view 1328a of user A 1314A and the field of view 1328b of user B 1314B. As shown in FIG. 13B, the positions and orientations of user A 1314A and user B 1314B and representations 1306, 1308, and 1322 of Apps A, B, and C, respectively remain the same in response to user C 1314C joining the three-dimensional environment 1304.

As described above with reference to FIGS. 9A-10T, the orientations of representations of applications optionally will be automatically selected based on the locations of user A 1314A, user B 1314B, and user C 1314C in the three-dimensional environment 1304 in response to detecting a request to move or initiate display of a representation of an application.

In some embodiments, the electronic devices 101*a* and/or 101*b* and/or an electronic device of user C 1314C automatically determine the initial location of user C 1314C in the three-dimensional environment 1304 based on one or more criteria. In some embodiments, placement of user C 1314C is based on the locations of user A 1314A and user B 1314B and representations 1306, 1308, and 1322 of Apps A, B, and C, respectively, in the three-dimensional environment 1304.

In some embodiments, the initial placement of user C 1314C is selected to allow user C 1314C to see the other users in the three-dimensional environment 1304 (e.g., user A 1314A and user B 1314B are within the field of view of user C 1314C). In some embodiments, the initial placement of user C 1314C is within a first threshold distance (e.g., 0.5, 1, 2, 3, etc. meters) of user A 1314A and user B 1314B in the three-dimensional environment 1304. For example, as shown in FIG. 13B, user C 1314C is placed at a location that is visible to user A 1314A and user B 1314B (e.g., the representation of user C 1314C is displayed by electronic device A 101A and electronic device 101A). Thus, in this example, user C 1314C is close enough to user A 1314A and user B 1314B that the electronic device of user C 1314C (not shown) is able to display representations of user A 1314A and user B 1314B in a similar manner. In some embodiments, the initial placement of user C 1314C is selected to avoid placing user C 1314C too close (e.g., within a threshold distance, such as 0.2, 0.5, 1, etc. meters) to user A 1314A or user B 1314B. In some embodiments, when a new user is added to a three-dimensional environment, the new user is at least a second threshold distance (e.g., 0.2, 0.5, 1, etc. meters) away from the other users. For example, the initial placement of user C 1314C in three-dimensional environment 1304 is between the first and second thresholds away from user A 1314A and user B 1314B. In some embodiments, the first threshold is greater than the second threshold.

In some embodiments, the initial placement of user C 1314C in the three-dimensional environment 1304 is selected to allow user C 1314C to view and interact with the representations 1306, 1308, and 1322 of Apps A, B, and C, respectively. For example, as shown in FIG. 13B, user C 1314C is initially placed adjacent to the representation of App C 1322. Moreover, user C 1314C is optionally able to view and interact with the representations 1306 and 1308 of App A and App B from the initial position of user C 1314C in the three-dimensional environment 1304 (e.g., representation 1322 of App C does not obstruct user C's access to and/or view of representations 1306 and 1308). For example, the position of user C 1314C in FIG. 13B is on the same side of representations 1306 and 1308 of user A 1314A and user B 1314B (e.g., the side of the representations 1306 and 1308 that includes the content of the representations 1306 and 1308).

In some embodiments, the initial placement of user C 1314C is selected to be within a threshold distance (e.g., 0.5, 1, 2, 3, etc. meters) of the user that is the host of the three-dimensional environment 1304 (e.g., user A 1314A). For example, the placement of user C 1314C in three-dimensional environment 1304 is within the threshold distance of the host of the three-dimensional environment 1304, user A 1314A.

In some embodiments, the initial placement of user C 1314C is selected to avoid obstructing other users' views of users and/or virtual objects in the three-dimensional environment 1304. For example, the placement of user C 1314C in three-dimensional environment 1304 is not between user A 1314A and user B 1314B and is not between either other user and any of the representations 1306, 1308, and 1322 of Apps A, B, and C, respectively.

In some embodiments, the initial placement of the new user in the three-dimensional environment 1304 is selected such that the horizons are aligned for all of the users in the three-dimensional environment 1304. For example, surfaces such as a floor, walls, a ceiling, etc. of the three-dimensional environment 1304 are displayed with the same alignment for all users. As another example, if electronic devices 101*a* and 101*b* displayed such surfaces in three-dimensional environment 1304, the alignment of these surfaces would be the same for both electronic devices 101*a* and 101*b*.

In some embodiments, the electronic devices 101*a* and/or 101*b* select initial positions for new users in the three-dimensional environment 1304 according to the user placement rules described above. In some embodiments, the electronic devices 101*a* and/or 101*b* are able to select a position for the new user that follows all of the user placement rules. In some embodiments, if there are no positions in the three-dimensional environment 1304 that would follow all of the user placement rules, the electronic devices 101*a* and/or 101*b* select a location that satisfies the most rules and/or the most prioritized rules (e.g., the rules are weighted and/or ranked to score each open position in the three-dimensional environment 1304 and the new use is added to the three-dimensional environment 1304 at the location with the best score).

The placement of additional users is optionally similarly controlled by similar criteria. As shown in FIG. 13B, the electronic device A 101*a* detects indication 1332*a* of a fourth user joining the three-dimensional environment 1304 and electronic device B 101*b* detects indication 1332*b* of the fourth user joining the three-dimensional environment 1304. In some embodiments, indications 1332*a* and 1332*b* are detected in manners similar to the manner in which indications 1330*a* and 1330*b* were detected, as described above with reference to FIG. 13A.

FIG. 13C illustrates the three-dimensional environment 1304 after user D 1314D joins the three-dimensional environment 1304. Because user D 1314D is within the field of view 1328*b* of user B 1314B, electronic device 101*b* updates display of the three-dimensional environment 1304 to display a representation of user D 1314D. Because user D 1314D is not within the field of view 1328*a* of user A 1314A, electronic device A 101*a* does not display a representation of user D 1314D. In some embodiments, if user A 1314A were to change their field of view 1328*a* in the three-dimensional environment 1304 (e.g., by rotating electronic device A 101*a*) to encompass user D 1314D, then electronic device A 101*a* would display a representation of user D 1314D.

In some embodiments, the initial placement of user D 1314D follows the same rules as the initial placement of user C 1314C. In some situations, however, there is no possible placement of user D 1314D that follows all of the placement rules described above with reference to FIG. 13B. For example, there is no available location for user D 1314D in three-dimensional environment 1304 that is both within a threshold distance of the representation 1322 of App C without being either too close to one of the other users 1314A-C or obstructing another user's view of the representation 1306 of App A or the representation 1308 of App B. As shown in FIG. 13C, although the initial placement of user D 1314D enables user D to see the representations 1306 and 1308 of apps A and B and is optionally between the first and second threshold distances from the other users 1314A-C, user D 1314D is placed such that user A 1314A is between user D 1314D and the representation 1322 of App C. Thus, for example, some of the placement rules have been followed and others have been broken. In some embodiments, the electronic devices 101a and/or 101b generate a heat map of possible initial positions for user D 1314D based on the user placement rules described above. In some embodiments, the placement rules are ranked and/or weighted by importance to enable the electronic devices 101a and/or 101b to select an initial placement for user D 1314D even though there may not be any available positions that follow all of the placement rules. In some embodiments, when there are no locations that would follow all (or at least a threshold number, such as 1, 2, 3, etc.) of the placement rules, the electronic device(s) place the user 1314D at a predetermined location (e.g., relative to the three-dimensional environment 1304, or relative to one or more of the users, such as placing user D 1314D to the left or behind of the host of the three-dimensional environment 1304, user A 1314A).

In some embodiments, the physical environment of one or more electronic devices 101a and 101b includes furniture or other objects on or around which the new users are placed to simulate the users interacting in a three-dimensional environment 1304 that includes representations of the furniture or other objects. For example, electronic device 101a and/or 101b displays a representation 1128 of a real world sofa 1124 or a representation 1130 of a real world wall 1126, in the manner illustrated in FIGS. 11A-11C. In some embodiments, an electronic device displays photorealistic representations of the furniture or other real objects (e.g., pass-through video) in the three-dimensional environment or the furniture or other real objects are visible through a transparent portion of the display generation component. In some embodiments, the new users are semantically placed on or around the objects. For example, if the physical environment includes a table with chairs, the electronic device places the new users to appear as though they are sitting at the table, filling the seats around the table sequentially as new users are added. As another example, if the physical environment includes a sofa 1124, the electronic device places new users to appear as though they are sitting on the representation 1128 of the sofa 1124, filling the available seating spaces on the sofa sequentially as new users are added. Moreover, in some embodiments, the electronic device avoids placing new users at locations that are in conflict with representations of real objects in the three-dimensional environment, such as by avoiding placing users at locations that are coincident with the real objects or in positions that are semantically illogical (e.g., a user standing on a table, sitting on a bookshelf, etc.).

Thus, in some embodiments as described above with reference to FIGS. 13A-13C, users are automatically placed according to user placement rules when the users initially join a three-dimensional environment 1304. In some embodiments, the initial placement rules are also used to update the position of a user in response to a request to reset the three-dimensional environment 1304 from the user's perspective. In some embodiments, in accordance with a determination that a user has moved at least a threshold distance (e.g., 3, 4, 5, 10, etc. meters) away from the other users and/or virtual objects (e.g., representation 1306, 1308, and 1322 of Apps A, B, and C, respectively) in the three-dimensional environment 1304, the electronic device for that user displays an option to reset the three-dimensional environment 1304. In some embodiments, in response to detecting selection of the option to reset the three-dimensional environment 1304, the electronic device updates the position of the user to a position selected using the user placement rules described above. In this way, the user is placed at a location at which they are able to interact with the users and/or virtual objects in the three-dimensional environment 1304 without interfering with other users' abilities to interact with other users and/or virtual objects in the three-dimensional environment 1304, for example. In some embodiments, the three-dimensional environment 1304 from the perspective of the user is reset, but the positions of the other users and the virtual objects is unchanged. In some embodiments, the other users see the user jump or teleport to the updated position but, otherwise, are not disrupted while interacting with the three-dimensional environment 1304.

FIGS. 14A-14L is a flowchart illustrating a method of automatically selecting a location for a user in a three-dimensional environment that includes one or more virtual objects and/or other users in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at an electronic device in communication with a display generation component and one or more input devices (e.g., a mobile device (e.g., a tablet, a smartphone, a media player, or a wearable device), or a computer). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. In some embodiments, the one or more input devices include an electronic device or component capable of receiving a user input (e.g., capturing a user input, detecting a user input, etc.) and transmitting information associated with the user input to the electronic device. Examples of input devices include a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera, a depth sensor, an eye tracking device and/or a motion sensor (e.g., a hand tracking device, a hand motion sensor), etc.

In some embodiments, such as in FIG. 13A, the electronic device (e.g., 101) displays (1402), via the display generation component 120, a three-dimensional environment (e.g., 1304) that includes one or more first locations associated with one or more users (e.g., 1314A) and (e.g., 1314B), and one or more objects (e.g., 1306), (e.g., 1308), and (e.g., 1322), at one or more second locations. In some embodiments, the three-dimensional environment is generated, displayed, or otherwise caused to be viewable by the device (e.g., the three-dimensional environment is a computer-generated reality (CGR) environment such as a virtual reality (VR) environment, a mixed reality (MR) environment, or an augmented reality (AR) environment, etc.). In some embodiments, each respective first location associated with a first user corresponds to the vantage point from which the electronic device associated with the first user displays the three-dimensional environment. In some embodiments, the relative positions of the first locations and second locations are the same for all users. In some embodiments, the one or more objects are one or more of representations and/or user interfaces of applications, representations of files, or other virtual objects. In some embodiments, the one or more objects are visible to the one or more users.

In some embodiments, such as in FIG. 13A, while displaying the three-dimensional environment (e.g., 1104), the electronic device (e.g., 101) detects (1404) an input (e.g., 1330) corresponding to a request to add an additional user to the three-dimensional environment (e.g., 1304). In some embodiments, the request is an invitation to the additional user to view the objects (and representations of the users) included in the three-dimensional environment. In some embodiments, the request is acceptance of a request from the additional user to view the objects (and representations of users) included in the three-dimensional environment.

In some embodiments, in response to detecting the input (e.g., 1330) corresponding to the request to add the additional user (e.g., 1314C) to the three-dimensional environment (e.g., 1304), such as in FIG. 13A, the electronic device (e.g., 101) updates (1406) the three-dimensional environment (e.g., 1304) to include a representation of the additional user (e.g., 1314C) at a respective location in the three-dimensional environment (e.g., 1304), wherein the respective location is based on the one or more first locations associated with the one or more users (e.g., 1314A) and (e.g., 1314B), and the one or more objects (e.g., 1306) (e.g., 1308), and (e.g., 1322) at the one or more second locations. In some embodiments, the respective location satisfies one or more criteria that are satisfied based on the respective location relative to the first locations of the users and one or more criteria that are satisfied based on the respective location relative to the second locations of the objects. In some embodiments, the location at which objects other than users (e.g., representations of applications, representations of files, other virtual objects) are initially displayed are evaluated using criteria different from the criteria used to evaluate the location at which the reorientations of user are initially displayed. In some embodiments, the initial position of objects can be determined according to methods 800 and 1000 described above. In some embodiments, in response to detecting the input corresponding to the request to add the additional user to the three-dimensional environment, the electronic device updates the three-dimensional environment to include a representation of the additional user at a location that is based on the locations associated with the other users and the locations of the objects in the three-dimensional environment. In some embodiments, the one or more objects are visible to the additional user.

The above-described manner of selecting the respective location at which to display the representation of the additional user based on the one or more first locations of the users and the one or more second locations of the objects provides an efficient way of presenting the three-dimensional environment to the additional user which additionally reduces power usage and improves battery life of the electronic device by enabling the user to use the electronic device more quickly and efficiently, while reducing errors in usage.

In some embodiments, such as in FIG. 13B, updating the three-dimensional environment (e.g., 1304) to include the representation of the additional user (e.g., 1314C) at the respective location in the three-dimensional environment (e.g., 1304) is performed without changing the one or more first locations associated with the one or more users (e.g., 1314A and 1314B) (1408). In some embodiments, the electronic device maintains display of representations of the users at the one or more first locations in the three-dimensional environment and the electronic device(s) of the users continue displaying the three-dimensional environment with the same viewpoint from which the three-dimensional environment was displayed prior to the first user being added to the three-dimensional environment.

The above-described manner of updating the three-dimensional environment to include the first user without updating the positions of the users at the first locations in the three-dimensional environment provides an efficient way of maintaining display of the three-dimensional environment from the perspectives of the users associated with the first locations of the three-dimensional environment, which additionally reduces power usage and improves battery life of the electronic device by enabling the user to use the electronic device more quickly and efficiently (e.g., by reducing the inputs needed to display the objects and representations of users at the locations at which they were displayed prior to adding the first user to the three-dimensional environment), while reducing errors in usage.

In some embodiments, the one or more objects (e.g., 1306, 1308, and 1322) include a first object at a first location in the three-dimensional environment (e.g., 1304), the first object is associated with a first user of the one or more users (e.g., if one of the objects (e.g., 1306, 1308, and 1322) were accessible to only one of user A (e.g., 1314A) or user B (e.g., 1314B)), and updating the three-dimensional environment (e.g., 1304) to include the representation of the additional user (e.g., 1314C) at the respective location in the three-dimensional environment (e.g., 1304) is performed without changing the first location of the first object in the three-dimensional environment (e.g., 1304) (1410). In some embodiments, the electronic device initialized display of the first object in response to an input associated with the first user. In some embodiments, the first object is accessible (e.g., visible) to the first user without being accessible to the other users in the three-dimensional environment. In some embodiments, the first object is accessible (e.g., visible) to more than one or all of the users on the three-dimensional environment.

The above-described manner of maintaining display of the first object at the first location in the three-dimensional environment while adding the additional user to the three-dimensional environment provides an efficient way of reducing the inputs needed by the first user to view the first object when the additional user is added to the three-dimensional environment, which additionally reduces power usage and improves battery life of the electronic device by enabling the user to use the electronic device more quickly and efficiently, while reducing errors in usage.

In some embodiments, such as in FIG. 13B, the representations of the one or more users (e.g., 1314A and 1314B) are visible from a viewpoint of the additional user (e.g., 1314C) at the respective location in the three-dimensional environment (e.g., 1304) (1412). In some embodiments, the respective location is within a predetermined threshold distance (e.g., 0.5, 1, 2, etc. meters) of the locations associated with the one or more users in the three-dimensional environment. In some embodiments, the electronic device selects a location of the additional user such that there are no virtual or real objects between the viewpoint of the additional user and the other users so that the view of the other users and the view of the additional users is not blocked by objects. In some embodiments, the location of the additional user is far enough away from the other users so that all (or at least a predetermined number or proportion) of the users are within the field of view of the additional user.

The above-described manner of selecting the respective location such that the one or more users are visible to the additional user at the respective location in the three-dimensional environment provides an efficient way of enabling the additional user to interact with the one or more users, which additionally reduces power usage and improves battery life of the electronic device by enabling the user to use the electronic device more quickly and efficiently (e.g., by reducing the inputs needed by the additional user to view the one or more users), while reducing errors in usage.

In some embodiments, the three-dimensional environment (e.g., 1304) includes a first region and a second region, different from the first region (1414). In some embodiments, in accordance with a determination that the one or more first locations associated with the one or more users (e.g., 1314A and 1314B) are within the first region and not the second region, the respective location associated with the additional user (e.g., 1314C) is selected (e.g., automatically, by the device) so as to be within the first region (1416). In some embodiments, the one or more users are within a predetermined threshold distance (e.g., 0.5, 1, 2, 3, etc. meters) of each other and the respective location is within the threshold distance of the one or more users. In some embodiments, the one or more users and the additional users are in the first region and one or more objects are in the second region of the three-dimensional environment. In some embodiments, one or more objects are within the first region. In some embodiments, in accordance with a determination that the one or more first locations associated with the one or more users (e.g., 1314A and 1314B) are within the second region and not the first region, the respective location associated with the additional user (e.g., 1314C) is selected (e.g., automatically, by the device) so as to be within the second region (1418). In some embodiments, the one or more users are within a predetermined threshold distance (e.g., 0.5, 1, 2, 3, etc. meters) of each other and the respective location is within the threshold distance of the one or more users. In some embodiments, the one or more users and the additional users are in the second region and one or more objects are in the first region of the three-dimensional environment. In some embodiments, one or more objects are within the second region. In some embodiments, the one or more users are within the a first respective region of the three-dimensional environment so that the one or more users are near (e.g., within the threshold distance of) each other and the one or more objects are in the second respective region of the three-dimensional environment so that the one or more objects do not block the users from viewing the other users.

In some embodiments, one or more objects are within the first respective region of the three-dimensional environment (e.g., because they were placed there by a user or because the electronic device determines that the object is easier to view in the first respective region than in the second respective region). The above-described manner of selecting the respective location such that it is in a respective region of the three-dimensional environment that includes the locations associated with the one or more users provides an efficient way of enabling the additional user to interact with the one or more users, which additionally reduces power usage and improves battery life of the electronic device by enabling the user to use the electronic device more quickly and efficiently, while reducing errors in usage.

In some embodiments, the one or more objects include a first object (e.g., 1322) (e.g., a representation of an application, a file, a virtual object, content, etc.) (1420). In some embodiments, in accordance with a determination that the first object (e.g., 1322) is at a first location in the three-dimensional environment (e.g., 1304), the respective location is selected (e.g., automatically, by the device) so as to be within a threshold distance (e.g., 0.1, 0.2, 0.3, 0.4, 0.5, 1, etc. meter) of the first location (1422). In some embodiments, in accordance with a determination that the first object (e.g., 1322) is at a second location in the three-dimensional environment (e.g., 1304), the respective location is selected (e.g., automatically, by the device) so as to be within the threshold distance of the second location (1424). In some embodiments, the respective location is selected such that the additional user is within the threshold distance of the first object. In some embodiments, the first object includes content that is visible from a respective side of the first object and the respective location associated with the additional user is located a direction away from the first object that corresponds to the respective side of the first object.

The above-described manner of selecting the respective location to be within a threshold distance of the first object provides an efficient way of enabling the first user to interact with the first object which additionally reduces power usage and improves battery life of the electronic device by enabling the user to use the electronic device more quickly and efficiently, while reducing errors in usage.

In some embodiments, such as in FIG. 13A, the one or more users include a first user (e.g., 1314A) that is a host of the three-dimensional environment (e.g., 1304) (1426). In some embodiments, the first user has abilities such as adding and removing users from the three-dimensional environment, controlling one or more settings of the three-dimensional environment, approving or vetoing objects (e.g., applications, files, content) added to the three-dimensional environment by other users. In some embodiments, the first user initiated display of the three-dimensional environment. In some embodiments, such as in FIG. 13C, in accordance with a determination that the first user (e.g., 1314A) is associated with a first location in the three-dimensional environment (e.g., 1304), the respective location is selected (e.g., automatically, by the device) so as to be within a threshold distance (e.g., 0.5, 1, 2, etc. meters) of the first location (1428). In some embodiments, in accordance with a determination that the first user (e.g., 1314A) is associated with a second location in the three-dimensional environment (e.g., 1304), the respective location is selected (e.g., automatically, by the device) so as to be within the threshold distance of the second location (1430). In some embodiments, the respective location is selected such that the additional user is within the threshold distance of the host of the three-dimensional environment. In some embodiments, the respective location is elected such that the additional user is closer to the host than they are to (e.g., any of) the other users in the three-dimensional environment.

The above-described manner of selecting the respective location to be within a threshold distance of the host of the three-dimensional environment provides an efficient way of enabling interactions between the additional user and the host of the three-dimensional environment which additionally reduces power usage and improves battery life of the electronic device by enabling the user to use the electronic device more quickly and efficiently, while reducing errors in usage.

In some embodiments, such as in FIG. 13A, before adding the representation of the additional user (e.g., 1314C) to the three-dimensional environment (e.g., 1304), the one or more objects (e.g., 1306, 1308, and 1322) are visible from viewpoints of the one or more users (e.g., 1314A and 1314B) at the one or more first locations (1432). In some embodiments, such as in FIG. 13B, after adding the representation of the additional user (e.g., 1314C) to the three-dimensional environment (e.g., 1304), the one or more objects (e.g., 1306, 1308, and 1322) are visible from the viewpoints of the one or more users (e.g., 1314A and 1314B) at the one or more first locations (1434). In some embodiments, the respective location of the additional user is selected such that the additional user is not between (e.g., any of) the users that were already in the three-dimensional environment and (e.g., any of) the virtual objects that were already in the three-dimensional environment. In some embodiments, the respective location of the additional user is selected such that the additional user is not between (e.g., any of) the users and any content items (e.g., image content, video content) in the three-dimensional environment, but the respective location is optionally between one or more users and one or more objects other than content items (e.g., representations of applications, representations of real objects (e.g., pass through video or real objects in the environment of the electronic device visible through a transparent portion of the display generation component)) in the three-dimensional environment.

The above-described manner of selecting the respective location such that the one or more objects are visible from the viewpoints of the one or more users after adding the representation of the additional user at the respective location in the three-dimensional environment provides an efficient way of enabling the one or more users to continue to interact with the one or more objects which additionally reduces power usage and improves battery life of the electronic device by enabling the user to use the electronic device more quickly and efficiently, while reducing errors in usage.

In some embodiments, such as in FIG. 13A, the one or more users include a first user (e.g., 1314A) associated with a first respective location in the three-dimensional environment, and a second user (e.g., 1314B) associated with a second respective location in the three-dimensional environment (e.g., 1304) (1436). In some embodiments, the electronic device displays a representation of the first user at the first respective location in the three-dimensional environment and displays a representation of the second user at the second respective location in the three-dimensional environment. In some embodiments, the electronic device of the first user displays the three-dimensional environment from a viewpoint at the first location in the three-dimensional environment. In some embodiments, the electronic device of the second user displays the three-dimensional environment from a viewpoint at the second respective location in the three-dimensional environment. In some embodiments, such as in FIG. 13A, before the electronic device (e.g., 101) adds (1438) the representation of the additional user (e.g., 1314C) to the three-dimensional environment (e.g., 1304), a representation of the first user (e.g., 1314A) is visible from a viewpoint of the second user (e.g., 1314B) at the second respective location in the three-dimensional environment (e.g., 1304) (1440). In some embodiments, the electronic device of the second user displays the representation of the first user at the first respective location of the three-dimensional environment. In some embodiments, the representation of the first user is not blocked by (e.g., any of) the other users and/or objects from the viewpoint of the second user. In some embodiments, such as in FIG. 13A, a representation of the second user (e.g., 1314B) is visible from a viewpoint of the first user (e.g., 1314A) at the first respective location in the three-dimensional environment (e.g., 1304) (1442). In some embodiments, the electronic device of the first user displays the representation of the second user at the second respective location in the three-dimensional environment. In some embodiments, the representation of the second user is not blocked by (e.g., any of) the other users and/or objects from the viewpoint of the first user. In some embodiments, such as in FIG. 13B, the representation of the additional user (e.g., 1314C) is added to the three-dimensional environment (e.g., 1304) at a location selected (e.g., automatically, by the device) so that after adding the representation of the additional user (e.g., 1314C) to the three-dimensional environment (e.g., 1304) (1444), the representation of the first user (e.g., 1314A) is visible from the viewpoint of the second user (e.g., 1314B) at the second respective location in the three-dimensional environment, such as in FIG. 13B (1446). In some embodiments, such as in FIG. 13B, the representation of the second user (e.g., 1314B) is visible from the viewpoint of the first user (e.g., 1314A) at the first respective location in the three-dimensional environment (e.g., 1304) (1448). In some embodiments, the respective location associated with the additional user is not in between the first respective location associated with the first user and the second respective location associated with the second user so that the representation of the additional user in the three-dimensional environment does not block the visibility of the first and second users to each other.

The above-described manner of maintaining display of the first user and the second user after the additional user is added to the three-dimensional environment provides an efficient way of enabling continued interaction between the first and second users, which additionally reduces power usage and improves battery life of the electronic device by enabling the user to use the electronic device more quickly and efficiently, while reducing errors in usage.

In some embodiments, such as in FIG. 13A, the one or more objects include a first object (e.g., 1306) (e.g., a representation of an application, a file, content, or another virtual object) (1450). In some embodiments, such as in FIG. 13A, the one or more first locations associated with the one or more users (e.g., 1314A and 1314B) are on a first side of the first object (e.g., 1306) in the three-dimensional environment (e.g., 1304) (1452). In some embodiments, the first object includes content that is only visible from the first side of the first object. In some embodiments, the first object includes content that is visible from more than one side of the first object. In some embodiments, such as in FIG. 13B, the respective location associated with the additional user (e.g., 1314C) is on the first side of the first object (e.g., 1306)

in the three-dimensional environment (e.g., 1304) (1454). In some embodiments, the respective location is selected to be on the same side of one or more virtual objects in the three-dimensional environment as the side of the one or more virtual objects that the one or more users are located. In some embodiments, in accordance with a determination that the one or more first locations are on a second side of the first object different from the first side, the electronic device selects the respective location to be on the second side of the first object.

The above-described manner of selecting the respective location to be on the first side of the first object in accordance with a determination that the one or more users are associated with locations on the first side of the first object provides an efficient way of enabling the additional user to interact with the first object, which additionally reduces power usage and improves battery life of the electronic device by enabling the user to use the electronic device more quickly and efficiently, while reducing errors in usage.

In some embodiments, such as in FIG. 13C, the respective location in the three-dimensional environment (e.g., 1304) satisfies a first subset (e.g., and not all) of a plurality of user placement criteria (1456). In some embodiments, the plurality of user placement criteria include one or more user placement criteria related to the locations associated with the one or more users (e.g., being between a first threshold distance and a second threshold distance of other users, not blocking objects/users from the viewpoint of other users, being proximate to a host user, etc.) and one or more user placement criteria related to the locations associated with the one or more objects in the three-dimensional environment (e.g., being at a location at which the objects are visible, not blocking the objects from the viewpoints of other users, semantic placement according to one or more objects in the environment of the electronic device, etc.). In some embodiments, the respective location satisfies a first subset of the plurality of user placement criteria and does not satisfy one or more of the user placement criteria not included in the first subset of user placement criteria. In some embodiments, the user placement criteria include one or more or all of the factors described herein with reference to method 1400. In some embodiments, such as in FIG. 13C, a second respective location in the three-dimensional environment (e.g., 1304) satisfies a second subset (e.g., and not all) of the plurality of user placement criteria (1458). In some embodiments, the plurality of user placement criteria include one or more user placement criteria related to the locations associated with the one or more users (e.g., being between a first threshold distance and a second threshold distance of other users, not blocking objects/users from the viewpoint of other users, being proximate to a host user, etc.) and one or more user placement criteria related to the locations associated with the one or more objects in the three-dimensional environment (e.g., being at a location at which the objects are visible, not blocking the objects from the viewpoints of other users, semantic placement according to one or more objects in the environment of the electronic device, etc.). In some embodiments, the second respective location satisfies a second subset of the plurality of user placement criteria and does not satisfy one or more of the user placement criteria not included in the second subset of user placement criteria. In some embodiments, such as in FIG. 13C, the representation of the additional user (e.g., 1314C) is placed at the respective location and not the second respective location in accordance with a determination that the first subset of the plurality of user placement criteria is prioritized over (e.g., preferred by a user placement algorithm of the electronic device) the second subset of the plurality of user placement criteria (1460). In some embodiments, the first subset of the plurality of user placement criteria is prioritized over the second subset of the plurality of user placement criteria because the first subset of user placement criteria includes more criteria than the second subset of user placement criteria; because the first subset of user placement criteria includes a criterion that is more important than all of the criteria in the second subset of user placement criteria (e.g., the criteria are ranked by importance); and/or because the first subset of user placement criteria are, as a whole (e.g., on average, by a weighted average, by a metric that weighs the number of satisfied criteria and the importance of the satisfied criteria), more important than the second subset of user placement criteria (e.g., the criteria are ranked by importance). In some embodiments, the electronic device places the additional user at a location that does not satisfy all of the user placement criteria because the location is the best available location based on the user placement criteria (e.g., based on the importance ranking of one or more criteria, the number of criteria satisfied, etc.). In some embodiments, in accordance with a determination that the second subset of the plurality of user placement criteria is preferred to the first subset of the plurality of user placement criteria, the electronic device places the representation of the addition user at the second respective location and not the respective location in the three-dimensional environment.

The above-described manner of placing the representation of the additional user at the respective location in accordance with a determination that the first subset of the plurality of user placement criteria is preferred to the second subset of the plurality of user placement criteria provides an efficient way of allowing the additional user to join the three-dimensional environment even if there are no positions available that satisfy all of the user placement criteria, which additionally reduces power usage and improves battery life of the electronic device by enabling the user to use the electronic device more quickly and efficiently, while reducing errors in usage.

In some embodiments, such as in FIG. 13B, while displaying the three-dimensional environment (e.g., 1304), the electronic device (e.g., 101) detects (1462) an input corresponding to a request to add a second additional user (e.g., 1314D) to the three-dimensional environment (e.g., 1304). In some embodiments, the input is an input corresponding to a request to transmit an indication from the electronic device to the electronic device of the second additional user to allow the second additional user to access the three-dimensional environment. In some embodiments, the input is an input accepting a request for access to the three-dimensional environment from the second additional user. In some embodiments, such as in FIG. 13C, in response to detecting the input corresponding to the request to add the second additional user (e.g., 1314D) to the three-dimensional environment (e.g., 1304) (1464), in accordance with a determination that one or more criteria are satisfied, the electronic device (e.g., 101) updates (1466) the three-dimensional environment (e.g., 1304) to include a representation of the second additional user (e.g., 1314D) at a second respective location in the three-dimensional environment (e.g., 1304), wherein the second respective location is based on the one or more first locations associated with the one or more users (e.g., 1314A and 1314B) (e.g., and the respective location associated with the additional user), and the one or more objects (e.g., 1306, 1308, and 1322) at the one or more second locations. In some embodiments, the second respective location is selected according to one or more placement criteria related to the locations associated with the one or more users (including the additional user) and the locations associated with the one or more objects. In some embodiments, the one or more criteria are satisfied when there are one or more locations in the three-dimensional environment that satisfy the one or more placement criteria related to the locations associated with the one or more users (e.g., being between a first threshold distance and a second threshold distance of other users, not blocking objects/users from the viewpoint of other users, being proximate to a host user, etc.) and the locations associated with one or more objects (e.g., being at a location at which the objects are visible, not blocking the objects from the viewpoints of other users, semantic placement according to one or more objects in the environment of the electronic device, etc.). In some embodiments, in response to detecting the input corresponding to the request to add the second additional user (e.g., 1314D) to the three-dimensional environment (e.g., 1304) (1464), in accordance with a determination that the one or more criteria are not satisfied, the electronic device (e.g., 101) updates (1468) the three-dimensional environment (e.g., 1304) to include the representation of the second additional user (e.g., 1314D) at a predetermined location in the three-dimensional environment (e.g., 1304). In some embodiments, if there are no locations in the three-dimensional environment that satisfy the one or more placement criteria, the electronic device selects a predetermined location in the three-dimensional environment as the second respective location at which to display the representation of the second additional user. In some embodiments, the predetermined location does not satisfy one or more of the placement criteria. In some embodiments, the predetermined location is a fixed location (e.g., a respective set of coordinates in the three-dimensional environment). In some embodiments, the predetermined location has a fixed orientation relative to a respective location in the three-dimensional environment. For example, the predetermined location is optionally a location to the left or right of the user that most recently joined the three-dimensional environment and/or the host of the three-dimensional environment.

The above-described manner of updating the three-dimensional environment to include the representation of the second additional user at the predetermined location in the three-dimensional environment in accordance with the determination that the one or more criteria are not satisfied provides an efficient way of allowing the second additional user to join the three-dimensional environment even when the one or more criteria are not satisfied which additionally reduces power usage and improves battery life of the electronic device by enabling the user to use the electronic device more quickly and efficiently (e.g., by reducing the inputs needed to satisfy all criteria to allow the user to join), while reducing errors in usage.

In some embodiments, such as in FIG. 13B, the one or more objects include a first object (e.g., 1306) (1470). In some embodiments, a virtual object such as a representation of an application, a file, an item of content, or other virtual object or a real object such as a photorealistic representation of an object in the physical environment of the electronic device (e.g., a "pass-through" object) or a real object in the physical environment of the electronic device that is visible through a transparent part of the display generation component. In some embodiments, such as in FIG. 13B, the one or more users include a first user (e.g., 1314A) (1472). In some embodiments, such as in FIG. 13B, before adding the representation of the additional user (e.g., 1314D) to the three-dimensional environment (e.g., 1304), a first portion of the first object (e.g., 1306) has a first orientation relative to a viewpoint of the first user (e.g., 1314A) in the three-dimensional environment (e.g., 1304) (1474). In some embodiments, a bottom surface of the first object is aligned with a floor or bottom of the three-dimensional environment and is displayed below the rest of the first object by the electronic device of the first user. In some embodiments, after adding the representation of the additional user (e.g., 1314D) to the three-dimensional environment (e.g., 1304), such as in FIG. 13C, the first portion of the first object (e.g., 1306) has the first orientation relative to the viewpoint of the first user (e.g., 1314A) and relative to a viewpoint of the additional user (e.g., 1314D) in the three-dimensional environment (e.g., 1304) (1476). In some embodiments, the location and/or orientation of the additional user is selected so that the horizon from the viewpoint of the additional user is aligned with the horizon of the one or more other users. In some embodiments, the horizons of the three-dimensional environment are the same for multiple (e.g., all) users in the three-dimensional environment. In some embodiments, multiple (e.g., all) users see flat surfaces as having a same orientation relative to their field of view. For example, the floor of the three-dimensional environment appears to be flat and the walls of the three-dimensional environment appear to be perpendicular to the floor for multiple (e.g., all) users. In some embodiments, a bottom surface of the first object is aligned with a floor or bottom of the three-dimensional environment and is displayed below the rest of the first object by the electronic device of the additional user.

The above-described manner of displaying the first portion of the first object with the first orientation from the viewpoints of both the first user and the additional user provides an efficient way of aligning the three-dimensional environment according to shared coordinates for all users in the three-dimensional environment, which additionally reduces power usage and improves battery life of the electronic device by enabling the user to use the electronic device more quickly and efficiently, while reducing errors in usage.

In some embodiments, such as in FIG. 13B, the respective location associated with the additional user (e.g., 1314C) is selected (e.g., automatically, by the device) so as to be more than a threshold distance (e.g., 0.1, 0.2, 0.3, 0.4, 0.5, 1, etc. meters) away from the one or more first locations associated with the one or more users (e.g., 1314A and 1314B) (1478). In some embodiments, the three-dimensional environment includes one or more regions associated with the one or more first locations in which the electronic device does not display representations of newly-added users. In some embodiments, the boundaries of the one or more first regions are the threshold distance from the one or more first locations. In some embodiments, the boundaries of the one or more first regions depend on the orientations of one or more (e.g., all) other users in the three-dimensional environment such that the additional user is not placed in the line of sight of one or more (e.g., any) other users. In some embodiments, the one or more first regions are selected independent of the orientations of the viewpoints of the other users. For example, the electronic device does not place new users such that they are face to face with or very close to other users in the three-dimensional environment. As another example, each user has a "personal space" radius (e.g., 0.1, 0.2, 0.3, 0.4, 0.5, 1, etc. meters) in which new users are not placed by the electronic device.

The above-described manner of selecting the respective location to be at least a threshold distance away from the one or more first locations associated with the one or more users provides an efficient way of enabling the one or more users to continue interacting with the three-dimensional environment without being obstructed by the additional user when the additional user is added to the three-dimensional environment, which additionally reduces power usage and improves battery life of the electronic device by enabling the user to use the electronic device more quickly and efficiently (e.g., by reducing the time and inputs needed to move away from the additional user if the additional user is placed within a threshold distance of a first user), while reducing errors in usage.

In some embodiments, such as in FIG. 13A, the electronic device (e.g., 101*a*) is associated with a first user (e.g., 1314A) of the one or more users (1480). In some embodiments, the electronic device is the electronic device of the first user and presents the three-dimensional environment from the viewpoint of the first user in the three-dimensional environment. In some embodiments, the electronic device (e.g., 101*a*) receives (1482), via the one or more input devices, a respective input corresponding to a request to move the first user (e.g., 1314A) in the three-dimensional environment (e.g., 1304). In some embodiments, the electronic device detects, via one or more gyroscopes, accelerometers, distance sensors, cameras, etc., motion of the electronic device from one location in the physical environment of the electronic device to another location in the physical environment of the electronic device. In some embodiments, in response to receiving the respective input corresponding to the request to move the first user (e.g., 1314A) in the three-dimensional environment (e.g., 1304) (1484), the electronic device (e.g., 101) moves (1486) the first user (e.g., 1314A) in the three-dimensional environment (e.g., 1304) in accordance with the respective input. In some embodiments, the electronic device moves the representation of the first user in the three-dimensional environment in a direction corresponding to a direction associated with the input and a distance corresponding to the distance associated with the input. In some embodiments, in response to receiving the respective input corresponding to the request to move the first user (e.g., 1314A) in the three-dimensional environment (e.g., 1304) (1484), in accordance with a determination that the first user (e.g., 1314A) has moved to a location that is further than a threshold (e.g., 5, 10, 15, 20, etc. meters) distance from other users (e.g., 1314B) of the one or more users in the three-dimensional environment (e.g., 1304) and further than the threshold distance from the one or more objects (e.g., 1306, 1308, and 1322) in the three-dimensional environment (e.g., 1304), the electronic device (e.g., 101) displays (1488), via the display generation component 120, a respective selectable option that is selectable to initiate a process to move the first user (e.g., 1314A) to a location in the three-dimensional environment (e.g., 1304) based on one or more locations associated with the other users (e.g., 1314B) of the one or more users, and the one or more objects (e.g., 1306, 1308, and 1322) at the one or more second locations. In some embodiments, in response to detecting selection of the selectable option, the electronic device displays the three-dimensional environment from a viewpoint at the location in the three-dimensional environment based on the one or more locations associated with the other users of the one or more users (e.g., being between a first threshold distance and a second threshold distance of other users, not blocking objects/users from the viewpoint of other users, being proximate to a host user, etc.) and the one or more objects at the one or more second locations (e.g., being at a location at which the objects are visible, not blocking the objects from the viewpoints of other users, semantic placement according to one or more objects in the environment of the electronic device, etc.). In some embodiments, the electronic device selects the location based on the same criteria with which the electronic device selects the respective location at which to display the representation of the additional user. In some embodiments, the electronic device(s) of the other user(s) in the three-dimensional environment display the representation of the first user at the location in the three-dimensional environment based on one or more locations associated with the other users of the one or more users and the one or more objects at the second location in response to the respective input. In some embodiments, in accordance with a determination that the first user has moved to a location that is further than the threshold (e.g., 5, 10, 15, 20, etc. meters) distance from the other users but not further than the threshold distance from the objects, the electronic device displays the respective selectable option. In some embodiments, in accordance with a determination that the first user has moved to a location that is further than the threshold (e.g., 5, 10, 15, 20, etc. meters) distance from the objects but not further than the threshold distance from the other users, the electronic device displays the respective selectable option. In some embodiments, the electronic device displays the respective selectable option for resetting the user's position in the three-dimensional environment in accordance with a determination that the user has moved a threshold (e.g., 5, 10, 15, 20, etc. meters) distance away from the objects and/or users in the three-dimensional environment.

The above-described manner of displaying the respective selectable option that is selectable to initiate the process to move the first user in accordance with the determination that the first user has moved to a location that is further than the threshold distance from the other users and the one or more object provides an efficient way of automatically repositioning and/or orienting the user with respect to the other users and/or objects in the three-dimensional environment, which additionally reduces power usage and improves battery life of the electronic device by enabling the user to use the electronic device more quickly and efficiently, while reducing errors in usage.

In some embodiments, such as in FIG. 11A, in accordance with a determination that the three-dimensional environment (e.g., 1104) includes a respective object (e.g., 1128) (e.g., an object in the physical environment of the electronic device) that has a plurality of positions along the respective object (e.g., 1128) that are able to contain representations of users (1490), in accordance with a determination that one or more first criteria are satisfied, the respective location associated with the additional user is a first position of the plurality of positions along the respective object (e.g., 1128) (1492). In some embodiments, for example, a sofa is able to contain representations of users because the electronic device is able to display avatars of the users sitting on the sofa. In some embodiments, the electronic device displays a photorealistic representation of a physical object in the environment of the electronic device. In some embodiments, the physical object in the environment of the electronic device is visible through a transparent portion of the display generation component. In some embodiments, the respective object is an item of furniture. In some embodiments, the respective object is physical object in the physical environment of the electronic device other than an item of furniture. In some embodiments, for example, if the user of the electronic device is sitting on a sofa with open space next to them, the electronic device selects the space next to the user as the respective location so that the additional user appears to be sitting on the sofa with the user of the electronic device in the three-dimensional environment. In some embodiments, in accordance with a determination that one or more second criteria are satisfied, the respective location associated with the additional user is a second position, different from the first position, of the plurality of positions along the respective object (e.g., 1128), such as in FIG. 11A (1494). In some examples, the electronic device places additional users at locations corresponding to physical objects (e.g., items of furniture, other items) in the physical environment of the electronic device. For example, the electronic device places an additional user across a table from the user of the electronic device before placing another additional user at the table next to the user of the electronic device. In this example, when another additional user joins the three-dimensional environment, the electronic device displays the representation of the other additional user at the table next to the user of the electronic device and displays further additional users at the table on alternating sides (e.g., display the next user across from the user of the electronic device, then another user on the same side of the table as the user of the electronic device, and so on). As another example, if an avatar of a first other user is displayed in the seat next to the user on a sofa, the electronic device places an avatar of a second other user in the next available seat on the sofa. As another example, if there is a table in the environment of the electronic device and none of the users are displayed sitting around the table, the electronic device places the additional user at a location other than a location corresponding to the additional user sitting at the table. In some embodiments, in accordance with a determination that the physical environment of the electronic device includes objects (e.g., furniture or non-furniture) on or around which people generally sit and/or stand, the electronic device displays representations of users on or around the objects. The above-described manner of selecting the respective location from a plurality of positions along the respective object provides an efficient way of placing additional users at locations at which they can easily interact with other users in the three-dimensional environment, which additionally reduces power usage and improves battery life of the electronic device by enabling the user to use the electronic device more quickly and efficiently, while reducing errors in usage.

In some embodiments, aspects/operations of methods 800, 1000, 1200, and 1400 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
displaying, via the display generation component, a three-dimensional environment that includes a representation of a respective real object and a respective virtual object;
while displaying the three-dimensional environment, receiving, via the one or more input devices, an input corresponding to a request to move the respective virtual object in the three-dimensional environment; and
in response to receiving the input corresponding to the request to move the respective virtual object in the three-dimensional environment:
moving the respective virtual object in the three-dimensional environment in accordance with the input; and
in accordance with a determination that the movement of the respective virtual object causes at least a portion of the respective virtual object to occupy a portion of the three-dimensional environment corresponding to a first portion of the representation of the respective real object in the three-dimensional environment, modifying display of a second portion of the representation of the respective real object that surrounds the first portion of the representation of the respective real object.

2. The method of claim 1, further comprising:
in response to receiving the input corresponding to the request to move the object in the three-dimensional environment:
in accordance with a determination that the movement of the respective virtual object does not cause any portion of the respective virtual object to occupy a portion of the three-dimensional environment corresponding to the representation of the respective real object, maintaining display of the representation of the real object without modifying display of a portion of the representation of the respective real object.

3. The method of claim 1 further comprising:
in accordance with a determination that the movement of the respective virtual object causes a location corresponding to a first portion of the representation of the respective real object to be located between the respective virtual object and a location of a user in the three-dimensional environment, modifying display of a second portion of the representation of the respective real object that surrounds the first portion of the respective real object.

4. The method of claim 1, wherein the input corresponding to the request to move the respective virtual object includes a first gesture performed by a hand of a user followed by movement of the hand while maintaining the first gesture performed by the hand.

5. The method of claim 1, wherein a physical environment of the electronic device includes a first real object at a location corresponding to a respective portion of the three-dimensional environment, the method further comprising:
while displaying the respective portion of the three-dimensional environment via the display generation component, wherein a representation of the first real object is not visible via the display generation component, detecting that the electronic device is moving towards the location of the first real object in the physical environment; and
in response to detecting that the electronic device is moving towards the location of the first real object, in accordance with a determination that one or more criteria are satisfied, displaying, in the three-dimensional environment, a representation of the first real object.

6. The method of claim 1, further comprising:
in response to receiving the input corresponding to the request to move the respective virtual object in the three-dimensional environment:
   in accordance with a determination that one or more criteria are satisfied, including a respective criterion that is satisfied when a current position of the respective virtual object is within a threshold distance of the representation of the respective real object, moving the respective virtual object to a location corresponding to the representation of the respective real object in the three-dimensional environment; and
   in accordance with the determination that the one or more criteria are not satisfied, forgoing moving the respective virtual object to the location corresponding to the representation of the respective real object in the three-dimensional environment.

7. The method of claim 6, further comprising:
in response to receiving the input corresponding to the request to move the respective virtual object in the three-dimensional environment:
   in accordance with a determination that the respective criterion is satisfied, displaying, via the display generation component, a visual indication that indicates that the respective virtual object will move to the location corresponding to the representation of the respective real object in the three-dimensional environment when the one or more criteria are satisfied.

8. The method of claim 6, further comprising:
in response to receiving the input corresponding to the request to move the respective virtual object in the three-dimensional environment:
   in accordance with the determination that the one or more criteria are satisfied, displaying the respective virtual object with a first orientation relative to the three-dimensional environment based on the respective real object; and
   in accordance with the determination that the one or more criteria are not satisfied, displaying the respective virtual object with a second orientation, different from the first orientation, relative to the three-dimensional environment based on a location of a user in the three-dimensional environment.

9. The method of claim 1, wherein:
before receiving the input corresponding to the request to move the respective virtual object in the three-dimensional environment, the respective virtual object is a first distance from a user in the three-dimensional environment, and the respective virtual object is displayed at a first size, and
after receiving the input corresponding to the request to move the respective virtual object in the three-dimensional environment, the respective virtual object is a second distance, different from the first distance, from the user in the three-dimensional environment, and the respective virtual object is displayed at a second size, different from the first size.

10. The method of claim 1, further comprising:
in response to receiving the input corresponding to the request to move the respective virtual object in the three-dimensional environment:
   in accordance with a determination that the input corresponding to the request to move the respective virtual object is to a respective location in the three-dimensional environment that is coincident with a location associated with a user in the three-dimensional environment, and that the input corresponding to the request to move the respective virtual object in the three-dimensional environment has terminated, displaying the respective virtual object at a second respective location, different from the respective location, in the three-dimensional environment.

11. The method of claim 10, further comprising:
in response to receiving the input corresponding to the request to move the respective virtual object in the three-dimensional environment:
   in accordance with the determination that the input corresponding to the request to move the respective virtual object is a request to move the virtual object to the respective location in the three-dimensional environment that is coincident with the location associated with the user in the three-dimensional environment, displaying the respective virtual object at the respective location in the three-dimensional environment;
   while displaying the respective virtual object at the respective location in the three-dimensional environment, detecting the termination of the input corresponding to the request to move the respective virtual object in the three-dimensional; and
   in response to detecting the termination of the input corresponding to the request to move the respective virtual object in the three-dimensional, moving the respective virtual object to the second respective location in the three-dimensional environment.

12. The method of claim 11, further comprising:
in response to receiving the input corresponding to the request to move the respective virtual object in the three-dimensional environment:
   in accordance with the determination that the input corresponding to the request to move the respective virtual object is a request to move the virtual object to the respective location in the three-dimensional environment that is within a threshold distance of the location associated with the user in the three-dimensional environment, displaying the respective virtual object at the second respective location in the three-dimensional environment that is different from the respective location in the three-dimensional environment.

13. The method of claim 1, further comprising:
while displaying the three-dimensional environment:
   in accordance with a determination that the representation of the respective real object is between a location of a first user of the electronic device and a representation of a second user in the three-dimensional environment, displaying, via the display generation component, a visual indication of the representation of the second user on the representation of the respective real object.

14. The method of claim 1, further comprising:
while the at least the portion of the respective virtual object occupies the portion of the three-dimensional environment corresponding to the first portion of the representation of the respective real object in the three-dimensional environment, and while display of the second portion of the representation of the respective real object is modified, receiving, via the one or more input devices, additional input corresponding to a request to further move the respective virtual object in the three-dimensional environment; and in response to receiving the additional input:
further moving the respective virtual object in the three-dimensional environment in accordance with the additional input; and
in accordance with a determination that the further movement of the respective virtual object causes at least a second portion of the respective virtual object to occupy a second portion of the three-dimensional environment corresponding to a third portion, different from the first portion, of the representation of the respective real object in the three-dimensional environment, modifying display of a fourth portion, different from the second portion, of the representation of the respective real object that surrounds the third portion of the representation of the respective real object.

15. The method of claim 1, wherein the second portion of the representation of the respective real object includes one or more portions of the representation of the respective real object that are within a threshold distance of a boundary of the respective virtual object, and does not include one or more portions of the representation of the respective real object that are further than the threshold distance of the boundary of the respective virtual object.

16. An electronic device, comprising:
one or more processors;
memory; and
one or more programs, wherein the one or more programs are stored in the memory and configured to be executed by the one or more processors, the one or more programs including instructions for:
displaying, via a display generation component in communication with the electronic device, a three-dimensional environment that includes a representation of a respective real object and a respective virtual object;
while displaying the three-dimensional environment, receiving, via one or more input devices in communication with the electronic device, an input corresponding to a request to move the respective virtual object in the three-dimensional environment; and
in response to receiving the input corresponding to the request to move the respective virtual object in the three-dimensional environment:
moving the respective virtual object in the three-dimensional environment in accordance with the input; and
in accordance with a determination that the movement of the respective virtual object causes at least a portion of the respective virtual object to occupy a portion of the three-dimensional environment corresponding to a first portion of the representation of the respective real object in the three-dimensional environment, modifying display of a second portion of the representation of the respective real object that surrounds the first portion of the representation of the respective real object.

17. The electronic device of claim 16, wherein the one or more programs further include instructions for:
in response to receiving the input corresponding to the request to move the object in the three-dimensional environment:
in accordance with a determination that the movement of the respective virtual object does not cause any portion of the respective virtual object to occupy a portion of the three-dimensional environment corresponding to the representation of the respective real object, maintaining display of the representation of the real object without modifying display of a portion of the representation of the respective real object.

18. The electronic device of claim 16, wherein the one or more programs further include instructions for:
in accordance with a determination that the movement of the respective virtual object causes a location corresponding to a first portion of the representation of the respective real object to be located between the respective virtual object and a location of a user in the three-dimensional environment, modifying display of a second portion of the representation of the respective real object that surrounds the first portion of the respective real object.

19. The electronic device of claim 16, wherein the input corresponding to the request to move the respective virtual object includes a first gesture performed by a hand of a user followed by movement of the hand while maintaining the first gesture performed by the hand.

20. The electronic device of claim 16, wherein a physical environment of the electronic device includes a first real object at a location corresponding to a respective portion of the three-dimensional environment, the one or more programs further including instructions for:
while displaying the respective portion of the three-dimensional environment via the display generation component, wherein a representation of the first real object is not visible via the display generation component, detecting that the electronic device is moving towards the location of the first real object in the physical environment; and
in response to detecting that the electronic device is moving towards the location of the first real object, in accordance with a determination that one or more criteria are satisfied, displaying, in the three-dimensional environment, a representation of the first real object.

21. The electronic device of claim 16, wherein the one or more programs further include instructions for:
in response to receiving the input corresponding to the request to move the respective virtual object in the three-dimensional environment:
in accordance with a determination that one or more criteria are satisfied, including a respective criterion that is satisfied when a current position of the respective virtual object is within a threshold distance of the representation of the respective real object, moving the respective virtual object to a location corresponding to the representation of the respective real object in the three-dimensional environment; and
in accordance with the determination that the one or more criteria are not satisfied, forgoing moving the respective virtual object to the location corresponding to the representation of the respective real object in the three-dimensional environment.

22. The electronic device of claim 21, wherein the one or more programs further include instructions for:
in response to receiving the input corresponding to the request to move the respective virtual object in the three-dimensional environment:
in accordance with a determination that the respective criterion is satisfied, displaying, via the display generation component, a visual indication that indicates that the respective virtual object will move to the location corresponding to the representation of the respective real object in the three-dimensional environment when the one or more criteria are satisfied.

23. The electronic device of claim 21, wherein the one or more programs further include instructions for:
- in response to receiving the input corresponding to the request to move the respective virtual object in the three-dimensional environment:
  - in accordance with the determination that the one or more criteria are satisfied, displaying the respective virtual object with a first orientation relative to the three-dimensional environment based on the respective real object; and
  - in accordance with the determination that the one or more criteria are not satisfied, displaying the respective virtual object with a second orientation, different from the first orientation, relative to the three-dimensional environment based on a location of a user in the three- dimensional environment.

24. The electronic device of claim 16, wherein:
- before receiving the input corresponding to the request to move the respective virtual object in the three-dimensional environment, the respective virtual object is a first distance from a user in the three-dimensional environment, and the respective virtual object is displayed at a first size, and
- after receiving the input corresponding to the request to move the respective virtual object in the three-dimensional environment, the respective virtual object is a second distance, different from the first distance, from the user in the three-dimensional environment, and the respective virtual object is displayed at a second size, different from the first size.

25. The electronic device of claim 16, wherein the one or more programs further include instructions for:
- in response to receiving the input corresponding to the request to move the respective virtual object in the three-dimensional environment:
  - in accordance with a determination that the input corresponding to the request to move the respective virtual object is to a respective location in the three-dimensional environment that is coincident with a location associated with a user in the three-dimensional environment, and that the input corresponding to the request to move the respective virtual object in the three-dimensional environment has terminated, displaying the respective virtual object at a second respective location, different from the respective location, in the three-dimensional environment.

26. The electronic device of claim 25, wherein the one or more programs further include instructions for:
- in response to receiving the input corresponding to the request to move the respective virtual object in the three-dimensional environment:
  - in accordance with the determination that the input corresponding to the request to move the respective virtual object is a request to move the virtual object to the respective location in the three-dimensional environment that is coincident with the location associated with the user in the three-dimensional environment, displaying the respective virtual object at the respective location in the three-dimensional environment;
  - while displaying the respective virtual object at the respective location in the three-dimensional environment, detecting the termination of the input corresponding to the request to move the respective virtual object in the three-dimensional; and
  - in response to detecting the termination of the input corresponding to the request to move the respective virtual object in the three-dimensional, moving the respective virtual object to the second respective location in the three-dimensional environment.

27. The electronic device of claim 26, wherein the one or more programs further include instructions for:
- in response to receiving the input corresponding to the request to move the respective virtual object in the three-dimensional environment:
  - in accordance with the determination that the input corresponding to the request to move the respective virtual object is a request to move the virtual object to the respective location in the three-dimensional environment that is within a threshold distance of the location associated with the user in the three-dimensional environment, displaying the respective virtual object at the second respective location in the three-dimensional environment that is different from the respective location in the three-dimensional environment.

28. The electronic device of claim 16, wherein the one or more programs further include instructions for:
- while displaying the three-dimensional environment:
  - in accordance with a determination that the representation of the respective real object is between a location of a first user of the electronic device and a representation of a second user in the three-dimensional environment, displaying, via the display generation component, a visual indication of the representation of the second user on the representation of the respective real object.

29. The electronic device of claim 16, wherein the one or more programs further include instructions for:
- while the at least the portion of the respective virtual object occupies the portion of the three-dimensional environment corresponding to the first portion of the representation of the respective real object in the three-dimensional environment, and while display of the second portion of the representation of the respective real object is modified, receiving, via the one or more input devices, additional input corresponding to a request to further move the respective virtual object in the three-dimensional environment; and
- in response to receiving the additional input:
  - further moving the respective virtual object in the three-dimensional environment in accordance with the additional input; and
  - in accordance with a determination that the further movement of the respective virtual object causes at least a second portion of the respective virtual object to occupy a second portion of the three-dimensional environment corresponding to a third portion, different from the first portion, of the representation of the respective real object in the three-dimensional environment, modifying display of a fourth portion, different from the second portion, of the representation of the respective real object that surrounds the third portion of the representation of the respective real object.

30. The electronic device of claim 16, wherein the second portion of the representation of the respective real object includes one or more portions of the representation of the respective real object that are within a threshold distance of a boundary of the respective virtual object, and does not include one or more portions of the representation of the respective real object that are further than the threshold distance of the boundary of the respective virtual object.

31. A non-transitory computer readable storage medium storing one or more programs, the one or more programs comprising instructions, which when executed by one or more processors of an electronic device, cause the electronic device to:
display, via a display generation component in communication with the electronic device, a three-dimensional environment that includes a representation of a respective real object and a respective virtual object;
while displaying the three-dimensional environment, receive, via one or more input devices in communication with the electronic device, an input corresponding to a request to move the respective virtual object in the three-dimensional environment; and
in response to receiving the input corresponding to the request to move the respective virtual object in the three-dimensional environment:
move the respective virtual object in the three-dimensional environment in accordance with the input; and
in accordance with a determination that the movement of the respective virtual object causes at least a portion of the respective virtual object to occupy a portion of the three-dimensional environment corresponding to a first portion of the representation of the respective real object in the three-dimensional environment, modify display of a second portion of the representation of the respective real object that surrounds the first portion of the representation of the respective real object.

32. The non-transitory computer readable storage medium of claim 31, wherein the one or more programs further cause the electronic device to:
in response to receiving the input corresponding to the request to move the object in the three-dimensional environment:
in accordance with a determination that the movement of the respective virtual object does not cause any portion of the respective virtual object to occupy a portion of the three-dimensional environment corresponding to the representation of the respective real object, maintain display of the representation of the real object without modifying display of a portion of the representation of the respective real object.

33. The non-transitory computer readable storage medium of claim 31, wherein the one or more programs further cause the electronic device to:
in accordance with a determination that the movement of the respective virtual object causes a location corresponding to a first portion of the representation of the respective real object to be located between the respective virtual object and a location of a user in the three-dimensional environment, modify display of a second portion of the representation of the respective real object that surrounds the first portion of the respective real object.

34. The non-transitory computer readable storage medium of claim 31, wherein the input corresponding to the request to move the respective virtual object includes a first gesture performed by a hand of a user followed by movement of the hand while maintaining the first gesture performed by the hand.

35. The non-transitory computer readable storage medium of claim 31, wherein a physical environment of the electronic device includes a first real object at a location corresponding to a respective portion of the three-dimensional environment, the one or more programs further cause the electronic device to:
while displaying the respective portion of the three-dimensional environment via the display generation component, wherein a representation of the first real object is not visible via the display generation component, detect that the electronic device is moving towards the location of the first real object in the physical environment; and
in response to detecting that the electronic device is moving towards the location of the first real object, in accordance with a determination that one or more criteria are satisfied, display, in the three-dimensional environment, a representation of the first real object.

36. The non-transitory computer readable storage medium of claim 31, wherein the one or more programs further cause the electronic device to:
in response to receiving the input corresponding to the request to move the respective virtual object in the three-dimensional environment:
in accordance with a determination that one or more criteria are satisfied, including a respective criterion that is satisfied when a current position of the respective virtual object is within a threshold distance of the representation of the respective real object, move the respective virtual object to a location corresponding to the representation of the respective real object in the three-dimensional environment; and
in accordance with the determination that the one or more criteria are not satisfied, forgo moving the respective virtual object to the location corresponding to the representation of the respective real object in the three-dimensional environment.

37. The non-transitory computer readable storage medium of claim 36, wherein the one or more programs further cause the electronic device to:
in response to receiving the input corresponding to the request to move the respective virtual object in the three-dimensional environment:
in accordance with a determination that the respective criterion is satisfied, display, via the display generation component, a visual indication that indicates that the respective virtual object will move to the location corresponding to the representation of the respective real object in the three-dimensional environment when the one or more criteria are satisfied.

38. The non-transitory computer readable storage medium of claim 36, wherein the one or more programs further cause the electronic device to:
in response to receiving the input corresponding to the request to move the respective virtual object in the three-dimensional environment:
in accordance with the determination that the one or more criteria are satisfied, display the respective virtual object with a first orientation relative to the three-dimensional environment based on the respective real object; and
in accordance with the determination that the one or more criteria are not satisfied, display the respective virtual object with a second orientation, different from the first orientation, relative to the three-dimensional environment based on a location of a user in the three-dimensional environment.

39. The non-transitory computer readable storage medium of claim 31, wherein:

before receiving the input corresponding to the request to move the respective virtual object in the three-dimensional environment, the respective virtual object is a first distance from a user in the three-dimensional environment, and the respective virtual object is displayed at a first size, and after receiving the input corresponding to the request to move the respective virtual object in the three-dimensional environment, the respective virtual object is a second distance, different from the first distance, from the user in the three-dimensional environment, and the respective virtual object is displayed at a second size, different from the first size.

40. The non-transitory computer readable storage medium of claim 31, wherein the one or more programs further cause the electronic device to:
in response to receiving the input corresponding to the request to move the respective virtual object in the three-dimensional environment:
in accordance with a determination that the input corresponding to the request to move the respective virtual object is to a respective location in the three-dimensional environment that is coincident with a location associated with a user in the three-dimensional environment, and that the input corresponding to the request to move the respective virtual object in the three-dimensional environment has terminated, display the respective virtual object at a second respective location, different from the respective location, in the three-dimensional environment.

41. The non-transitory computer readable storage medium of claim 40, wherein the one or more programs further cause the electronic device to:
in response to receiving the input corresponding to the request to move the respective virtual object in the three-dimensional environment:
in accordance with the determination that the input corresponding to the request to move the respective virtual object is a request to move the virtual object to the respective location in the three-dimensional environment that is coincident with the location associated with the user in the three-dimensional environment, display the respective virtual object at the respective location in the three-dimensional environment;
while displaying the respective virtual object at the respective location in the three-dimensional environment, detect the termination of the input corresponding to the request to move the respective virtual object in the three-dimensional; and
in response to detecting the termination of the input corresponding to the request to move the respective virtual object in the three-dimensional, move the respective virtual object to the second respective location in the three-dimensional environment.

42. The non-transitory computer readable storage medium of claim 41, wherein the one or more programs further cause the electronic device to:
in response to receiving the input corresponding to the request to move the respective virtual object in the three-dimensional environment:
in accordance with the determination that the input corresponding to the request to move the respective virtual object is a request to move the virtual object to the respective location in the three-dimensional environment that is within a threshold distance of the location associated with the user in the three-dimensional environment, display the respective virtual object at the second respective location in the three-dimensional environment that is different from the respective location in the three-dimensional environment.

43. The non-transitory computer readable storage medium of claim 31, wherein the one or more programs further cause the electronic device to:
while displaying the three-dimensional environment:
in accordance with a determination that the representation of the respective real object is between a location of a first user of the electronic device and a representation of a second user in the three-dimensional environment, display, via the display generation component, a visual indication of the representation of the second user on the representation of the respective real object.

44. The non-transitory computer readable storage medium of claim 31, wherein the one or more programs further cause the electronic device to:
while the at least the portion of the respective virtual object occupies the portion of the three-dimensional environment corresponding to the first portion of the representation of the respective real object in the three-dimensional environment, and while display of the second portion of the representation of the respective real object is modified, receive, via the one or more input devices, additional input corresponding to a request to further move the respective virtual object in the three-dimensional environment; and
in response to receiving the additional input:
further move the respective virtual object in the three-dimensional environment in accordance with the additional input; and
in accordance with a determination that the further movement of the respective virtual object causes at least a second portion of the respective virtual object to occupy a second portion of the three-dimensional environment corresponding to a third portion, different from the first portion, of the representation of the respective real object in the three-dimensional environment, modify display of a fourth portion, different from the second portion, of the representation of the respective real object that surrounds the third portion of the representation of the respective real object.

45. The non-transitory computer readable storage medium of claim 31, wherein the second portion of the representation of the respective real object includes one or more portions of the representation of the respective real object that are within a threshold distance of a boundary of the respective virtual object, and does not include one or more portions of the representation of the respective real object that are further than the threshold distance of the boundary of the respective virtual object.

\* \* \* \* \*